(12) United States Patent
Chassin et al.

(10) Patent No.: US 9,026,473 B2
(45) Date of Patent: May 5, 2015

(54) USING BI-DIRECTIONAL COMMUNICATIONS IN A MARKET-BASED RESOURCE ALLOCATION SYSTEM

(71) Applicant: Battelle Memorial Institute, Richland, WA (US)

(72) Inventors: David P. Chassin, Pasco, WA (US); Robert G. Pratt, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 13/965,049

(22) Filed: Aug. 12, 2013

(65) Prior Publication Data

US 2013/0325692 A1 Dec. 5, 2013

Related U.S. Application Data

(62) Division of application No. 12/587,009, filed on Sep. 29, 2009, now Pat. No. 8,694,409.

(60) Provisional application No. 61/194,596, filed on Sep. 29, 2008.

(51) Int. Cl.
*G06Q 30/08* (2012.01)
*G06Q 20/10* (2012.01)
(Continued)

(52) U.S. Cl.
CPC .............. *G06Q 30/08* (2013.01); *G06Q 20/102* (2013.01); *G06Q 50/06* (2013.01); *G06Q 40/04* (2013.01); *Y04S 50/12* (2013.01); *G06Q 30/0611* (2013.01)

(58) Field of Classification Search
None
See application file for complete search history.

(56) References Cited

U.S. PATENT DOCUMENTS

| 5,572,438 A | 11/1996 | Ehlers et al. |
| 5,684,710 A | 11/1997 | Ehlers et al. |

(Continued)

FOREIGN PATENT DOCUMENTS

| JP | 2008-204073 | | 9/2008 | |
| WO | WO 99/01822 | * | 1/1999 | .............. G06F 15/00 |

(Continued)

OTHER PUBLICATIONS

Charles R. Plott and Jared Smith, Instability of Equilibria in Experimental Markets: Upward-sloping Demands, Externalities, and Fad-like Incentives, Southern Economic Journal, Jan. 1999, vol. 65, iss. 3.*

(Continued)

*Primary Examiner* — Robert R Niquette
(74) *Attorney, Agent, or Firm* — Klarquist Sparkman, LLP

(57) ABSTRACT

Disclosed herein are representative embodiments of methods, apparatus, and systems for distributing a resource (such as electricity) using a resource allocation system. In one exemplary embodiment, a plurality of requests for electricity are received from a plurality of end-use consumers. The requests indicate a requested quantity of electricity and a consumer-requested index value indicative of a maximum price a respective end-use consumer will pay for the requested quantity of electricity. A plurality of offers for supplying electricity are received from a plurality of resource suppliers. The offers indicate an offered quantity of electricity and a supplier-requested index value indicative of a minimum price for which a respective supplier will produce the offered quantity of electricity. A dispatched index value is computed at which electricity is to be supplied based at least in part on the consumer-requested index values and the supplier-requested index values.

20 Claims, 58 Drawing Sheets

(51) Int. Cl.
*G06Q 50/06* (2012.01)
*G06Q 40/04* (2012.01)
*G06Q 30/06* (2012.01)

(56) References Cited

U.S. PATENT DOCUMENTS

| | | | |
|---|---|---|---|
| 5,696,695 A | 12/1997 | Ehlers et al. | |
| 5,924,486 A | 7/1999 | Ehlers et al. | |
| 6,216,956 B1 | 4/2001 | Ehlers et al. | |
| 6,633,823 B2 | 10/2003 | Bartone et al. | |
| 6,963,854 B1* | 11/2005 | Boyd et al. | 705/37 |
| 7,043,380 B2* | 5/2006 | Rodenberg et al. | 702/62 |
| 7,085,739 B1 | 8/2006 | Winter et al. | |
| 7,130,719 B2 | 10/2006 | Ehlers et al. | |
| 7,135,956 B2 | 11/2006 | Bartone et al. | |
| 7,141,321 B2 | 11/2006 | McArthur et al. | |
| 7,243,044 B2 | 7/2007 | McCalla | |
| 7,249,169 B2 | 7/2007 | Blouin et al. | |
| 7,343,226 B2 | 3/2008 | Ehlers et al. | |
| 7,343,360 B1 | 3/2008 | Ristanovic et al. | |
| 7,379,997 B2 | 5/2008 | Ehlers et al. | |
| 7,418,428 B2 | 8/2008 | Ehlers et al. | |
| 7,516,106 B2 | 4/2009 | Ehlers et al. | |
| 7,599,866 B2 | 10/2009 | Yan et al. | |
| 7,716,101 B2 | 5/2010 | Sandholm et al. | |
| 7,953,519 B2 | 5/2011 | Hamilton, II et al. | |
| 7,996,296 B2 | 8/2011 | Lange | |
| 8,126,794 B2 | 2/2012 | Lange et al. | |
| 8,271,345 B1 | 9/2012 | Milgrom et al. | |
| 8,504,463 B2 | 8/2013 | Johnson et al. | |
| 8,527,389 B2 | 9/2013 | Johnson et al. | |
| 8,577,778 B2 | 11/2013 | Lange et al. | |
| 2001/0032029 A1 | 10/2001 | Kauffman | |
| 2002/0038279 A1 | 3/2002 | Samuelson et al. | |
| 2002/0091626 A1 | 7/2002 | Johnson et al. | |
| 2002/0128747 A1 | 9/2002 | Mima | |
| 2002/0178047 A1 | 11/2002 | Or et al. | |
| 2003/0014379 A1 | 1/2003 | Saias et al. | |
| 2003/0023540 A2* | 1/2003 | Johnson et al. | 705/37 |
| 2003/0041002 A1* | 2/2003 | Hao et al. | 705/37 |
| 2003/0055774 A1 | 3/2003 | Ginsberg | |
| 2003/0093357 A1 | 5/2003 | Guler et al. | |
| 2003/0144864 A1 | 7/2003 | Mazzarella | |
| 2004/0010478 A1 | 1/2004 | Peljto et al. | |
| 2004/0128266 A1* | 7/2004 | Yellepeddy et al. | 705/412 |
| 2004/0140908 A1 | 7/2004 | Gladwin et al. | |
| 2004/0153330 A1 | 8/2004 | Miller et al. | |
| 2004/0254688 A1 | 12/2004 | Chassin et al. | |
| 2005/0027636 A1 | 2/2005 | Gilbert et al. | |
| 2005/0065867 A1 | 3/2005 | Aisu et al. | |
| 2005/0114255 A1 | 5/2005 | Shields et al. | |
| 2005/0125243 A1* | 6/2005 | Villalobos | 705/1 |
| 2005/0137959 A1 | 6/2005 | Yan et al. | |
| 2005/0197875 A1 | 9/2005 | Kauffman | |
| 2005/0228553 A1 | 10/2005 | Tryon | |
| 2006/0036357 A1 | 2/2006 | Isono et al. | |
| 2006/0241951 A1 | 10/2006 | Cynamom et al. | |
| 2006/0259199 A1 | 11/2006 | Gjerde et al. | |
| 2007/0011080 A1 | 1/2007 | Jain et al. | |
| 2007/0061248 A1 | 3/2007 | Shavit et al. | |
| 2007/0087756 A1 | 4/2007 | Hoffberg | |
| 2007/0124026 A1 | 5/2007 | Troxell et al. | |
| 2008/0021628 A1 | 1/2008 | Tryon | |
| 2008/0027639 A1 | 1/2008 | Tryon | |
| 2008/0039980 A1 | 2/2008 | Pollack et al. | |
| 2008/0046387 A1 | 2/2008 | Gopal et al. | |
| 2008/0051977 A1 | 2/2008 | Tryon | |
| 2008/0243664 A1 | 10/2008 | Shavit et al. | |
| 2008/0243682 A1 | 10/2008 | Shavit et al. | |
| 2008/0243719 A1 | 10/2008 | Shavit et al. | |
| 2008/0297113 A1 | 12/2008 | Saeki et al. | |
| 2008/0300907 A1 | 12/2008 | Musier et al. | |
| 2008/0300935 A1 | 12/2008 | Musier et al. | |
| 2008/0306801 A1 | 12/2008 | Musier et al. | |
| 2009/0132360 A1 | 5/2009 | Arfin et al. | |
| 2009/0177591 A1 | 7/2009 | Thorpe et al. | |
| 2009/0195349 A1 | 8/2009 | Frader-Thompson et al. | |
| 2009/0313174 A1 | 12/2009 | Hafner et al. | |
| 2010/0010939 A1 | 1/2010 | Arfin et al. | |
| 2010/0106332 A1 | 4/2010 | Chassin et al. | |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0179862 A1 | 7/2010 | Pratt et al. | |
| 2010/0216545 A1 | 8/2010 | Lange et al. | |
| 2010/0217550 A1 | 8/2010 | Crabtree et al. | |
| 2010/0218108 A1 | 8/2010 | Crabtree et al. | |
| 2010/0256999 A1* | 10/2010 | Ghani et al. | 705/4 |
| 2010/0332373 A1 | 12/2010 | Crabtree et al. | |
| 2011/0015801 A1 | 1/2011 | Mazzarella | |
| 2011/0016055 A1 | 1/2011 | Mazzarella | |
| 2011/0081955 A1 | 4/2011 | Lange et al. | |
| 2011/0301964 A1 | 12/2011 | Conwell | |
| 2012/0022995 A1 | 1/2012 | Lange | |
| 2013/0325691 A1 | 12/2013 | Chassin et al. | |
| 2013/0325692 A1 | 12/2013 | Chassin et al. | |

FOREIGN PATENT DOCUMENTS

| | | |
|---|---|---|
| WO | WO 02/23693 | 3/2002 |
| WO | WO 2007/065135 | 6/2007 |

OTHER PUBLICATIONS

Borenstein et al., "Diagnosing Market Power in California's Deregulated Wholesale Electricity Market," University of California Energy Institute, Power, PWP-064, 54 pp. (Aug. 2000).

Borenstein et al., "Diagnosing Market Power in California's Deregulated Wholesale Electricity Market," University of California Energy Institute, Power, PWP-064, 52 pp. (Mar. 2000).

Chassin, "Statistical Mechanics: A Possible Model for Market-based Electric Power Control", Proc. of the 37th Hawaii Int'l Conf. on System Sciences, 10 pp. (Jan. 2004).

Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).

Denton et al., "Spot Market Mechanism Design and Competitivity Issues in Electric Power", Proc. of the 31st Hawaii International Conference on System Sciences, vol. 3, pp. 48-56 (Jan. 1998).

Gjerstad et al., "Price Formation in Double Auctions," Games and Economic Behavior, vol. 22, article No. GA970576, pp. 1-29 (1998). (Document marked as Received Nov. 30, 1995).

Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).

Lu et al., "Reputation-Aware Transaction Mechanisms in Grid Resource Market," IEEE Sixth Int'l Conf. on Grid and Cooperative Computing, 6 pp. (Aug. 2007).

Nanduri et al., "A Methodology for Evaluating Auction Based Pricing Strategies in Deregulated Energy Markets," Working Paper, 12 pp. (2005).

Nanduri, et al., "A Reinforcement Learning Model to Assess Market Power Under Auction-Based Energy Pricing," IEEE Trans. on Power Systems, vol. 22, No. 1, pp. 85-95 (Feb. 2007).

Satayapiwat et al., "A Utility-based Double Auction Mechanism for Efficient Grid Resource Allocation," Int'l Symp. on Parallel and Distributed Processing with Applications (ISPA '08), pp. 252-260 (Dec. 10-12, 2008).

Yin et al., "A Novel Double Auction Mechanism for Electronic Commerce: Theory and Implementation," IEEE Proc. of the Third Int'l Conf. on Machine Learning and Cybernetics, pp. 53-58 (Aug. 2004).

Boyd et al., "Load Reduction, Demand Response, and Energy Efficient Technologies and Strategies," Pacific Northwest National Laboratory PNNL-18111, 44 pp. (Nov. 2008).

Brambley, "Thinking Ahead: Autonomic Buildings," *ACEEE Summer Study on the Energy Efficiency in Buildings*, vol. 7, pp. 73-86 (2002).

Chandley, "How RTOs Set Spot Market Prices (And How It Helps Keep the Lights On)," *PJM Interconnection*, 23 pp. (Sep. 2007).

(56) References Cited

OTHER PUBLICATIONS

Chassin et al., "Decentralized Coordination through Digital Technology, Dynamic Pricing, and Customer-Driven Control: The GridWise Testbed Demonstration Project," *The Electricity Journal*, vol. 21, pp. 51-59 (Oct. 2008).
Chassin et al., "Gauss-Seidel Accelerated: Implementing Flow Solvers on Field Programmable Gate Arrays," *IEEE Power Engineering Society General Meeting*, 5 pp. (Jun. 2006).
Chassin et al., "GridLAB-D: An open-source power systems modeling and simulation environment," *IEEE*, 5 pp. (Apr. 2008).
Chassin, "GridLAB-D Technical Support Document: Tape Modules Version 1.0," Pacific Northwest National Laboratory PNNL-17614, 8 pp. (May 2008).
Chassin, "GridLAB-D Technical Support Document: Commercial Modules Version 1.0," Pacific Northwest National Laboratory PNNL-17615, 8 pp. (May 2008).
Chassin, "GridLAB-D Technical Support Document: Network Module Version 1.0," Pacific Northwest National Laboratory PNNL-17616, 10 pp. (May 2008).
Chassin et al., "Modeling Power Systems as Complex Adaptive Systems," Pacific Northwest National Laboratory PNNL-14987, 151 pp. (Dec. 2004).
Chassin et al., "Project 2.6—Enhancement of the Whole-Building Diagnostician," Pacific Northwest National Laboratory PNNL-14383, 17 pp. (Aug. 2003).
Chassin, "The Abstract Machine Model for Transaction-based System Control," Pacific Northwest National Laboratory PNNL-14082, 28 pp. (Nov. 2002).
Chassin et al., "The pacific northwest demand response market demonstration," *IEEE*, 6 pp. (Jul. 2008).
Clearwater et al., "Thermal Markets for Controlling Building Environments," *Energy Engineering*, vol. 91, No. 3, pp. 26-56 (1994).
Gatterbauer, "Interdependencies of Electricity Market Characteristics and Bidding Strategies of Power Producers," Master's Thesis, Massachusetts Institute of Technology, 33 pp. (May 2002).
Georgilakis, "Market Clearing Price Forecasting in Deregulated Electricity Markets Using Adaptively Trained Neural Networks," *Hellenic Conference on Artificial Intelligence*, vol. 3955, pp. 56-66 (2006).
Guttromson et al., "Residential energy resource models for distribution feeder simulation," *IEEE*, vol. 1, pp. 108-113 (Jul. 2003).
Hammerstrom et al., "Pacific Northwest GridWise Testbed Demonstration Projects: Part I. Olympic Peninsula Project," Pacific Northwest National Laboratory PNNL-17167, 157 pp. (Oct. 2007).
Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).
Hatley et al., "Energy Management and Control System: Desired Capabilities and Functionality," Pacific Northwest National Laboratory PNNL-15074, 46 pp. (Apr. 2005).
Huang et al., "Transforming Power Grid Operations," *Scientific Computing*, vol. 45, No. 5, pp. 22-27 (Apr. 2007).
Kannberg et al., "GridWise: The Benefits of a Transformed Energy System," Pacific Northwest National Laboratory PNNL-14396, 48 pp. (Sep. 2003).
Katipamula et al., "Evaluation of Residential HVAC Control Strategies for Demand Response Programs," *ASHRAE Trans., Symp. on Demand Response Strategies for Building Systems*, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kiesling, "Retail Electricity Deregulation: Prospects and Challenges for Dynamic Pricing and Enabling Technologies," The Searle Center Annual Review of Regulation, 44 pp. (May 2007).
Kintner-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Kok et al., "Agent-based Electricity Balancing with Distributed Energy Resources, A Multiperspective Case Study," *Proc. Hawaii Int'l Conf. on System Sciences*, 10 pp. (Jan. 2008).
Kok et al., "PowerMatcher: Multiagent Control in the Electricity Infrastructure," *AAMAS*, 8 pp. (Jul. 2005).
LeMay et al., "An Integrated Architecture for Demand Response Communications and Control," *Hawaii Int'l Conf. on System Sciences*, 10 pp. (Jan. 2008).
Lu et al., "A State-Queueing Model of Thermostatically Controlled Appliances," *IEEE Trans. on Power Systems*, vol. 19, No. 3, pp. 1666-1673 (Aug. 2004).
Lu et al., "Control Strategies of Thermostatically Controlled Appliances in a Competitive Electricity Market," *IEEE Proc. Power Engineering Society General Meeting*, pp. 202-207 (Jun. 2005).
Lu et al., "Design Considerations for Frequency Responsive Grid Friendly Appliances," *IEEE PES Trans. and Distribution Conference and Exhibition*, 6 pp. (May 2006).
Lu et al., "Modeling Uncertainties in Aggregated Thermostatically Controlled Loads Using a State Queueing Model," *IEEE Trans. on Power Systems*, vol. 20, No. 2, pp. 725-733 (May 2005).
Lu et al., "Simulating Price Responsive Distributed Resources," *IEEE*, vol. 3, pp. 1538-1543 (Oct. 2004).
Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).
Pourebrahimi et al., "Market-based Resource Allocation in Grids," *IEEE Int'l Conf. on e-Science and Grid Computing*, 8 pp. (2006).
Pratt et al., "Potential Impacts of High Penetration of Plug-in Hybrid Vehicles on the U.S. Power Grid," DOE/EERE PHEV Stakeholder Workshop, 14 pp. (Jun. 2007).
Schneider et al., "A Taxonomy of North American Radial Distribution Feeders," IEEE Power & Energy Society General Meeting, 6 pp. (Jul. 2009).
Schneider et al., "Distribution Power Flow for Smart Grid Technologies," IEEE/PES Power System Conference and Exhibition, 7 pp. (Mar. 2009).
Schneider et al., "Modern Grid Strategy: Enhanced GridLAB-D Capabilities Final Report," Pacific Northwest National Laboratory PNNL-18864, 30 pp. (Sep. 2009).
Taylor et al., "GridLAB-D Technical Support Document: Residential End-Use Module Version 1.0," Pacific Northwest National Laboratory PNNL-17694, 30 pp. (Jul. 2008).
Notice of Allowance from the United States Patent & Trademark Office in copending U.S. Appl. No. 12/587,008, 11 pages, dated Oct. 8, 2013.
Notice of Allowance from the United States Patent & Trademark Office in copending U.S. Appl. No. 12/587,009, 15 pages, dated Oct. 28, 2013.

* cited by examiner

USING BI-DIRECTIONAL COMMUNICATIONS IN A MARKET-BASED RESOURCE ALLOCATION SYSTEM

CROSS REFERENCE TO RELATED APPLICATIONS

This application is a divisional of U.S. patent application Ser. No. 12/587,009, filed Sep. 29, 2009, and entitled "USING BI-DIRECTIONAL COMMUNICATIONS IN A MARKET-BASED RESOURCE ALLOCATION SYSTEM," which claims the benefit of U.S. Provisional Application No. 61/194,596, filed on Sep. 29, 2008, and entitled "METHOD AND SYSTEM FOR ELECTRIC POWER GRID CONTROL," both of which are hereby incorporated by reference in their entirety.

ACKNOWLEDGMENT OF GOVERNMENT SUPPORT

This invention was made with Government support under Contract DE-AC05-76RLO1830 awarded by the U.S. Department of Energy. The Government has certain rights in the invention.

FIELD

This application relates generally to the field of power grid management and control.

BACKGROUND

The demand for electricity is expected to continue its historical growth trend far into the future. To meet this growth with traditional approaches would require adding power generation, transmission, and distribution that may cost in the aggregate up to $2,000/kW on the utility side of the meter. The amount of capacity in generation, transmission, and distribution generally must meet peak demand and must provide a reserve margin to protect against outages and other contingencies. The nominal capacity of many power-grid assets is typically used for only a few hundred hours per year. Traditional approaches for maintaining the adequacy of the nation's power generation and delivery system are characterized by sizing system components to meet peak demand, which occurs only a few hours during the year. Thus, overall asset utilization remains low, particularly for assets located near the end-user in the distribution portion of the system.

The increased availability of energy-information technologies can play an important role in addressing the asset utilization issue cost-effectively. It has been estimated that $57 billion savings could be realized by applying smart technologies throughout the nation's electric generation, transmission, and distribution systems over the next 20 years.

Accordingly, there is a need for improved power distribution systems and techniques that allow larger portions of the demand-side infrastructure to function as an integrated system element. For example, there is a need for systems and methods that enable end-use electrical devices and/or consumers to actively participate in grid control.

SUMMARY

Disclosed below are representative embodiments of methods, apparatus, and systems for distributing a resource (such as electricity). One of the disclosed embodiments is a nested, hierarchical resource allocation scheme that can be applied to any system. The resource allocation scheme can, for example, utilize a match of supply and demand at multiple levels and various locations within a transactive network, have supply resources that can be at the highest level but may also be at lower levels and have demand that varies with time and location in the network, and that also has a degree of response to resource allocation signals within the network. Specific examples are disclosed herein in which the general scheme is applied to manage and control the central generation, transmission, distribution, distributed local generation and storage, and end-use elements of an electric power grid. Furthermore, specific techniques are described that can be used for distributed generation, thermostatically-controlled end-use elements with two-way communication capabilities and end-use elements with one-way communication capabilities.

One of the disclosed embodiments is a method for clearing offers and requests as can be used in a resource allocation system. In this embodiment, a plurality of requests for electricity are received from a plurality of end-use consumers. The requests indicate a requested quantity of electricity and a consumer-requested index value indicative of a maximum price a respective end-use consumer will pay for the requested quantity of electricity. A plurality of offers for supplying electricity are also received from a plurality of resource suppliers. Each of the offers indicates an offered quantity of electricity and a supplier-requested index value indicative of a minimum price for which a respective supplier will produce the offered quantity of electricity. Using computing hardware (e.g., a computer processor or an integrated circuit), a dispatched index value is computed at which electricity is to be supplied based at least in part on the consumer-requested index values and the supplier-requested index values. The acts of receiving the plurality of requests for electricity, receiving the plurality of offers for supplying electricity, and determining can be repeated at periodic intervals (e.g., less than 60 minutes, less than 10 minutes, or other such intervals). The act of receiving the plurality of requests and the act of receiving the plurality of offers can be performed substantially simultaneously. In certain implementations, the dispatched index value is transmitted to at least one of the end-use consumers or resource suppliers. In some implementations, the act of determining the dispatched index value is performed using a double auction method. For example, the act of determining the dispatched index value can comprise separating the requests and the offers into two groups, sorting each item in the two groups according to a quantity level, and determining the dispatched index value by determining the index value at which the same quantity level for requests and offers occurs.

Another disclosed embodiment is a system for allocating resources. The system can comprise, for example, at least two resource allocation systems. A first of the resource allocation systems can be nested within a second of the resource allocation systems. Each of the resource allocation systems can be configured to communicate with resource consumers and resource suppliers over a digital network and according to a bi-directional communication protocol. In particular implementations, the resource allocation systems dispatch resources by separating requests and offers for a resource into two groups, sorting each item in the two groups according to a quantity level, and determining a dispatched index value for the resource by determining the index value at which the same quantity level for requests and offers occurs. The system can additionally include a tracking system that tracks index values dispatched by at least one of the resource allocation systems and debits a consumer's index balance in response to the dispatched index values. The resource allocation system can be used to distribute a variety of resources, including electricity.

Another embodiment disclosed herein is a method for computing bids using two-way communication in a resource allocation system. In this embodiment, a desired performance value indicative of a user's desired performance level for an electrical device is received. A user tolerance value indicative of the user's willingness to tolerate variations from the desired performance level is also received. Using computing hardware (e.g., a computer processor or an integrated circuit), a bid value for purchasing electricity sufficient to operate the electrical device at the desired performance level is computed. The computing can be performed using at least the desired performance value and the user tolerance value. The electrical device can be a variety of devices, such as an air-conditioning unit; heating unit; heating, ventilation, and air conditioning (HVAC) system; hot water heater; refrigerator; dish washer; washing machine; dryer; oven; microwave oven; pump; home lighting system; electrical charger, electric vehicle charger; or home electrical system. In certain implementations, a historical dispatch value indicative of values at which electricity has been dispatched by the market-based resource allocation system during a previous time period is also computed. The computing of the bid value can be additionally performed using the historical dispatched value. The historical dispatch value can be, for example, an average of multiple dispatch values from the previous time period (e.g., the previous 24 hours or less). In particular implementations, a standard deviation of the values at which electricity has been dispatched by the market-based resource allocation system during a previous time period is computed. The computing of the bid value can be additionally performed using the standard deviation. In some implementations, a current performance level of the electrical device can be received, and the computing of the bid value can be additionally performed using the current performance level. In certain implementations, the user tolerance value is selected from at least a first tolerance value and a second tolerance value, the first tolerance value resulting in higher bid values relative to the second tolerance value. In some implementations, the bid value is transmitted to a central computer in the market-based resource allocation system. An indication of a dispatched value for a current time frame can be received from the central computer. The bid value can be compared to the dispatched value for the current time frame, and a signal can be generated to activate the electrical device based on the comparison (e.g., if the bid value is equal to or exceeds the dispatched value for the current time frame). Any of the disclosed method acts can be repeated over periods of time (e.g., time periods of 15 minutes or less).

A further embodiment disclosed herein is another method for computing bids in a resource allocation system using two-way communication. In this embodiment, an indication of a current status of a system controlled by an electrical device is received. Using computing hardware (e.g., a computer processor or an integrated circuit), an average dispatched value is computed using multiple dispatched values from a previous time period, the multiple dispatched values representing values at which electricity was dispatched by the market-based resource allocation system during the previous time period. Using the computing hardware, a bid value for purchasing electricity sufficient to operate the electrical device is computed, the computing being performed using at least the current status of the system and the average dispatched value. In certain implementations, a standard deviation of the multiple dispatched values from the previous time period is computed, and the computing of the bid value is additionally performed using the standard deviation. In some implementations, a user comfort setting selected by a user is received. The user comfort setting can be selected from at least a first user comfort setting and a second user comfort setting, the first user comfort setting indicating the user's willingness to pay more to achieve a desired status of the system controlled by the electrical device relative to the second user comfort setting. In these implementations, the computing of the bid value can be additionally performed using the user comfort setting. In one particular implementation, the electrical device is a pump and the current status is a measurement of a water level affected by the pump. In some implementations, the electrical device is an electric charger for charging a battery, and the current status of the system is the state of charge of the battery. In one particular implementation in which the electrical device is an electrical charger for charging a battery, the bid value is computed according to the following equation:

$$P_{bid} = P_{avg} - \underline{k} P_{std} SOC_{dev}$$

where $P_{bid}$ is the bid value, $P_{avg}$ is an average daily clearing price of energy, $P_{std}$ is a daily standard deviation of price, and $SOC_{dev}$ is the fractional deviation of the SOC from a desired SOC ($SOC_{des}$) with respect to minimum and maximum limits ($SOC_{min}$ and $SOC_{max}$) set by a user. In some implementations, the bid value is transmitted to a central computer in the market-based resource allocation system. An indication of a dispatched value for a current time frame can be received from the central computer. The bid value can be compared to the dispatched value for the current time frame, and a signal can be generated to activate the electrical device based on the comparison (e.g., if the bid value is equal to or exceeds the dispatched value for the current time frame). Any of the disclosed method acts can be repeated over fixed periods of time (e.g., time periods of 15 minutes or less).

Another embodiment disclosed herein is a method for computing a bid value in a resource allocation system, the bid value being related to controlling temperature in a temperature-controlled zone. In this embodiment, a desired temperature value indicative of a user's desired temperature in a temperature-controlled zone is received. A user comfort setting selected by the user is also received, the user comfort setting being selected from at least a first user comfort setting and a second user comfort setting, the first user comfort setting indicating the user's willingness to pay more to achieve the desired temperature relative to the second user comfort setting. Using computing hardware (e.g., a computer processor or an integrated circuit, a bid value is computed for purchasing electricity to heat or cool the temperature-controlled zone to the desired temperature, the bid value being computed using at least the desired temperature, the user comfort setting, and a historical value indicative of an average value at which electricity was dispatched by the resource allocation system over a historical time period. In certain implementations, the bid value can be further computed using a standard deviation of dispatched values from the historical time period. In certain implementations, the historical time period is 24 hours. In some implementations, the first user comfort setting is associated with a first set of elasticity factors and temperature limits, and the second user comfort setting is associated with a second set of elasticity factors and temperature limits. The elasticity factors and the temperature limits for each of the first and the second comfort settings can include elasticity factors and temperature limits for when the desired temperature is greater than a current temperature and different elasticity factors and temperature limits for when the desired temperature is less than the current temperature. In particular implementations, the selected user comfort setting is associated with elasticity factors $k_{T\_L}$ and $k_{T\_H}$ and temperature limits $T_{max}$ and $T_{min}$. In such implementations, the bid value can be computed according to the following equation, $$P_{bid} = P_{average} + (T_{current} - T_{set}) \frac{k_T \times \sigma}{|T_{limit} - T_{set}|}$$

where $P_{bid}$ is the bid value, $P_{average}$ is the average dispatched value for the historical time period, $T_{current}$ is a current temperature, $T_{set}$ is a desired temperature set point, $\sigma$ is the standard deviation of the dispatched values from the historical time period, and $k_T$ and $T_{limit}$ are either $k_{T\_L}$ and $T_{min}$ if $T_{set}$ is less than $T_{current}$ and $k_{T\_H}$ and $T_{max}$ if $T_{set}$ is greater than $T_{current}$. In some implementations, the bid value is computed during a first time period, and the computing is repeated during a next time period. A modified desired temperature set point $T_{set,a}$ can be used for the next time period. For example, the modified desired temperature set point $T_{set,a}$ can be computed according to the following equation for the next time period:

$$T_{set,a} = T_{set} + (P_{clear} - P_{average}) \frac{|T_{limit} - T_{set}|}{k_T \times \sigma}$$

where $P_{clear}$ is a clearing price from the first time period. Any of the disclosed method acts can be repeated after a fixed time period (e.g., after a time period of 15 minutes or less).

A further embodiment disclosed herein is another method for computing a bid value in a resource allocation system, the bid value being related to controlling temperature in a temperature-controlled zone. In this embodiment, a current zone temperature is measured and a consequent bid price computed. The bid price is communicated into the resource allocation system. A resulting market clearing price is received from the resource allocation system. Using computing hardware, an adjusted zone set point is calculated. A thermostat's zone set point can be reset to the adjusted zone set point. In certain implementations, a customer's balance of available funds is debited in response to the resulting market clearing price.

Another embodiment disclosed herein is a method for computing bids in a resource allocation system using one-way communication. In this embodiment, a user comfort setting selected by a user is received, the user comfort setting being selected from at least a first user comfort setting and a second user comfort setting, the first user comfort setting indicating the user's willingness to pay more to achieve a desired performance level for an electrical device relative to the second user comfort setting. An average dispatched value is computed using multiple dispatched values from a previous time period (e.g., a time period of 24 hours or less), the multiple dispatched values representing values at which electricity was dispatched by the market-based resource allocation system during the previous time period. Using computing hardware (e.g., a computer processor or an integrated circuit), a probability value of operating the electrical device is computed based on at least the user comfort setting and the average dispatched value. In certain implementations, a standard deviation of the multiple dispatched values from the previous time period is computed, and the probability value is additionally based on the standard deviation. In certain implementations, dispatched values are periodically received from a central computer in the resource allocation system. In some implementations, a random number is generated, a determination is made as to whether to operate the electrical device (the determination being made by comparing the random number to the probability value), and a signal for causing the electrical device to operate is generated based on the comparison. In some implementations, the selected comfort setting is associated with a weighting factor $k_W$. In such implementations, the probability value can be computed according to the following equation:

$$r = k_w \left[ \frac{1}{\sqrt{2\pi}\,\sigma} \int_{-\infty}^{P_{clear}} e^{-\frac{(\overline{P}-x)^2}{2\sigma^2}} dx - \frac{1}{2} \right]$$

$$= k_w [N(P_{clear}, \overline{P}, \sigma) - 0.5]; r \geq 0$$

$$r = 0; \text{otherwise}$$

where N is the cumulative normal distribution, $P_{clear}$ is a current dispatched value, $\overline{P}$ is the average dispatched value over the time period, and $\sigma$ is the standard deviation of the dispatched value over the time period. The electrical device can be a wide variety of electrical devices, including for example an air-conditioning unit; heating unit; heating, ventilation, and air conditioning (HVAC) system; hot water heater; refrigerator; dish washer; washing machine; dryer; oven; microwave oven; pump; home lighting system; electrical charger, electric vehicle charger; or home electrical system. Any of the method acts can be performed repeatedly after fixed time periods (e.g., time periods of 15 minutes or less).

A further embodiment disclosed herein is another method for computing bids in a resource allocation system using one-way communication. In this embodiment, a probability that current flow to a non-thermostatically controlled device will be interrupted based upon preselected settings and cleared market prices is determined using computing hardware. In certain implementations, a customer balance is debited in response to the cleared market prices.

Another disclosed embodiment is a method for generating offer values in a resource allocation system. In this embodiment, an offer value indicative of a value at which electricity can be supplied by a generator for a current time frame is computed using computing hardware, the offer value being based at least in part on dispatched values from previous time frames, the dispatched values representing values at which electricity was dispatched by the market-based resource allocation system during the previous time frames. The offer value is transmitted along with a value indicative of a quantity of electricity that can be supplied by the generator during the current time frame to a central computer. A message is received from the central computer indicating a dispatched value for the current time frame. In certain implementations, the dispatched value is compared to the offer value, and the generator is activated in response to the comparison. Any of these method acts can be repeated for subsequent time frames (e.g., time frames of 15 minutes or less, 5 minutes or less, or other amount of time). In particular implementations, the dispatched value was computed by the central computer using a double auction technique. The dispatched value can be computed by the central computer, for example, by using the offer value and bid values transmitted from consumers to the central computer during the current time frame. In certain implementations, a standard deviation for the dispatched values from the previous time frames is computed, and the offer index value is additionally based at least in part on the standard deviation. The offer value can also be additionally based at least in part on a startup cost for supplying the electricity, a shutdown cost for supplying the electricity, and/or a remaining number of time frames available in an operating license associated with the electricity.

Another method disclosed herein is a method for generating a generator bid value for bidding to supply electricity in a market-based resource allocation system. In this embodiment, a generator bid value indicative of a price at which a generator can deliver electricity into a power grid is computed using computing hardware. The generator bid value and a value indicative of a magnitude of electrical load the generator can remove from the power grid are transmitted to a central computer that manages the resource allocation system. A message is received from the central computer indicating whether the generator should be activated. The message from the central computer can include a current market price value indicative of a current market price for electricity, and wherein the method comprises activating the generator if the generator bid value is less than the current market price value. In certain implementations, the generator bid value is based at least in part on a license premium value that is computed using a remaining number of hours the generator can operate according to the generator's operating license, a fuel cost value indicative of a cost of fuel for operating the generator for a fixed period of time, a cost for operating and maintaining the generator for a fixed period of time, a startup cost value indicative of a cost for starting the generator, and/or a shutdown cost value indicative of a cost for shutting down the generator before a minimum operating time threshold is achieved. In particular implementations, the generator bid value is computed according to the following equation, bid=licensepremium·(fuelcost+O&Mcost+startup-
cost+shutdownpenalty), wherein bid is the generator bid, licensepremium is a value associated with remaining unused licensed hours for the generator, O&Mcost is a value associated with the operating and maintenance cost, startupcost is a value associated with penalties or costs for starting up the generator, and shutdownpenalty is a value associated with penalties or costs for prematurely shutting down the generator. Any of the disclosed method acts can be repeated over fixed periods of time (e.g., fixed periods of 15 minutes or less).

Another embodiment disclosed herein is a method of operating an electrical charger in a market-based resource allocation system. In this embodiment, a user comfort setting selected by a user is received. The user comfort setting is selected from at least a first user comfort setting and a second user comfort setting, the first user comfort setting indicating the user's willingness to pay more to achieve a desired performance level for an electrical device relative to the second user comfort setting. An average dispatched value is computed using multiple dispatched values from a previous time period, the multiple dispatched values representing values at which electricity was dispatched by the market-based resource allocation system during the previous time period. A current rate of charge at which the electrical charger is to operate is computed (e.g., using computing hardware, such as a computer processor or an integrated circuit) based on at least the user comfort setting and the average dispatched value. A signal is generated for controlling the electrical charger such that it provides a charge at the current rate of charge. In certain implementations, a standard deviation of the multiple dispatched values is computed from the previous time period. In these implementations, the current rate of charge is additionally based on the standard deviation. In some implementations, dispatched values are periodically received from a central computer in the resource allocation system. In particular implementations, the current rate of charge is computed according to the following:

$$ROC_{set}=ROC_{des}(1-kP_{dev})$$

where $ROC_{set}$ is the current rate of charge, $ROC_{des}$ is a desired rate-of-charge such that $$ROC_{des} = \frac{(SOC_{final} - SOC_{obs})}{n_{hours}}$$

where $SOC_{final}$ is the final state of charge, $SOC_{obs}$ is the current state of charge observed, $n_{hours}$ is the number of hours remaining before the $SOC_{final}$ is to be achieved, k is the user comfort setting, with $0<k<\infty$, $P_{dev}$ is the price deviation such that $$P_{dev} = \frac{P_{now} - P_{avg}}{P_{std}}$$

wherein $P_{now}$ is a current price, $P_{avg}$ is the average daily clearing price for energy, and $P_{std}$ is the daily standard deviation of the price, $SOC_{final}$ is the final desired state-of-charge of the vehicle, $SOC_{obs}$ is the current observed state-of-charge of the vehicle, and $n_{hours}$ is the number of hours remaining before the $SOC_{final}$ must be achieved. Any of the actions in this embodiment can be repeated periodically (e.g., at fixed time periods).

Embodiments of the disclosed methods can be performed using computing hardware, such as a computer processor or an integrated circuit. For example, embodiments of the disclosed methods can be performed by software stored on one or more non-transitory computer-readable media (e.g., one or more optical media discs, volatile memory components (such as DRAM or SRAM), or nonvolatile memory or storage components (such as hard drives)). Such software can be executed on a single computer or on a networked computer (e.g., via the Internet, a wide-area network, a local-area network, a client-server network, or other such network). Embodiments of the disclosed methods can also be performed by specialized computing hardware (e.g., one or more application specific integrated circuits (ASICs) or programmable logic devices (such as field programmable gate arrays (FPGAs)) configured to perform any of the disclosed methods). Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions for causing a computer to perform any of the disclosed methods), intermediate results, or final results created or modified by the disclosed methods can be transmitted, received, or accessed through a suitable communication means.

The foregoing and other objects, features, and advantages of the invention will become more apparent from the following detailed description, which proceeds with reference to the accompanying figures.

BRIEF DESCRIPTION OF THE DRAWINGS

FIG. 46A shows hourly prices.

FIGS. 47A through 47D are graphs showing diurnal residential load shapes by contract type for experiment participants. FIG. 47A is for a winter weekday. FIG. 47B is for a winter weekend. FIG. 47C is for a spring weekday. FIG. 47D is for a spring weekend.

FIG. 48A shows demand during unconstrained supply conditions, and FIG. 48B shows demand during constrained supply conditions.

FIG. 49A shows demand during moderately constrained supply conditions, and FIG. 49B shows demand during heavily constrained supply conditions.

FIG. 52A shows the 1500-kW feeder capacity during the summer. FIG. 52 B shows the 750-kW feeder capacity during the winter. FIG. 52C shows the 500-kW feeder capacity during the fall.

FIG. 54A shows the 500-kW feeder capacity during the fall. FIG. 54B shows the 650-kW feeder capacity during the winter. FIG. 54C shows the 1500-kW feeder capacity during the summer.

FIG. 58A shows dispatched distributed generation by month. FIG. 58B shows dispatched distributed generation by hour of day.

DETAILED DESCRIPTION

I. General Considerations

Figure 1:
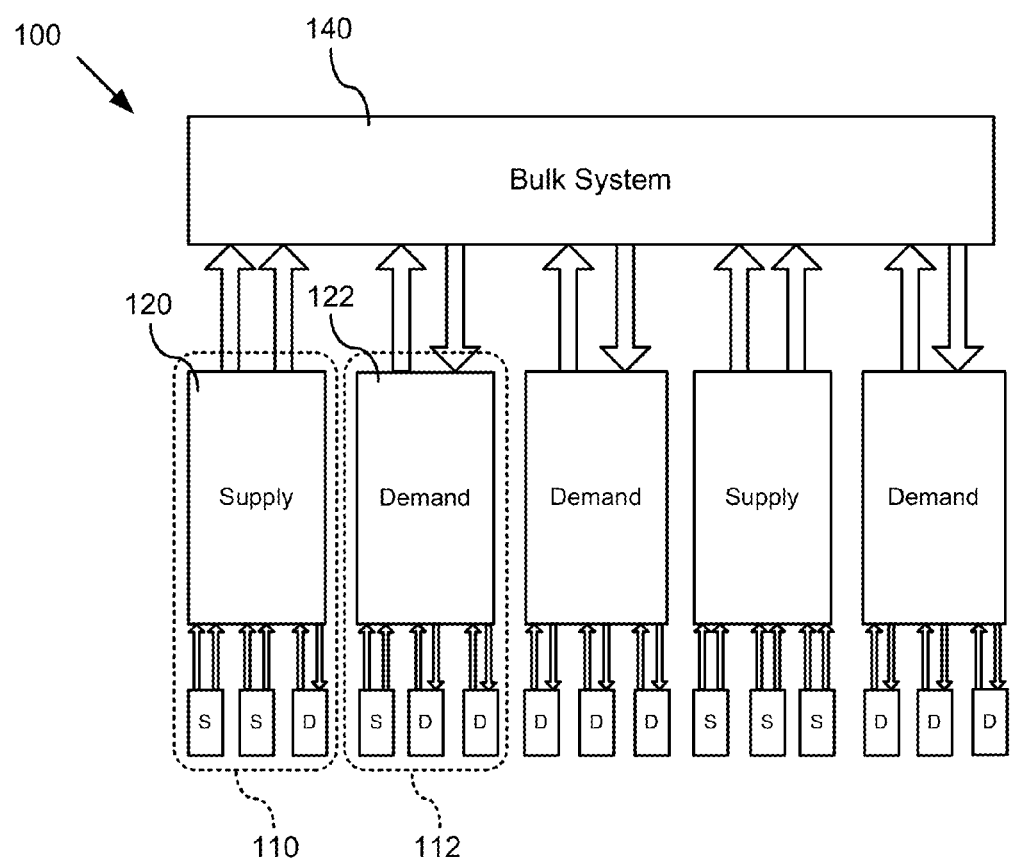
FIG. 1 is a block diagram of an exemplary resource allocation system that can be nested to any arbitrary depth with consumers making demand requests and producers making supply offers.

Disclosed below are representative embodiments of methods, apparatus, and systems for distributing a resource (such as electricity) using a resource allocation system. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer).

Any of the computer-executable instructions for implementing the disclosed techniques (e.g., the disclosed bid generation, offer generation, or dispatch index generation techniques) as well as any data created and used during implementation of the disclosed resource allocation systems can be stored on one or more computer-readable media (e.g., non-transitory computer-readable media). The computer-executable instructions can be part of, for example, a dedicated software application or a software application that is accessed or downloaded via a web browser. More specifically, such software can be executed on a single computer (e.g., any suitable commercially available computer) or in a network environment (e.g., via the Internet, a wide-area network, a local-area network, a client-server network, or other such network).

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit (ASIC) or programmable logic device (PLD), such as a field programmable gate array (FPGA)). The integrated circuit can be embedded in or directly coupled to an electrical device (or element) that is configured to interact with the resource allocation system. For example, the integrated circuit can be embedded in or otherwise coupled to a generator, an air-conditioning unit; heating unit; heating, ventilation, and air conditioning (HVAC) system; hot water heater; refrigerator; dish washer; washing machine; dryer; oven; microwave oven; pump; home lighting system; electrical charger, electric vehicle charger; or home electrical system.

Figure 64:
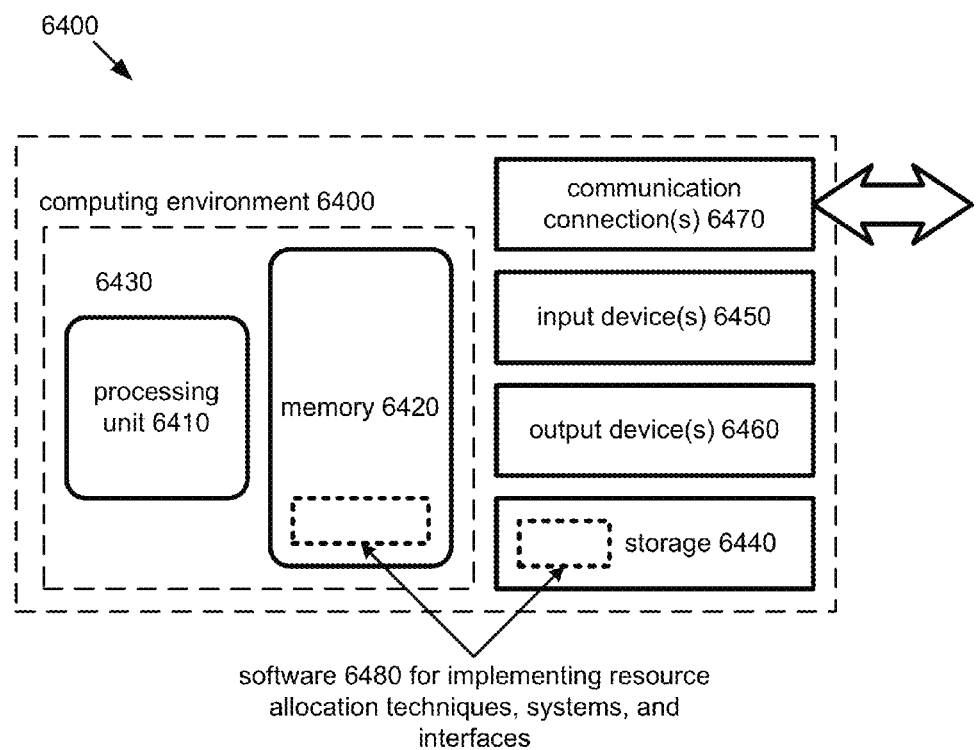
FIG. 64 is a schematic block diagram of a computing environment that can be used to implement embodiments of the disclosed technology.

FIG. 64 illustrates a generalized example of a suitable computing environment 6400 in which several of the described embodiments can be implemented. The computing environment 6400 is not intended to suggest any limitation as to the scope of use or functionality of the disclosed technology, as the techniques and tools described herein can be implemented in diverse general-purpose or special-purpose environments that have computing hardware.

With reference to FIG. 64, the computing environment 6400 includes at least one processing unit 6410 and memory 6420. In FIG. 64, this most basic configuration 6430 is included within a dashed line. The processing unit 6410 executes computer-executable instructions and may be a real or a virtual processor. In a multi-processing system, multiple processing units execute computer-executable instructions to increase processing power. The memory 6420 may be volatile memory (e.g., registers, cache, RAM), non-volatile memory (e.g., ROM, EEPROM, flash memory, etc.), or some combination of the two. The memory 6420 stores software 6480 implementing one or more of the described techniques for operating or using the disclosed resource allocation systems. For example, the memory 6420 can store software 6480 for implementing any of the disclosed bidding or offer strategies described herein and their accompanying user interfaces.

The computing environment can have additional features. For example, the computing environment 6400 includes storage 6440, one or more input devices 6450, one or more output devices 6460, and one or more communication connections 6470. An interconnection mechanism (not shown) such as a bus, controller, or network interconnects the components of the computing environment 6400. Typically, operating system software (not shown) provides an operating environment for other software executing in the computing environment 6400, and coordinates activities of the components of the computing environment 6400.

The storage 6440 can be removable or non-removable, and includes magnetic disks, magnetic tapes or cassettes, CD-ROMs, DVDs, or any other tangible non-transitory storage medium which can be used to store information and which can be accessed within the computing environment 6400. The storage 6440 can also store instructions for the software 6480 implementing any of the described techniques, systems, or environments.

The input device(s) 6450 can be a touch input device such as a keyboard, mouse, pen, or trackball, a voice input device, a scanning device, or another device that provides input to the computing environment 6400. The output device(s) 6460 can be a display, printer, speaker, CD-writer, or another device that provides output from the computing environment 6400.

The communication connection(s) 6470 enable communication over a communication medium to another computing entity. The communication medium conveys information such as computer-executable instructions, resource allocation messages or data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-readable instructions stored on one or more computer-readable media. Computer-readable media are any available media that can be accessed within or by a computing environment. By way of example, and not limitation, with the computing environment 6400, computer-readable media include tangible non-transitory computer-readable media such as memory 6420 and storage 6440.

The various methods, systems, and interfaces disclosed herein can also be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

Figure 65:
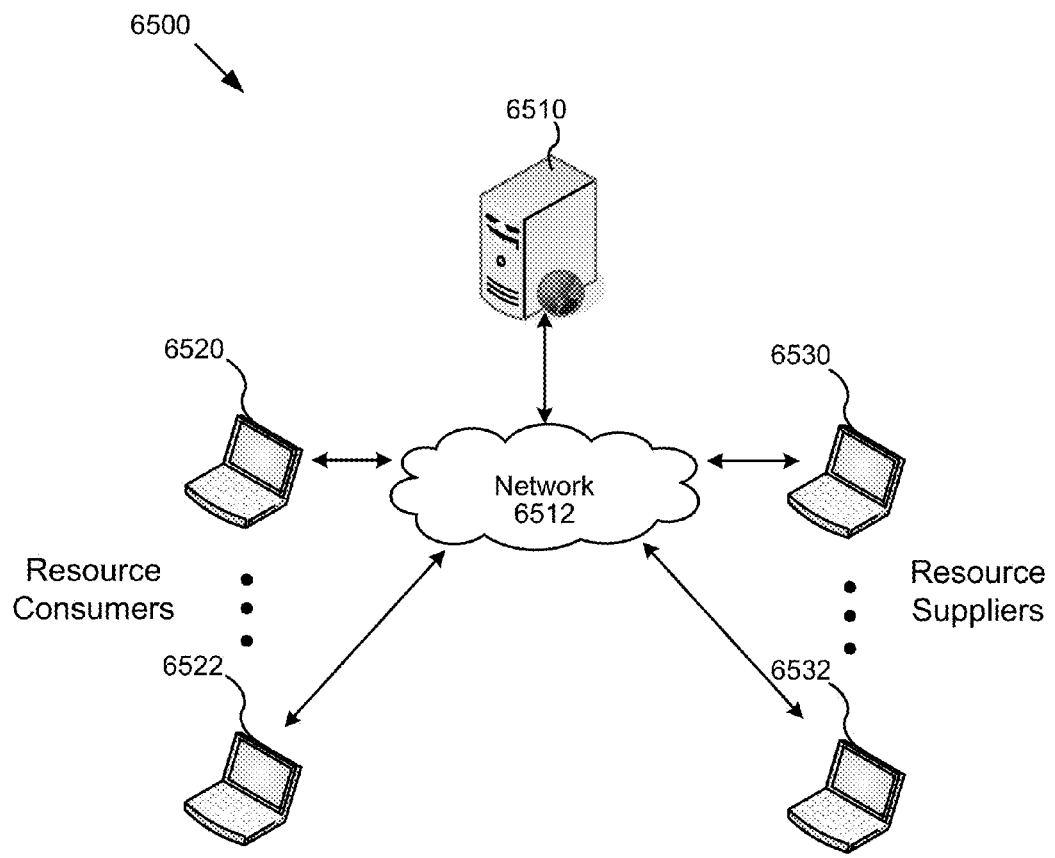
FIG. 65 is a schematic block diagram of a network topology that can be used to implement embodiments of the disclosed technology.

An example of a possible network topology for implementing a resource allocation system according to the disclosed technology is depicted in FIG. 65. Networked computing devices 6520, 6522, 6530, 6532 can be, for example, computers running browser or other software for accessing one or more central computers 6510 that manage and operate the resource allocation system. The computing devices 6520, 6522, 6530, 6532 and the central computer 6510 can have computer architectures as shown in FIG. 64 and discussed above. The computing devices 6520, 6522, 6530, 6532 are not limited to traditional personal computers but can comprise other computing hardware configured to connect to and communicate with a network 6512 (e.g., specialized computing hardware associated with an electrical device or a power generator (e.g., hardware comprising an integrated circuit (such as an ASIC or programmable logic device) configured to perform any of the disclosed methods)).

In the illustrated embodiment, the computing devices 6520, 6522, 6530, 6532 are configured to connect to one or more central computers 6510. In certain implementations, the central computer receives resource bids or requests from those computing devices associated with resource consumers (e.g., devices 6520, 6522) and receives resource offers from those computing devices associated with resource suppliers (e.g., devices 6530, 6532). The one or more central computers 6510 then compute a value at which the resource is to be dispatched (e.g., using a double auction technique) and transmit this dispatched value to the computing devices 6520, 6522, 6530, 6532. As more fully explained below, this process can be repeated at fixed intervals (e.g., intervals of 10 minutes or less). In the illustrated embodiment, the central computers 6510 are accessed over a network 6512, which can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, and most likely, at least part of the network 6512 can be the Internet or a similar public network.

The various possible roles and functionalities of the computing devices 6520, 6522, 6530, 6532 and the one or more central computers 6510 will be described in more detail in the following sections.

II. Introduction to Embodiments of the Disclosed Resource Allocation Scheme

A. General Case of a Nested, Hierarchical Resource Allocation Schema

FIG. 1 is a schematic block diagram illustrating an embodiment of a resource allocation system 100 according to the disclosed technology. In the embodiment shown in FIG. 1, system 100 comprises multiple nested resource allocation systems (two of which are shown as subsystems 110 and 112), which themselves comprise self-similar resource allocation subsystems. The resource allocation system 100 can be nested to any arbitrary depth, with net producers (such as net producer 120) making supply offers and net consumers (such as net consumer 122) making demand requests to a larger bulk system 140. All resources that are limited in some manner and can be measured can be allocated independently in such a system. The embodiments disclosed herein generally concern applying the resource allocation system 100 to an electrical power grid in which electrical power is limited, but it is to be understood that this application is not limiting. The resource allocation system can be used in other contexts as well, including water supply, Internet bandwidth distribution, or other such markets having limited resources.

In the illustrated embodiment, each of the resource allocation systems operates by periodically collecting demand requests from consumers and supply offers from resource suppliers and determining an index value at which the resource allocation is to be dispatched. As more fully explained below, the dispatched index value (or allocation index value) is determined from index values associated with the demand requests and supply offers. In one particular embodiment, the process is different than traditional markets in that an index that is capable of being monetized (rather than just a currency value itself) is used. The index provides a common valuation method for participants in the system. The index may itself be a currency, but in the absence of a single currency, a separate market can be operated to trade units of the index. For instance, one such index unit might be units of $CO_2$. Thus, in this example, instead of trading resources using money, participants can have resources allocated using indexes having units of $CO_2$. Participants can then use a separate traditional market to monetize the units of $CO_2$. Other index units are also possible, including index units that are unique to the resource allocation system but that are capable of being monetized. For ease of presentation, reference will sometimes be made in this disclosure to the index for a resource as though it were the actual price of the resource. It is to be understood that such reference includes not only the situation where the index is the currency, but also the situation where the index is another index unit that is capable of being monetized or traded.

B. Participants and Accounts

In one embodiment of the disclosed technology, participants in the system have accounts in which the fund of index units at their disposal is kept. As consumers use resources, their index fund balances are debited, and as producers deliver resources, their index fund balances are credited. Index funds can be credited using a variety of mechanisms, including up-front deposits (e.g., through incentives), periodic deposits (e.g., with income), or purchased funds from a separate index fund market when producers sell funds.

C. Supply Offers and Demand Requests

In one exemplary embodiment of the disclosed technology, end-use consumers use computer agents to request resources from their local distribution service provider based on the current needs of their end-use appliance or electrical device. For example, end-use consumers can input their resource requests through a web site that transmits the user's requests over the Internet to one or more central computers that are used by the distribution service provider to allocate the resource. In such instances, the requests can be computed and transmitted by executing computer-executable instructions stored in non-transient computer-readable media (e.g., memory or storage). Alternatively, a consumer's end-use appliances or electrical devices can be configured to themselves compute the resource requests (in which case the appliance or device can be considered as the end-use consumer). In such instances, the requests can be computed using computing equipment embedded in the appliances or electrical devices themselves. The computing equipment can comprise a computer system (e.g., a processor and non-transient computer-readable media storing computer-executable instructions) or can comprise a specialized integrated circuit configured to compute the resource request (e.g., an ASIC or programmable logic device). If the requests are computed by the appliances or electrical devices themselves, the requests can be directly sent to the central computers of the distribution service provider (e.g., via the Internet) or can be aggregated with other requests (e.g., using a computer at the consumer's home). For instance, the appliances and electrical devices at the consumer's home can transmit their requests (e.g., wirelessly using Wi-Fi or the like) to a local computer, which aggregates the requests. The aggregated requests can then be sent together to the distribution service provider (e.g., as a single request to the central computer or as a single message comprises a string of requests).

In one exemplary embodiment, resource requests comprise two pieces of information: the quantity of any number of resources desired (described as a rate of consumption for the time frame over which the resource will be allocated) and the maximum index value at which it will be consumed. Desirably, consumers submit at least one such request for each time frame in which they wish to consume, and the time frame is determined by the distribution service provider. The time frame can vary from embodiment to embodiment, but in some embodiments is 60 minutes or less, 15 minutes or less, or 5 minutes or less, and some embodiments can use mixed time and/or overlapping frames. As more fully explained below, the time frame can depend on the size of the resource allocation system and the number of nested resource allocation systems within the overall system. In general, the time frame used in a lower-level system in a nested framework will typically be less than the time frame for a higher-level system in the nested framework. After receiving such requests within the time frame, the distribution service provider can compute and dispatch the index value at which each resource is allocated. This value is sometimes referred to herein as the "dispatched index value" or "dispatched value."

In one exemplary embodiment, resource suppliers use computer agents to submit offers for resources to the local distribution service provider based on the current cost of provide the resources. For example, the supply offers can be computed and submitted over the Internet using a computer system (e.g., using a dedicated web site). Alternatively, the supply offer can be computed and transmitted using a specialized integrated circuit configured to compute the resource offer (e.g., an ASIC or programmable logic device). Any such computing hardware can be coupled directly to and provide control over the relevant equipment for supplying the resource. For instance, the computing hardware can be integrated with the control equipment for an electrical power generator, thereby allowing the computing hardware to directly activate and deactivate the generator as needed.

In one exemplary embodiment, offers comprise at least two pieces of information: the quantity of any number of resources available (described as a rate of production for the time frame over which the resource will allocated) and the minimum index value at which it will be produced. Producers desirably submit at least one such offer for each time frame in which they wish to produce resources, and the time frame is determined by the service provider.

In one exemplary embodiment for operating the resource allocation system, consumers are required to consume the resources which they requested only if they requested the resource at an index value greater than or equal to the dispatched index value. Conversely, consumers are prohibited from consuming the resources if they requested the resource at an index value less than the dispatched index value for that time frame. These rules can be enforced, for example, at the appliance or electrical device level (e.g., using appropriate shut-off hardware) or enforced by control signals sent from a computer at the consumer's home or locale to the relevant appliance or equipment. Violation of these rules can be subject to a penalty (e.g., a penalty levied against the offender's index fund account). Furthermore, in some embodiments of the disclosed technology, consumers can submit unconditional requests that require the distribution service provider to deliver the resource at any price, and require the consumer to accept it at any price.

Similarly, in one exemplary embodiment for operating the resource allocation system, producers are required to produce the resources which they offered only if they offered the resource at an index value less than or equal to the dispatched index value. Conversely, producers are prohibited from producing resource if they offered the resource at an index value greater than the dispatched index value for that time frame. Violation of the rules can be subject to a penalty levied against their index fund accounts. Furthermore, in some embodiments of the disclosed technology, producers can submit unconditional offers that require the distribution service provider to accept the resource at any price, and require the producer to supply it at any price.

D. Aggregation Services

Figure 2A:
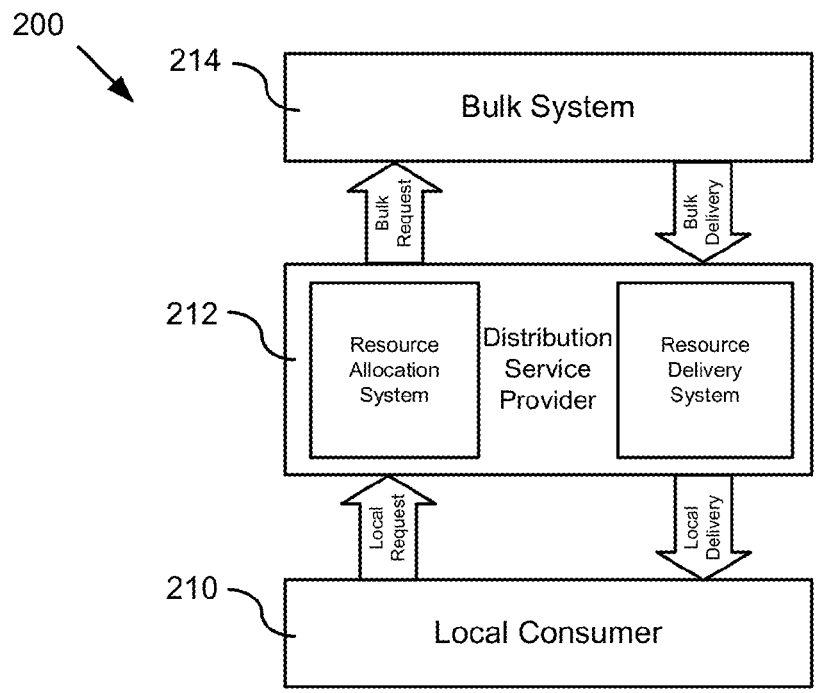
FIG. 2A is a block diagram showing a resource consumer who makes demand requests to a local resource allocation system and who consumes the resource based on the dispatched allocation index. The local resource allocation system in FIG. 2A aggregates the consumer's demand request with other requests.
Figure 2B:
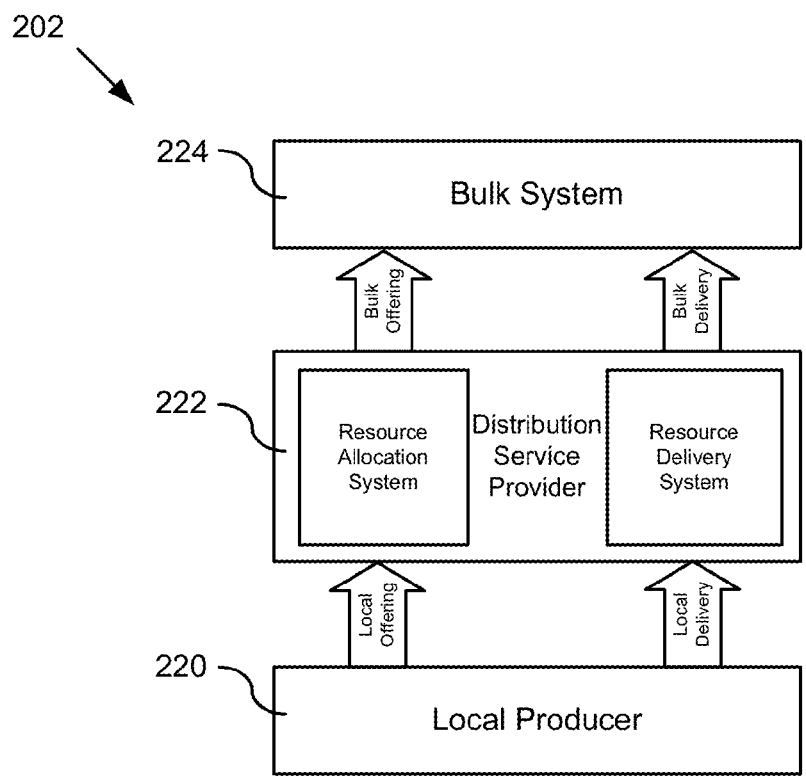
FIG. 2B is a block diagram showing a resource producer who makes supply offers to a local resource allocation system and who supplies the resource based on the dispatched allocation index. The local resource allocation system in FIG. 2B aggregates the producer's supply offer with other offers.

In certain embodiments of the disclosed technology, and as noted above, a service provider may in turn be a consumer or producer with respect to another service provider, depending on whether they are a net importer or exporter of resources. Examples of such arrangements are shown in block diagrams 200 and 202 of FIG. 2A of 2B. In particular, FIG. 2A shows a local resource consumer 210 that makes demands on a local distribution service provider 212, who in turn aggregates local requests to make an aggregated bulk request on a bulk distribution service provider 214. FIG. 2B shows a local producer 220 that makes offers to a local distribution provider 222, who in turn aggregates local offers to make an aggregated offer on a bulk distribution provider 224. Any number of service providers can be combined to construct a system of arbitrary size and complexity.

In certain embodiments of the disclosed technology, producers and consumers can make non-firm offers and requests as well, but such requests can have an index premium with respect to the firm offers and requests presented during a given time frame. The premium can be based, for example, on the difference between the aggregate cost of load following in the service providers system and the cost the same in the bulk system (load following service cost arbitrage).

E. Multiple Time Frames

As resources are aggregated to larger and larger system, the time frame over which allocation is performed can be lengthened. For example, building resources might be dispatched on a 1 minute time frame, distribution resources on a 5 minute time frame, transmission resources on a 15 minute time frame, and generation on a 1 hour time frame. This permits aggregators to also aggregate over time by exchanging or moving blocks of resources against across time frames using storage capacities and ramp rates.

Both consumers and producers can break their total demand and supply into multiple requests and offers spanning multiple time frames. For example, in the face of 10% uncertainty (or other percentage of uncertainty) in the quantity needed a consumer can request the mean quantity of the needed resources in a longer time frame at any price and exchange (buy or sell) the remaining 10% fluctuation (or other percentage of fluctuation) in a shorter time frame at any price.

F. An Exemplary Resource Allocation Strategy

In each time frame, the index value and quantity allocated is determined by the resource allocation service. A wide variety of methods can be used to determine the dispatched index value. In certain embodiments, however, the dispatched index is determined using a double auction technique. For instance, in one particular embodiment, the following technique is used. The requests and offers are separated into two groups. Each is sorted by the index value provided, requests being sorted by descending value, and offers by ascending value (or vice versa). Next, each item in the sorted lists is given a quantity level computed by adding its quantity to the previous item's quantity level, with the first items quantity level being its quantity alone. Finally, the dispatched index value is found by determining the index value at which the same quantity level for requests and offers occurs. In one embodiment, this can occur in one of two ways. Either two requests bound a single offer, in which case the supplier is required to supply less than the offered quantity and the offer index is the dispatched index; or two offers bound a single request, in which case the consumer is required to consume less than the request quantity with only partial resources and the request index value is the dispatched index. Additionally, there are some special cases that although rare must be handled explicitly. Whenever both consumers and suppliers mutually bound each other at a given quantity level, the dispatched index can be the mean of the offer and request indexes, the request index, or the offer index. In certain embodiments, the method that maximizes the total benefit (e.g., profit) to both consumers and producers is chosen and in cases where more than one index level maximizes the total benefit, the index level which most equitably divides the total benefit between consumers and producers is chosen.

Figure 66:
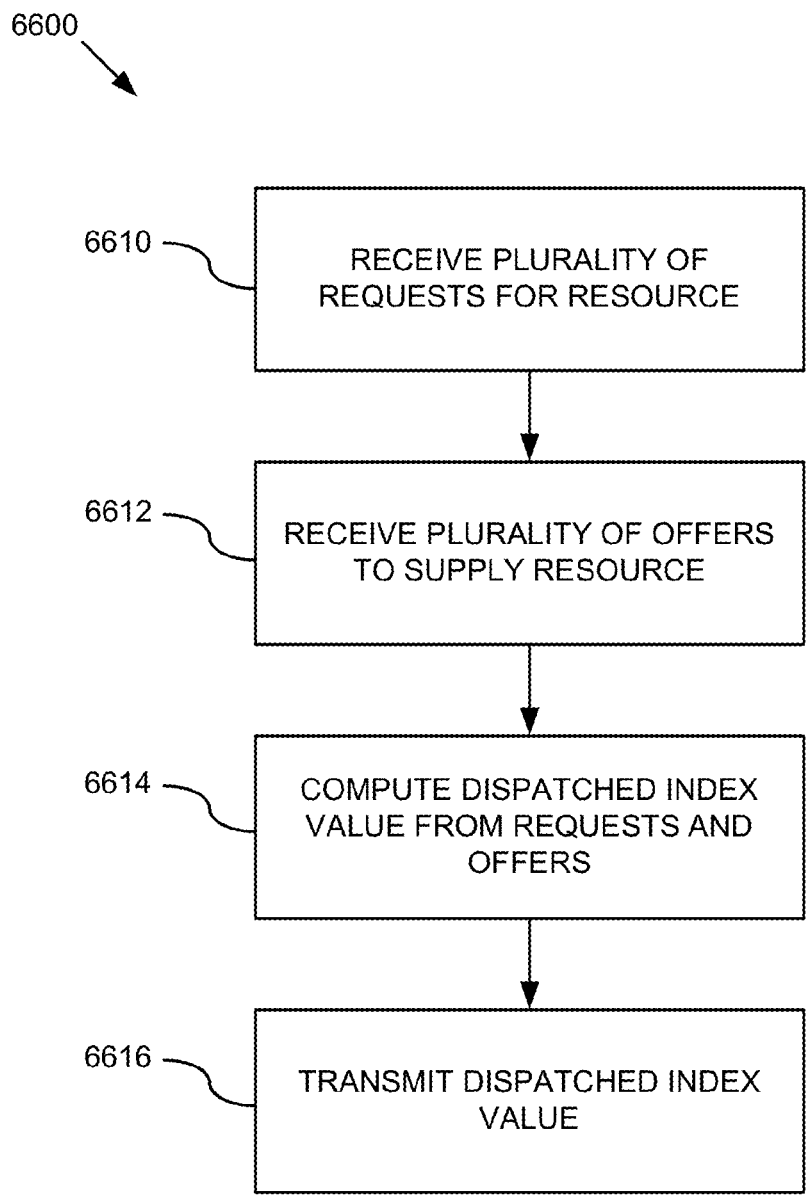
FIG. 66 is a flowchart showing a generalized method for clearing offers and requests as can be used in any of the disclosed resource allocation systems.

FIG. 66 is a flowchart 6600 showing a generalized method for clearing offers and requests as can be used in any of the disclosed resource allocation systems. The particular method shown in FIG. 66 is for a system for allocating electricity resources, but this usage should not be construed as limiting. The method can be performed using computing hardware (e.g., a computer processor or an integrated circuit). For instance, the method can be performed by a central computer that manages the resource allocation system.

At 6610, a plurality of requests for electricity are received from a plurality of end-use consumers (e.g., electrical devices or home consumers). The requests can comprise data messages indicating a requested quantity of electricity and a consumer-requested index value indicative of a maximum price a respective end-use consumer will pay for the requested quantity of electricity.

At 6612, a plurality of offers for supplying electricity are received from a plurality of resource suppliers. The offers can comprise data messages indicating an offered quantity of electricity and a supplier-requested index value indicative of a minimum price for which a respective supplier will produce the offered quantity of electricity.

At 6614, a dispatched index value is computed at which electricity is to be supplied based at least in part on the consumer-requested index values and the supplier-requested index values. In some implementations, the act of determining the dispatched index value is performed using a double auction method. For example, the act of determining the dispatched index value can comprise separating the requests and the offers into two groups, sorting each item in the two groups according to a quantity level, and determining the dispatched index value by determining the index value at which the same quantity level for requests and offers occurs.

At 6616, the dispatched index value is transmitted to at least one of the end-use consumers or resource suppliers (e.g., using suitable communication means, such as the Internet or other network).

Methods acts 6610, 6612, 6614, and 6616 can be repeated at periodic intervals (e.g., intervals of less than 60 minutes, less than 10 minutes, or other such intervals). Furthermore, it should be understood that the method acts 6610 and 6612 do not necessarily occur in the illustrated sequence. Instead, the orders and requests can be received substantially simultaneously. For instance, the orders and requests can be received at various times and/or orders within a given time period and before the dispatched index is determined.

G. Demand Strategies

In some cases, suppliers or consumers desirably place offers or bids that nearly guarantee that they obtain consumers and suppliers, respectively. To help generate an offer or request that has a high likelihood of being accepted by the local resource allocation system, a supplier or consumer can use recent history of dispatched indexes to forecast the most likely dispatched index for a particular offer or request time frame. This ability to adjust a request or offer allows a consumer or supplier to utilize an adaptive bidding or offer strategy. As more fully illustrated below, such adaptive strategies are useful in a variety of settings, including in the heating or cooling of buildings using thermostatically-controlled equipment.

Figure 3:
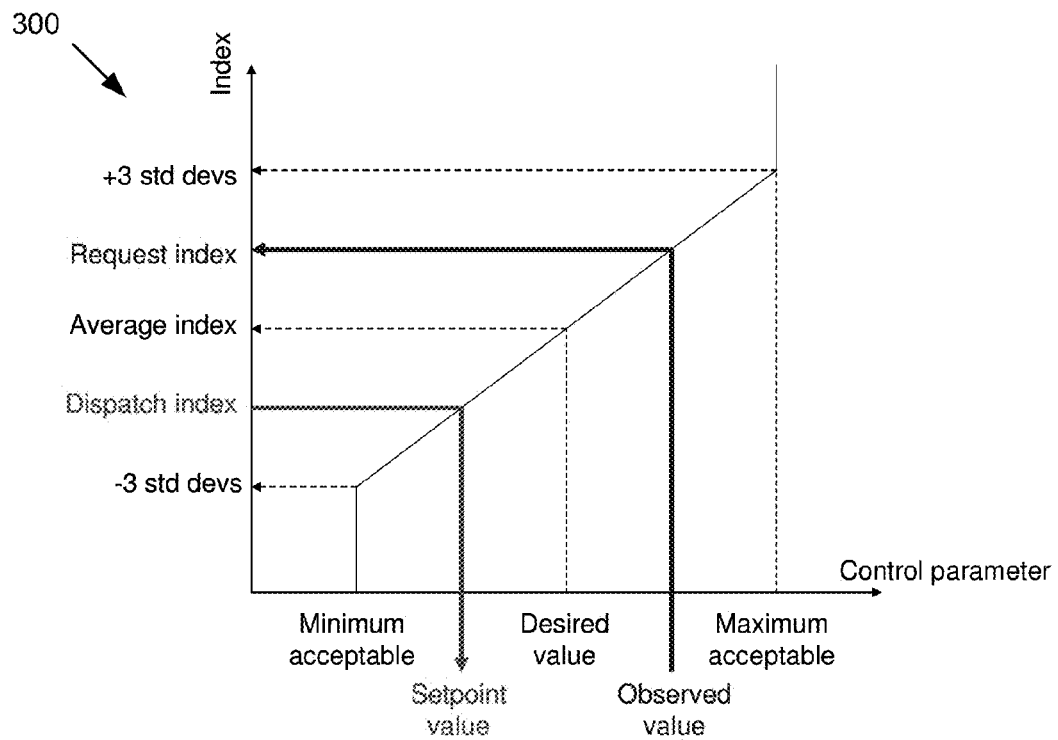
FIG. 3 is a graph illustrating an exemplary adaptive control strategy for consumers using a resource allocation system as in FIG. 2A.

One possible adaptive request strategy is to compute the average and the standard deviation of the dispatched index over the last N time frames, where N is a relatively large number compared to the time frame (e.g., 20, 50, 100 or more). When consumers cycle their demand for resources periodically, then they can adjust the consumption time to exploit times when the index is low. In one particular embodiment, the control decision for consumption can be offset by the index average and scaled by the index standard deviation before being submitted to the resource allocation system. This exemplary request strategy is illustrated in graph 300 of FIG. 3, which is explained in greater detail through the example shown in FIG. 4 and discussed below.

In some embodiments, the last N time frames that are used are consecutive time frames. For instance, if N is selected to account for the previous 24 hours, if the duration of a time frame is 5 minutes, and if the current time frame is 3:00 p.m., then the dispatched index from the 3:00 p.m. time frame the previous day, the index from the 3:05 p.m. time frame the previous day, the index from the 3:10 p.m. time frame the previous day, and so on, can be used. In other embodiments, the last N time frames that are used are from the same time frame (or similar time frame) as the current time frame but are from different days (e.g., consecutive days). For instance, if N is selected to account for the previous 7 days, if the duration of a time frame is 5 minutes, and if the current time frame is 3:00 p.m., then the dispatched index from the 3:00 p.m. time frame from the previous 7 days can be used. Various combinations of these time frames can also be used (e.g., the index values for multiple time frames around the current time frame from multiple previous days). This flexibility can help further account for variations in demand that arise throughout a day.

Many consumers that employ adaptive control also use a similar strategy to determine the operating point from the dispatched index. This is done by simply reversing the process shown in FIG. 3, and adjusting the control set-point based on the dispatched index.

The following paragraphs introduce general embodiments for generating bid values in a resource allocation system, such as any of the resource allocation systems disclosed herein. Specific implementations of these generalized embodiments are introduced in Section III below.

Figure 67:
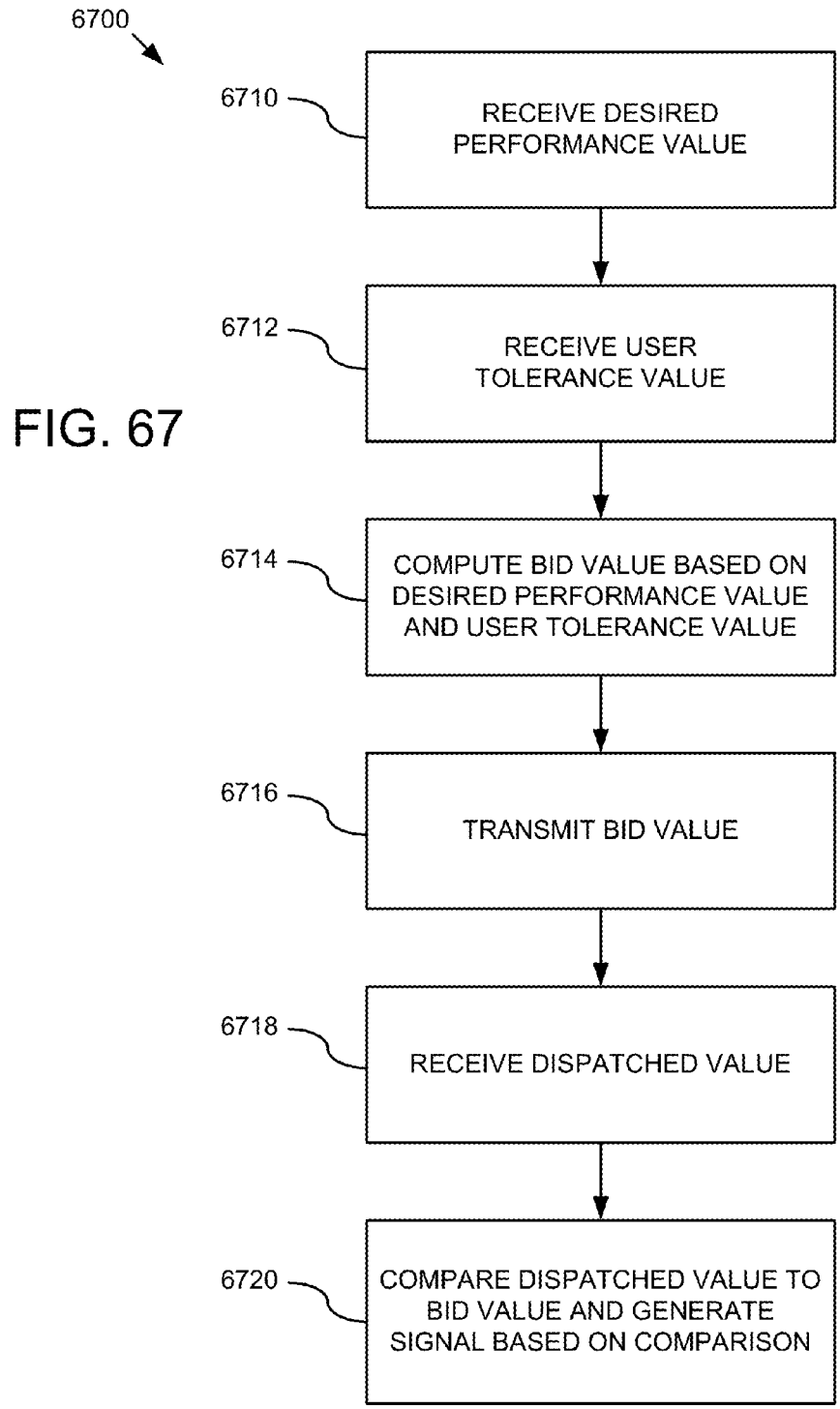
FIG. 67 is a flowchart showing a general embodiment for computing bids in any of the disclosed recourse allocation system using two-way communications.

FIG. 67 is a flowchart 6700 showing a general embodiment for computing bids in any of the disclosed recourse allocation system using two-way communications. The particular method shown in FIG. 67 is for an electrical device in a system for allocating electrical resources, but this usage should not be construed as limiting. The electrical device can be a variety of devices, such as an air-conditioning unit; heating unit; heating, ventilation, and air conditioning (HVAC) system; hot water heater; refrigerator; dish washer; washing machine; dryer; oven; microwave oven; pump; home lighting system; electrical charger, electric vehicle charger; or home electrical system. The method of FIG. 67 can be performed using computing hardware (e.g., a computer processor or an integrated circuit). For instance, the method can be performed by a computer at an end-user's locale or home, a computer coupled to an electrical device, or by specialized hardware (e.g., an ASIC or programmable logic device) coupled to the electrical device. Furthermore, it should be understood that the method acts in FIG. 67 do not necessarily occur in the illustrated sequence.

At 6710, a desired performance value indicative of a user's desired performance level for an electrical device is received. For example, a desired temperature for a temperature-controlled environment can be received.

At 6712, a user tolerance value indicative of the user's willingness to tolerate variations from the desired performance level is also received. For example, a comfort setting reflective of comfort versus economy (such as any of the comfort settings shown in Table 7 or similar comfort setting) can be received. In certain embodiments, the user tolerance value is selected from at least a first tolerance value and a second tolerance value, the first tolerance value resulting in higher bid values relative to the second tolerance value. The performance value and user tolerance value can be input, for example, through an appropriate graphical user interface displayed on a computer or through a keypad, touch screen, dial, or other control mechanism associated with the electrical device.

At 6714, a bid value for purchasing electricity sufficient to operate the electrical device at the desired performance level is computed. In the illustrated embodiment, the bid value is based at least in part on the desired performance value and the user tolerance value. In certain embodiments, a historical dispatch value indicative of values at which electricity has been dispatched by the market-based resource allocation system during a previous time period is also computed. In such embodiments, the bid value can be additionally based at least in part on the historical dispatched value. The historical dispatched value can be, for example, an average of multiple dispatch values from the previous time period (e.g., the previous 24 hours or less). In some embodiments, a standard deviation of the values at which electricity has been dispatched by the market-based resource allocation system during a previous time period is also computed. In such embodiments, the bid value can also be based at least in part on the standard deviation. In further embodiments, a current performance level of the electrical device can also be received. In such embodiments, the bid value can also be based at least in part on the current performance level.

At 6716, the bid value is transmitted to a central computer in the market-based resource allocation system (e.g., using suitable communication means, such as the Internet or other network).

At 6718, an indication of a dispatched value for a current time frame is received from the central computer.

At 6720, the bid value is compared to the dispatched value for the current time frame, and a signal is generated to activate the electrical device based on this comparison (e.g., if the bid value is equal to or exceeds the dispatched value for the current time frame).

Any combination or subcombination of the disclosed method acts can be repeated after a fixed period of time (e.g., a time period of 15 minutes or less, or other such time period). In certain embodiments, some of the received values are reused for subsequent time frames. For example, the user-selected performance value and user tolerance value can be stored and reused for subsequent time frames. In such instances, method acts 6710 and 6712 need not be repeated.

Figure 68:
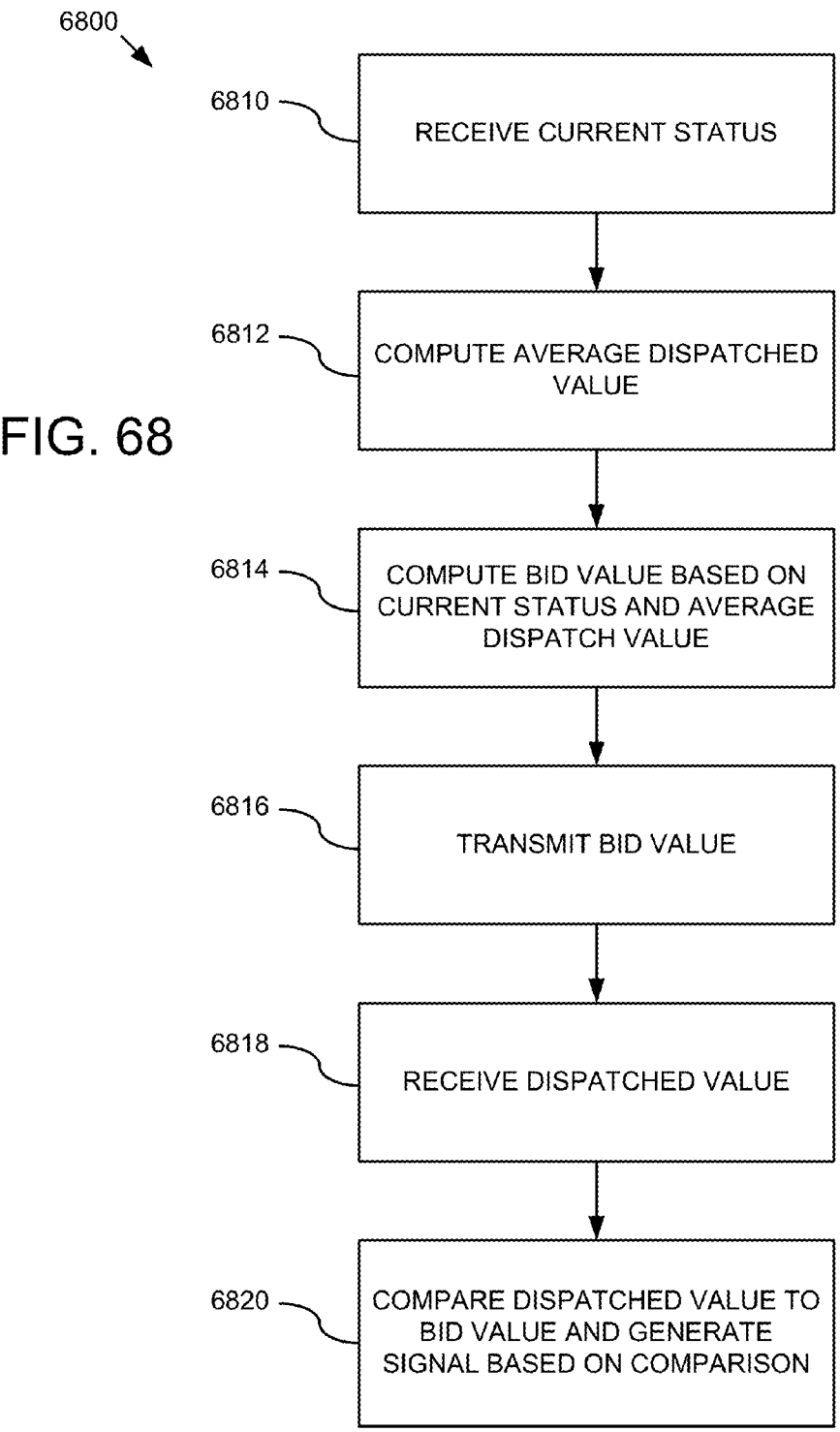
FIG. 68 is a flowchart showing another general embodiment for computing bids in any of the disclosed recourse allocation system using two-way communications.

FIG. 68 is a flowchart 6800 showing another general embodiment for computing bids in any of the disclosed recourse allocation system using two-way communications. The method in FIG. 68 can be performed by computing devices like those mentioned above with respect to FIG. 67. Likewise, the bids computed by the method in FIG. 68 can be associated with electrical devices like those mentioned above. In one particular embodiment, the electrical device is a pump.

At 6810, an indication of a current status of a system controlled by an electrical device is received. For example, if the electrical device is a pump, the current status of the system can be a measurement of a water level affected by the pump.

At 6812, an average dispatched value is computed using multiple dispatched values from a previous time period. The multiple dispatched values can be values at which electricity was dispatched by the market-based resource allocation system during the previous time period.

At 6814, a bid value for purchasing electricity sufficient to operate the electrical device is computed. In the illustrated embodiment, the bid value is based at least in part on the current status of the system and the average dispatched value. In certain embodiments, a standard deviation of the multiple dispatched values from the previous time period is also computed. In such embodiments, the bid value is additionally based at least in part on the standard deviation. In some embodiments, a user comfort setting selected by a user is also received. The user comfort setting can be selected from at least a first user comfort setting and a second user comfort setting, the first user comfort setting indicating the user's willingness to pay more to achieve a desired status of the system controlled by the electrical device relative to the second user comfort setting. In these embodiments, the bid value is additionally based at least in part on the user comfort setting. The desired status and user tolerance value can be input, for example, through an appropriate graphical user interface displayed on a computer or through a keypad, touch screen, dial, or other control mechanism associated with the electrical device.

At 6816, the bid value is transmitted to a central computer in the market-based resource allocation system (e.g., using suitable communication means, such as the Internet or other network).

At 6818, an indication of a dispatched value for a current time frame can be received from the central computer.

At 6820, the bid value is compared to the dispatched value for the current time frame, and a signal is generated to activate the electrical device based on this comparison (e.g., if the bid value is equal to or exceeds the dispatched value for the current time frame).

Any combination or subcombination of the disclosed method acts can be repeated after a fixed period of time (e.g., a time period of 15 minutes or less, or other such time period). In certain embodiments, some of the received values are reused for subsequent time frames. For example, the user comfort setting can be stored and reused for subsequent time frames.

Figure 69:
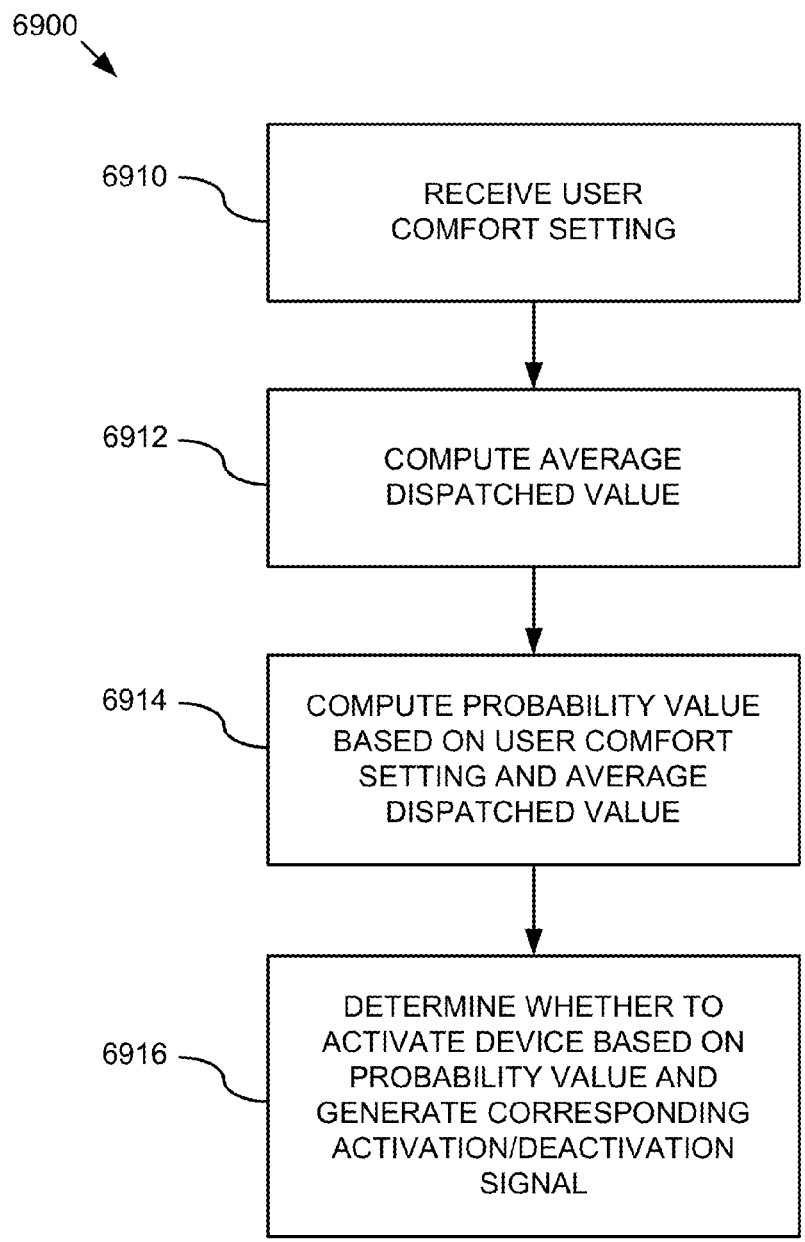
FIG. 69 is a flowchart showing a general embodiment for computing bids in any of the disclosed recourse allocation system using one-way communications.

FIG. 69 is a flowchart 6900 showing a general embodiment for computing bids in any of the disclosed recourse allocation system using one-way communications. The particular method shown in FIG. 69 is for an electrical device in a system for allocating electrical resources, but this usage should not be construed as limiting. The electrical device can be a variety of devices, such as an air-conditioning unit; heating unit; heating, ventilation, and air conditioning (HVAC) system; hot water heater; refrigerator; dish washer; washing machine; dryer; oven; microwave oven; pump; home lighting system; electrical charger, electric vehicle charger; or home electrical system. The method of FIG. 69 can be performed using computing hardware (e.g., a computer processor or an integrated circuit). For instance, the method can be performed by a computer at an end-user's locale or home, a computer coupled to an electrical device, or by specialized hardware (e.g., an ASIC or programmable logic device) coupled to the electrical device. Furthermore, it should be understood that the method acts in FIG. 69 do not necessarily occur in the illustrated sequence.

At 6910, a user comfort setting selected by a user is received. The user comfort setting can be selected from at least a first user comfort setting and a second user comfort setting, the first user comfort setting indicating the user's willingness to pay more to achieve a desired performance level for an electrical device relative to the second user comfort setting. For example, any of the user comfort settings shown in Table 7 or similar comfort setting can be received. The user comfort setting can be input, for example, through an appropriate graphical user interface displayed on a computer or through a keypad, touch screen, dial, or other control mechanism associated with the electrical device.

At 6912, an average dispatched value is computed using multiple dispatched values from a previous time period (e.g., a time period of 24 hours or less). The multiple dispatched values can represent values at which electricity was dispatched by the market-based resource allocation system during the previous time period. The dispatched values can be periodically received in order for this average value to be updated. In alternative embodiments, a single dispatched value (e.g., the most current dispatched value) is received and used to perform the method. In still other embodiments, a value other than the average value is derived from the multiple dispatched values and used to perform the method (e.g., a median value, weighted sum, or other such derived value).

At 6914, a probability value of operating the electrical device is computed based on at least the user comfort setting and the average dispatched value. In certain embodiments, a standard deviation of the multiple dispatched values from the previous time period is computed, and the probability value is additionally based on the standard deviation.

At 6916, a determination is made as to whether to operate the electrical device using the probability value, and a signal is generated to cause the electrical device to operate based on this determination. In some implementations, for instance, a random number is generated, which is compared to the probability value. If the random number is less than (or in some embodiment greater than) the probability value, then the signal for causing the electrical device to operate is generated.

Any combination or subcombination of the disclosed method acts can be repeated after a fixed period of time (e.g., a time period of 15 minutes or less, or other such time period). In certain embodiments, some of the values are reused for subsequent time frames. For example, the user comfort setting can be stored and reused for subsequent time frames.

H. Supply Strategies

Suppliers can consider many factors when computing their offer index value. For example, if there is a production start-up cost, it can be spread over a minimum of M time frames using the formula:

$$\text{index} = \text{variable} + \frac{\text{startup}}{M \cdot \text{capacity}} \tag{1}$$

where index is the index value of the offer, variable is the time-dependent index value (computed, for example, using the average of dispatched indexes over N previous time frames as explained above and the standard deviation of those dispatched indexes), startup is the index value of starting production, and capacity is the total production capacity of the unit.

Similarly, a supplier for which production is already engaged can adjust their offer strategy by lowering their offer's index when they wish to assure their resource is used for a minimum number of time frames. In order to compensate for the potential lost returns during those minimum run time periods, suppliers can increase their initial start-up index enough to offset for potential losses. Here again, one approach is for resource producers to use the average and standard deviation of previously dispatched indexes to forecast the most likely variations and use an increment that minimizes the potential loss over the desired minimum run time:

$$\text{index} = \text{variable} - M \frac{\text{shutdown}}{\text{runtime}} \tag{2}$$

where index is the offer index value, variable is the time-dependent index value, shutdown is the index value of shutting down production, and runtime is the number of period over which the unit has already run.

Another common requirement for suppliers is that they not exceed a maximum production quota allotted for a number of time frames. One solution to this problem is to adjust the offer's index price based on how much of the allotment has been used in relation to number of time frames that have past. Producers that have used a disproportionately high allotment remaining will have lower offers than those that have used a disproportionately low allotment remaining. For example, a supplier with a limited operating license can use:

$$\text{index} = \text{variable} + \text{capacity} \cdot \text{fixed} \frac{\text{remaining}}{\text{license} - \text{run}} \tag{3}$$

where index is the offer index value, fixed is the time-independent index value, remaining is the number of time frames remaining unused in the license, license is the number of time frames in the license, and run is the number of time frames used in the license.

Figure 70:
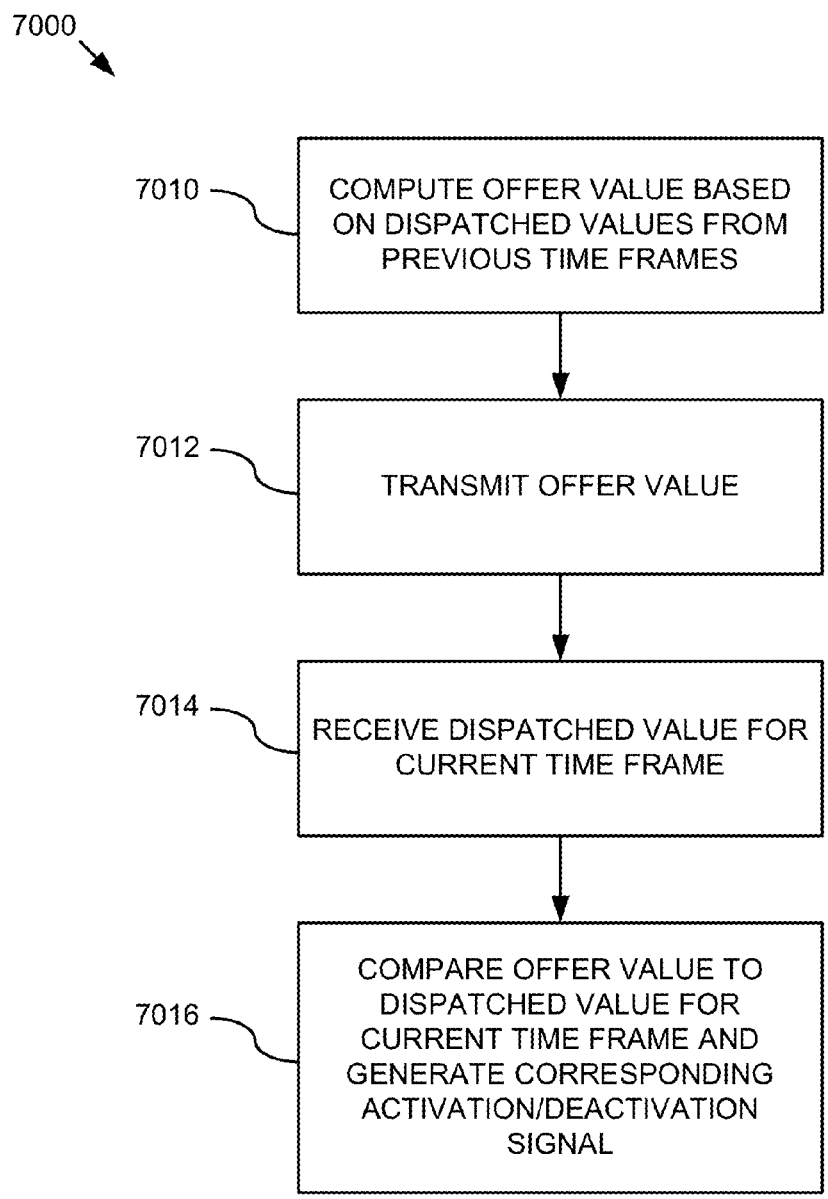
FIG. 70 is a flowchart showing a general embodiment for generating offer values for use in any of the disclosed recourse allocation systems.

FIG. 70 is a flowchart 7000 showing a general embodiment for generating offer values for use in any of the disclosed recourse allocation systems. The particular method shown in FIG. 70 is for an electrical resource (e.g., a generator) in a system for allocating electrical resources, but this usage should not be construed as limiting. The method of FIG. 70 can be performed using computing hardware (e.g., a computer processor or an integrated circuit). For instance, the method can be performed by a computer at a supplier's locale, a computer coupled to an electrical generator, or by specialized hardware (e.g., an ASIC or programmable logic device) coupled to the electrical generator. Furthermore, it should be understood that the method acts in FIG. 70 do not necessarily occur in the illustrated sequence.

At 7010, an offer value indicative of a value at which electricity can be supplied by a generator for a current time frame is computed. In the illustrated embodiment, the offer value is based at least in part on dispatched values from previous time frames, the dispatched values representing values at which electricity was dispatched by the market-based resource allocation system during the previous time frames. In certain implementations, a standard deviation for the dispatched values from the previous time frames is computed, and the offer index value is additionally based at least in part on the standard deviation. The offer value can also be additionally based at least in part on a startup cost for supplying the electricity, a shutdown cost for supplying the electricity, and/or a remaining number of time frames available in an operating license associated with the electricity (e.g., using a weighted sum or other technique).

At 7012, the offer value is transmitted along with a value indicative of a quantity of electricity that can be supplied by the generator during the current time frame to a central computer (e.g., using suitable communication means, such as the Internet or other network).

At 7014, a message is received from the central computer indicating a dispatched value for the current time frame.

At 7016, the dispatched value is compared to the offer value, and the generator is activated in response to the comparison.

Any combination or subcombination of the disclosed method acts can be repeated after a fixed period of time (e.g., a time period of 15 minutes or less, or other such time period). In certain embodiments, some of the values are reused for subsequent time frames. Furthermore, there are instances when the offer value is used as a bid in the market-based resource allocation system. For example, when the electrical resource is configured with an emergency transfer switch for supplying particular consumers in the power grid, then the offer value can be used as a bid value along with a value indicative of a magnitude of electrical load the generator can remove from the power grid.

I. Ramp Rates

Some resources cannot change their production or consumption output more than a certain amount within a single time frame. In this case, the resource being offered is not the quantity, but the change in quantity. This situation can be handled by treating the change in quantity as a distinct resource rather than an extra feature of an existing resource. This way, resources for which ramp rates apply have an extra resource allocation strategy, which can be handled separately and independently. This strategy also helps maintain the independence of each resource as regards its allocation.

J. Multiple Resources

Each consumer and producer can engage in both demand and supply of any number of resources. For example, a producer may offer to supply a quantity of X at index A, while simultaneously requesting a quantity of Y at index B. If the producer depends on having Y in order to produce X, it address the risk of losing access to Y while still having to produce X by either adjusting the offer and request indexes, or ensuring that it has an alternate source for Y or is ready to pay the penalty for not delivering X. The same considerations apply for consumers.

K. Effect of Constraints

Frequently situations arise where a resource that is available in one part of a service provider's system cannot be delivered in its entirety to another part of the same system. Such delivery constraints can be addressed by segregating the system into two separate resource allocation systems that operate independently. For example, the system with surplus resources can make a supply offer into the system with a deficit, and the system with a deficit can make a consumption request from the surplus system. Each system can dispatch its own index value, in which case the index difference will represent the impact of the constraint on both systems. In some embodiments, the aggregator resource allocation system can credit a capacity expansion account, which is used to support the improvement of the connection between the two such that the constraint is eventually addressed.

III. Exemplary Implementations of the Resource Allocation Scheme and Case Studies Concerning the Exemplary Implementations The following are examples of end-use and distributed resource control techniques that can be used in the general resource allocation scheme described above in Section II and illustrated in FIG. 1. These techniques have each been implemented and tested as part of an experimental research project, which is described in much greater detail in Section IV.

A. Two-Way, Transactive Control for Thermostatically-Controlled Equipment

The techniques introduced in this section can be applied to the controls of space heating and cooling (e.g., in residential or commercial buildings). The approach can be extended to other contexts as well (e.g., the control of municipal water-pump loads, where the temperature is replaced by reservoir height as the principal control input for determining the loads' bids).

In one exemplary embodiment, thermostatically controlled heating and cooling modifies conventional controls by explicitly using market information obtained through interaction with a resource allocation system, such as any of the resource allocation systems introduced above in Section II. In particular, the exemplary embodiment uses bid and dispatched index information. In the discussion below, bids and dispatched indexes are sometimes referred to in terms of a cost or price. It is to be understood that this "cost" or "price" can represent an actual monetary cost or price or a cost or price in terms of the relevant resource allocation index. Furthermore, the dispatched index from the resource allocation system is sometimes referred to herein as the "clearing price".

Figure 4:
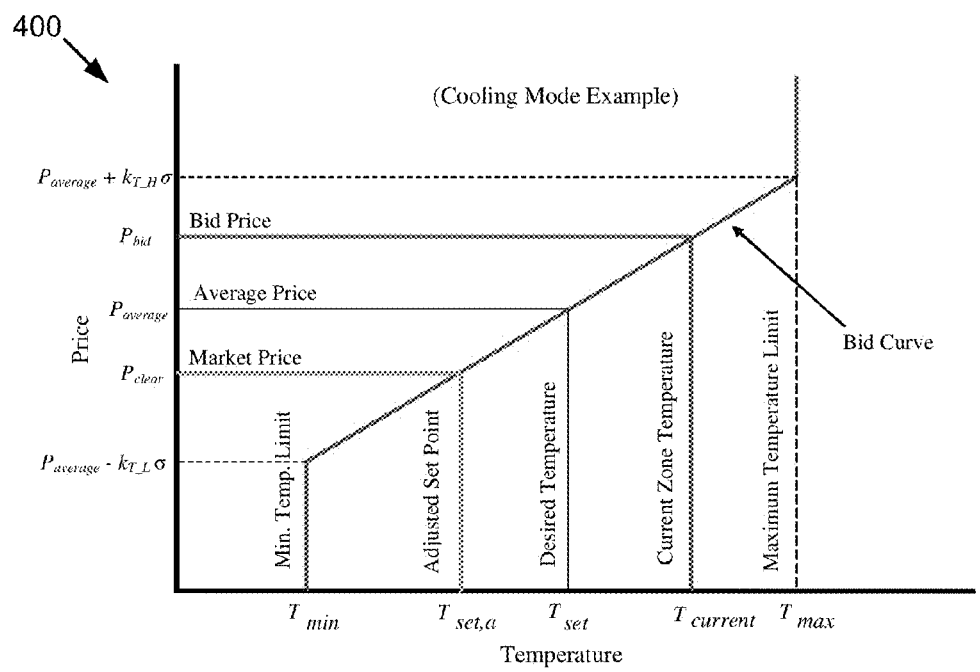
FIG. 4 is a graph illustrating a bid and response strategy for thermostatically controlled loads according to one exemplary embodiment of the disclosed technology.

A bid curve can be used to functionally relate the cost of a service to a user's comfort. FIG. 4 shows a graph 400 of an exemplary bid curve that graphically illustrates several of the concepts embodied in the bidding technique described below. The exemplary bid curve in graph 400 is derived from the mean and standard deviation of dispatched indexes over a 24-hour period along with exemplary minimum and maximum temperature limits that result from a comfort setting selected by a user. Desirably, the standard deviation and average of the clearing price will be continually evaluated and updated.

In the exemplary technique described below, the occupant of a locale or zone that is thermostatically controlled (the user, in this example) provides two inputs. First, the occupant selects a preferred temperature setting $T_{set}$ for each scheduled occupancy period. For each occupancy period, the occupant also selects a comfort setting from among a set of alternatives.

In the exemplary embodiment, each comfort setting is associated with pairings of elasticity factors and temperature limits (in the illustrated example: $k_{T\_L}$, $T_{min}$ and $k_{R\_H}$, $T_{max}$). In certain embodiments, the pairings of comfort settings and parameters shown in Table 7 or any combination thereof are used. In other embodiments, parameters that deviate from those shown in Table 7 but that are still based on variations from the standard deviation are used.

In the example illustrated by graph 400 in FIG. 4, the high-temperature limit $T_{max}$ corresponds to $k_{T\_H}$ standard deviations from the mean price. Furthermore, in this example, the value $k_{T\_H}$ is automatically determined with the user's selected comfort setting (e.g., using a look-up table or file storing the elasticity factors and time limits associated with each comfort setting). The values of $k_{T\_L}$ and $k_{T\_H}$ are not necessarily identical for the upper and lower parts of the bid curve. Further, in this example, if both $k_{T\_H}$ and $k_{T\_L}$ are sufficiently (or infinitely) large, the thermostat will function like a normal thermostat unaffected by grid conditions and the behaviors of the market. With such a configuration, the thermostat is said to be inelastic.

The example shown in FIG. 4 is one in which it is desired to cool the current temperature (e.g., it is an example in which electrical resources are to be used for air conditioning). In the example, a high value of $k_{T\_H}$ will lead to relatively high bids when the zone temperature exceeds the desired zone temperature $T_{set}$, which a high bid will help make sure that the zone cooling bid will win the right to become satisfied. If $k_{T\_L}$ and $k_{T\_H}$ are small (representing elastic behavior), bids from the thermostatically controlled load deviate little from the mean price, and current temperatures are permitted to vary throughout a relatively large temperature range (from $T_{min}$ to $T_{max}$) as the market's cleared price changes.

Although the illustration assumes that the price of electricity is changing in real time, transactive thermostat control can be adapted for time-of-use, day-ahead, and critical peak pricing structures with minor and, in some cases, no modifications.

The following discussion describes one exemplary technique for computing a bid value for a next market interval. In the exemplary technique, the current indoor zone temperature $T_{current}$ can be determined and the consequent bid price $P_{bid}$ computed. According to the exemplary technique, the bid price is based on the slope of the bid curve and the difference between the current zone temperature $T_{current}$ and the desired zone temperature set point $T_{set}$. The corresponding bid price depends on additional parameters that are defined by the chosen comfort setting and are indicative of the user's willingness to tolerate differences in temperature from the desired temperature setting. In this example, the additional parameters comprise $k_{T\_L}$, $k_{T\_H}$, $T_{max}$ and $T_{min}$. The bid price $P_{bid}$ is also based at least in part on historical market clearing prices. For example, the bid price $P_{bid}$ in the exemplary technique is based at least in part on the mean market clearing price and standard deviation of the market clearing prices from the recent historical performance of the market. For example, the following equation can be used:

$$P_{bid} = P_{average} + (T_{current} - T_{set}) \frac{k_T \times \sigma}{|T_{limit} - T_{set}|} \quad (4)$$

where $P_{bid}$ is the bid price, $P_{average}$ is the mean price of electricity for the last 24-hour period (or other historical time period), $\sigma$ is the standard deviation of the electricity price for the same period, and $k_T$ and $T_{limit}$ are chosen from $k_{T\_L}$, $k_{T\_H}$ and $T_{min}$, $T_{max}$, depending on where $T_{current}$ presently resides on the bid curve. For example, any combination or subcombination of the parameters $k_{T\_L}$, $k_{T\_H}$ and $T_{min}$, $T_{max}$ and the comfort settings shown in Table 7 can be used.

In this example, the mean and standard deviation price parameters over the prior 24-hour window were used. The intention of doing so was to track the energy price trends closely without necessarily tracking the diurnal behaviors of that price. By using averaged price parameters, the technique is adaptive. Relative high and low price definitions are based on recent historical information. Independent of any absolute price thresholds, the exemplary technique can be similarly applied where prices are high, where prices are low, and where the prices are tending to increase. The use of a recent standard deviation enables the technique to automatically adapt and scale a bid value so that it is competitive in the present market while meeting the consumer's objective with respect to comfort and economy.

The resulting bid value can then be posted to the market (e.g., the resulting bid value can be transmitted to the resource allocation system responsible for determining the clearing price). The market then establishes the market clearing price using this and the other bids and offers, as has been described in Section II. Depending on how the resource allocation system is implemented, the market can be cleared externally (e.g., by a resource distributor that is external to the entity placing the bid) or internally (e.g., by a resource distributor that is internal to the entity placing the bid). For instance, a resource allocation system according to the disclosed technology may be implemented within a single building or system that is internally controlled (e.g., an HVAC system in a commercial building where each temperature zone is viewed as a separate consumer that can compute and post bids). In this example of a resource allocation system that is cleared internally, the systems within a building compete for an internal, rather than an external, reallocation of costs and services.

After receiving the resulting posted market clearing price, an adjusted zone set point $T_{set,a}$ can be calculated. For example, in one exemplary embodiment, the following equation can be used:

$$T_{set,a} = T_{set} + (P_{clear} - P_{average}) \frac{|T_{limit} - T_{set}|}{k_T \times \sigma} \quad (5)$$

A graphical interpretation of the adjusted set point $T_{set,a}$ is shown in graph 400 of FIG. 4. The thermostat's zone set point can be adjusted to the new adjusted zone set point. Once the set point is adjusted, the thermostat's conventional control takes over.

In graph 400 of FIG. 4, the adjusted cooling set point falls below the current temperature $T_{current}$, meaning that there presently exists an opportunity to cool the given space at an acceptable energy cost. This process continues for each market clearing cycle. The notion of a single zone temperature set point no longer exists because the set point can be affected by the market as well as a user's selected comfort setting. Note that $T_{set,a}$ can be higher or lower than the desired set point $T_{set}$ based on the market clearing price. In cooling mode, lowering the adjusted set point $T_{set}$ below the desired set point will increase the energy consumption as one takes advantage of low energy costs.

In general, transactive control can support more aggressive pre-cooling and pre-heating functions. (For example, lowering the set point below what would normally be comfortable is done to pre-cool.) For some dynamic rate structures (e.g., time-of-use), the future price is known a priori; however, in the case of real-time pricing, the future price is unknown or highly uncertain. To pre-heat or pre-cool with real-time pricing, one should have the ability to forecast future prices. In certain embodiments, pre-cooling and pre-heating comfort settings can be offered.

B. Demand Response On/Off Control for Equipment with One-Way Communication

This section describes techniques that can be used to control equipment that is not capable of computing and transmitting bids to the resource allocation system but that nonetheless can benefit from adaptive control strategies. The exemplary techniques are described in the context of controlling a water heater. The water heaters in this example differ from the thermostatically controlled loads described in the previous section in that they have no temperature measurement with which they could formulate their present need for electricity as bids into a market. Nonetheless, water heaters (or other electrical devices in which only one-way communication is possible, such as pool pumps, battery chargers, and the like) can be adapted to opportunistically respond to market prices without having to formulate and submit any bids.

According to one exemplary embodiment, a probability function can be used to control whether the electrical device should run during a given time interval. For instance, the probability function can be used to grant the electrical device (e.g., the water heater) a probabilistic opportunity to run that is dependent on the relative magnitude of a cleared market price.

For example, in one particular implementation, the basic water heater controls were modified so that the signal activating the water heater was interrupted with increasing likelihood as the clearing price exceeded the reported historic average electricity price. The greater the difference between the clearing price and average, the more likely the water heater circuit will be interrupted. In this implementation, the water heater user can select a comfort setting from among multiple possible comfort settings. Each comfort setting is associated with a consequent weighting factor (in the exemplary implementation, the $k_W$ factor), which either attenuates or amplifies the effect of the probability function.

A variety of probability functions can be used to control the water heater, but in one particular embodiment, the following equation is used:

$$r = k_w \left[ \frac{1}{\sqrt{2\pi}\,\sigma} \int_{-\infty}^{P_{clear}} e^{-\frac{(P-x)^2}{2\sigma^2}} dx - \frac{1}{2} \right] \quad (6)$$

$$= k_w [N(P_{clear}, \overline{P}, \sigma) - 0.5];$$

$$r \geq 0$$

$$r = 0;\ \text{otherwise}$$

where N is the cumulative normal distribution, and the factor $k_W$ is defined through the participant's selection of a comfort setting.

In certain embodiments, the probability parameter r can then be used to test the probability of turning the water heater off by comparing it to a uniformly generated random number between 0 and 1. For instance, if r is greater than this random number, the water heater can be curtailed. The random number can be generated at each time interval to give each water heater an opportunity to run a fraction of the overall time that is proportional to the curtailment probability.

Table 1 shows the probability of water heater curtailment given various values of comfort setting $k_W$ according to one exemplary embodiment. Table 1 also shows the probability according to several exemplary cleared market prices. Specific values of cleared market price $P_{clear}$ are provided for the case where the mean cleared market price over the past day was $75/MWh, and its standard deviation was $25/MWh. As can be seen from Table 1, the likelihood of the water heater being turned off increases with the cleared energy price $P_{clear}$ and with the factor $k_W$. As can also be seen from the example in Table 1, the water heaters are never curtailed when the price is below average. In other words, according to the example shown in Table 1, it is advantageous for the water heaters to heat their water when the price is below average.

TABLE 1

Example of Water Heater Curtailment Probability for Values of $k_W$ ($P_{mean} = 75$, $\sigma = 25$)

| Multiples of σ | $P_{clear}$ ($/MWh) | Factor $k_W$ | | | | |
|---|---|---|---|---|---|---|
| | | 0 | 0.5 | 1.0 | 1.5 | 2.0 |
| −3 | 0 | 0.0% | 0.0% | 0.0% | 0.0% | 0.0% |
| −2 | 25 | 0.0% | 0.0% | 0.0% | 0.0% | 0.0% |
| −1 | 50 | 0.0% | 0.0% | 0.0% | 0.0% | 0.0% |
| 0 | 75 | 0.0% | 0.0% | 0.0% | 0.0% | 0.0% |
| 1 | 100 | 0.0% | 17.1% | 34.1% | 51.2% | 68.3% |
| 2 | 125 | 0.0% | 23.9% | 47.7% | 71.6% | 95.4% |
| 3 | 150 | 0.0% | 24.9% | 49.9% | 74.8% | 99.7% |

C. Commercial Building Load Control

In this section, details of the experimental use of a market-based control technology used to control a building-space air conditioning and heating system are described. The experiment was implemented using an existing Johnson Controls building automation system (BAS) with no additional capital expenditure for making the commercial building more energy demand responsive. Instead, the building was made responsive to the real-time electric energy market prices of a resource allocation system as described above. The elements that were controlled during the experiment were the variable air volume (VAV) dampers serving temperature zones within the building.

1. Traditional Building-Space Conditioning Controls

Most building control systems in large commercial buildings (e.g., larger than 100,000 square feet) include HVAC systems that are controlled by a building automation system (BAS). A BAS has sensors to measure control variables (e.g., temperature and air flow rates), a controller with the capability to perform logical operations and produce control outputs, and controlled devices that accept the control signals and perform actions (e.g., dampers and valves). In addition, the BAS may also have a global supervisory controller to perform high-level tasks (e.g., resetting temperature set points based on building conditions and scheduling on and off times).

BAS technology has evolved over the past 3 decades from pneumatic and mechanical devices to direct digital controls (DDCs) or computer-based controllers and systems. A BAS typically comprises electronic devices with microprocessors and communication capabilities. The widespread use of powerful, low-cost microprocessors and standard cabling as well as the adoption of standard communication protocols (such as BACnet™ and LonWorks™) have led to improved BAS. Most modern BASs have powerful microprocessors in the field panels and controllers that may soon be embedded in sensors as well. Therefore, in addition to providing better functionality at lower cost, these BASs also distribute the processing and control functions to the field panels and controllers without having to rely on a central supervisory controller for all functions.

Figure 5:
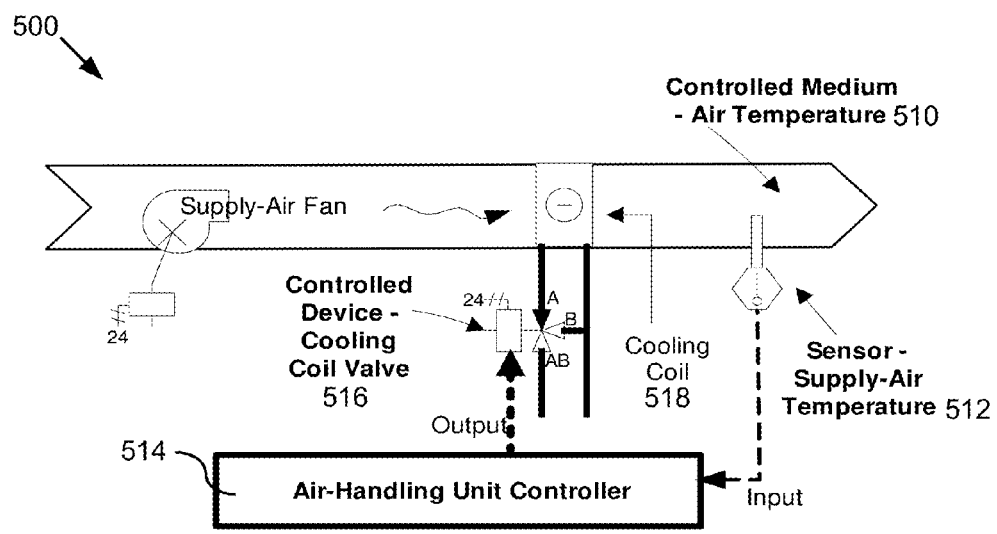
FIG. 5 is a schematic block diagram of an exemplary building automation system that can be controlled according to embodiments of the disclosed technology

In a conventional (or non-transactive) control application, shown in block diagram 500 of FIG. 5, the principal control elements are the supply air temperature 510 (which is the controlled variable), a dry-bulb temperature sensor 512, a controller 514 (which compares the sensed supply air temperature value with a fixed set point and uses the difference between the two to generate an output signal), a controlled device 516 (which in this case is a cooling coil valve controlling the chilled water flow to the cooling coil), and a process plant 518 (which in this case is the cooling coil and air stream).

As the supply air temperature changes, the difference between the measured supply air and the supply set point temperature changes; the controller 514 uses the difference between the two values to generate an output signal that repositions the cooling coil valve 516. As the valve is repositioned, the supply air temperature changes, and eventually the measured temperature and the supply set point will be nearly equal. Note that the supply air temperature is the only controlled variable in a conventional control approach; the cost of providing comfort and the performance of the component or the system are not part of the decision-making process.

2. Transactive Building Control

The process by which commercial-building bids for thermostatic zone control were computed and transmitted into the resource allocation system were presented above in Section III.A. Specifically, equations 4 and 5 were used to compute the bid values for each temperature zone. The purpose of this section is to further describe transactive control as it applies to commercial buildings and to differentiate such control from traditional commercial-building controls.

Transactive networks and agent-based systems present an opportunity to implement strategies in which a degree of both local and global optimization is an inherent attribute of the strategy, achieved through market-based competition for resources rather than explicitly programmed. Such market-based competition can be implemented using any of the resource allocation schemes described above in Section II.

The premise of transaction-based control is that interactions between various components in a complex energy system can be controlled by negotiating substantially immediate and contingent contracts on a regular basis in lieu of or in addition to conventional command and control. Each device is given the capability to negotiate deals with its peers, suppliers, and customers to maximize revenues while minimizing costs. This is best illustrated by an example.

A typical building might have one or more chillers that supply chilled water on demand to multiple air handlers. If several air handlers require the full output of one chiller, and still another air handler suddenly also requires cooling, traditional building control algorithms simply start up another chiller to meet the demand, and the building's electrical load increases accordingly.

A transaction-based building-control system behaves differently. Instead of submitting an absolute demand for more chilled water, the air handler submits a bid for additional service from the chillers, increasing its bid in proportion to its "need" (e.g., the divergence of the zone or supply air temperature from its set point). The chiller controls, possibly having knowledge of the electric rate structure, can express the cost of service as the cost of the electricity needed to run the additional chiller plus the incremental capacity demand charges, where such charges might apply. If the zone served by this air handler just began to require cooling, its "need" is not yet very great, so it places a relatively the low bid for service, and the additional chiller stays off until its level of need and consequent bid increases.

Meanwhile, if another air handler satisfies its own need for cooling, the cost of chilled water immediately drops because a second chiller is no longer required, and the bid from the air handler awaiting service perhaps then exceeds the present price, and it receives the chilled water it had requested. Alternatively, a peer-to-peer transaction can take place in which an air handler with greater need for service displaces (literally outbids) another whose thermostat is nearly satisfied.

In this way, the transaction-based control system accomplishes several things. For instance, the transaction-based control system inherently limits demand by providing the most cost-effective service. In doing so, the system inherently prioritizes service to its more important needs before serving less important ones. Further, assuming that no air-handling unit (AHU) is willing to pay the additional cost of service to start the second chiller, the transaction-based control system decreases energy demand and consumption by preventing the operation of an entire chiller to meet a small load, a condition where the system would operate inefficiently. Additionally, contract-based controls inherently propagate cost impacts up and down through successive hierarchical levels of the system being controlled (in this example, a chiller or a boiler that provides cooling or heating, an air handler that provides air circulation, and the zone). The impacts on the utility bill, which are easily estimated for the chiller operation, are used as the basis for expressing the costs of air handler and zone services. Using cost as a common denominator for control makes expression of what is effectively a multi-level optimization much simpler to express than an explicitly engineered solution would be. It allows controls to be expressed in local, modular terms while accounting for their global impact on the entire system.

In effect, the engineering decision-making process can be subsumed by a market value-based decision-making process that indirectly injects global information conveyed by market activity into the local engineering parameters that govern the behavior of individual systems over multiple time scales.

Many HVAC systems are controlled by thermostats. The desired temperature is set by the customer, and the thermostat uses the current space temperature to control the air-flow damper positions or to turn the compressor off, thereby satisfying the heating and cooling needs of the zone. In a conventional control system, indoor temperature and indoor set-point temperatures control the amount of heating and cooling to each zone. However, in a transactive control system, in addition to the conventional inputs, the thermostat also uses price information to make control decisions. Although much of the discussion so far has been for thermostatically controlled systems, transactive controls can be applied to non-thermostatically controlled systems as well.

3. Case Study of Transactive Control

In this section, the actual implementation of a transactive control strategy is discussed. In particular, the HVAC system of a commercial building in Sequim, Wash., was modified to operate using a resource allocation system as described above. The building (the marine sciences laboratory (or MSL) building) was a mixed-use commercial building with both office and laboratory spaces. The perimeter of the building consisted of office spaces, while the core consisted of laboratories. The building was served by a heat pump chiller and a boiler that supplemented the building's heating needs when the heat pump chiller was not able to meet the building's heating needs. The office and laboratory spaces had independent HVAC systems. The office spaces were conditioned by a multi-zone VAV AHU. Each office was served by a VAV terminal box that was controlled by a zone thermostat. The VAV boxes also had a reheat coil to provide heating as well as reheat. For the office spaces, the zone temperature set points were different for the heating and cooling periods and also for occupied (in this example, 6:30 AM to 5:30 PM) and unoccupied (in this example, 5:30 PM to 6:30 AM) periods. The transactive control strategy was applied to 12 VAV systems serving the office spaces.

The transactive control strategy, described in the previous section, was programmed at two levels in the BAS (zone level and building level). The bidding and calculation of adjusted set point occurred at the zone level, each zone bidding independently of other zones. The user-specified parameters (in this example, the user's desired temperature and the comfort settings according to Table 7) were entered for each zone. In this case, the facilities operator specified a common acceptable temperature range for controlled zones (65° F. to 80° F.) and a common comfort parameter ($k_T=3$) as well. A zone level override was also provided so that the user could override the transactive control strategy and fall back onto the building's prior conventional control approach. Another way to override the transactive control is to set the value of $k_T$ very high (>10), which emulates conventional control.

Some aspects of the transactive control were implemented at the building level. The current market price, the mean price, and the standard deviation, for example, were posted from an external source at the building level. In addition, a building-level override was also provided for use by the building manager. Unlike the zone-level override, the override at the building level superseded all transactive controls at all levels, including at the zone level.

Although electric power markets are generally cleared infrequently at an hourly interval, the real-time market created for this experiment (also referred to as the "shadow market") cleared every 5 minutes. The zones did not directly participate in and bid into the experiment's market but rather used the cleared market price to adjust their set points based on the market price. VAV damper control cannot be directly correlated to energy price as could be done, for example, for the operation of a boiler or HVAC units.

The communication between the shadow market and the BAS was mediated through an object link and embedding (OLE) for process control (OPC) server. To compare the response of conventional controls with transactive controls, the building was operated with conventional controls on Tuesday and Thursday and with transactive controls on Monday, Wednesday, and Friday.

Figure 6A:
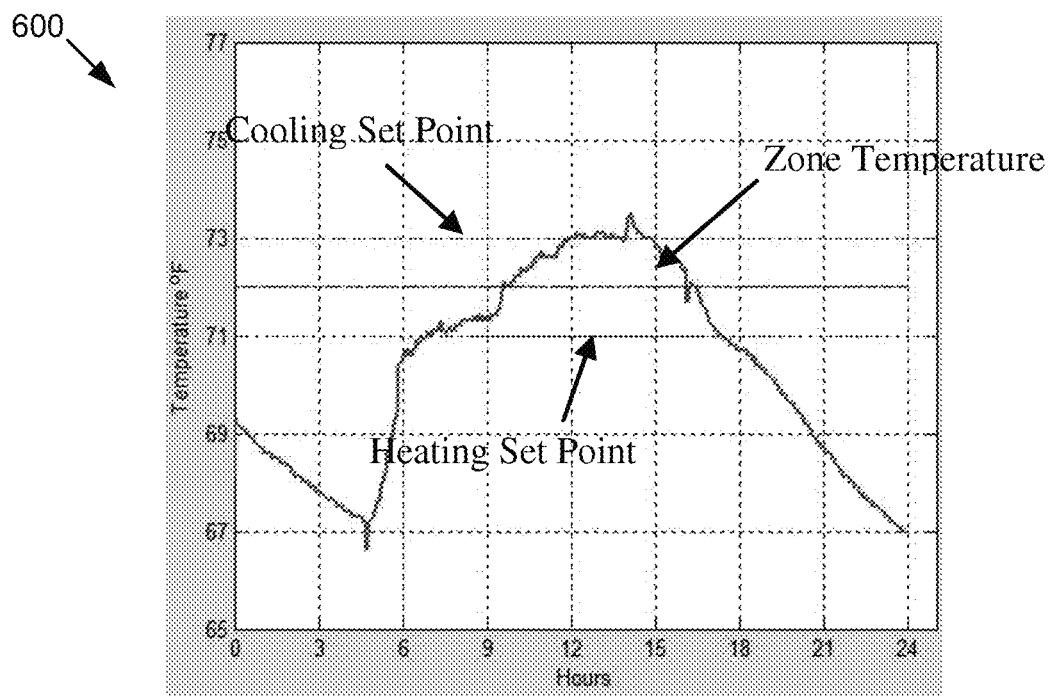
FIGS. 6A and 6B are graphs showing the effect of transactive control on zone temperatures and set points in an experiment performed using an embodiment of the disclosed technology.
Figure 6B:
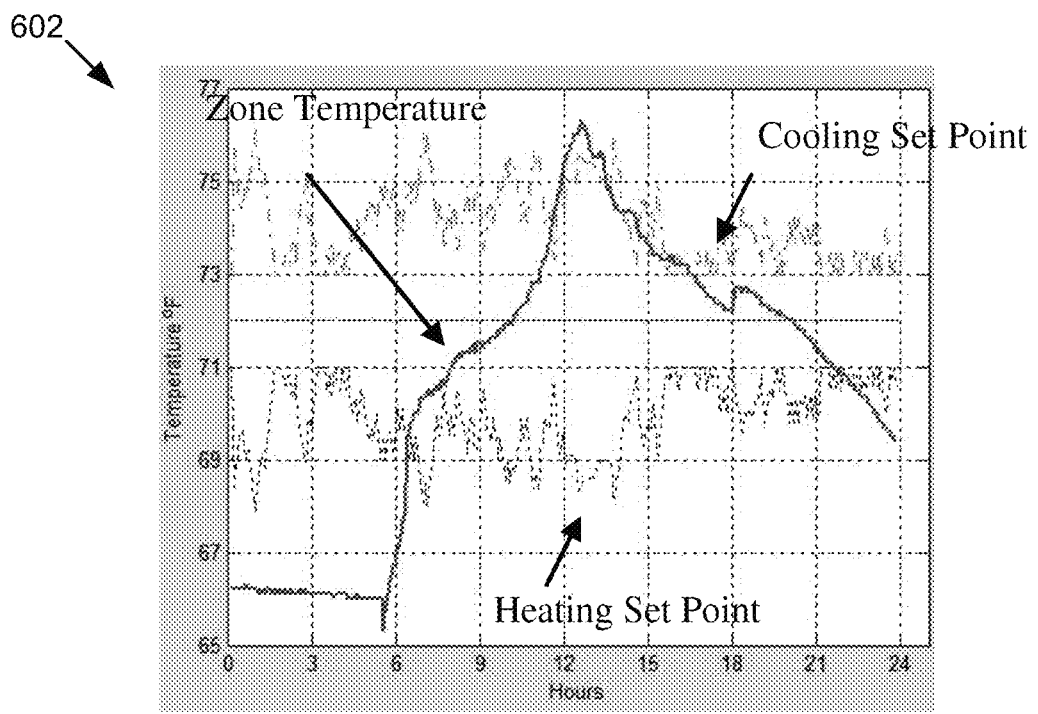

Graphs 600 and 602 of FIGS. 6A and 6B compare the response of a single zone on two consecutive days with conventional and transactive control. The heating and cooling set points during occupied hours (6:30 AM to 5:30 PM) for the zone with conventional control were 71° F. and 73° F., respectively. As seen from graph 600 in FIG. 6A, the zone temperature with conventional control was between the two set points most of the time during occupied hours. Unlike the conventional control, on the day with transactive control, the heating and cooling set points were not constants but changed in response to the market price signal, as is shown in graph 602 of FIG. 6B.

Figure 7:
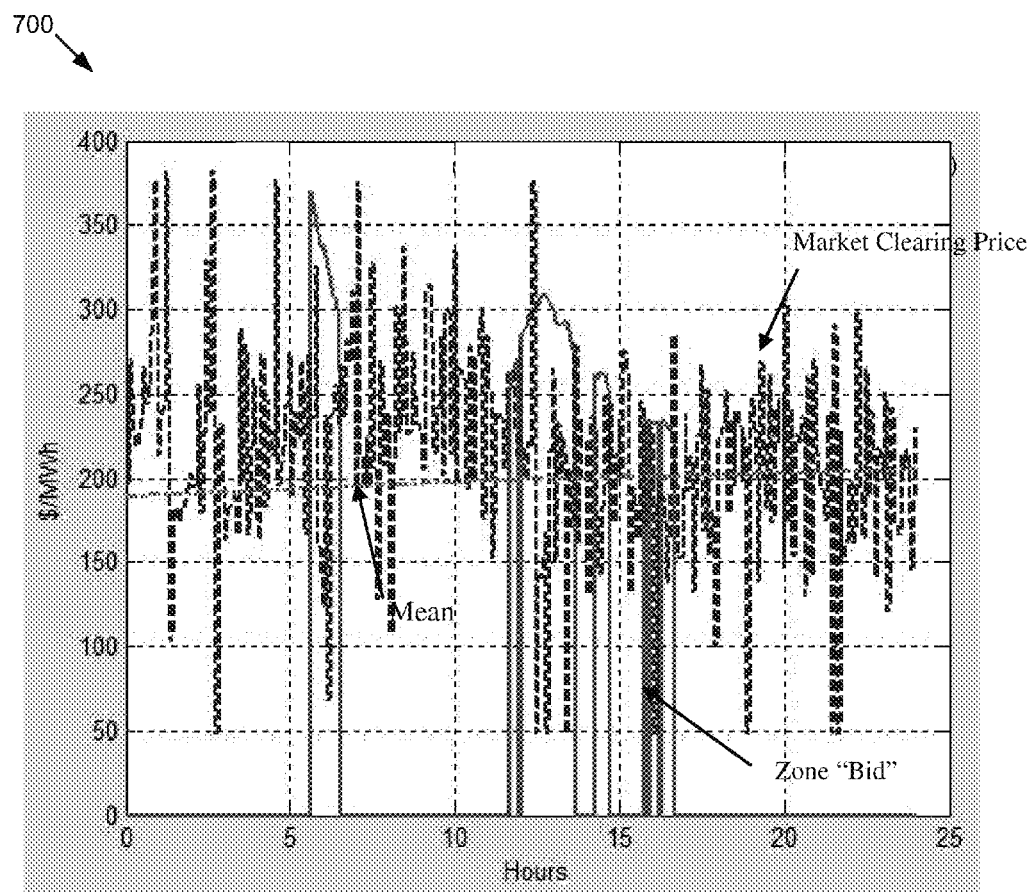
FIG. 7 is graph showing the zone bid, market clearing price, and the mean price of electricity for an experiment performed using an embodiment of the disclosed technology.

Graph 700 in FIG. 7 shows the corresponding bid prices, market prices, and mean price. In this transactive control application, the zone thermostat "bids" were zero when the zone set point was satisfied. (For clarification, these bid prices were calculated and used by the thermostats even though the bids were not placed into the market.)

D. Water Pump Load Control

This section summarizes an experiment performed in which the control of municipal water pump-load resources was modified to respond to a resource allocation system according to the disclosed technology. In particular, five 40-horsepower municipal pumps from two pump stations in public utility district #1 (PUD #1) in the Clallam County service territory on the Olympic Peninsula, Wash., participated in the experiment. This section describes the operational performance of the pumps, their automated bidding into the exemplary price market generated for the experiment, and the times and durations for which the pumps were curtailed.

1. Transactive Market for Real-Time Energy Control

A local marginal price signal was designed for the experiment and was used in conjunction with the Clallam County pumps to automatically determine when the pump loads should operate. The operation of the project's market was described above in Section I. The control of municipal water pump loads is similar to the control of the thermostatically controlled loads described in the previous section, but water-reservoir level replaced zone temperature as the principal input variable from which the loads' market bids were determined.

Each pump station automatically submitted a bid to run its pumps for the next 5 minutes based upon measurements of the actual height of the reservoir at the pumping station. The pump stations bid high when their reservoir's level became low and bid lower when the reservoir's level was acceptable. An unsuccessful bid automatically curtailed the pumps' operation. Initially, the pumps' bids were not submitted to influence the market, but rather the operation of the pumps was based on a comparison of the pump bid and market clearing price. If the bid price was greater than the market clearing price, the pumps operated normally; and if the bid price was less than the market clearing price, the pumps were curtailed. During the experiment, the pumps also began bidding into and influencing the market as a responsive load resource where their bids reflected their reservoir water height.

2. Pump Load Control and Communications

The responsive municipal water pump load consisted altogether of five 40-hp municipal water pumps, which were to maintain the level of water stored in two nearby water reservoirs. These load resources were made available for the experiment by PUD #1 of Clallam County, in whose service territory the pumps resided on the Olympic Peninsula, Wash.

Figure 8:
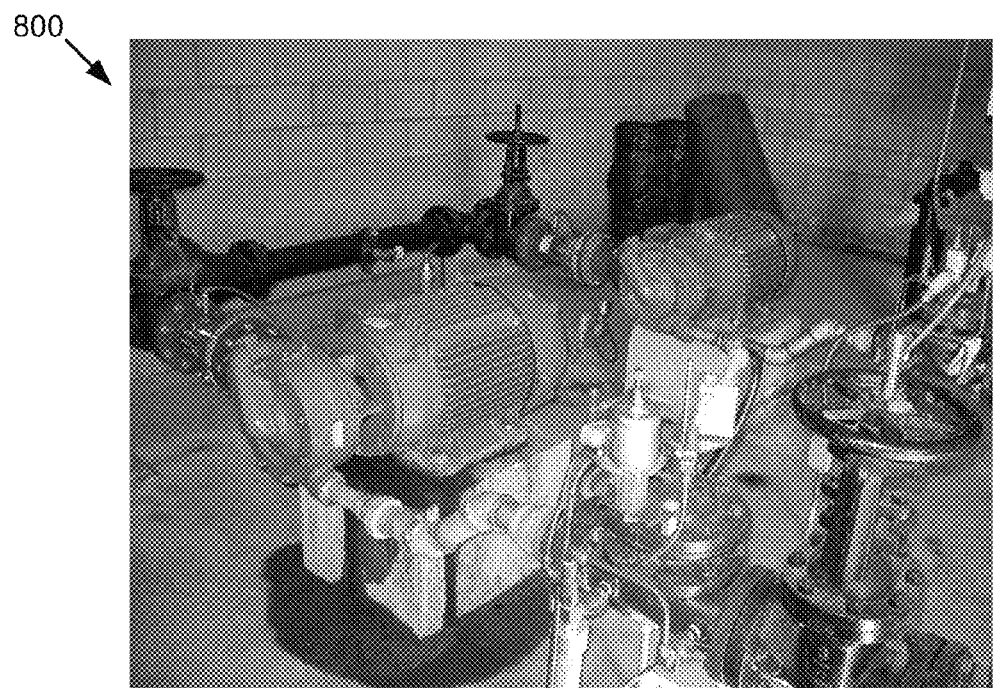
FIG. 8 is an image of the interior of a pump house and two 40-hp pumps used in an experiment investigating aspects of the disclosed technology.
Figure 9:
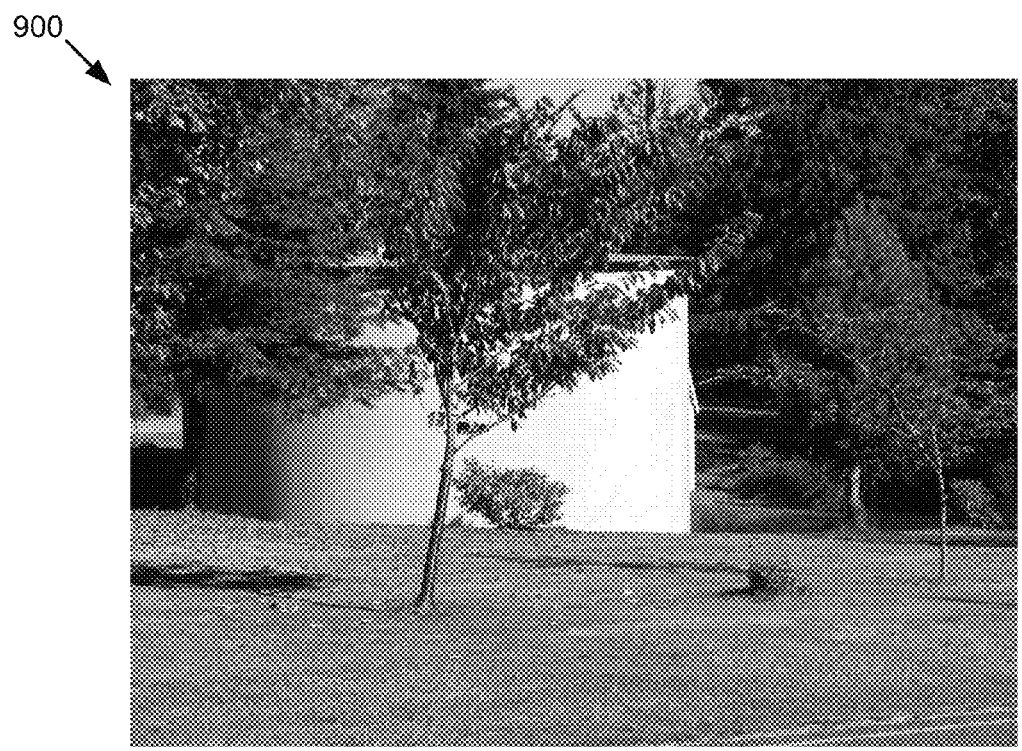
FIG. 9 is an image of a water reservoir associated with the pumps in FIG. 8.
Figure 10:
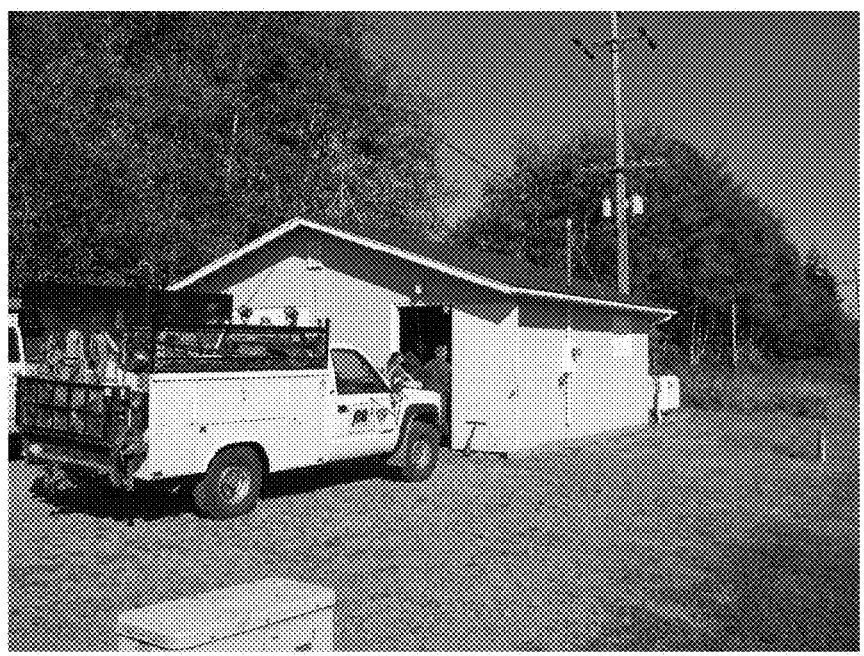
FIG. 10 is an image of the exterior of the pump station housing the pumps in FIG. 8.

Image 800 of FIG. 8 shows the interior of the Sekiu pump house and its two 40-hp pumps, and image 900 of FIG. 9 shows the corresponding water reservoir. Image 1000 of FIG. 10 shows the exterior of the Sekiu pump station. Similar pumps and a reservoir existed at the Hoko River pump station and also in the Clallam County PUD service territory near Clallam Bay on the Olympic Peninsula.

Before the experiment, these sites used a simple control strategy to maintain the levels of the reservoirs. Pumps were consecutively directed to turn on by their controllers at absolute water-height thresholds as the water level in the reservoirs diminished. For example, the first would turn on when the reservoir dropped 1 foot. A second would come on after the reservoir level dropped 2 feet, and so on.

Figure 11:
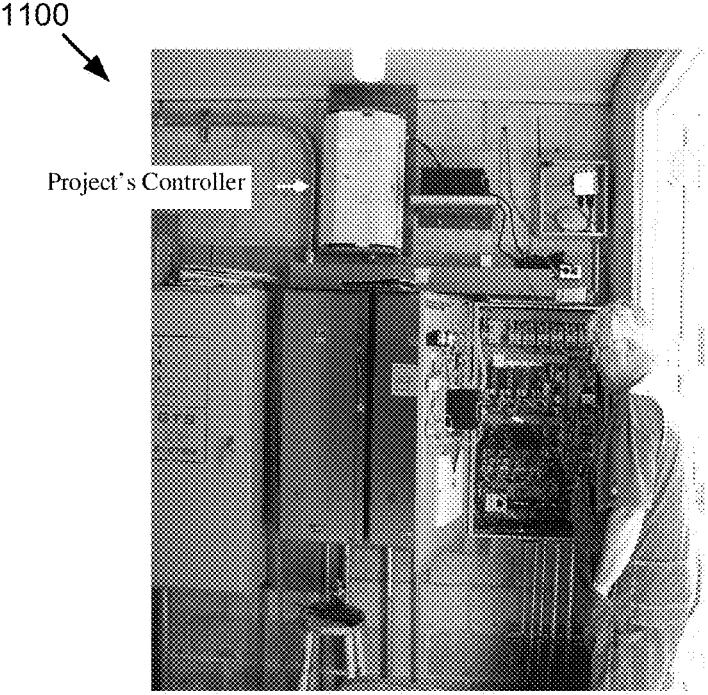
FIG. 11 is an image of the main control panel of the pumps in FIG. 8.
Figure 12:
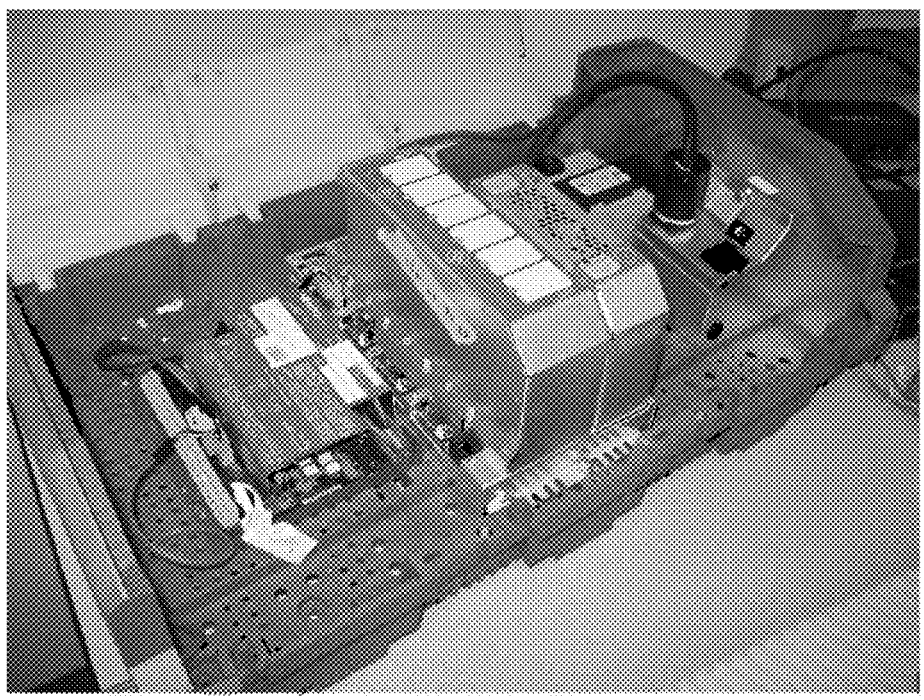
FIG. 12 is an image of the inside of one of the control panels from FIG. 11.

For the experiment, controller switches were placed in series with the existing controls. Therefore, the grid benefits by removing pump load that was already, or would be, part of the total system load. In other words, the experiment allowed for the pump operation to be curtailed, but not initiated. The main control panel at the Sekiu pump station is shown in image 1100 of FIG. 11. The Johnson Control (JCI) panel was placed into the pump house to control the pumps. The inside of one of one such JCI controller can be seen in image 1200 of FIG. 12.

Figure 13:
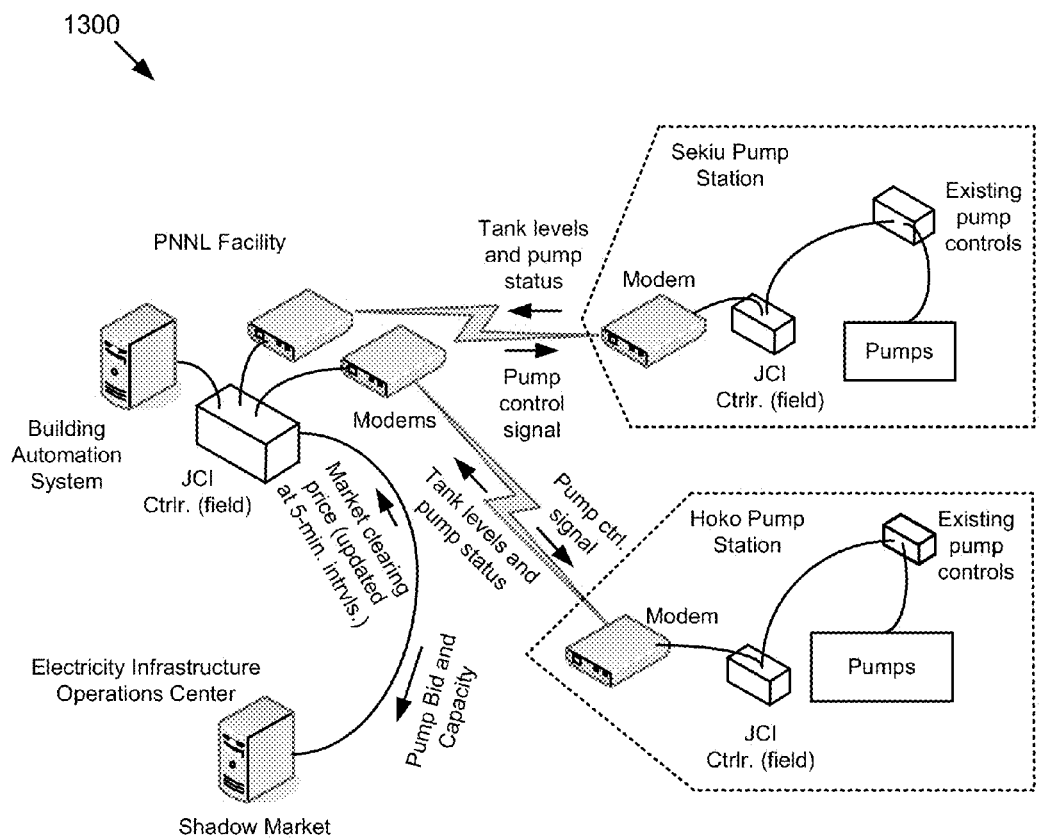
FIG. 13 is a schematic block diagram of the control system used to control water pumps in an experiment investigating aspects of the disclosed technology.

Block diagram 1300 of FIG. 13 shows a schematic diagram of the experiment's control communications for controlling the pumps. Starting from the right-hand side of this figure, the experiment involved adding a JCI controller at each pump station to interact with the existing pump controls. The JCI controllers communicated their status via a modem to another controller (located at the Richland Pacific Northwest National Laboratory facility) via a similar modem and JCI box. The pump status was converted to a bid and capacity by the controller, which was then relayed to the servers located in the PNNL Electrical Infrastructure Operations Center (EIOC).

There, the bids from all loads and resources were received, and the project's market cleared, resulting in a total regional capacity that can be supplied and consumed at the cleared market price. The resulting cleared market price was an input for the decision for each pump to operate or not. This control-action signal was then relayed back to each pump station and its controllers via modem.

3. Detailed Method of Bidding

PUD #1 of Clallam County offered the project the privilege to control the Sekiu and Hoko River reservoir levels within the ranges of 20 to 24 feet and 12.5 to 15 feet, respectively (see Table 2). There were three 40-Hp pumps at Hoko and two 40-Hp pumps at Sekiu. Before project control, each pump was configured simply to turn on at a reservoir level and turn off at another. The turn-on pump levels were staggered such that more pumps would be used at decreasingly lower reservoir levels until all the pumps at the site would be on.

Figure 14:
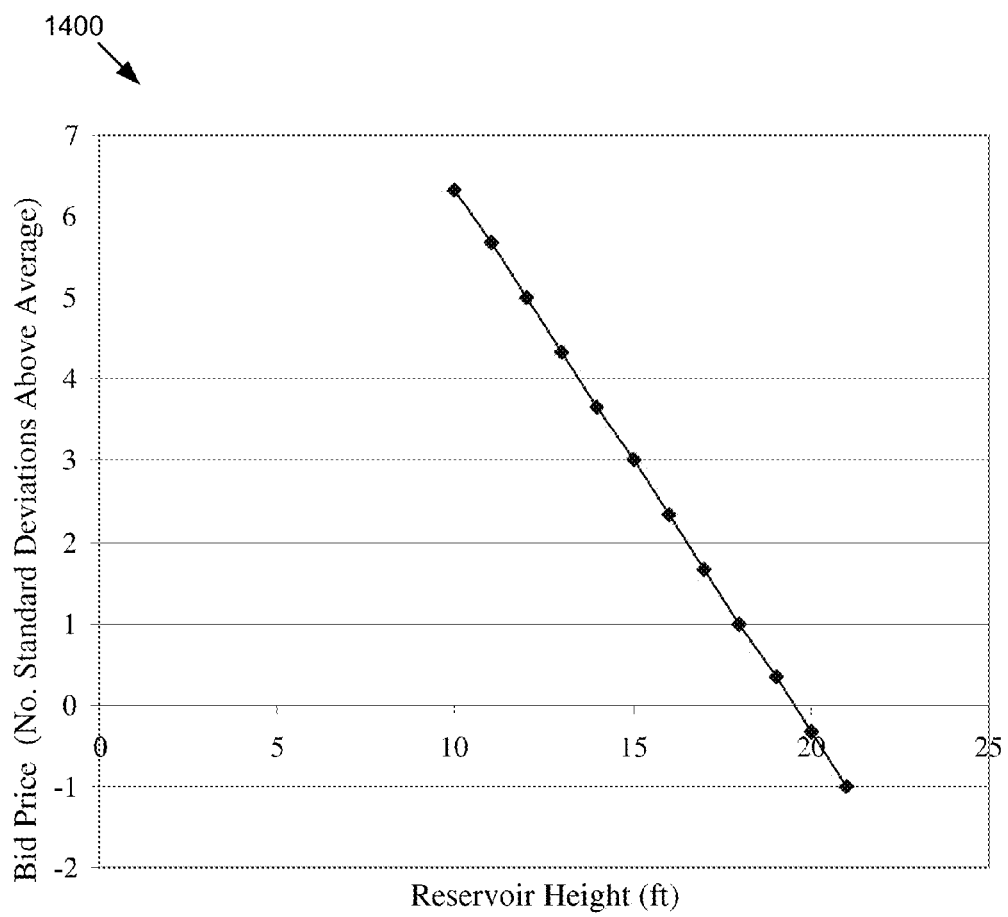
FIG. 14 is a graph showing the bid strategy implemented for one of the pumps in the control system of FIG. 13 relative to the height of its corresponding reservoir.

The pump bid curve is shown in graph 1400 of FIG. 14 for Sekiu (asserting a mean price for the past 24-hours to be zero and standard deviation of 1.0). The Hoko River pumps were controlled similarly within their allowable reservoir limits. The bid curve was later modified slightly to be more aggressive when the pump operators were present in the pump station, 7 to 9 AM.

TABLE 2

Water Pump Control Prior to Project Involvement

| Condition | Hoko Water Level (ft.) | Sekiu Water Level (ft.) |
|---|---|---|
| all pumps off | 15 | 24 |
| first pump on | 13.5 | 23 |
| second pump on | 12.5 | 20 |
| third pump on | 11 | NA |
| low water alarm | 10 | 19 |

FIG. 14 is a graph 1400 showing the bid price for the Sekiu pumps as a number of standard deviations above or below an average bid price when the pumps were controlled according to an embodiment of the disclosed technology. As can be seen in graph 1400, the Sekiu pumps bid an average price when the reservoir was at a 19-ft level. The pumps bid more as the reservoir level decreased. The pump operator could control both the point at which an average bid is asserted and the slope of the line, which represents the change in bid as a function of change in reservoir level. The likelihood of having a market price more than 3 standard deviations away from the average price is very small. The control was implemented in series with the existing control loop, so project control could only turn off the pump; it could not turn the pump on. Furthermore, the project implemented software overrides that allowed the pump to run without risks of project load curtailments at some minimum reservoir level, regardless of the market's prices and bids. Reservoir operators were also provided a means to override project control. These precautions were taken to assure the PUD and its staff that they would always maintain adequate emergency water reserves.

4. Pump Load Market Behavior

Figure 15:
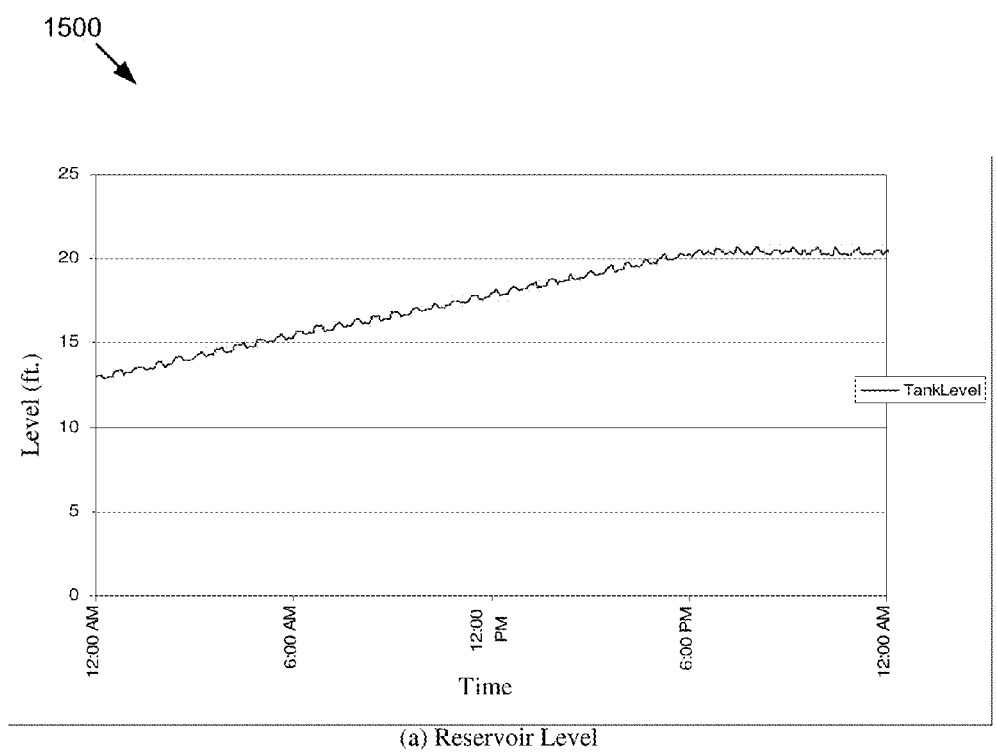
FIG. 15 is a graph showing the reservoir level during a sample test day for a reservoir in the system of FIG. 13.
Figure 16:
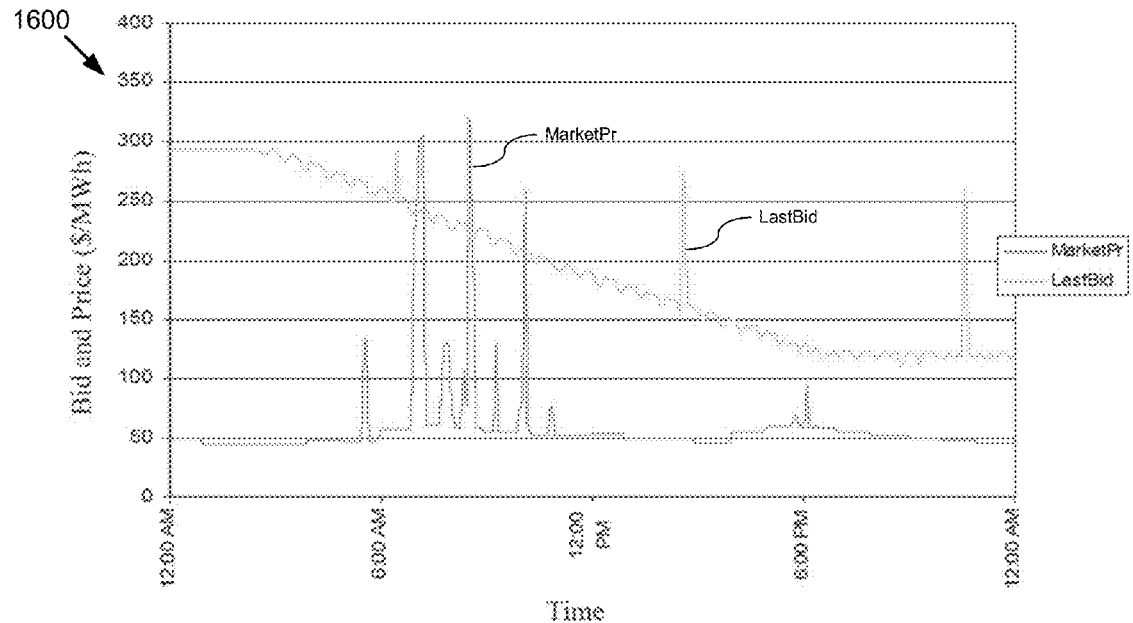
FIG. 16 is a graph showing the bid and price for one of the pumps in the system of FIG. 13 during a sample test day.
Figure 17:
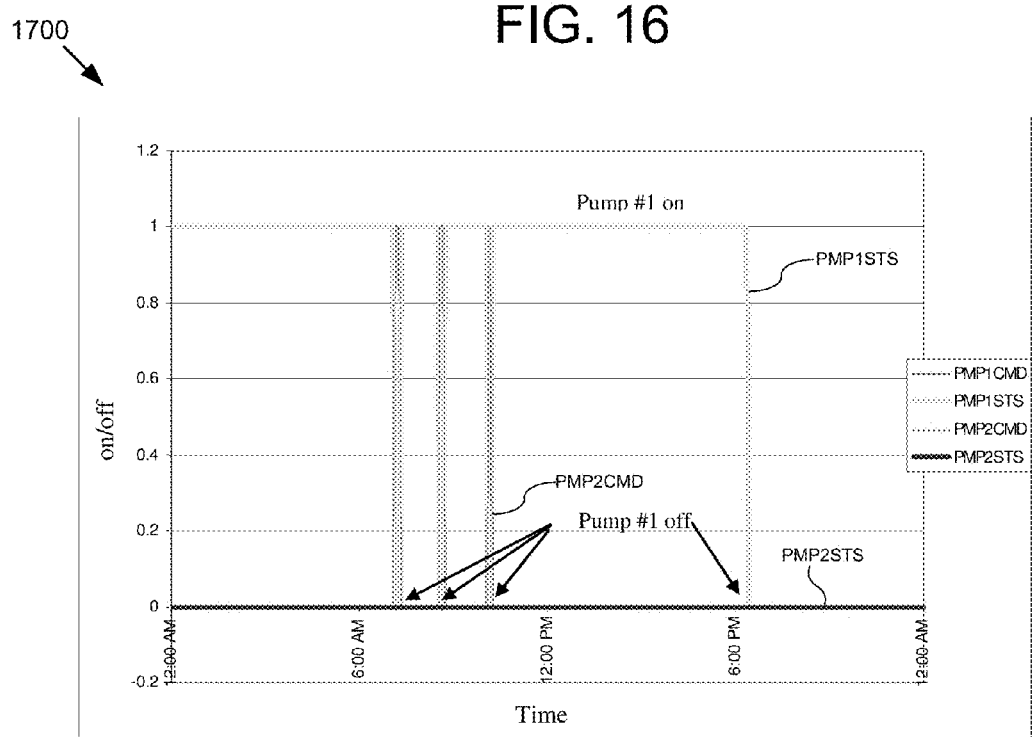
FIG. 17 is a graph showing the number of pumps operating in the system of FIG. 13 during a sample test day.

Representative operational data for the Sekiu pumps and reservoir level were plotted for a single day and are shown in graphs 1500, 1600, and 1700 of FIGS. 15, 16, and 17. Graph 1500 shows the reservoir level during the test day, graph 1600 shows the pump bids for the test day, and graph 1700 shows the number of pumps on the test day. In graph 1500, the reservoir level is shown to be gradually recovering through about 6:00 PM that evening. According to graph 1600 of FIG. 16, the pumps' bids reflect this fact, starting at a maximum bid and bidding progressively less as the reservoir level recovers. The cleared market prices were low except during the peak load morning period, as was typical for the project's winter market. The cleared market price exhibits several periods during which market information was not successfully communicated throughout the system.

In graph 1700 of FIG. 17, pump #1 is shown to become briefly curtailed at each of the three market price spikes, where the market price exceeded the pump bids, as is shown by the yellow pump status line (on=high state; off=low state). The pump bids and pumps appeared to be properly responding. Their responses appropriately corresponded to changes in reservoir water level and the relative magnitudes of pump bids and cleared market prices, as designed.

As part of the pump control experiment, delay counters were applied by the control algorithm upon the startup and shutdown of any pump. These counters prevented the pumps from cycling on and off more quickly than desired. The project originally set these delays at 10 minutes, but this duration was found to allow the reservoir level to fall too low while the startup of a pump remained delayed and locked out. Satisfactory performance was achieved upon reducing the control delays to 5 minutes.

In the pump control experiment, the pumps communicated using phone lines. Because the market was clearing every 5 minutes, phone lines remained connected at all times (thereby increasing the cost of communication). If the market clearing were to have occurred after longer period (e.g., every hour), the need for continuous communication could have been eliminated.

E. Distributed-Generator Control

Figure 18:
FIG. 18 is an image of a 600-kW Caterpillar diesel generator used in an experiment investigating aspects of the disclosed technology.
Figure 19:
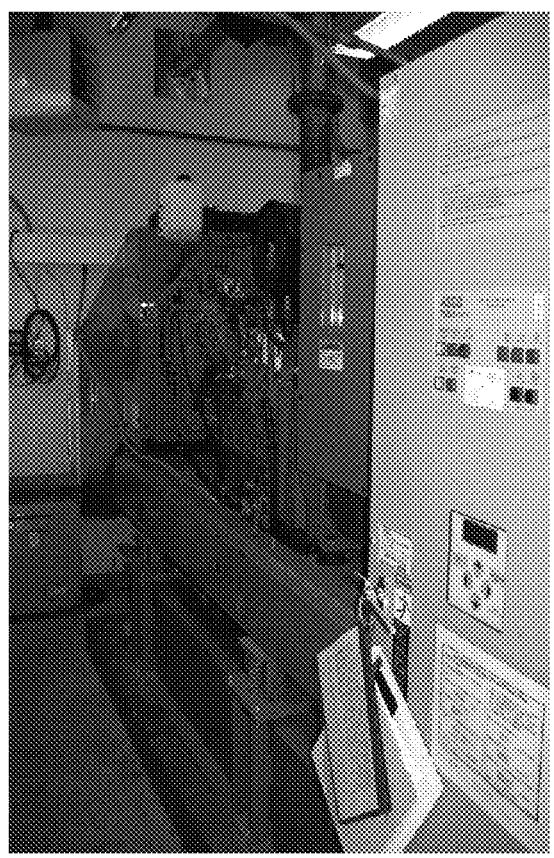
FIG. 19 is an image of a 175-kW Kohler generator used in the experiment investigating aspects of the disclosed technology.

This section summarizes an experiment performed in which power generators in a distributed network were modified to generate bids for and be controlled by a resource allocation system according to the disclosed technology. In the experiment, two diesel generators were controlled. The two generators were a 600-kW Caterpillar diesel generator (the "upper" generator) and a 175-kW Kohler diesel generator (the "lower" or "beach" generator). Both generators were connected to associated buildings and isolated from the grid using an automatic transfer switch. These switches were configured to automatically start up the generators whenever grid power became unavailable. The larger, upper generator served a critical main office and laboratory building; the lower, a smaller research building near the beach. These generators were appropriately sized to supply their entire loads isolated or islanded from the local power grid. The upper and lower distributed generators used in the experiment are shown in images 1800 and 1900 shown in FIGS. 18 and 19, respectively.

The generators already possessed automatic-transfer-switch controllers that were useful to the project. These controllers also communicated with the existing BAS. The existing field controllers (JCI controllers) were readily modified through software to participate in the local marginal price market. Few hardware improvements were needed or made.

Figure 20:
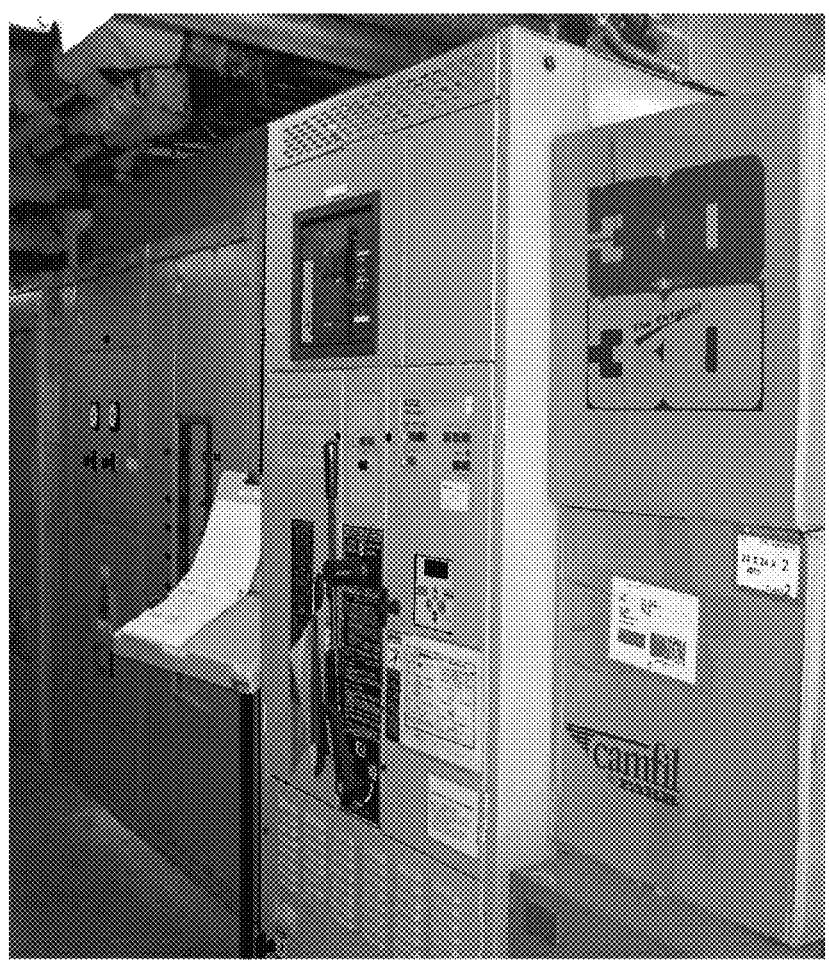
FIG. 20 is an image of the automatic transfer switch coupled to the generator shown in FIG. 19.

If the generators had been made operable in parallel with the power grid, they could have supplied their entire nameplate capacity into the power grid. However, with their emergency-transfer-switch configurations (comprising the hardware shown in image 2000 of FIG. 20), their value to the power grid was the magnitude of load that they would remove from the power grid whenever their emergency-transfer switch becomes activated. Therefore, these generators bid on the demand side of the market, not the supply side, using the present magnitude of load they could remove from the power grid with a successful bid. More generally, generators that operate asynchronously with the power grid (e.g., generators that cannot feed the grid, but can support a building, electrical device, or customer premises off-grid) can compute and transmit a bid corresponding to the load of the building, device, or premises that it supports instead of the generator's capacity. Generators that operate synchronously with the power grid, by contrast, can bid their capacity.

1. Generator Bid Strategy

Each generator in the experiment prepared and submitted bids based on realistic estimates of fuel and maintenance costs. These bids were transferred via the Internet to another BAS at then to an Electrical Infrastructure Operations Center (EIOC). It was in the EIOC that the bids from all resources and loads were gathered and resolved. The project market cleared every 5 minutes at some power magnitude and price. The cleared price was then sent from the EIOC back to the distributed generators, which compared their bid to the resultant price and reacted by turning on or off.

Figure 21:
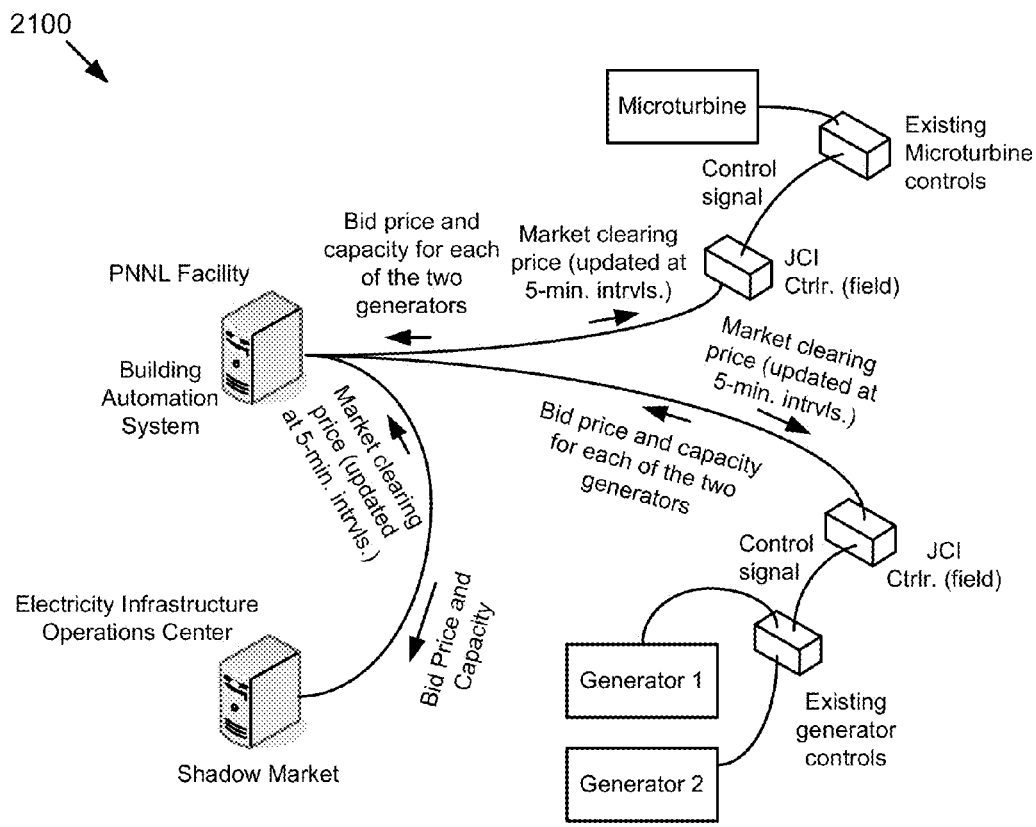
FIG. 21 is a schematic block diagram of the control system used to control generator activation in an experiment investigating aspects of the disclosed technology.

Persistent communications were required to control the generators in this way. The complete communication pathways are represented by block diagram 2100 of FIG. 21. Also shown in block diagram 2100 of FIG. 21 is a small 30-kW microturbine that was also included in the distributed power system. This microturbine was also responsive to the two-way market. Unlike the larger generators described above, however, it ran in parallel with the power grid.

2. Detailed Method of Bidding

These definitions are useful for the discussion of how the distributed generator bids in the experiment described in the previous section were calculated:

operating license—the total number of hours that the unit was licensed to operate during a year. The typical period starts on January 1, and the default license is 200 hours.

maximum daily runtime—the maximum number of hours that the unit is permitted to run per day. The default was 4 hours per day.

maximum daily starts—the maximum number of starts that the unit is permitted per day. The default was 2 starts per day.

current bid price—the price at which the unit will start. A NULL bid indicated that the unit was unavailable.

The experiment used the following exemplary equation for computing the generator bid:

$$\text{bid} = \text{licence premium} \cdot (\text{fuelcost} + \text{O\&M cost} + \text{startup cost} + \text{shutdown penalty}), \quad (7)$$

where bid=generator bid price normalized for 1 hour of operation
fuel cost=variable cost of running for 1 hour
O&M cost=operating and maintenance cost per capacity for the time allowed by the license period
startup cost=the projected penalties or costs for starting up the units
shutdown cost=the projected penalties or costs for prematurely shutting down the units.

The license premium factor in Equation (7) is used to modify the bids in light of remaining unused licensed hours for the generator. One of the largest constraints placed on diesel generators is the limit that is placed on their operation for environmental reasons. Installed diesel generators have been limited to far fewer hours of operation per year than they might be run economically by the project's control system. Although negotiated for each unique installation, the number of allowable runtime hours is in the 100- to 500-hour range. There was no environmental restriction on the experiment's microturbine, which used natural gas as its fuel source.

Exemplary methods for computing the individual components of Equation (7) are introduced in the follow paragraphs. These methods should not be construed as limiting, however, as a variety of methods exist for computing such factors.

Fuel Cost.

This term can be represented as the product of the fuel cost and the conversion efficiency. This and the following terms can be normalized in the sense that they become expressed as costs per hour of operation, which can then be directly used where market prices are expressed in the units $/MWh.

$$\text{fuel cost (\$/MWh)} = \text{fuel cost (\$/gal.)} \times \text{conv. eff. (gal./MWh)} \quad (8)$$

Operations and Maintenance (O&M) Cost Per Hour.

This term can include both fixed and variable expenses. The O&M cost is desirably spread out over the total run hours permitted for the unit to run in a year. For example, if one were to run the generator for its entire number of licensed hours (hours the project can legally operate the unit), the operations and maintenance cost would be normalized by the licensed hours. In addition, the dollar per hour cost must be normalized by the capacity bid.

$$O\&M \text{ cost (\$/MWh)} = \frac{\text{total } O\&M \text{ cost (\$)}}{\text{licensed hours (h)} \times \text{capacity bid (MW)}} \quad (9)$$

License Usage Premium.

Since the generators had only a limited number of hours they could run during a calendar year, a factor was defined to manage and allocate these hours. This portion of the bid applies irrespective of the current generator status (whether on or off).

$$\text{license usage premium} = \text{scaling factor} \times \frac{(N-n)}{N} \times \frac{M}{(M-m)} \quad (10)$$

where N is the total number of hours in which to use the licensed hours. If the licensed hours are to be calculated for a calendar year, N will be 8760 hours, and n will be the current hour of the year. M is the total number of license hours, and m is the number of licensed hours already used to date. The scaling factor is an arbitrary number less than 1. This term becomes infinite when the number of licensed runtime hours has become depleted; the term approaches zero toward the end of the license period.

Startup Cost.

This cost can be assessed to cover any startup costs that are incurred each time the generator starts. In most cases, it is a fixed-dollar amount. The dollar cost is desirably normalized by the capacity bid and selected arbitrary time interval to recover the cost during the generation period. This cost only applies when the unit is off and is bidding its willingness to start. If the unit is already on, this portion of the bid is zero.

$$\text{startup cost (\$/MWh)} = \frac{\text{startup cost (\$)}}{\text{capacity bid (MW)} \times 1 \text{ hour}} \quad (11)$$

Early Shutdown Penalty.

This cost can be used to recover expenses for an early shutdown, which, if permitted, might cause excessive wear and tear on the generator asset. In certain implementations, this cost will apply only if the bid interval is less than a minimum threshold for the generator (e.g., 30 minutes). If the bid interval is greater than the minimum threshold, there should be no early shutdown penalty. Also, if the unit is already running, then this portion of the bid is zero. If the bid interval is less than the minimum threshold of operation and the generator is off, the normalized early shutdown penalty is:

$$\text{early shutdown penalty (\$/MWh)} = \frac{\text{early shutdown penalty (\$)}}{\text{capacity bid (MW)} \times 1 \text{ hour}} \quad (12)$$

Table 3 shows the values of these variables used in the previously presented exemplary equation for estimating the bid prices of the generators.

TABLE 3

Variables Used to Calculate Distributed Generator Offers

| Variable | 600-kW Generator | 175-kW Generator | 30-kW Microturbine |
|---|---|---|---|
| fuel cost ($/gal) | 2.80 | 2.80 | 12 ($/MMBtu) |
| effic. (kWh/gal) | 12.80 | 13.60 | 69.0 ($/MMBtu) |
| bid interval (min.) | 5 | 5 | 5 |
| O&M cost ($/year) | 3,000 | 1,000 | 1,000 |
| scaling factor | 0.2 | 0.2 | 0.2 |
| N (hrs) | 8,760 | 8,760 | no limit |
| M (hrs) | 200 | 200 | no limit |
| start-up cost ($) | 10.0 | 5.0 | 0.0 |
| capacity bid (kW) | varies | varies | 30 kW |
| early shut-down cost ($) | 50.0 | 10.0 | 5.0 |
| minimum run time (min.) | 30.0 | 30.0 | 15.0 |

Equation (7) should not be construed as limiting, as other equations or techniques can be used to compute the generator bid. For instance, the generator bid could be based at least in part on any one or more of a value indicative of the fuel cost, O&M cost, startup cost, shutdown cost, or cost associated with the operating license of the generator.

3. Observations of Distributed-Generator Market Behavior

Most of the time, the experiment's generators bid unfavorably—too high—as they competed with the existing, relatively low-priced power available from the electrical distribution and transmission system. However, when the amount of power that could be safely received into the region through its existing distribution and transmission was exceeded, prices rose. Bids from the additional resources were eventually accepted, resulting in the activation of the additional generators. In this fashion, resources were equitably distributed in response to the elasticity of demand.

In this section, the behaviors observed for the experiment's real and virtual generators as they participated in and responded to the local marginal energy price market are summarized. The virtual generators were used to simulate additional generators participating in the system, thus making the experiment more realistic of a wide-scale implementation of the system. The generators did not participate much in the market until a cooler time period, when space-heating loads in the region accompanied lower morning temperatures. Approximate total recorded run times for each generator, representing how long they ran on behalf of the project, were as follows: (1) APEL microturbine: 59 hours; (2) lower generator: 65 hours; and (3) upper generator: 48 hours.

It was decided early in the project to assert that the diesel generators should not be permitted to cycle on and off rapidly. Doing so might adversely affect their lifetimes. Therefore, the generators were programmed to bid very low (on the load side) for several market cycles after they began to run to ensure that they remained on for at least 30 minutes once started. The effect of this and the startup cost premium was to create some hysteresis in their bids and prevent short cycling of the generators.

Figure 22:
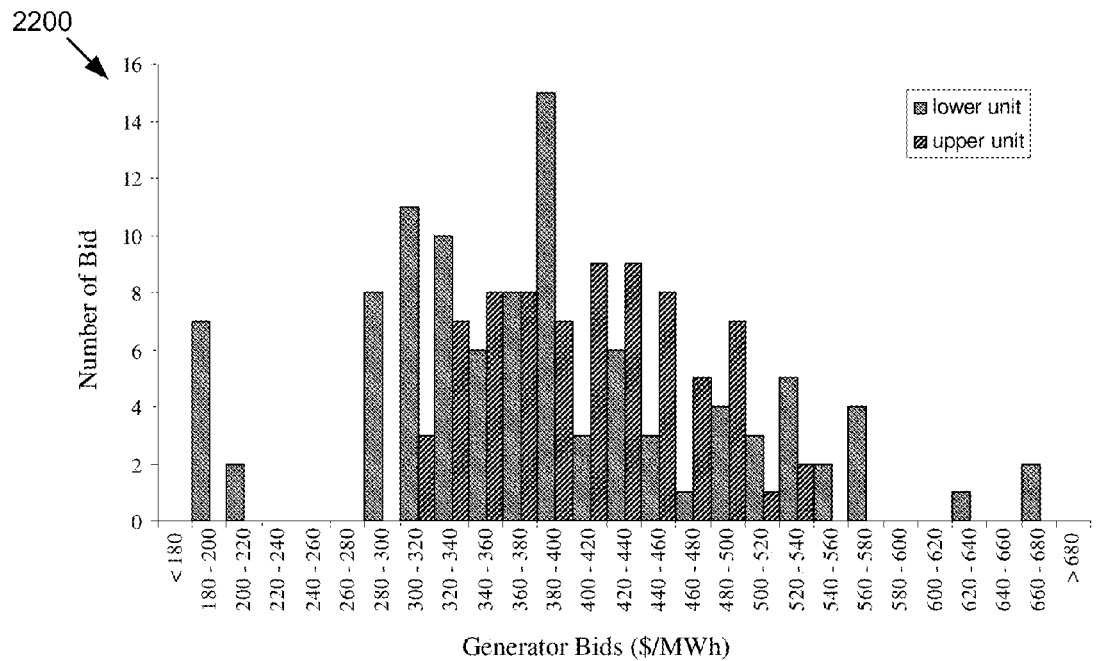
FIG. 22 is a graph showing the distribution of accepted generator bid prices for the two diesel generator used in the experiment shown in FIG. 21.

Two types of figures are presented below to demonstrate the operation of the diesel generators in the energy market—distributions of bid prices and bid capacities. Graph 2200 of FIG. 22 shows the market closing price when the generator bid was accepted during the test period for the two diesel generators. The microturbine (not shown) bid a constant price of about 377 $/MWh because it was an energy supplier in the market, capable of running in parallel with the grid. The accepted bids for both generators were in the range of about 180 $/MWh to 680 $/MWh, although the 175-kW "lower" generator usually bid lower than the 600-kW generator.

The small gas microturbine, because of its lower bids, operated more often than the other two diesel generators. Also, the smaller 175-kW MSL diesel generator was earlier to participate in the market and became exercised before its larger neighbor. As a smaller generator, its bid and startup costs were lower on a per-kilowatt basis than those for the 600-kW diesel generator. Although not shown here, most of the distributed-generator activity occurred during early morning hours on cold mornings when feeder space-heating loads were high.

Figure 23:
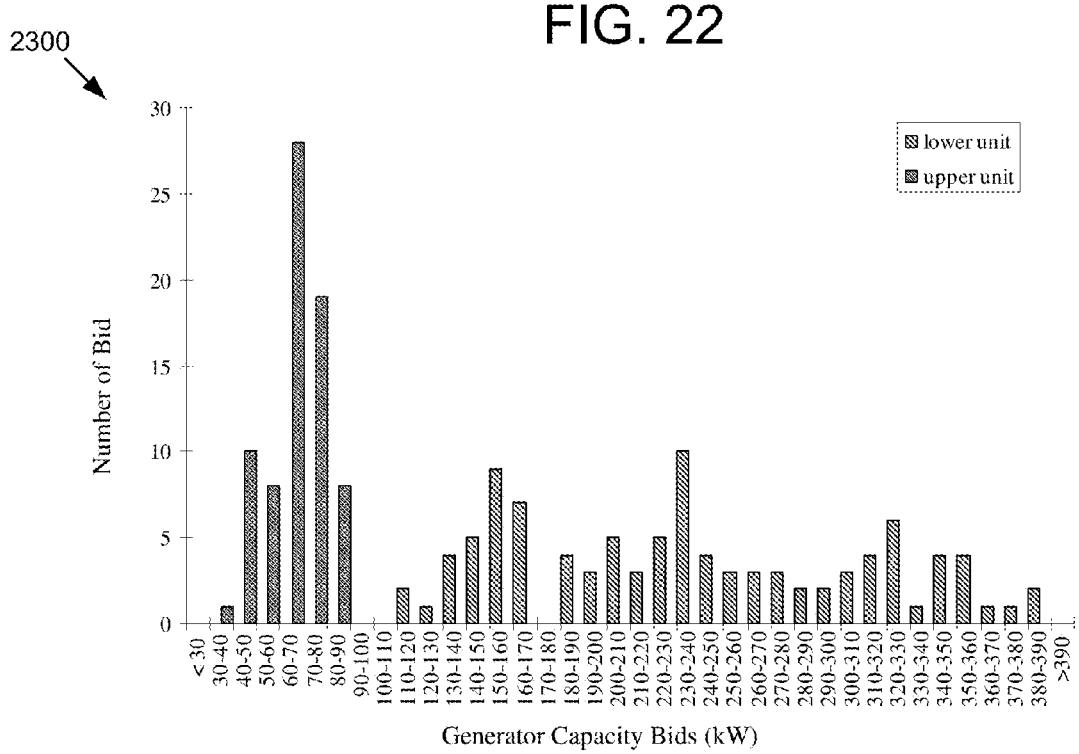
FIG. 23 is a graph showing the distribution of capacity bids for the two diesel generators used in the experiment shown in FIG. 21.

Graph 2300 of FIG. 23 shows the distribution of the capacity bids for the two diesel generators. The 600-kW "upper" generator bid between 110 kW and 390 kW while the smaller generator bid between 30 kW and 90 kW. The microturbine (not shown) was a 30-kW turbine that operated in parallel with the grid. It therefore provided a constant, predictable resource each time it was activated. Such is not the case for the MSL Sequim generators, for which the project used existing automatic transfer switches to island the generators and their loads. These two generators bid the value of the building current loads that they could serve on behalf of the power grid. The average hourly electric loads of the two MSL facilities that are served by, and determined the capacity bid magnitudes of, the two MSL generators are shown in graph 2400 of FIG. 24.

The 600-kW upper generator unit was observed to have considerable variability in the amount of capacity it bid, even during the same day or operating period. The load in the served office and laboratory space should not be expected to correlate perfectly with utility peak loads. Fortunately, the operation of the generator was shown to relieve at least 110 kW of load from the grid at the times it was called upon. The lower generator's bid capacity was both lower and exhibited a smaller range.

4. Conclusions Concerning Distributed-Generator Resources

The two-way market approach successfully controlled the project's distributed-generation resources. Generators were assigned to run by the market only when they were needed. The bids of the generators, inasmuch as it was possible, reflected actual and reasonable costs that would be incurred for fuel, maintenance, and other costs for the startup and operation of the generators. The cost of configuring and controlling these generators was moderate, taking advantage of existing automatic transfer switch hardware at the site. The value of the generators to the power grid was their capability to island and remove a dedicated load from the power grid.

F. Transactive Control System Bid/Response Strategy for Electric Vehicle Chargers This section introduces exemplary methods for controlling chargers (e.g., electric vehicle chargers) in a resource allocation system according to the disclosed technology. For instance, some of the disclosed methods can be used in a two-way communication system, where the computing hardware associated with the charger generates bids for transmission to the resource allocation. Other methods can be used in a one-way communication system, where the computing hardware associated with the charger responds to market prices and selectively activates and deactivates the charger.

In certain embodiments of the disclosed technology, electric vehicle charges (a) increase or decrease their bids in accordance with a user's comfort economy setting (e.g., a user-selected value, referred to herein as the k-value) in relation to the state-of-charge (SOC) and time remaining to desire full-charge, and/or (b) reduce or increase the rate-of-charge (ROC) based on the price cleared from the market.

In one exemplary implementation, the active bid strategy for an electric vehicle charger is based on the SOC, and the bid price is computed using the following:

$$P_{bid} = P_{avg} - k P_{std} SOC_{dev} \quad (13)$$

where $P_{avg}$ is the average daily clearing price of energy, $P_{std}$ is the daily standard deviation of price, and $SOC_{dev}$ is the fractional deviation of the SOC from a desired SOC ($SOC_{des}$) with respect to minimum and maximum limits ($SOC_{min}$ and $SOC_{max}$) set by the user (e.g., $SOC_{dev} = 3(SOC_{des} - SOC_{obs})/(SOC_{des} - SOC_{max})$ or $SOC_{dev} = 3(SOC_{des} - SOC_{obs})/(SOC_{min} - SOC_{des})$). In operation, and according to one exemplary embodiment, the charger can be controlled so that it is turned on when the clearing price $P_{clear}$ is less than or equal to $P_{bid}$ and turned off when the clearing price exceeds the bid price.

In embodiments in which only one-way communication is possible and bidding is not possible, then a passive control strategy can be used. For example, in one particular embodiment, a strategy can be used that alters the rate of charge as a function of price. One exemplary computation uses the following equation:

$$ROC_{set} = ROC_{des}(1 - k P_{dev}) \quad (14)$$

where $ROC_{des}$ is the desired rate-of-charge, such that $$ROC_{des} = \frac{(SOC_{final} - SOC_{obs})}{n_{hours}},$$

k is the user's comfort economy setting, with $0 < k < \infty$, $P_{dev}$ is the price deviation, such that $$P_{dev} = \frac{P_{now} - P_{avg}}{P_{std}},$$

$SOC_{final}$ is the final desired state-of-charge of the vehicle, $SOC_{obs}$ is the current observed state-of-charge of the vehicle, and $n_{hours}$ is the number of hours remaining before the $SOC_{final}$ must be achieved.

IV. Additional Information About the Case Studies

This section includes additional information about the case studies introduced in the previous section. In particular, the case studies were performed as part of an experimental project termed the "Olympic Peninsula Project."

A. Summary of the Olympic Peninsula Project

1. Purpose and Objectives

The purpose of the Olympic Peninsula Project was to create and investigate experimental implementations of the energy-pricing schemes described above. One of the goals of the project was to insert intelligence into electric-grid components at the end-use, distribution, transmission and generation levels in order to improve both the electrical and economic efficiencies within the electric power system. Specifically, the project tested whether automated two-way communication between the grid and distributed resources could enable resources to be dispatched based on the energy and demand price signals that they received. In this manner, conventionally passive loads and idle distributed generators could be transformed into elements of a diverse system of grid resources that provide near real-time active grid control and a broad range of economic benefits. The project controlled these resources to successfully manage the power flowing through a constrained feeder-distribution circuit for the duration of the project. In other words, the project tested whether it was possible to decrease the stress on the distribution system at times of peak demand by more actively engaging typically passive resources-end use loads and idle distributed generation.

Some of the objectives of the project were to:
show that a common communications framework could enable the economic dispatch of dispersed resources and integrate them to provide multiple benefits;
gain an understanding of how these resources performed individually and when interacting in near real time in order to meet common grid-management objectives; and
evaluate economic rate and incentive structures that influence customer participation and the distributed resources they offer.

2. Background

Certain aspects of the project can be better appreciated after a brief explanation of the smart-grid concept known as the "GridWise concept" and a review of conventional electric utility pricing practices.

GridWise Concept.

The term GridWise describes various smart grid-management technologies based on real-time, electronic communication and intelligent devices that are expected to mature in the next several years. By enabling an overall increase in asset utilization, these technologies should be capable of deferring and, in some cases, entirely preventing the construction of conventional power-grid infrastructure in step with anticipated future load growth.

The Olympic Peninsula was selected as a location for experimental case studies for several reasons. For example, the Peninsula is presently served by a capacity-constrained, radial transmission system. The area is experiencing significant population growth, and it already has been projected that power-transmission capacity in the region may be inadequate to supply demand during extremely cold winter conditions.

Utility Pricing Practices.

While fixed electric energy rates still predominate in the United States, price-responsive electricity markets have made inroads. Time-of-use rates, including critical peak rates, have been offered in California and elsewhere to move electricity consumption to periods when the system is not at its peak. Administering time-of-use rates requires advanced utility interval meters that can distinguish and monitor customers' electricity consumption during peak and off-peak periods. While programs with advanced notification and long time intervals do not mandate the use of automation, adoption of time-of-use rates has been accelerated somewhat by the availability of interval meters and communicating energy-management systems that can automate customers' responses. Advanced metering and communicating thermostat initiatives are other recent examples of equipment development programs that could hasten the propagation of time-of-use pricing contracts.

To a lesser degree, real-time contracts also have been offered to customers, but these practices have often applied only to large customer loads using relatively long time intervals. The "real-time" prices are communicated up to a day ahead based on advanced markets. For retail electricity sales, the state of available automation supports responses to price intervals down to about 15 minutes. However, these interactions would best be described as one-way, i.e., they do not feedback demand bids.

Organized markets for wholesale electricity exist today. The nature of such markets varies greatly with the degree of deregulated market structure region by region. No organized market exists in the Northwest or the Southeast. A few large entities conduct bilateral agreements, and the resulting wholesale market price is not available until the next day.

The Project Market.

Against this background, the Olympic Peninsula Project was undertaken to evaluate further steps in realizing the value of transforming passive end-use loads and distributed generation into active, market-driven resources for power-grid management as well as the practicality of reducing the market clearing time of this process to intervals as short as 5 minutes.

The project's market was operated at a 5-minute interval to allow the cycling behavior of loads to contribute to load reduction and load recovery. The duty cycle of most appliances, even on peak, is usually sufficiently diverse to allow a load-control signal, such as price, to take advantage of the fact that they turn on and off anyway. By adjusting when and how long loads turn on or off, a great deal of flexibility can be achieved to the benefit of the entire system. Because much of this appliance duty cycling behavior occurs with a frequency comparable to a 5-minute time scale, it was judged necessary to make the project market operate on a similar time scale to exploit this characteristic of load behavior.

3. Project Resources

The Olympic Peninsula Project included the following controllable assets that were enabled to respond to the project's energy price signals:

five 40-HP water pumps, distributed between two municipal water-pumping stations, representing a nameplate total load of about 150 kW. The electrical load these pumps placed on the grid was bid into the market incrementally when water-reservoir levels were above a designated height in a water reservoir.

two distributed diesel generators. These two generators (175- and 600-kW) served the facility's electrical load when feeder supply was insufficient. The biddable resource capacity in this case was the removal of the building electric load (~170 kW) removed from the grid by transferring it to these units. In addition, a small 30-kW microturbine was set up to respond to the two-way market. Unlike the larger generators, the microturbine ran in parallel with the power grid. The market prices offered for the supply of these generator units were based on the actual fixed and variable expenses incurred.

residential demand response for electric water and space heating provided by 112 homes using gateways that supported two-way communications. This residential demand-response system allowed current market prices to be presented to consumers and allowed users to pre-program their automatic demand-response preferences. The residential participants were evenly divided among three types of utility price contracts (fixed, time-of-use, and real-time) and a control group.

While all residential electricity was metered, only the appliances in price-responsive homes (~75 kW) were controlled by the project.

Automation was provided by the project to monitor, and in some cases control, each of these resources. All participants and resource operators were provided means to temporarily disable or override project control of their loads or generators. In the cases of residential thermostats and water heaters, appliance owners were provided a means to assign a degree of price responsiveness to their appliances from among lists of 5 to 15 intuitively named comfort settings. In the cases of commercial and municipal resources, the degree of automated price-responsiveness was negotiated with each resource owner.

Figure 25:
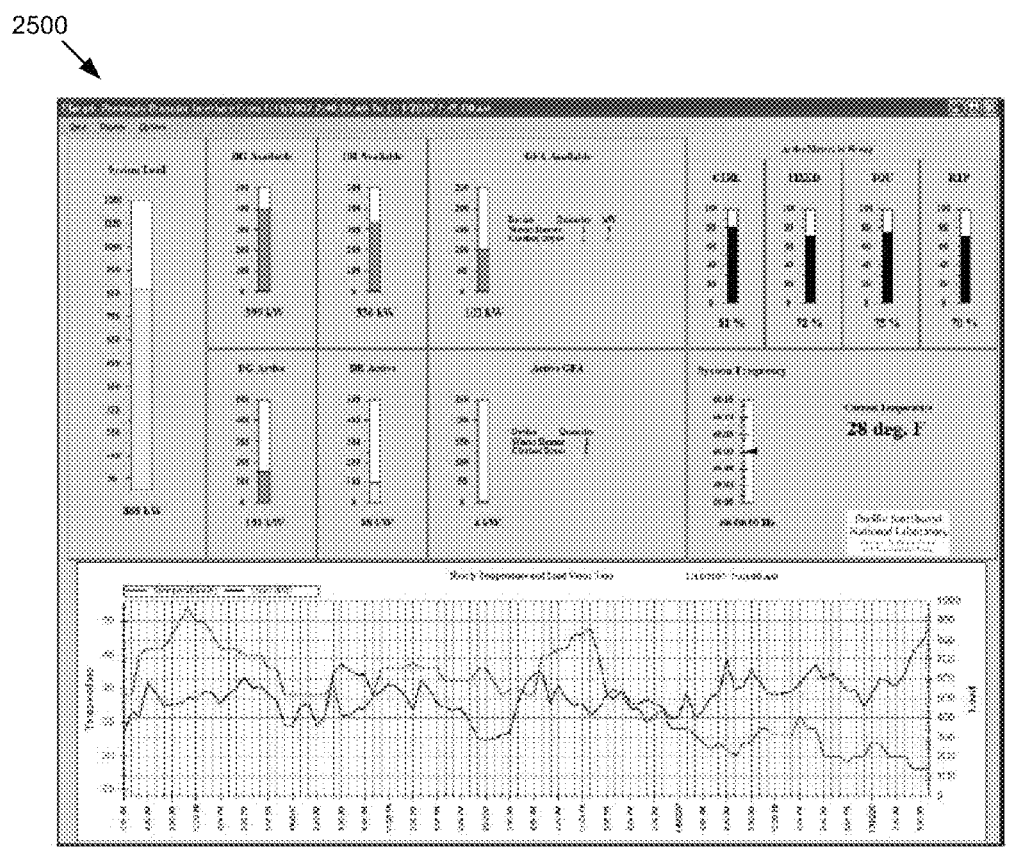
FIG. 25 is an image of a distributed energy resource dashboard that can be used to monitor aspects of a resource allocation system implemented according to an embodiment of the disclosed technology.

While not all resources could be co-located on one feeder for this experiment, the measurement and control of these resources were conducted as if all resided on a common virtual feeder. Throughout the project, these project resources were monitored online at Pacific Northwest National Laboratory (PNNL) using distributed energy resource (DER) dashboards, such as dashboard 2500 shown in FIG. 25. This example would show a grid operator how much of a resource is available and how much has already been dispatched. These dashboards allowed project staff to quickly assess the status of the system and its individual resource components. Visualization tools of this type can be useful for grid operators to achieve the widespread adoption of distributed resources.

One of the elements of the project was a shadow market used to provide the incentive signals that encouraged operation of the project's distributed generation (DG) and demand-response resources to manage local distribution congestion. The project created debit accounts with balances of actual money that were used to cover the shadow market electricity savings earned by the residential customers. The amount of cash they earned and received depended on whether they were operating their household loads in a manner that was responsive to the needs of the grid. As these customers responded to price signals sent from the shadow market, the cash balances in their debit accounts were reduced at a rate commensurate with the shadow market's current energy prices for the given market interval. If consumers reduced their consumption more during period of high prices, they would save money. The participants got to keep any money left in the account at the end of each quarter. The project received guidance from the Bonneville Power Administration to recommend reasonable values for these incentives with limited project budget in mind. Participating homes' energy consumption histories were also studied before the experiment to establish baseline expectations.

Built upon the region's Mid-Columbia (MIDC) wholesale electricity price and responsive to the feeder's real-time load needs and supply availability, the project's local marginal price reflected the effects of (1) the resources offered and needed at the wholesale level, (2) the feeder's economical capacity, and (3) the true marginal price of the feeder's marginal resources. Over time, the price also reflected the effects of customer behaviors as the customers reconfigured their automated responses based on their perceptions of the market and their changing comfort needs.

4. Brief Discussion of Findings

This section previews some of the findings of the project, which are discussed in greater detail below:

Distribution Constraint Managed.

One of the project's goals was to manage congestion on a feeder. Seasonally, the project imposed a new constraint on the energy that could be imported into the feeder from an external wholesale electricity source. The project then controlled the imported capacity below this constraint for all but one 5-minute interval during the duration of the experiment. Graph 2600 of FIG. 26 previews this result. On this curve representing the duration of feeder capacity, the feeder supply (the red line) has been limited successfully to 750 kW. Distributed generators provided additional supply (up to about 350 kW at its peak) when needed (green line).

Market-Based Control Tested.

Figure 27:
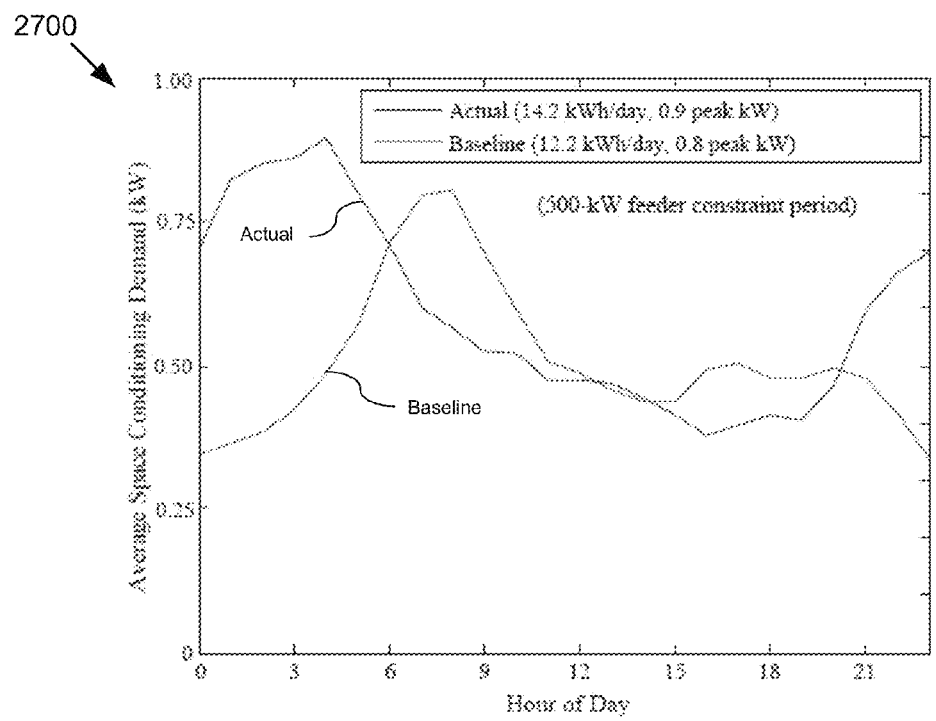
FIG. 27 is a graph illustrating the shifting of thermostatically controlled load by price as a result of performing resource allocation according to an embodiment of the disclosed technology.

The project controlled both heating and cooling loads. Observation of the project's residential thermostatically controlled loads for those homes on real-time price contracts revealed a significant, surprising shift in energy consumption. This shift is shown in graph 2700 of FIG. 27. Space-conditioning loads served by the real-time price contracts effectively used energy in the very early morning hours when electricity is least expensive. This effect occurred during both constrained and unconstrained feeder conditions; however, it was more pronounced when the feeder was constrained. This result is remarkably similar to what one would expect for pre-heating or pre-cooling, but these project thermostats had no explicit prediction capability. It is the diurnal shape of the price signal itself that caused this outcome.

Peak Load Reduced.

Figure 26:
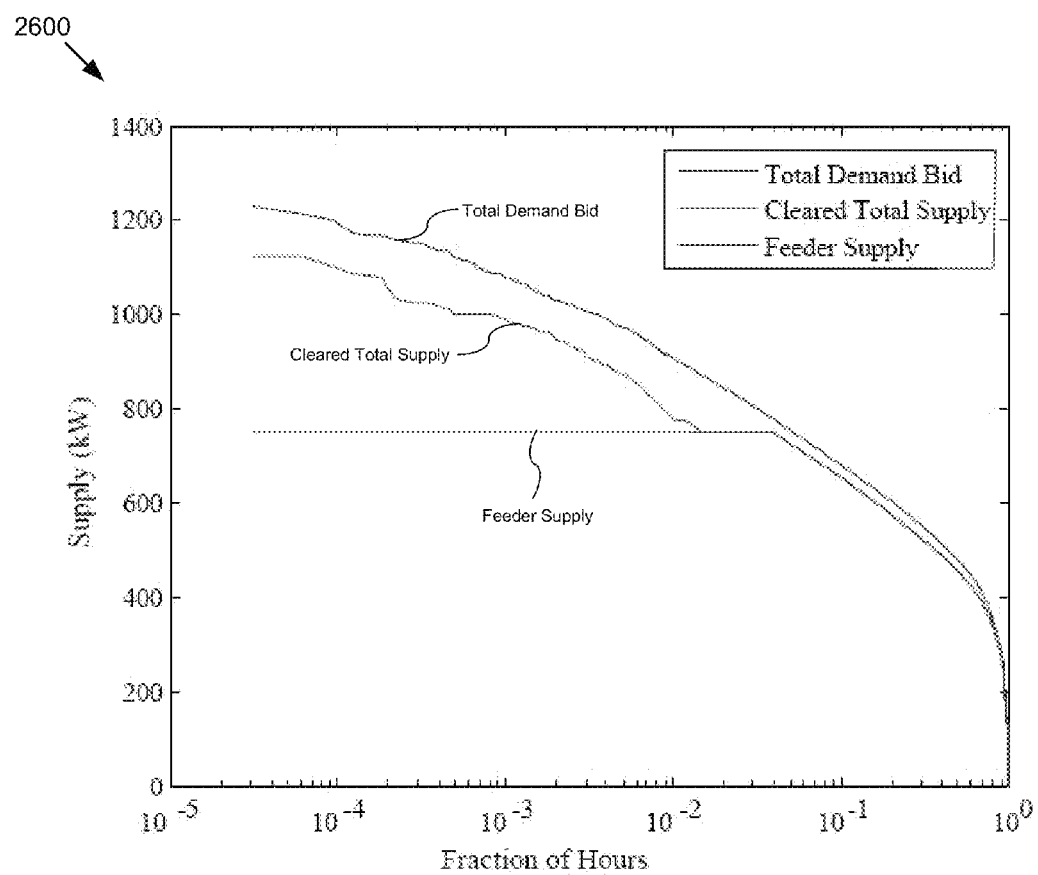
FIG. 26 is a graph of a curve showing the duration of feeder capacity during a 750-kW feeder constraint when power was managed using an embodiment of the disclosed technology.

As shown in graph 2600 of FIG. 26, the project's market also deferred and shifted peak load. Unlike time-of-use control, the project's real-time control operated exactly when needed and with the precise magnitude needed. The magnitude of load reduction under real-time price control increases with the peak itself and with the degree to which the feeder import is constrained. The project conservatively estimated that a 5 percent reduction in peak load was achieved under a 750-kW constraint; 20 percent peak load reduction was easily obtained under a 500-kW feeder constraint.

Internet-Based Control Tested.

The project implemented Internet control of its distributed resources. Bid and control interactions were communicated via the Internet. Residential thermostats, for example, modified their effective temperature setbacks through a combination of local and central control communicated over the Internet. The project market itself was cleared centrally every 5 minutes (though other intervals could have been used). While average project connectivity to these resources was at times sporadic, the resources almost always performed well in default modes until communications could become re-established.

Distributed Generation Served as a Valuable Resource.

The project was able to obtain a useful supply from distributed diesel generators. The project elected to control the generators at their existing emergency-transfer switches. The generators and their protected facilities therefore ran separated, or islanded, from the grid. These generators bid the capacity of the commercial building loads they served; the price they offered was based on actual fixed and variable expenses they would incur by turning on and running. These resources were called upon and used many times during the project.

Figure 28:
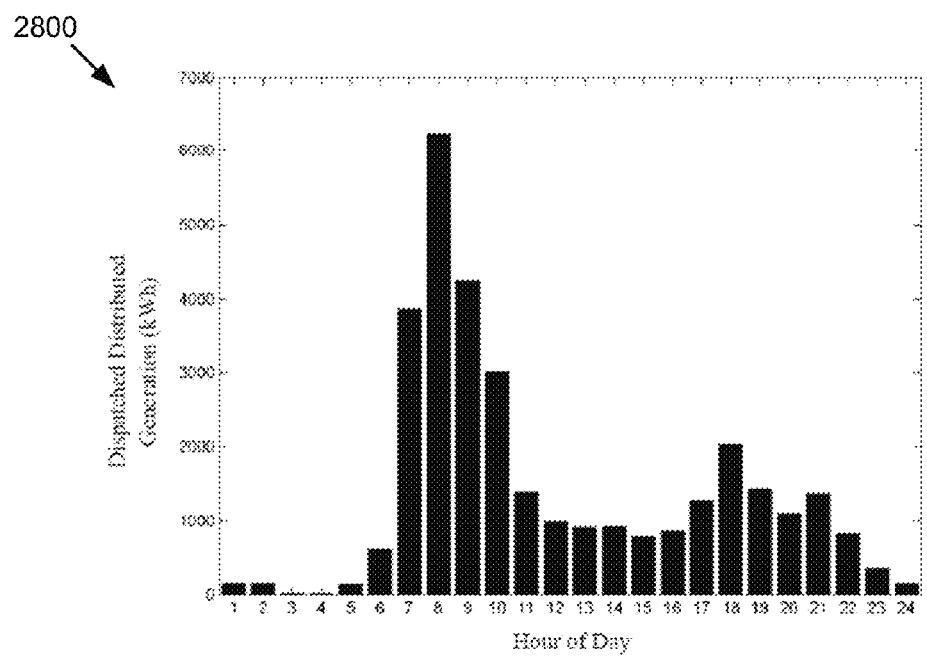
FIG. 28 is a graph showing the total distributed power generation through a day when resource allocation was performed according to an embodiment of the disclosed technology.

Graph 2800 of FIG. 28 shows the total distributed generator energy used by the project accumulated by hour of day. The diesel generators were restricted by their environmental licensing to operate no more than about 100 hours per year. This constraint was easily managed by imposing and managing a price premium applied to every market offer made by these resources. Note that many such emergency backup generators lie unused in the United States.

5. Conclusions

The Olympic Peninsula Project was a unique experiment that revealed persistent, real-time benefits of the disclosed technology. Results from the project indicate that local marginal retail price signals, coupled with communications and the market clearing process, can successfully manage the bidding and dispatch of loads and account quite naturally for wholesale costs, distribution congestion, and customer needs.

Overall, the Olympic Peninsula Project indicated the viability of numerous aspects of the disclosed technology on a common feeder. The project was planned at a large enough scale to offer unambiguous evidence that resources could be bid into an electricity market to provide, in principle, solutions for a constrained power-delivery infrastructure that did not involve constructing new poles and wires. While technological challenges were found and noted, the project found no fundamental technological limitations that should prevent the application of these technologies again and at larger scale.

B. Introduction to the Olympic Peninsula Project

This section describes the planning, commissioning, and results of the Olympic Peninsula Project. In particular, this section provides background context to explain the rationale for the Olympic Peninsula Project in addition to the project's objectives, participants, approach, and planning.

1. Background Information

Historically, power-supply infrastructure has been constructed to serve load, a purely passive element of the system. Today, information technology has been developed to the point of allowing larger portions of the demand-side infrastructure to function as an integrated system element. Thus, for the first time, distributed electric load can be made to actively participate in grid control and protection functions as well as real-time economic interactions. The collective application of these information-based technologies to the U.S. power grid is the backbone of the GridWise concept. GridWise technologies are expected to allow more power to be delivered through existing delivery infrastructure and reduce the rate and cost of future system expansion to accommodate load growth. At the same time, these technologies will increase grid reliability by using the load resources on the customer's side of the meter to make the grid inherently more efficient, stable, and reconfigurable.

a. GridWise Implementation

The transformational nature and broad scope of the GridWise concept will require substantial experimental testing before widespread adoption can occur. Such a profound transformation requires field testing before wide-scale adoption to establish the worth of a variety of technologies and reveal possible shortcomings in their implementation and integration. This transformation enables the integration of a diverse suite of distributed resources. These are anticipated to function in conjunction with existing utility assets to produce an aggregate value much greater than the sum of benefits provided by individual components or subsystems. Key aspects expected of the GridWise implementation are that it will: (1) provide benefits at multiple levels of the system from the same distributed resources (i.e., generation and wholesale markets, transmission, and distribution); (2) integrate multiple types of distributed resources (e.g., distributed generation and demand response); and/or (3) use "real-time" communication of market-like incentives to obtain cooperative, voluntary responses from customers.

It is unlikely that the concept will gain widespread acceptance by demonstrating individual technologies separately and in isolation. Thus, demonstrating GridWise benefits requires experimentation and testing at the integrated system level. It is also desirable to demonstrate how new business models and regulatory solutions can overcome institutional barriers to a GridWise implementation. Stakeholders, such as electricity consumers, utility service providers, public utility commissions, and other interested parties should be involved in testing these propositions, as well.

The GridWise concept has achieved, to date, a coalescence of interest on the part of utilities, regulators, and power and information technology developers. The Olympic Peninsula Project represents a significant and tangible experimental use of multiple technologies acting in concert to show that aspects of the GridWise concept are both practical and achievable.

b. Project Focus

The Olympic Peninsula Project was undertaken to evaluate how industrial, commercial, and residential demand-response and backup generation resources can be dispatched through real-time communication of cost information and the end-use value of electrical services. These values were based on an experimental "shadow" market, which reflected realistic wholesale costs and incentives to relieve transmission congestion.

c. Olympic Peninsula Project Rationale

Both the geographical topography and the particular electric-grid configuration on the Olympic Peninsula in Washington State contribute to its being a desirable location for investigating GridWise technologies in the Pacific Northwest. The Olympic Peninsula is dominated by the centrally located Olympic mountain range. This topography has forced human settlement predominantly at lower altitudes within an area ranging a few miles inland from a lengthy coastline bounded by the Strait of Juan de Fuca and the Pacific Ocean. The largest of several small cities and towns situated in this area is Port Angeles with a population now in excess of 20,000 (18,397 in the 2000 Census). The region is not heavily industrialized. However, the area's population is increasing quite rapidly, resulting in a projected load growth of more than 20 MW per year.

Port Angeles is supplied by two 230-kV circuits forming the Shelton-Fairmount connection supplied by the Olympia Substation on the Bonneville Power Administration (BPA) grid. Power transmission to communities west of Port Angeles is achieved at lower voltages over a long and essentially radial system. The principal threat to power delivery on the Olympic Peninsula is an outage of a major transmission line to Olympia. If this were to occur under extra-heavy winter load conditions, the Olympic Peninsula could experience voltage instability and even collapse.

BPA has studied options for reinforcing the Olympic Peninsula transmission system for many years. Various system and institutional constraints have presented challenges to designing economical reinforcement using conventional construction that will both support load growth and maintain adequate supply reliability. Because of the unique circumstances of its configuration, load density and diversity, and service conditions, both the transmission and distribution (T&D) portions of the Olympic Peninsula power delivery system have become, from BPA's perspective, prime candidates for "non-wires" enhancement solutions. This approach calls for offsetting future needs for new T&D construction with more cost-effective alternative measures, including demand-side management and improved use of existing infrastructure.

In principle, GridWise benefits can be investigated anywhere on the grid. However, the value of field experiments in areas where the grid is currently robust or less constrained might be appreciated only at an academic level of interest. Siting a test bed where a real need for alternative supply solutions is already apparent amplifies the prospect that any benefits may be clearly recognized and rapidly adopted. These considerations provided a strong incentive for selecting the Olympic Peninsula grid as a prime project site.

2. Project Objectives

Among the objectives of the Olympic Peninsula Project were to: (1) evaluate whether a common communications framework can enable economic dispatch of dispersed resources and integrate them to provide multiple benefits; (2) gain an understanding of how these resources perform individually and when interacting in near real time to meet common grid-management objectives; and (3) evaluate economic rate and incentive structures and other socio-political issues that influence customer participation and the distributed resources they offer.

Some of the more specific desired outcomes of the project included: (1) evaluating how transmission and distribution capital investment can be deferred; (2) evaluating the role that demand response will play in the future and its potential benefits in the residential and commercial sectors; (3) evaluating how distributed generators can contribute benefits to the system beyond the energy they produce; and (4) evaluating how distributed resources can enhance the stability and reliability of the system. Some additional objectives of the Olympic Peninsula Project were that it would: (1) help develop alternative solutions to power-delivery problems with broad national applicability; (2) help achieve valuable GridWise research goals; (3) be able to display system benefits in quasi-real time using a compelling visual interface; and (4) serve as an expandable platform to integrate diverse, geographically dispersed regional experimental efforts.

It is recognized that there is likely no single technological "silver bullet" that will verify the best, most cost-effective use of power grid assets. Rather, one must integrate a broad range of new, distributed resource technologies with existing grid assets. Achieving an appreciable level of technological integration is considered to be among the most challenging objectives of the Olympic Peninsula Project.

3. Approach

A range of dispersed supply-side and demand-side resources were deployed at various locations on the Olympic Peninsula transmission route. These resources were integrated into a virtual physical operating and market environment, backed with real cash consequences that allowed a degree and quality of experimentation previously unavailable to the GridWise program. By linking and co-managing demand and distributed generators in the same economic-dispatch system, their relative cost efficiencies, their degree of response, and the synergies between them were measured as functions of time-of-day, day-of-week, time-of-year, and duration of curtailment.

a. Distributed Resources

The assets introduced in this project were deployed to complement and leverage BPA's investment in "non-wires" solutions that address the growing Olympic Peninsula transmission constraint. The following are brief statements of how each of the distributed resources was deployed.

Distributed Generation and Demand Response at Marine Sciences Laboratory (MSL).

Pacific Northwest National Laboratory (PNNL) operates the MSL campus in Sequim, Wash., which has two diesel backup generators, a 175-kW unit and a newer 600-kW unit. These two generators were integrated into the market dispatch system of the Olympic Peninsula Project using the existing Johnson Controls building energy-management system at the MSL and its automatic transfer switch. The project calculated and provided local marginal costs to these resources to modify their control based on price signals from the shadow market. The distributed generators bid their actual costs for starting and running for short intervals, including their automated management of environmentally permitted run times.

Transactive Commercial Building Demand Response.

The office building of the MSL also responded to project market price signals using the transactive building control technology disclosed above, in which thermostatically controlled zones within the building were made to compete amongst themselves for limited energy resources. Each zone bid for the resource according to the variance between its temperature set point and its actual zone temperature. The zones having winning bids were granted air flow through control of their variable air volume (VAV) flow dampers.

Automated Residential Demand Response.

The Olympic Peninsula Project recruited 112 homes to install energy-management systems that supported two-way communications. This allowed the project's current market prices to be distributed to residents and provided a user-programmable automatic demand-response capability for residential water heaters and thermostatically-controlled heating, ventilation and air conditioning (HVAC) systems. End-use data collection was also incorporated so that both automated and manual demand response of various appliance loads could be measured for some residential clothes dryers, water heaters, and HVAC systems. The thermostat control provided setback demand-response conservation benefits during both the cooling and heating seasons.

The practical realization of these residential demand-response resources approached 1.5 kW per home, or about 160 kW in total. Experiment participants were encouraged to tailor and pre-program their desired automated demand responses via Web sites accessible from their homes' personal computers. Thereby, participants could select their own preferred balance between energy cost savings and comfort. The project provided participants educational materials concerning the programming of such automated responses and the voluntary efforts they could pursue during the project to achieve even greater benefits. Warning lights and visible indicators alarmed during periods of high electricity prices at thermostats and at some clothes dryers.

In addition, 50 clothes dryers and 25 water heaters in these homes were equipped with GFA underfrequency load-shedding capability. See, e.g., Hammerstrom D. J. et al., "Pacific Northwest GridWise™ Testbed Projects: Part 2. Grid Friendly™ Appliance Project," PNNL-17079, Pacific Northwest National Laboratory, Richland, Wash. (2007).

Advanced Process Engineering Laboratory (APEL) Microturbine Distributed Generation.

The project also incorporated a 30-kW microturbine resource that had already been made remotely controllable through prior contract work for BPA. This generator represented the project's only paralleled generator, meaning it and the facility it served remained grid-connected while the generator unit ran. Because the startup costs incurred by the microturbine were small, the microturbine was the most active distributed generation resource used in the project.

Hoko River and Sekiu Municipal Water Pump Demand Response.

Public Utility District #1 of Clallam County water department worked closely with the project to provide and observe control of water-reservoir levels at its Hoko River and Sekiu water pumping stations. Control was implemented via Johnson Control systems at these two sites to control a total of five 40-hp municipal water pumps. The control traded off small variations in allowed water-reservoir levels for the control of times during which pumps were allowed to run. This control was made responsive to the shadow-market price-control signals of the project.

Virtual Distributed Generation Resources.

Due to cost and time constraints, the project also incorporated virtual distributed generator resources of various sizes into the shadow market in addition to the real generators. The operation of the virtual distributed generators was simulated, emulating the same control objectives and constraints applied to the project's real generators. Environmental restrictions applied to the virtual generators as for the real ones.

b. Shadow Market

One of the main organizing elements of the experiment was to implement a near-real time shadow market to provide the incentive signals that induced operation of the project's distributed generators and demand-response resources. The project integrated real resources into a virtual market that allowed the resources to compete and respond to pricing signals.

To avoid potentially lengthy delays and regulatory hurdles that would be encountered designing special rates for customers and implementing them in actual utility billing systems, the project's shadow market created, in effect, a debit account that customers could earn by operating household appliances in collaboration with the needs of the grid. Residential electric customers were given real cash balances at the beginning of each month. As these customers responded to price signals sent from the virtual market, their cash balances were reduced or remained unchanged, depending on the value of their demand responses. Quarterly, the project disbursed the remaining funds in these accounts to the participants. This virtual market environment, backed with real cash consequences for customers, allowed meaningful experimentation with various market constructs and price signals.

The project represented the first limited-scale experimental use of a two-way clearing market with a short clearing interval (e.g., 5 minutes) at the retail level. For this experimental market to produce results with any validity, it was desirable that the price signals realistically reflect the structure and magnitude of price signals and rates designed to induce demand response in the future. This approach also allowed the incentive structures to be varied across customers or time to experiment with their effect on customer response.

The shadow market system was set up to communicate the real-time (e.g., 5-minute) aggregate local marginal price for electricity to each customer involved. These marginal prices included the costs for wholesale power in the Western Interconnection, as indicated by the behaviors of the Mid-Columbia (MIDC) price, and market incentives to relieve the transmission constraint as were determined by the automated resolution of load bids and supply offers in the market.

Figure 29:
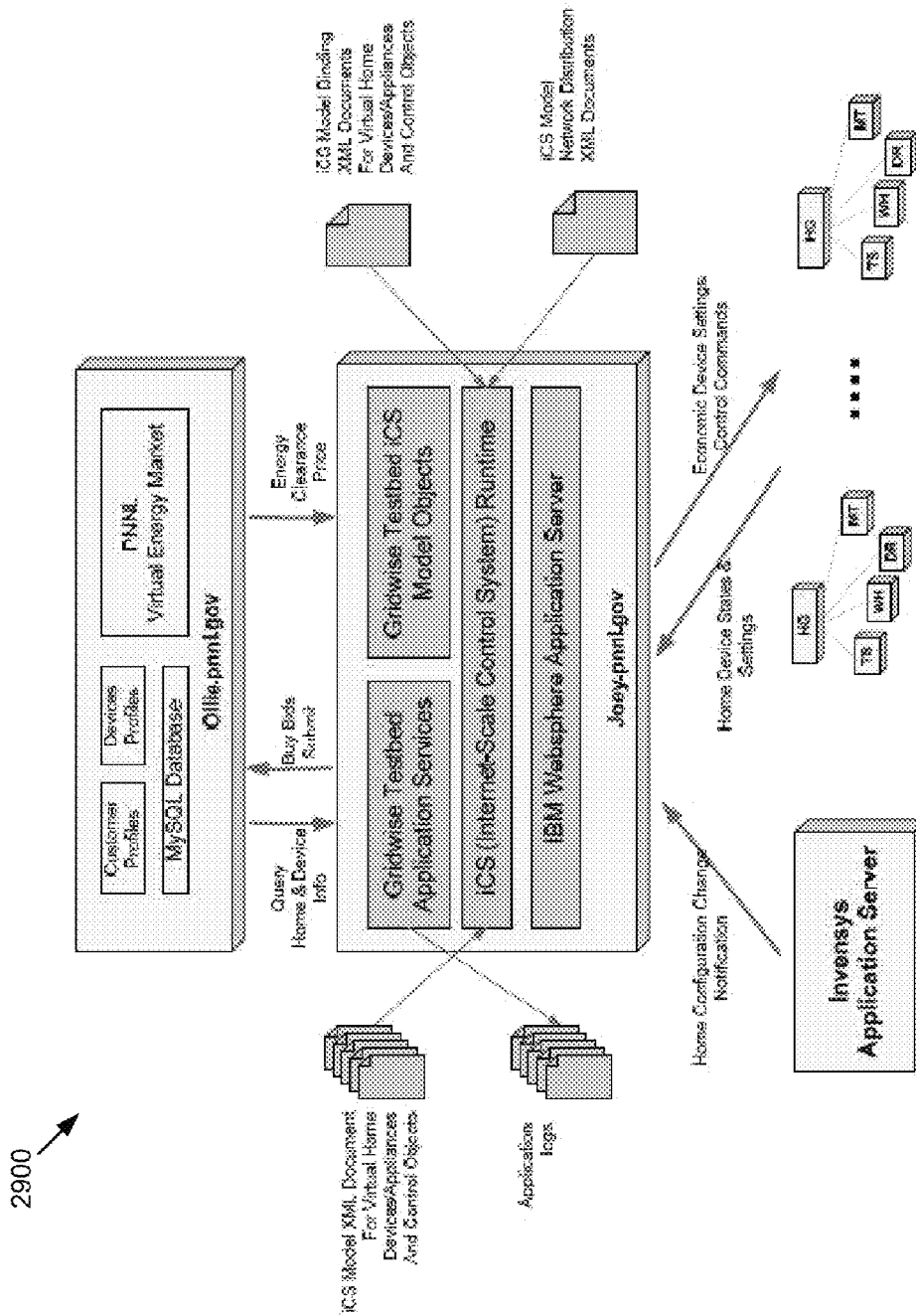
FIG. 29 is a schematic block diagram showing a project communication schematic as was used during an experimental use of an embodiment of the disclosed technology.

An Internet Scale Control System (iCS), a Web-Sphere™ based middleware software available from International Business Machines, was used as the foundation of the shadow market system. The market features of the real-time contract operations were carried out centrally, but these functions were integrated by IBM's middleware into the project as if the features had been provided locally at every home gateway. The software enabled the display of both incentive signals and resource responses in near-real time on the project Web site and allowed the project to browse historical results. The middleware software also allowed dynamic re-configuration of the system by adding or removing residential home components as well as user preferences and settings. Block diagram 2900 of FIG. 29 shows the principal elements of the communication system.

c. Distribution Benefits with a Virtual Feeder

The Olympic Peninsula Project was designed to indicate how peak loads on distribution feeders can be managed to avoid the need for local capacity expansion. To do this, the widely distributed real assets of the test bed were integrated into a virtual distribution environment where they appear and perform as resources available on a single capacity-constrained feeder. The shadow market was employed to signal these assets to operate and to manage this constraint as if they were actually all co-located on such a virtual feeder.

This feeder's capacity constraint could be arbitrarily modified during the experiment to throttle the activity of the control imposed by the project's market. Three different capacity constraints were asserted during the project's duration.

C. Local Marginal Energy Price Market

An experimental local marginal price market was designed and implemented on the Olympic Peninsula. Additionally, residential, commercial, and municipal loads and distributed generators were identified and used to bid into and respond to the local marginal pricing market. This section summarizes the design and operation of this market and how the distributed resources were controlled by this market during the experimental test period.

1. Introduction to Transactive Control

By transactive control (sometimes also referred to as "contract nets"), the project refers broadly to market-based building control systems, whether those systems are used locally within a single building or facility or throughout a region. The project chose a two-way market in which both suppliers and loads submit bids. This approach is remarkably scalable. It can be successfully applied within a building, as was done in this project to create a market competition between space conditioning zones, and it can be applied regionally as the project did at multiple residential and commercial building locations.

Experiment participants who participated in the real-time market submitted demand price bids for the expected power to be used by them during the next 5-minute interval. These bids were placed at the price at which they would be willing to curtail the stated power consumption. Most consumers submitted at least two bids for each 5-minute interval, one for their controllable, curtailable load and the other for their uncontrolled, non-curtailable load. Consumers' uncontrollable, uncurtailable load power was always bid at $9999-infinity from the perspective of the project's market.

The one generator that was able to run in parallel with the power grid always submitted bids for the maximum nameplate generation capacity it could supply. The price of its supply offer consisted of all costs that would be incurred to start the unit and included the effects of minimum allowable runtime and environmental permits. Minimum runtimes were enforced by bidding a high start-up price, followed by very low running prices for the first few 5-minute periods until the minimum runtime expired. The running price was then escalated until it met the steady run cost, usually within one-half hour. The complete formulas by which generators automatically bid were presented above in Section III.E.2.

Backup generators that could not generate back into the distribution network were required to bid as consumers. Thus, non-paralleled backup generators always bid on the demand side, not the supply side, of the market. However, they could only bid the capacity of the load that they were backing up at the time of the market clearing. The offer, however, was also calculated to reflect the effects of actual startup costs, runtime costs, minimum runtimes, and environmental constraints.

The retail market was cleared every 5 minutes. All demand bids and supply offers were sorted by price while summing their cumulative capacity, thus producing the demand and supply curves for that market. The intersection of the load and supply curves always occurred in one point, which was published back to all bidders as the market's clearing price and cleared power quantity. If the curves did not intersect, such as when the uncurtailable load quantity exceeded the sum of all supply bid quantity, then the market cleared at $9999 (infinity). This occurred only once in more than 100,000 market clearings during this project, corresponding to a single 5-minute interval during which the unresponsive demand did indeed exceed all available supply.

2. Two-Sided Real-Time Market with Clearing

Figure 30:
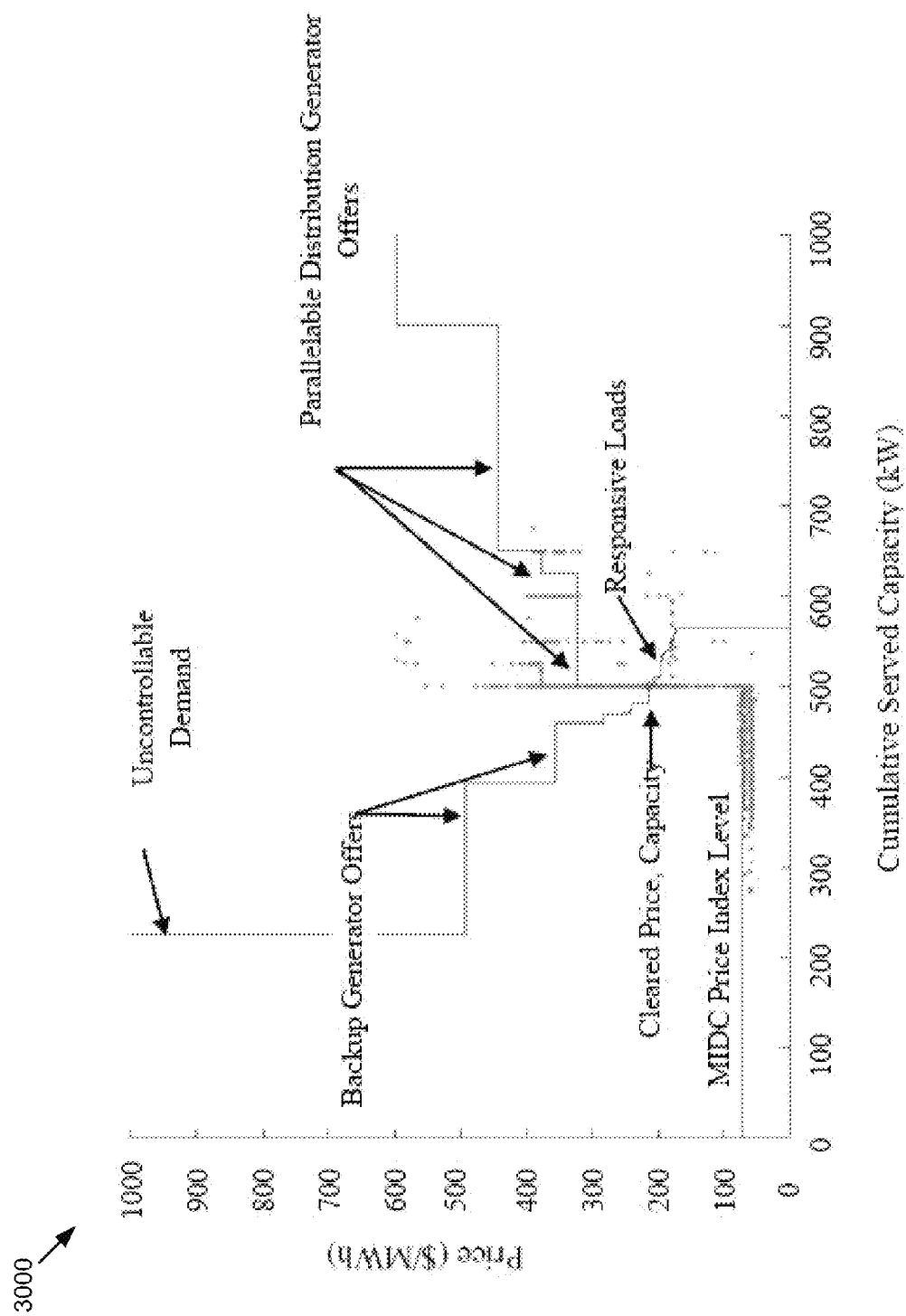
FIG. 30 is a graph showing an example 3-day history for a 5-minute two-sided clearing market according to an embodiment of the disclosed technology.

To help convey the system operation of the project's real-time energy market, graph 3000 of FIG. 30 shows an example of a two-sided market clearing diagram 3-day "snapshot" for the operation of the project. The loads' price bids are arranged from highest to lowest as one proceeds rightward toward higher total cumulative load. The supply price bids are shown ascending in price with increasing cumulative supply.

Supply.

The extended, flat base price, leftmost on the supply curve, represents the base price for energy that can be delivered by the constrained feeder. The simulated feeder constraint is shown arbitrarily assigned by the project at 500 kW in graph 3000 (the location of the first step in the supply curve). This much power is readily imported into the region at a cost assigned equal to the bulk wholesale cost of electricity plus a small premium. The project chose to assign this wholesale cost by projecting hourly MIDC wholesale price data from the prior day, according to data collected from Dow Jones. The projection of day-ahead price was problematic only on Mondays and Sundays, for which day-ahead markets were unavailable. On these two week days, wholesale prices were projected without dynamics from known recent average and peak daily wholesale prices.

The higher priced plateaus toward the right of the supply curve are the offers received from the project's real and virtual distributed generators. Due to cost and schedule constraints, with the exception of a single 30-kW microturbine, these distributed generators on the supply curve were simulated to emulate the market behaviors and performance of real distributed generators of various sizes.

Demand.

The "infinite" demand-side bids by the uncontrolled project loads (vertical line leftmost on the demand curve) represent all loads of those residents who were not assigned to the real-time price contracts and also the dishwashers, refrigerators, lighting, and other loads in real-time contract homes that were not configured to bid into the market. The next large steps usually corresponded to the offers of the real and virtual emergency-backup diesel generators that bid the capacities of the loads they served. The multiple small steps even farther to the right corresponded to the responsive pumping loads and responsive residential loads in real-time contract homes.

Clearing Process.

The project's published local marginal price for each interval is the price at which the load and supply curves intersected. The historic 5-minute local marginal prices are displayed as green diamonds in graph 3000 of FIG. 30. It can be seen that the recent history in this figure includes higher prices when the transmission constraint would have been exceeded and higher-priced distributed generation resources were started to avoid exceeding the constraint. As shown at present, however, those small loads bidding to the right of the intersection choose not to operate, and total system load is being held at the feeder constraint capacity (500 kW).

In general, if the total participants' demand was less than the feeder's capacity, the retail price was the same as the wholesale price. When the feeder's capacity was exceeded, the retail price would rise according to how the retail market cleared. Those loads to the right of the intersection defer their operation also to help manage the constraint. However, all bidding loads share the responsibility and any discomforts equitably over time because the automated bid process dynamically prioritizes the loads according to their present needs. The loads are queued from highest bid to lowest. The highest bidding loads are permitted to run; low-bidding loads compete unsuccessfully in the market and do not operate. By using transactive control throughout the project's region, a single local marginal price was sufficient to manage both load and generation resources in the region.

Figure 31A:
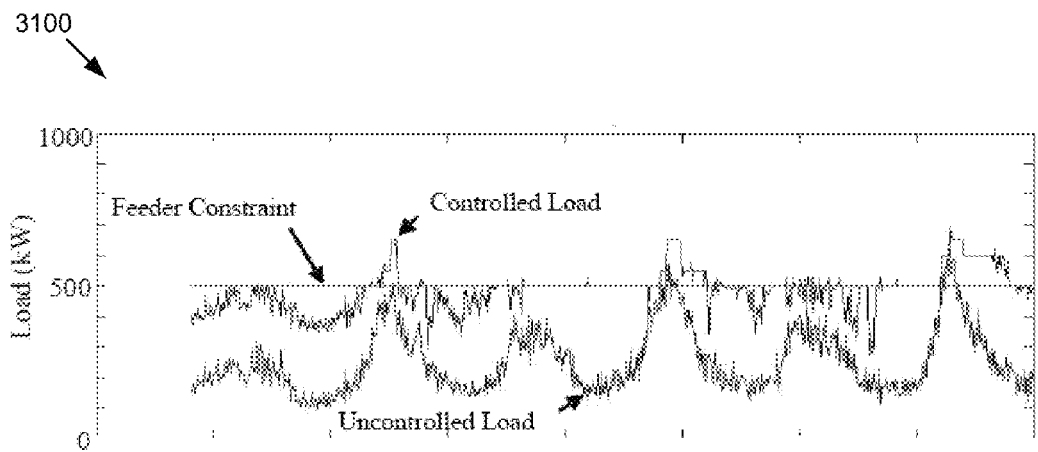
FIGS. 31A and 31B are graphs showing the control of an imposed distribution constraint using transactive control according to an embodiment of the disclosed technology.
Figure 31B:
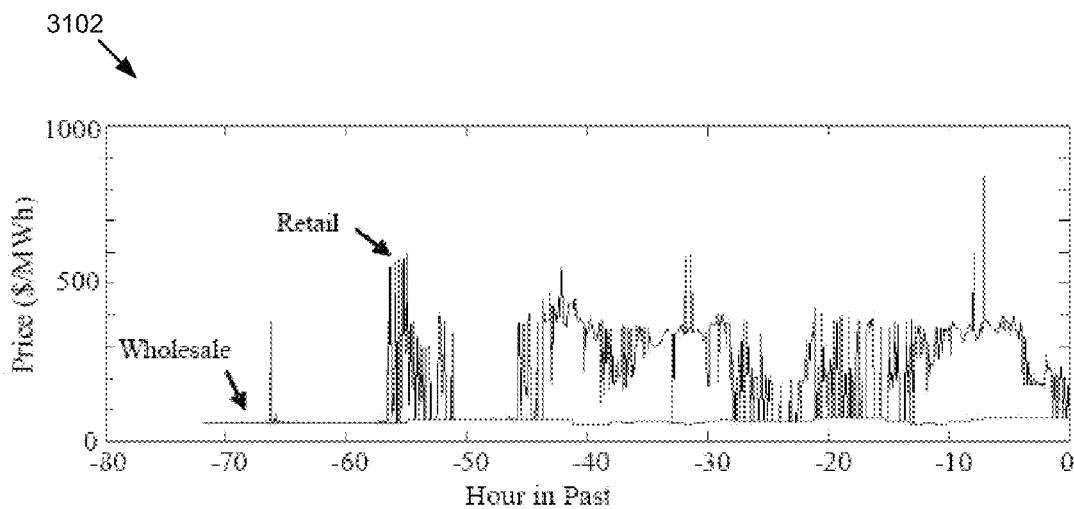

It is also interesting to view this 3-day period in another way. Graph 3100 of FIG. 31A shows the time history of loads and local marginal prices for the same 3-day period used in graph 3000 of FIG. 30. The total cleared load (black line) is the sum of the unresponsive loads on the system (i.e., things like household refrigeration and small appliances that were not controlled by the project, the blue line) and the controlled loads. When the total load approaches the feeder capacity limit (horizontal red line), the local marginal price (the black line of graph 3102 of FIG. 31B) increases sharply and helps keep the dynamic system load below the limit.

On the supply side of the market, the higher clearing local marginal prices become enticing to generators, which eventually turn on to increase the total allowable capacity of the region. The startup of distributed generators is concurrent with the instances where the total cleared load significantly exceeds the transmission constraint.

3. Source and Load Bids

Having discussed an example of the system-wide, aggregate behaviors of the resources as they participated in the project's real-time market, the discussion now addresses the general methods by which the project's resources calculated their bids and offers into this market. The general approaches can be organized as bids and responses from thermostatically controlled loads
responses from non-thermostatically controlled, non-bidding loads
distributed generator resource offers.

4. Transactive Control for Thermostatically-Controlled Equipment

The transactive control for thermostatically-controlled equipment was described above in Section III.A.

5. Water Heater Controls

The water heater control strategy that was utilized in the experiment was described above in Section III.B.

D. Residential Load Control

The purpose of this section is to explain the Olympic Peninsula Project's interaction with its residential participants and the residential loads controlled by the project.

1. Project Locations

With assistance from BPA, the project identified opportunities and obtained permissions to recruit residential participants in and near Sequim and Port Angeles, Wash., on the Olympic Peninsula. These regions were located in the two utility service territories operated by PUD #1 of Clallam County and the City of Port Angeles. Several homes were also recruited in the service territory of Portland General Electric in Gresham, Oreg. Eventually, 112 experiment participants were successfully recruited to participate in the Olympic Peninsula Project.

2. Recruitment Process

Potential participants for the project were recruited with the assistance of their local utility companies. The utilities targeted their recruitment efforts toward potential participants who would likely have high-speed Internet service, primarily electric HVAC space heating and cooling, an electric water heater, and an electric dryer.

The project received mailing lists for these potential participants from the utility companies. Recruitment letters were mailed to potential residential participants on the Olympic Peninsula. The recruitment letters listed the participation requirements and asked them to visit a project Web site to provide the project their contact information and answer a series of questions that were later reviewed to determine if the participant met the participation requirements. The project intentionally over recruited at this point, knowing that some of the invited applicants would become disqualified by later screening efforts to be conducted by the project's automated Web site and by follow-up phone interviews. Despite much effort expended to recruit 200 participants, the project only located and successfully signed up 112 qualified participants.

The project also encountered challenges understanding the nature of space-heating equipment in applicant's homes. The preference was for applicants having HVAC systems for both the heating and cooling of their homes. Unfortunately, the cool Olympic Peninsula has relatively little air conditioning load, and few suitable homes were found to have HVAC systems. However, the interaction of the project's home automation equipment was obtained through thermostats, so the project ultimately also accepted applicants with all or part of their homes' heating loads served by resistive heating as long as the home was served by one, or at most two, thermostats. The project attempted to clarify the types of home heating systems in the applicants' homes by inquiring how many thermostats controlled the homes.

3. Participant Qualifications

In this section, the residential-applicant qualities the project sought are summarized. The qualities sought were:

The applicant must be served by one of the two participating utilities. Two utilities had agreed to informally cooperate with the project. Utilities accepted the responsibility to replace participant revenue meters with the project's advanced meters.

The applicants had to own and occupy their own homes throughout the project duration. The project required participants' permissions to modify the homes' electrical service and to attach control boxes with fasteners to walls. Unoccupied homes were avoided because the project wished to test the interactions of occupants with provided equipment.

The applicant must have HVAC space conditioning (later relaxed to the applicant having not more than two central thermostats). The project would interact with participating homes through one, or at most two, thermostats. The project wished to affect both heating and cooling loads.

The applicant must have at least one 30-gallon or larger electric, not gas or solar, water heater. Project load-control modules were to be installed between the electric water heaters and 240-VAC service. Only water heaters with reservoirs have the thermal energy storage that can be used for peak reduction in a way that would be accepted by participants.

The applicant must receive and subscribe to broadband Internet service. The project's home gateway communicated with the project via broadband Internet connections. The project desired to interact with applicants who would be savvy enough to use their Internet user interfaces and to take project surveys online.

Each applicant's revenue meter had to be within 60 feet of the home. This criterion was adopted soon after installations began, at which time the project learned this limitation of the premise wireless communications. At that distance, the wireless signal became unreliable.

Optionally, the applicant must use an electric, not gas, dryer. At a sample of these homes, the project investigated the broadcast of energy price information at the clothes dryers' user interfaces.

4. Incentives

The project offered applicants (1) the use of project equipment for the management and monitoring of their home water heaters and space heating and (2) a total of $150, on average, cash earnings, more or less, depending on the occupants' responses to the energy signals provided to them by the project. These incentives were offered in the initial recruitment letters to applicants and were carefully stated in the contract between participants and the project. Participants earned more than this amount due to an extension of the project one additional quarter beyond what had been initially planned.

At the beginning of each project month, each participant's project account was refilled with an amount of cash. The amount of cash was unique for each participant, based on the participant's assigned contract type and his/her historical consumption of electric energy at his/her home. During the month, cash was removed by the project from each account commensurate with the time and contract price at which each participant consumed electricity. The remainder, if any, was returned each project quarter to the participant by check. Participants' monthly accounts were never allowed to become negative.

The participants' incentive accounts were unaffected by customers' normal electric utility bills. The incentive accounts only dealt with the differential electricity costs and benefits that the customers would have incurred had they truly been under contracts that might have differed from the fixed-price contract offered by their local electric providers.

Quarterly, the project reviewed these accounts and calculated and mailed the project incentive checks. Some modifications were needed at these times to target the promised average compensation. These modifications were justified by the project because of limited project funds and the significant variability some of these contracts exhibited with seasonal temperature variations.

5. Participant Obligations

Each participant became contractually obligated to (1) make reasonable allowances for access by the project into homes to install, fix, or uninstall project equipment, (2) take initial and final surveys provided them by the project, and (3) occupy the home and interact with the provided project equipment. Participants were required to inform the project in advance if they would be unable to complete their project participation for any reason.

6. Contract Types and the Assignments of Contract Types

Participants were offered three types of electricity contracts: fixed, time-of-use (TOU) with critical peak price (CPP), and real-time price (RTP). Participants requested and were assigned to these three contract types and a fourth experimental control group in roughly equal numbers. The experimental price contracts did not change the existing obligations the customers had with their existing electric service providers.

The following quoted educational information was provided to the participants concerning these contracts at the time they were asked to state their first and second preferences:

"Fixed Price Program Contract—

This choice requires little or no involvement from you and little to no change in your electricity usage patterns. You are most likely to receive a small program payment with this contract choice.

"The price of electricity under the fixed-price program contract will remain constant, regardless of when you use electricity or how much you use at any one time-just like the bill you currently receive from your local utility. In this program contract, there is no incentive for changing your usage when electricity is in short supply. However, you may affect your program bill by using more or less electricity.

"Tips to minimize your program bill under this program contract:

"Perform energy-efficiency strategies to save energy, such as turning down your thermostat, replacing incandescent light bulbs with compact fluorescent light bulbs, installing low-flow showerheads, switching from warm to cold water cycles in the washing machine, installing storm windows, checking and installing sealing and weather stripping, etc."

The project's fixed price of $81/MWh (8.1¢/kWh) was selected and used for these contract participants. This price was determined by BPA project collaborators based on a forward market price for a comparably sized load, plus a small service provider markup.

Following is the invitation for applicants to participate in the project's time-of-use contracts:

"Time-of-Use/Critical Peak Program Contract—

This program contract choice will require a moderate level of consumer involvement and change in your electricity usage patterns. You are most likely to receive a moderate program payment with this contract choice. By changing the time at which you use electricity, you may be able to reduce your program bills.

"The price of electricity under the time-of-use/critical peak program contract will vary between three program rates:

"Off-peak: this program rate will apply mid-day, night, and weekend hours when demand for electricity is typically at its lowest. The program rate during these times will be lower than what you currently pay your local utility.

"On-peak: this program rate will apply in the weekday early morning and early evening hours when the demand for electricity is typically at its highest. The program rate during these times will be higher than what you currently pay your local utility.

"Critical peak: this program rate will apply during times of power shortages or emergencies on the electrical grid (representing disruptions on the power grid, times of increased congestion on major transmission lines, etc.), The program rate during these times will be much higher than the 'on-peak' rate described above. There will be a limit to the number of these critical peak events for the year, each lasting no more than four hours, and you will be notified at least one day in advance so you can respond appropriately.

"Your equipment will receive these price signals, and you can set your equipment to respond automatically to these rates as you desire. You can also take voluntary actions to reduce your household's energy use during critical peak times. For your convenience and comfort, you can override your equipment settings at any time.

"Tips to minimize your program bill under this program contract:

"Choose the maximum economy selection when setting up your thermostat set points using the Invensys GoodWatts™ user interface.

"Avoid overriding your controller.

"Pay attention to notices of upcoming critical peak price events and be prepared to respond.

"Eliminate all unnecessary use of electricity during critical peak periods."

Those residential participants assigned to the time-of-use with critical peak pricing contracts were invited to automate their homes' responses for on-peak, off-peak, and critical peak periods using the energy-management equipment supplied them by the project. Prices were assigned by the project for each of these three periods, and these time-of-use prices and corresponding periods remained constant at least through a season. Participants were able to select from multiple comfort settings, much as has been described for those on real-time price contracts. During the on-peak periods, including that for a critical peak period, the homes' thermostats would revert to a user-selected temperature setback, which would permit the homes' temperatures to coast and avoid or defer energy consumption. Water heater operation could be curtailed during on-peak and critical peak scheduled periods. A critical peak event was called only once during the project for a 4-hour period between 2:00 AM to 6:00 AM. Invensys Control GoodWatts system had been designed for time-of-use interactions, and the equipment was quickly and easily configured for participants on this contract.

The time-of-use periods and their retail rates are summarized in Table 4.

TABLE 4

Time-of-use and Critical Peak Rates

| Season | Period | Times (pacific w/DST) | Price (¢/kWh) |
|---|---|---|---|
| Spring | off-peak | 9:00 a-5:59 p; 9:00 p-5:59 a | 4.119 |
| (1 Apr-24 Jul) | on-peak | 6:00 a-8:59 a; 6:00 p-8:59 p | 12.150 |
|  | critical | (not called) | 35.000 |
| Summer | off-peak | 9:00 p-2:59 p | 5.000 |
| (25 Jul-30 Sep) | on-peak | 3:00 p-8:59 p | 13.500 |
|  | critical | (called 1 Nov 2:00 a- | 35.000 |
| Fall/Winter | off-peak | 9:00 a-5:59 p; 9:00 p-5:59 a | 4.119 |
| (1 Oct-31 Mar) | on-peak | 6:00 a-8:59 a; 6:00 p-8:59 p | 12.150 |
|  | critical | (not called) | 35.000 |

"Real-Time Pricing Program Contract—

This choice requires the greatest consumer involvement and the greatest change in your electricity usage patterns. You are most likely to receive the largest program payment with this contract choice.

"The price of electricity under the real-time pricing program contract will vary every five minutes and somewhat unpredictably during the course of the day, week, and year. Participants in this program contract can set and adjust an automatic response to the price signals by going to the Internet and choosing between maximum comfort, maximum economy, or some level of response in between. At any time, you can press a button on your thermostat to override your pre-set responses. Some equipment also will signal if prices are unusually high so that you can choose whether to use electricity or not during that program price period. By using less electricity, especially when energy prices are high, you may be able to lower your program bills substantially.

"Tips to minimize your program bill under this program contract:

"Program the Invensys GoodWatts™ thermostats for your heating and cooling system and water heater for maximum economy.

"Avoid overriding your system settings.

"Voluntarily reduce your overall electricity usage as much as possible when the warning light is flashing, indicating that prices are unusually high "Perform energy-efficiency strategies to save energy, such as those listed above."

Behaviors of automated controls in the real-time price contract homes were described in Section III.A for thermostatically controlled space conditioning and in Section III.B for water heater controls.

"Control Group—

In addition to these three groups, a certain number of participants will be randomly assigned to a control group for the course of the program. If you are selected to be in the control group, equipment will be installed in your home, but you will not have a program account, program contact, or program bills. Control-group members will receive $150 over the course of the project in appreciation of their participation, regardless of how they use electricity."

Figure 32:
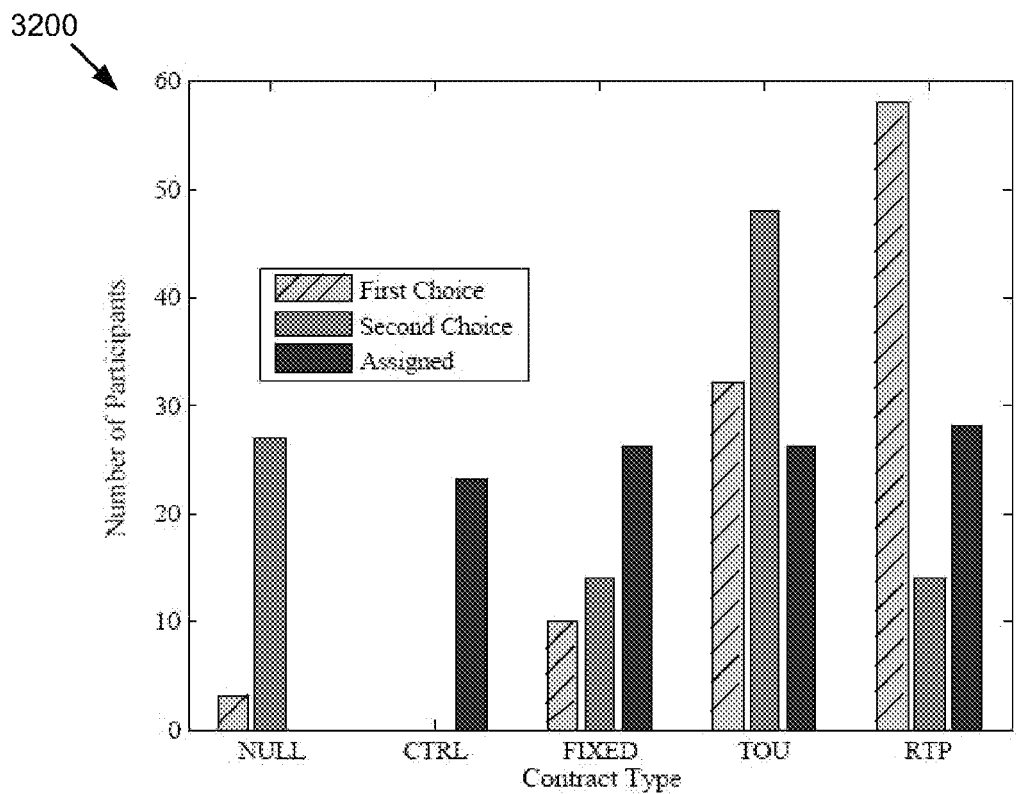
FIG. 32 is a graph showing consumer preferences for contract types as part of an experimental use of embodiments of the disclosed technology.

Graph 3200 of FIG. 32 shows participants' first, second, and assigned contract types. As shown, participants showed the strongest preference for real-time pricing contracts. This preference was somewhat surprising, but the project had perhaps oversold the contract by stating that participants could earn the greatest incentives by participating in this contract type.

The project's contract assignment methodology first chose the control-group members at random, and then maximized the number of participants that got their first or second choices through an iterative random reassignment procedure. A control group assignment was made, but subjects were not offered the opportunity to volunteer for the control group. According to this method, a score is generated based on the square difference between numbers of customers receiving desirable assignments in each contract type. One randomly chosen subject is then changed from one group to another, and if the score is improved, the change is adopted. This process was repeated up to 1000 times until the score could no longer be improved. The final arrangement was adopted as the final customer contract membership.

At the conclusion of this assignment process, 49 percent of participants were granted their first choices, 16 percent received their second choice, and the remaining 36 percent were granted neither their first nor second choices. This last group is deceptively high because it included control-group assignments that could not have been requested by the participants. Final group memberships were nearly equal in size between the four contract groups. See Table 5. The final assignment of a specific program contract was communicated to each participant.

TABLE 5

Residential Contract Choices

| Preference | Fixed | Time-of-Use | Real-time | None | Control |
|---|---|---|---|---|---|
| first | 10% | 32% | 58% | 3% | — |
| second | 14% | 48% | 14% | 27% | — |
| assigned | 26% | 26% | 28% | — | 23% |

7. Residential Control Equipment

Figure 33:
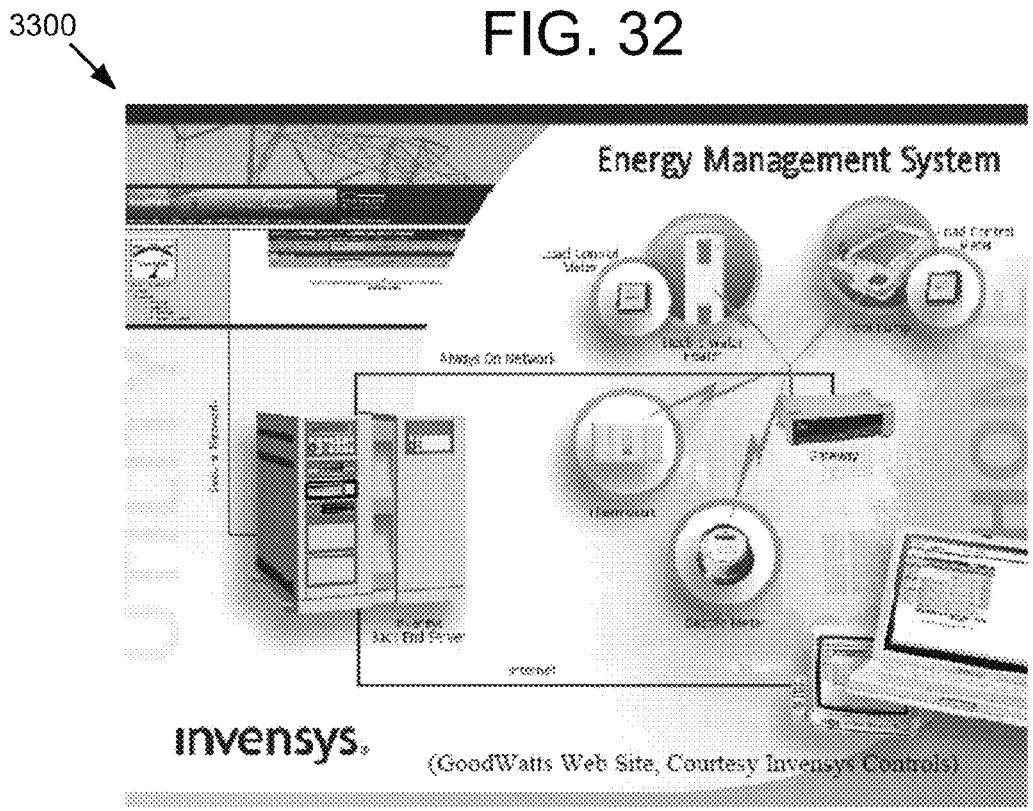
FIG. 33 is an image showing components of an energy management system that was used during an experimental use of embodiments of the disclosed technology.

The project conducted a competitive request for proposals for energy-management-system equipment that would perform requested monitoring and control functions for residential thermostats and electric water heaters. Invensys Controls won this competition and entered into a contract to provide the project its needed equipment and services. Diagram 3300 of FIG. 33 shows the components of the Invensys GoodWatts™ system. The system had been designed primarily for time-of-use contract types.

Each participant was provided by the project with a: (1) a home gateway; (2) a Virtual Private Network (VPN) for those homes possessing digital subscriber line (DSL) broadband connections; (3) a water heater load-control module; (4) a communicating thermostat; and (5) an advanced revenue meter. A sample of participants was also provided a load-control module for their clothes dryers.

The system's home gateway communicated wirelessly with the other system hardware and via Internet to the project and Invensys back-end servers. The gateway and VPN resided near each home's personal computer. The gateway's firmware contained some of the necessary project functions that defined its interactions with the thermostat and water heater. The gateway's firmware was successfully updated in the field several times during the project to update or correct system performance. The gateway maintained a memory of component actions and duties such that the system components could function acceptably for a while even if Internet connectivity had been severed.

The home gateway required that a VPN box be installed in locations having DSL Internet connectivity. Additional thermostats were used as wireless repeaters in several locations where distances or materials prevented successful wireless communication between system components. The gateways, VPNs, and modems were found to need periodic re-booting by the participants during the project.

a. Water Heater Load-Control Module

Figure 34:
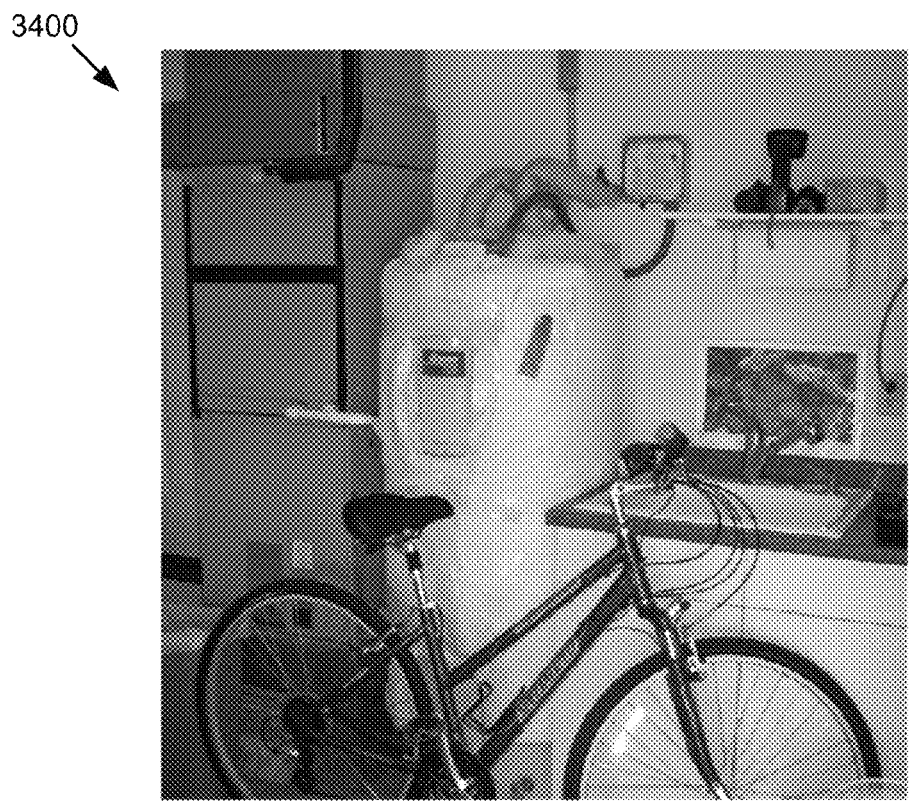
FIG. 34 is an image of a load control module and an experiment participant's water heater.

The water heater load-control module used in the experiment contained a 240-V AC switch and a means for wireless communications that permit it to receive, store, and respond to the curtailment commands and schedules that it receives. The load-control module could also tell the project whether the water heater was active or idle as a load. A load module was installed between each electric water heater and 240-V AC home service in each project home by licensed electricians. Based on users' occupancy schedules, time-of-use schedules, critical peak events, or real-time contract commands, the load-control module switch could break the 240-V AC circuit, causing the water heater, if active, to shed or defer its load. A water heater load-control module is shown installed at a project home in image 3400 of FIG. 34.

b. Communicating Thermostat

Participants' existing thermostats were replaced by GoodWatts wireless communicating thermostats. The thermostat was able to receive curtailment commands and was able to maintain simple scheduled occupancy modes with or without wireless connectivity to the remainder of the system. The liquid crystal display (LCD) panel of the thermostat displayed the system's present occupancy setting and status and alerted the participant to special occurrences, like high energy price conditions. At the project's conclusion, participants chose to either have their project thermostats left in place or removed and replaced by another.

c. Advanced Revenue Meter

A GoodWatts advanced revenue meter was also installed at each participating home by the local utility. This meter kept track of not only electricity consumption, but also the time during which the consumption occurred. The discrimination of electrical consumption by time was a useful component of the project. The meter's present reading could be polled at any time to provide other functions and confirmations for the project.

Figure 35:
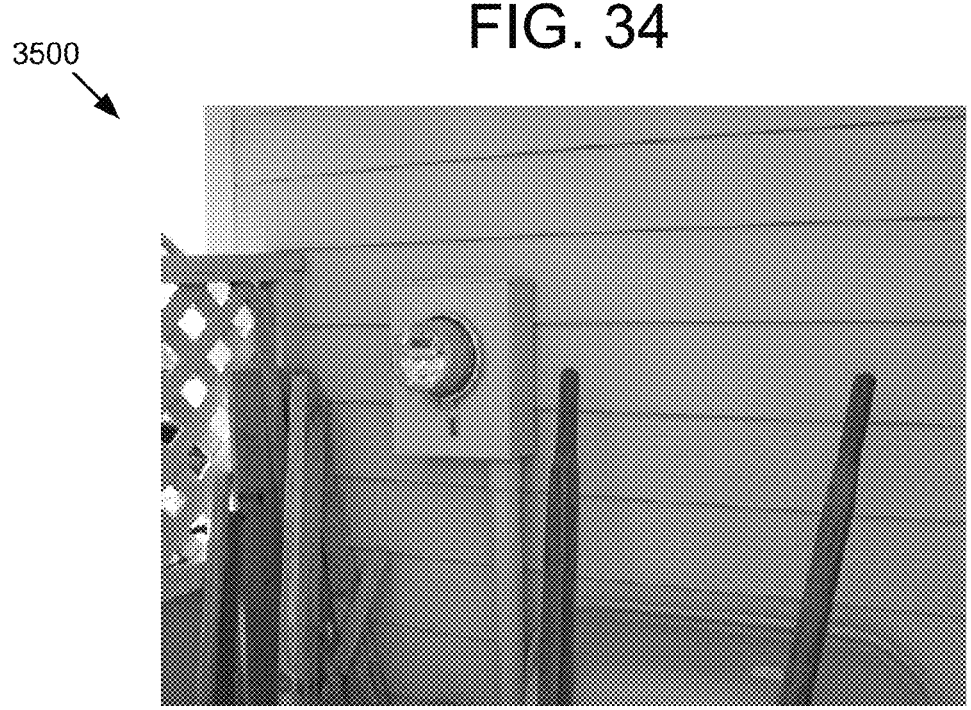
FIG. 35 is an image of an energy meter as used by an experiment participant.

These meters became the property of the local utilities that installed them. Installation of the meters by the utilities represented the major technical interaction between the project and themselves. All participating project utilities elected to keep the revenue meters installed in place at the conclusion of the experiments. Image 3500 of FIG. 35 shows an installed project revenue meter.

d. Clothes Dryer Module

Figure 36:
FIG. 36 is an image of a dryer configured to display energy alert signals according to embodiments of the disclosed technology.

The project was able to display price information and curtailment requests on the front panels of approximately 50 $HE^2$ Sears Kenmore clothes dryers manufactured by Whirlpool Corporation. These clothes dryers were designed to display "Pr" concurrent with high price conditions and "En" during CPP and traditional curtailment requests. Image 3600 of FIG. 36 shows an example of this indicator feature. The starts of these displayed conditions were accompanied by an audible alert from the dryers. During these displayed conditions, clothes dryer users were required to push the start button a second time to acknowledge and override the condition alert. Otherwise, no changes in dryer performance occurred. Dryer operation was never directly interrupted by the project.

The purpose of this project price interaction with dryers was to observe how participants might interact and provide fully voluntary price responsiveness at appliances that provide alerts, but no direct control action, for the appliance user.

e. Participant GoodWatts Web Site Interactions

Figure 37:
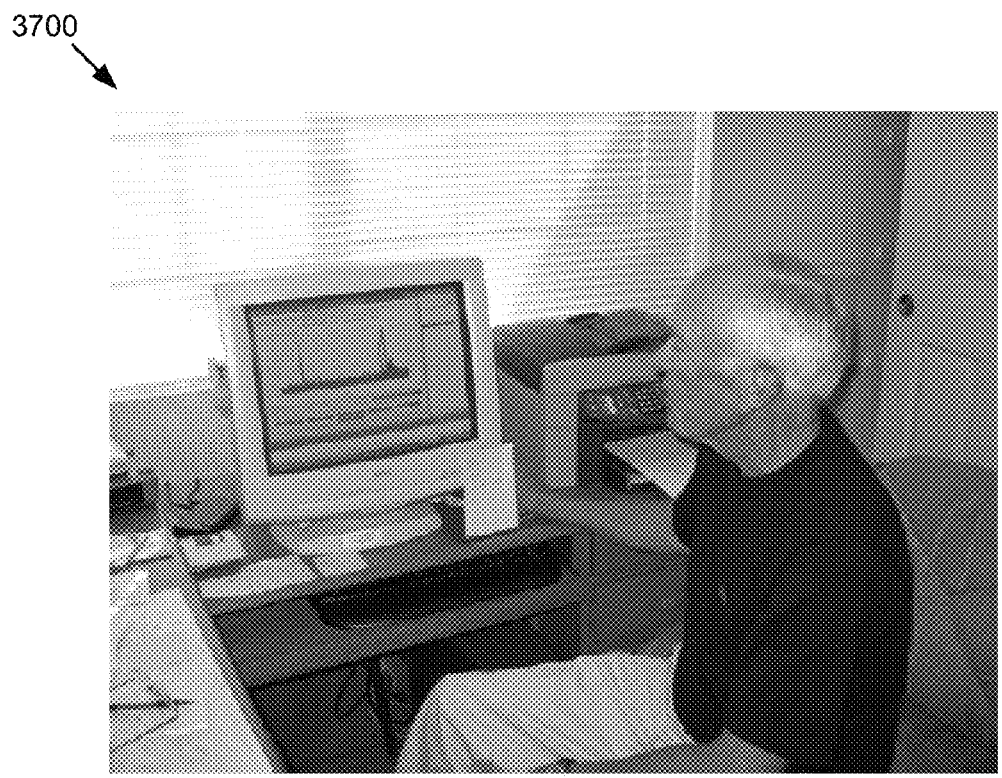
FIG. 37 is an image of an experiment participant accessing a web site for configuring his power usage preferences according to an embodiment of the disclosed technology.
Figure 38:
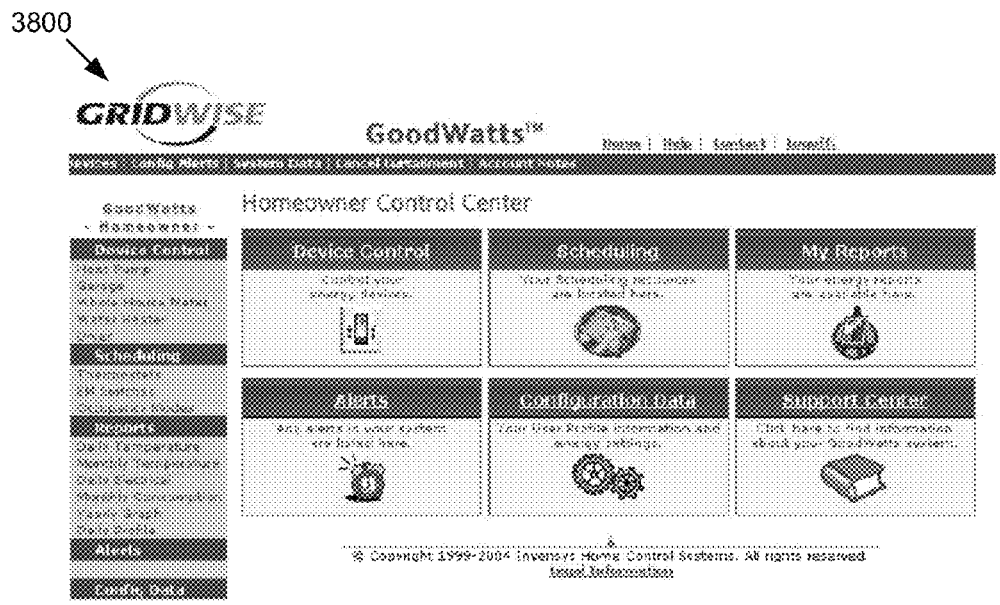
FIG. 38 is an image of a screen shot of a web site configured to allow a user to input power usage preferences according to an embodiment of the disclosed technology.

Participants were able to view detailed 15-minute energy information for the historic operation of their thermostats, water heaters, and the rest of their appliances at a project website (termed the "GoodWatts Web site"). There, participants could review details of their appliance energy consumption for any 15-minute interval of the project. They could also review aggregate consumption histories as well. Images 3700 and 3800 of FIG. 37 and FIG. 38 show a participant interacting with his GoodWatts project Web site, and an example web page that participants might see when they enter their Web site.

This Web site too was where participants could set their occupancy schedules and establish how each controllable appliance (e.g., thermostatically-controlled HVAC, water heater) should behave during each occupancy period. Time-of-use contract participants, for example, could establish their appliance behaviors for on-peak and off-peak intervals. All participants received the same energy-management equipment. However, participants were offered the opportunity to reconfigure the performance of their thermostats and water heaters during the experiment differently, depending on their assigned contract types. The list of available appliance controls by contract type is summarized in Table 6.

Residents in every contract type could specify time-of-day occupancy schedules. The start and stop times of these periods, the desired space conditioning thermostat set points, and the on/off status of electric water heaters could be scheduled for one or more occupancy periods. Any restrictions imposed by occupancy schedules overrode responses from time-of-use or real-time price schedules or commands. For example, a water heater held off by its user's occupancy schedule was not then available to curtail its load as a price response.

Real-time and time-of-use contract residents were further allowed to configure their relative desire for comfort versus economy by selecting comfort settings for their thermostats and water heaters. Time-of-use contract customers were able to specify absolute thermostat setbacks that would apply during peaks and critical peaks and the preferred on/off behaviors of their water heaters too during these times. The real-time contract customers, however, selected from seven comfort setting options (more if pre-cooling options are counted too) for their thermostats and five comfort setting options for their water heaters. From the customers' perspectives, these options were simply a continuum ranking, allowing customers to state their preferences between maximum comfort (price would not affect thermostat set back) and maximum economy (customers recover as much of their project shadow account as is possible by allowing large setbacks). These settings, for example, affected the likelihood that real-time contract customers' water heaters would be permitted to run during consecutive 5-minute intervals.

Control and fixed-price group members could only set their occupancy modes and corresponding thermostat set points. The only difference between the control and fixed-contract groups was that the fixed-price contract members could achieve an energy-efficiency benefit through the shadow market; control group members could not.

TABLE 6

Appliance Control Summary by Residential Contract Type

| | Thermostats | | | | Water Heaters | | | |
|---|---|---|---|---|---|---|---|---|
| | Occupancy Set Point Schedules | TOU/CPP Set Point Schedules | Cost vs. Economy Setback Options | Relative RTP Bid and Set Point Response | Occupancy on/off Schedules | TOU/CPP on/off Schedules | Cost vs. Economy Response Options | Relative RT Likelihood Response |
| control | X | | | | X | | | |
| fixed | X | | | | X | | | |
| TOU | X | X | | | X | X | | |
| RTP | X | | X | X | X | | X | X |

Participants on the real-time price contracts selected one of five water heater comfort settings and one of seven thermostat comfort settings. These options established acceptable temperature limits and response curves for thermostats and likelihood functions for water heaters, respectively. These options are summarized in Table 7. Note that the comfort-settings options were offered to participants in this way as a limited number of descriptive options. The resulting computations were performed, and range parameters were set in the background.

TABLE 7

Appliance Comfort Settings and Resulting kw and kr Values

| Water Heater | Thermostat | Cooling | | Heating | |
|---|---|---|---|---|---|
| Comfort settings | $k_W$ Comfort Settings | $k_{T\_L}/k_{T\_H}$ | Tmin/Tmax | $k_{T\_L}/k_{T\_H}$ | Tmin/Tmax |
| maximum economy | 2.0 maximum economy | 1/1 | 0/10[b] | 1/1 | −10/0[b] |
| balanced economy | 1.5 balanced economy | 2/2 | 0/10 | 2/2 | −10/0 |
| balanced | 1.0 comfortable economy | 3/3 | 0/10 | 3/3 | −10/0 |
| balanced comfort | 0.5 economical comfort | 1/1 | 0/5 | 1/1 | −5/0 |
| maximum comfort | 0.0 balanced comfort | 2/2 | 0/5 | 2/2 | −5/0 |
| | maximum comfort | 3/3 | 0/5 | 3/3 | −5/0 |
| | maximum economy[a] | 1/1 | −3/10 | 1/1 | −10/3 |
| | balanced economy[a] | 2/2 | −3/10 | 2/2 | −10/3 |
| | comfortable economy[a] | 3/3 | −3/10 | 3/3 | −10/3 |
| | economical comfort[a] | 1/1 | −3/5 | 1/1 | −5/3 |
| | balanced comfort[a] | 2/2 | −3/5 | 2/2 | −5/3 |
| | maximum comfort[a] | 3/3 | −3/5 | 3/3 | −5/3 |
| | no price reaction | ∞/∞ | 0/0 | ∞/∞ | 0/0 |

[a]with pre-heat and pre-cool option.

[b]$T_{min}$ and $T_{max}$ are expressed as °F. above or below the present thermostat f. Installation of Project Equipment The next paragraphs present some unanticipated events and conditions that were encountered during equipment installation.

Soon after its first equipment installations, the project learned about a limitation of components' wireless communication distance. This limitation presented the greatest challenges for the revenue meter, which was frequently located on a pole far from the residence at project homes. After recognizing this limitation, the project began questioning new applicants about the distances between their home computers and electric revenue meters. New applicants were disqualified whenever this distance exceeded 60 feet. At some locations, additional thermostats were successfully employed as wireless repeaters for the systems to overcome this limitation and transmit effectively over longer distances.

The project also encountered a number of homes having service other than the desired 200-ampere, split-phase meters that were unsuitable for use with the chosen energy-management system.

Additional routers were needed in conjunction with the home gateway wherever DSL home Internet service existed. The Internet communications were not entirely stable during the project, requiring the periodic re-booting of gateways and routers, especially after stormy weather. Project personnel often had to monitor these communication outages and had to consequently phone participants to help them conduct manual re-boots and re-establish connectivity on behalf of the project.

E. Commercial Building Load Control

A market-based control technology for a commercial building's HVAC system was also implemented and studied. Details of this implementation and study are described above in Section III.C.

F. Municipal Water Pump Load Control

A market-based control technology for controlling municipal water pump-load resources was also implemented and studied. Details of this implementation and study are described above in Section III.D.

G. Distributed-Generator Control

A market-based control technology for controlling generators according to a distributed-generated scheme was also implemented and studied. Details of this implementation and study are described above in Section III.E.

H. Data Analysis Results

This section presents and describes major analysis findings from the Olympic Peninsula Project.

1. Chosen Equipment Settings

Figure 39:
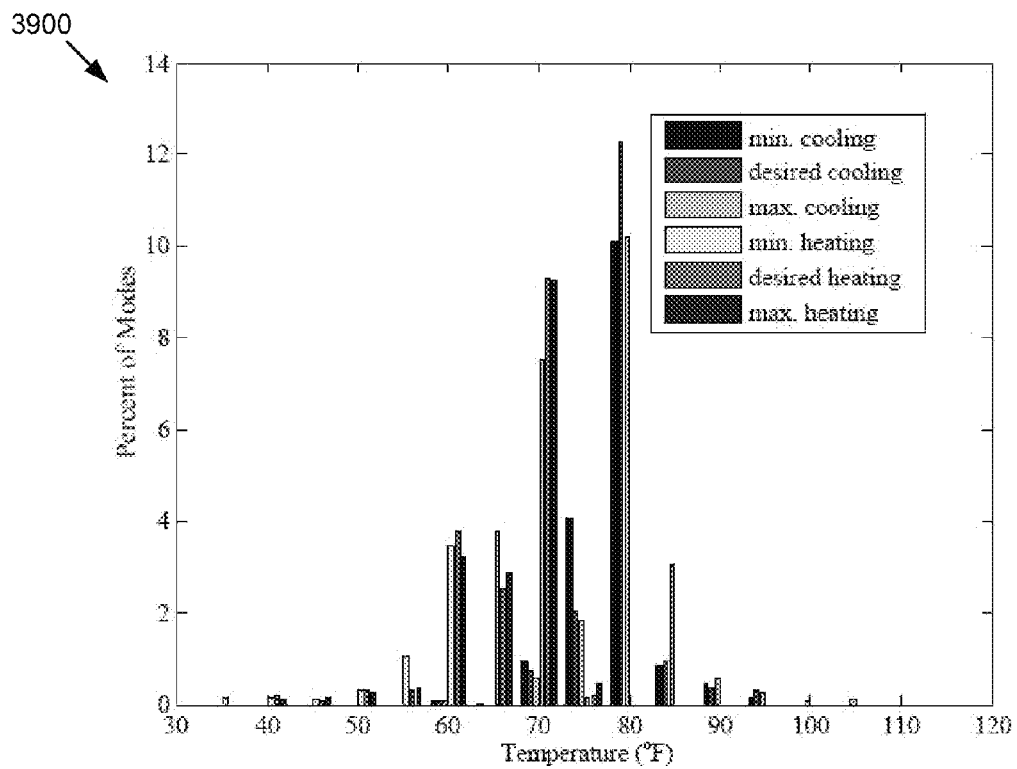
FIG. 39 is a graph showing a distribution of selected residential thermostat limit setting from participants in an experimental use of an embodiment of the disclosed technology.

Overall, the thermostat cooling and heating temperatures chosen by residential participants throughout the project were distributed as expected for the population, with a few outliers for those thermostats that were installed in unusual locations because they were being used by the energy-management-system vendor as wireless relays. No easy way was found to differentiate the thermostats used as communication relays from those truly used as thermostats. See graph 3900 of FIG. 39. This figure reflects the participants' chosen thermostat set points (desired heating and desired cooling) and the thermostat temperature limits (e.g., $T_{T\_L}$ and $T_{T\_H}$) that the participants selected through their comfort setting choices. In this figure, the set points and limits are included for every participant's various occupancy modes (e.g., sleep, away, return) and for participants in every contract type. The data query included initial thermostat settings and all changes in those thermostat settings configured through participants' Good-Watts Web sites during the project. The set points are in no way weighted for the fraction of time the thermostats spent in any of their occupancy modes, which might make the shown temperature ranges appear more spread out than what was in fact tolerated by participants most of the time.

Real-time price participants were further offered the ability to choose comfort settings for their water heaters and thermostats. As has been described, this setting allowed the thermostat to place more or less emphasis on either comfort or economy, using the price fluctuations in the real-time price to avoid high-price consumption and encourage low-price energy consumption. A snapshot of the distribution of these comfort settings is shown in Table 8. The data query was based on $k_T$ values (see Table 7) only and was therefore unable to distinguish all comfort settings. The table also fails to distinguish those who selected the pre-heat and pre-cool option. The data query includes initial settings and changes in those settings that were requested by participants for any of their occupancy modes during the project. The distribution also does not weigh the comfort-setting distribution for the amount of time spent in each occupancy mode or its comfort setting. Most real-time contract participants maintained a balanced comfort setting intermediate between the extremes. Incidentally, this balanced setting was also the starting point assigned to all such participants' thermostats at the beginning of the experiment.

TABLE 8

Snapshot Summary of Real-time Contract Participants' Thermostat Comfort Settings

| No Price Reaction | Comfortable Economy/ Maximum Comfort | Balanced Economy/ Balanced Comfort | Maximum Economy/ Economical Comfort |
|---|---|---|---|
| 22% | <1%[a] | 67%[a] | 10%[a] |

[a]Table does not distinguish comfort setting modes with and without the pre-heat and While not bidding their value into the real-time market, real-time contract participants could configure their residential water heaters' comfort settings to be more or less sensitive to electricity price fluctuations. Among the 28 percent of residential participants on the real-time contract, 61 percent chose to use some water heater price response, as shown in Table 9. The numbers show the original comfort settings and all changes in comfort settings for any occupancy mode during the project. The comfort-setting distribution has not been weighted for the amount of time spent in each occupancy mode having these comfort settings.

By comparing Table 8 and Table 9, it can be seen that participants were relatively more tolerant of price control for their thermostats than they were for their water heaters. Perhaps even more real-time contract participants would have chosen price responsiveness for their water heaters had the project not encountered a water-heater control problem early in the experiment that caused multiple participants to thereafter disallow such control by the project. The water heater control issues were rectified, but participants did not thereafter retry the more aggressive control options.

TABLE 9

Snapshot Summary of Real-time Contract Participants' Water Heater Comfort Settings

| Maximum Comfort | Balanced Comfort | Balanced | Balanced Economy | Maximum Economy |
|---|---|---|---|---|
| 39% | 50% | 4% | 7% | 0% |

2. Network Performance

The project relied on two types of telemetry: (1) the broadband communication between the gateways and the project; and (2) the wireless telemetry of energy-management system data within a residential premise. The project collected data that permits it to address the reliability of the broadband "network" communications.

Figure 40:
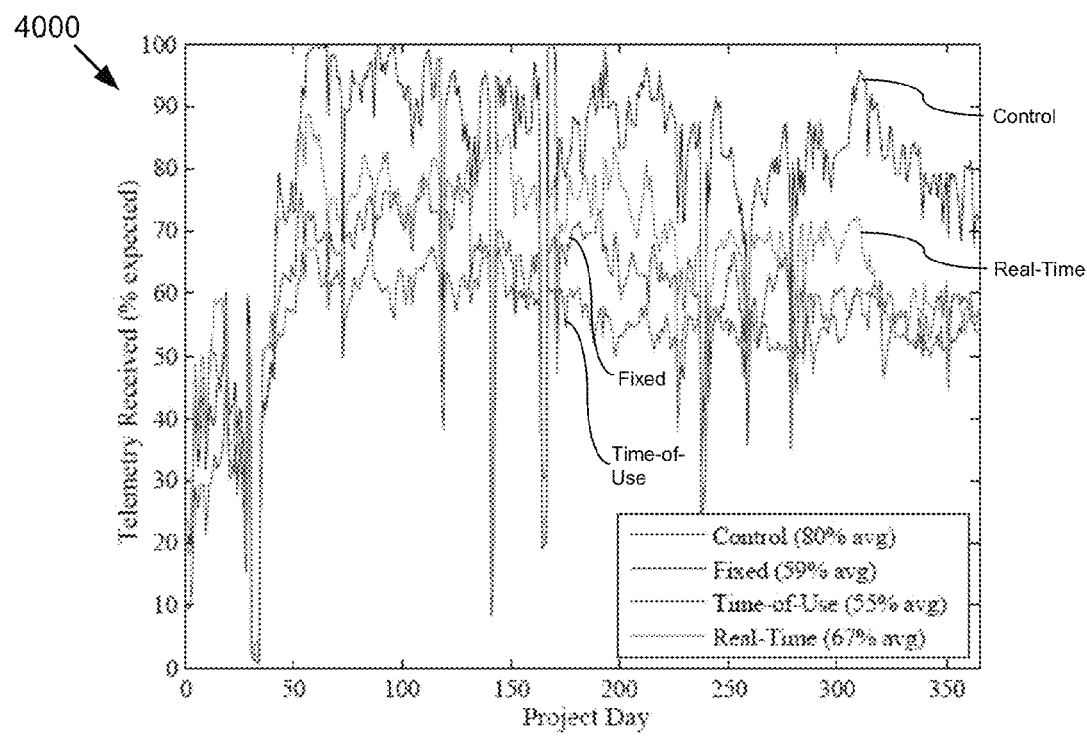
FIG. 40 is a graph showing network telemetry performance statistics during an experimental use of an embodiment of the disclosed technology.

The reliability of telemetry was essential to the proper operation of the real-time market because both the total unresponsive residential load and the individual real-time bids were dependent on the telemetry reports from participants' meters. Any meter not reporting load within the 5-minute period before market clearing was excluded from the virtual feeder load for that market. Graph 4000 of FIG. 40 shows the daily network performance for the duration of the project.

It can be observed that it took nearly two months at the beginning of the experiment to improve the communications to a steady level that was maintained thereafter throughout the remainder of the experiment. The reliability of the network communication of consumption, bid, and price signals ranged from about 55 to 80 percent, on average, for the four contract groups. The reliability of communications for the four contract groups clearly differs, but the causes for such differences cannot be easily assigned. The bandwidth communicated by the equipment of each contract type was similar.

3. Residential Incentives and Savings

Each residential participant's incentive account was re-filled at the beginning of each month. The participant's account balance was then diminished through that month commensurate with his energy consumption at his contract's energy price. The amount placed in each account each month was based on the participant's historical energy consumption for the year or two before the project. Because these accounts addressed only the marginal costs of energy, small changes in participants' behaviors and the weather caused wild fluctuations in account remainders. The project found it necessary to correct these account balances to adhere to the expectations it had communicated to residents at the beginning of the project and to stay within project incentive budgets. This problem would not have occurred had the project affected participants' total bills rather than only the marginal portion.

Figure 41:
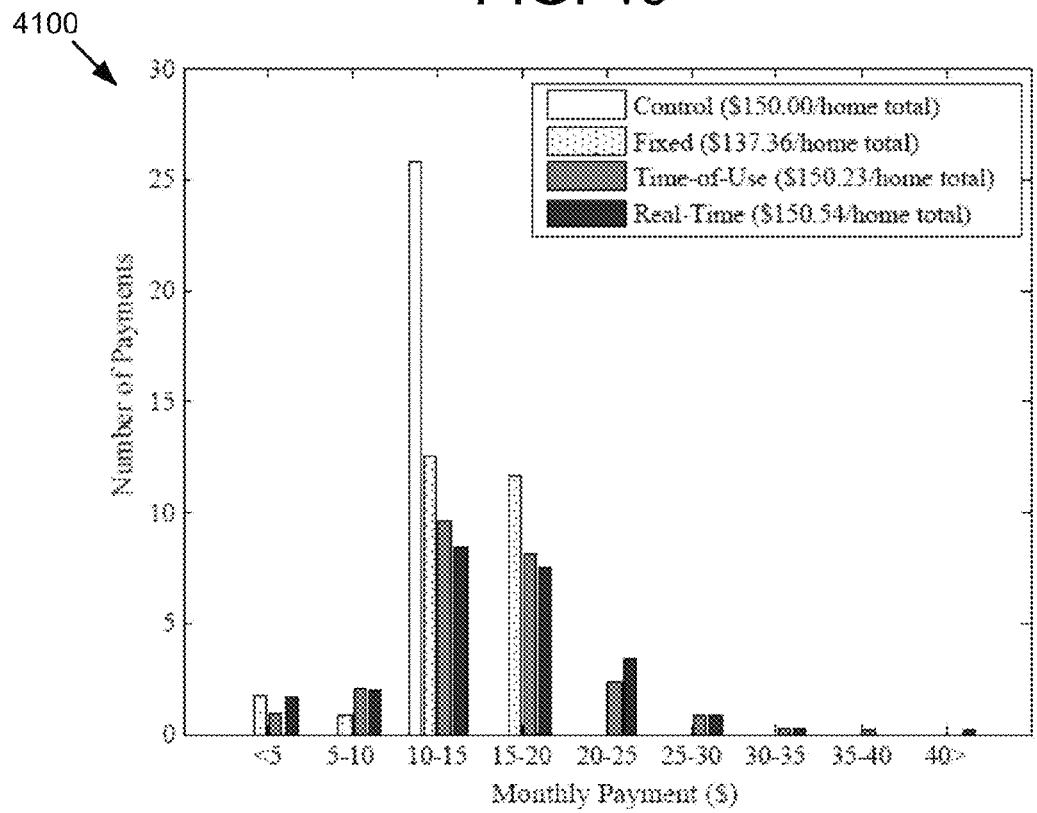
FIG. 41 is a graph showing monthly incentive payment distributions made to experiment participants.

In theory, the incentive payments should have been based strictly on the balance remaining after charges were deducted from the income given. However, in recruiting participants, the project had guaranteed that the average incentive payment for each contract type would be $150. Control-group members would have no opportunity to make more money, fixed-price members would have minimal opportunity based on overall reduction of energy consumption, time-of-use members would have moderate opportunity to make more money based on shifting their energy consumption to off-peak hours, and real-time members would have the most opportunity to make money by selecting aggressive economy options on their appliances. Graph 4100 in FIG. 41 shows the extent to which these goals were accomplished. Project analysis has not yet resolved why those in the fixed-price contract group appeared to receive less than the targeted $150. The average target incentive goal was hit by three of the four contract groups. The spread in participants' incentive payment distribution increased from control contract to fixed, time-of-use, and real-time price contracts.

Figure 42:
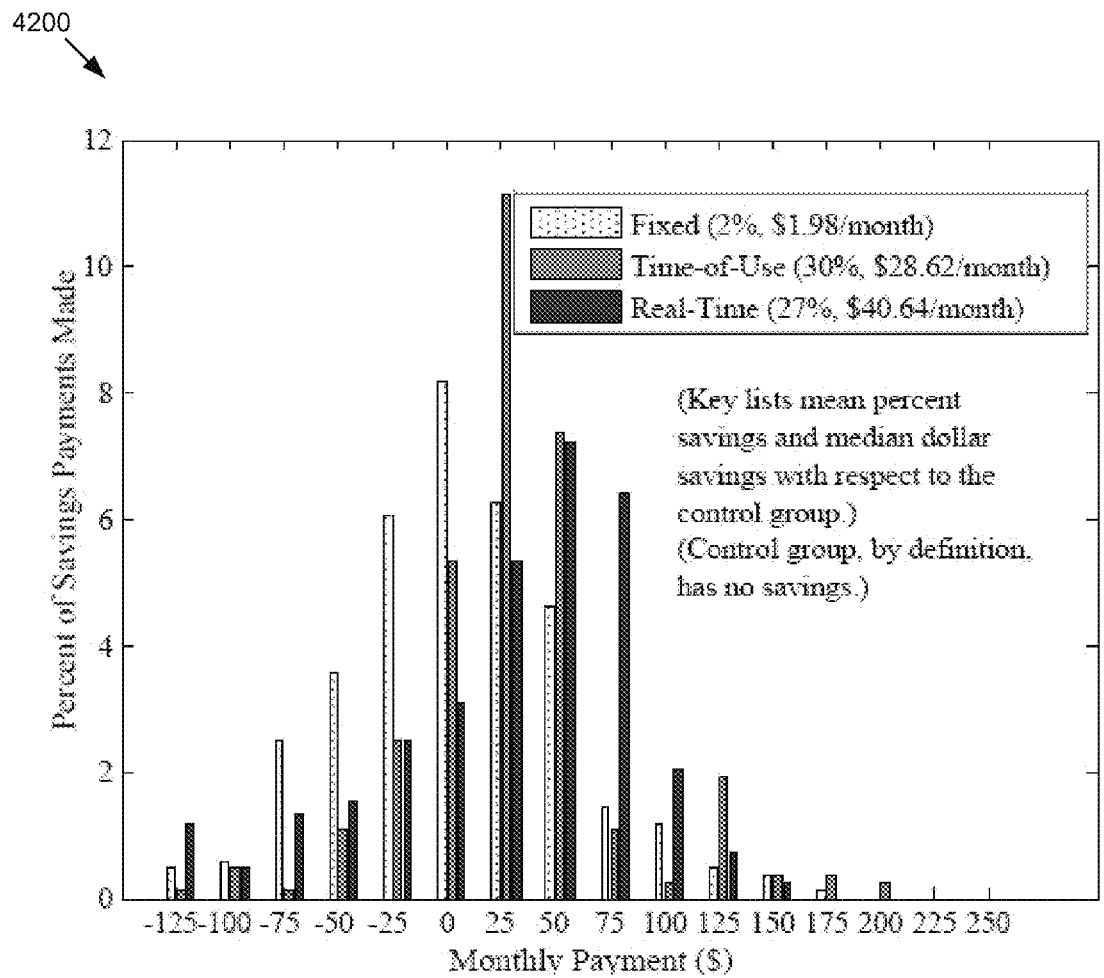
FIG. 42 is a graph showing monthly savings estimates by contract type for experiment participants.

The expected participant savings were estimated by computing the balance of the incentive income remaining after the energy charges were deducted. The incentive account starting balances, and consequently the savings, were computed based on each participant's historical energy consumption. Energy charges were computed using the contract type and the corresponding energy price for the energy consumed at that price. Therefore, a participant who used electricity exactly as he had the previous years and under his previous contract type should have realized no savings. This comparison from one pricing contract to a second is described in the industry as revenue neutral. See Graph 4200 of FIG. 42. Control-group participants, as the reference for this comparison, could receive no savings. Their project payments were not at all influenced by their energy consumption. Participants in the fixed-price contract received about 2 percent savings compared to the control group, the time-of-use group saved 30 percent, and the real-time price contract group saved 27 percent. It is interesting to note the skew in the distribution of real-time savings, with the average monthly savings being somewhat less than for time-of-use, but the median savings significantly greater than time-of-use participants' savings. This skew is probably caused by the significantly greater savings incurred by those individuals in the real-time contracts who selected the most economical appliance options compared to those who selected more comfort.

4. Utility Billing

Although participants received only incentive checks, the project collected energy price and usage data necessary to produce a model of the revenue stream for a fictitious utility serving the project's virtual feeder.

Figure 43:
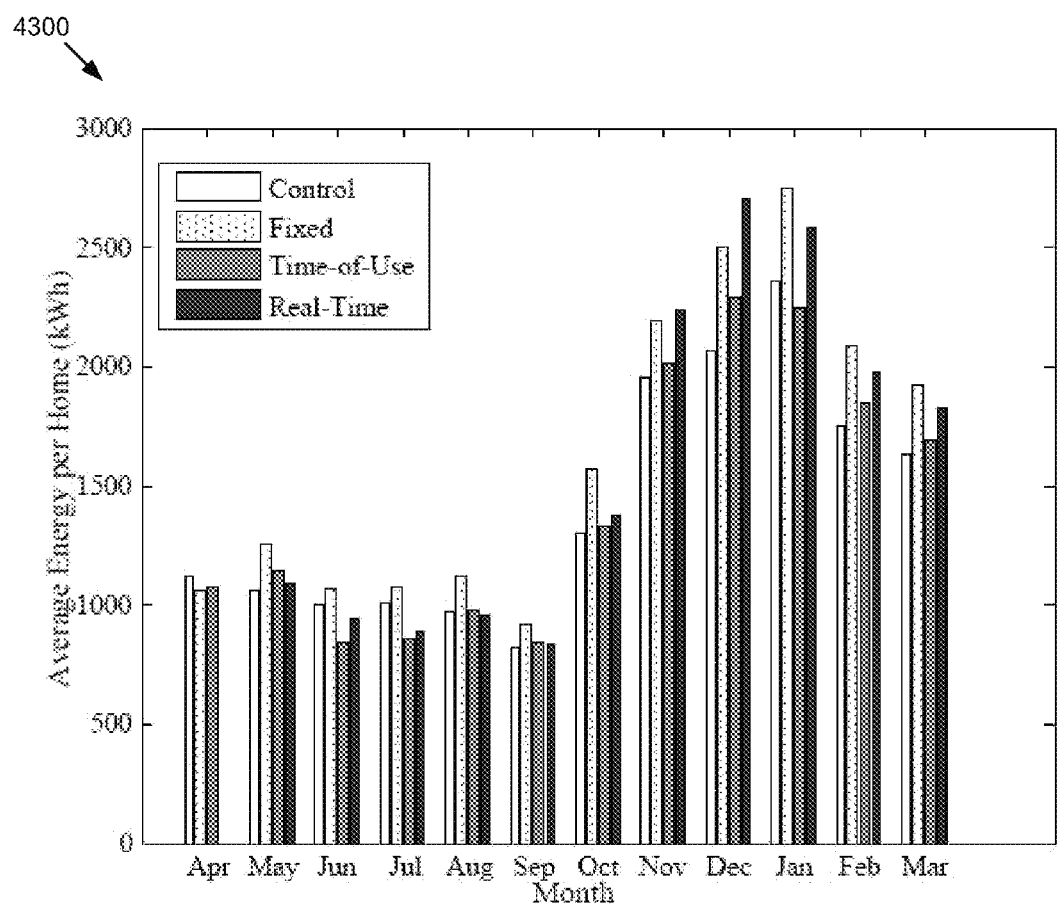
FIG. 43 is a graph showing average monthly energy use for experiment participants.

Energy consumption peaked during the winter months, and energy use was roughly equally distributed over the four contract groups, as seen in graph 4300 in FIG. 43. Note that real-time group members were effectively assigned to the control group early in the project during April because of initial operational problems with the real-time thermostat controls.

The differences in mean energy consumption between the contract groups were small but measurable (Table 10). Time-of-use contract members consumed less energy, on average. The real-time and fixed price contract groups used successively more energy. The variances of these measurements were large. A pair-wise signed-rank test conducted on this data confirmed all groups' energy consumption were statistically different at a 5 percent confidence level or higher.

Figure 44:
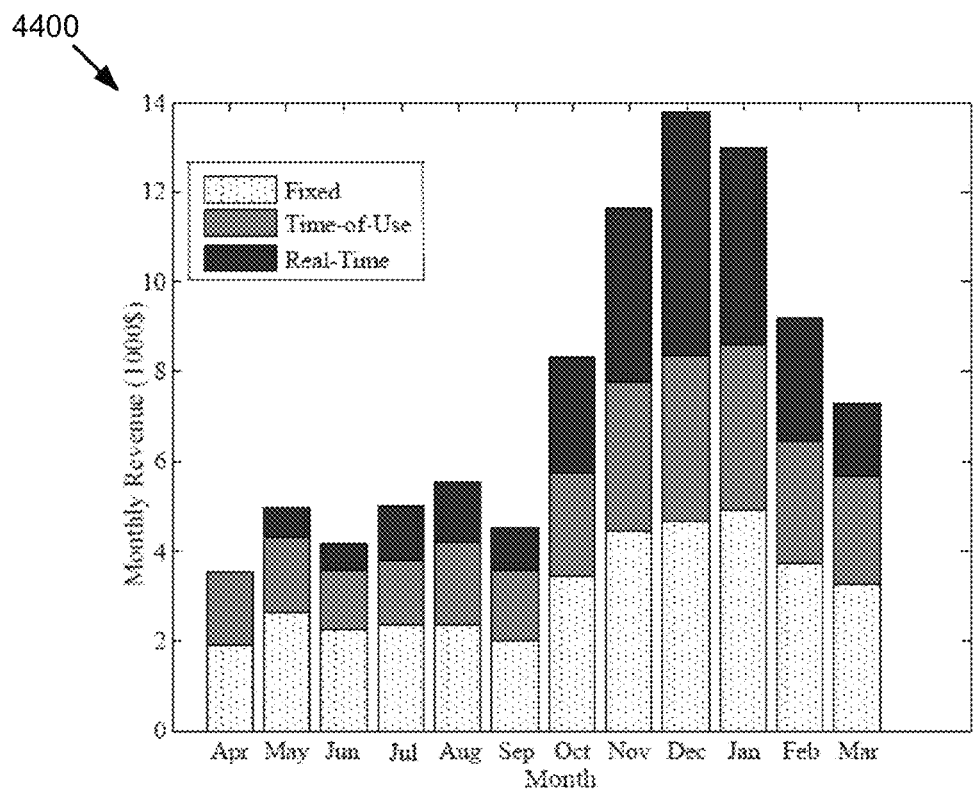
FIG. 44 is a graph showing monthly utility revenue by contract type for experiment participants.
Figure 45:
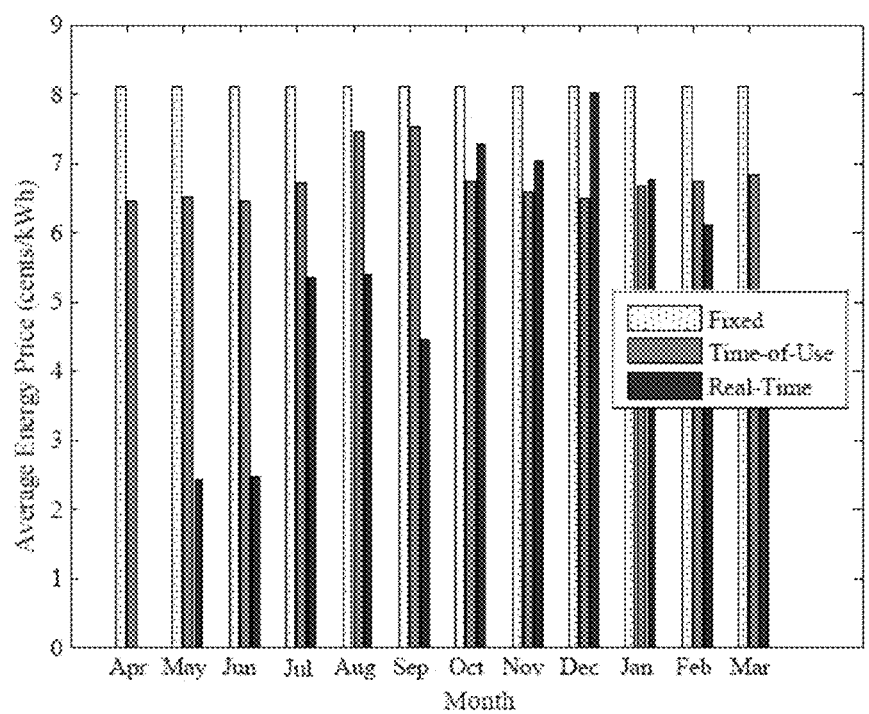
FIG. 45 is a graph showing average monthly energy prices by contract type for experiment participants.

All participants paid more for electricity in winter months (graph 4400 in FIG. 44). However, participants on the real-time price contracts paid both proportionally more and more on the basis of average energy price (shown in graph 4500 in FIG. 45) than did their counterparts having other contract types. Graph 4500 in FIG. 45 further suggests that at least one of the initial project contract price estimates had somewhat missed its mark. The average real-time retail price probably should have exceeded the fixed price during the winter months. It did not.

TABLE 10

Mean Daily Energy Consumption per Home (April to December)

| Contract Type | Mean daily energy Consumption | Standard Deviation (kWh) |
| --- | --- | --- |
| Control | 47 | 24 |
| Fixed | 49 | 22 |
| Time-of-use | 39 | 29 |
| Real-time | 47 | 26 |

5. Effect of Wholesale Energy Price

The project adopted the MIDC wholesale price as the base of its dynamic local marginal price. This price was received by the project by subscription to a Dow Jones service.

Because the price was published one day later for the hourly closing prices on the previous day, this price was necessarily projected forward and used as if it were available hourly without delay. Recall that the project's local marginal price was roughly equivalent to this wholesale price most of the time, whenever the project virtual feeder operated well below its distribution constraint capacity.

Figure 46A:
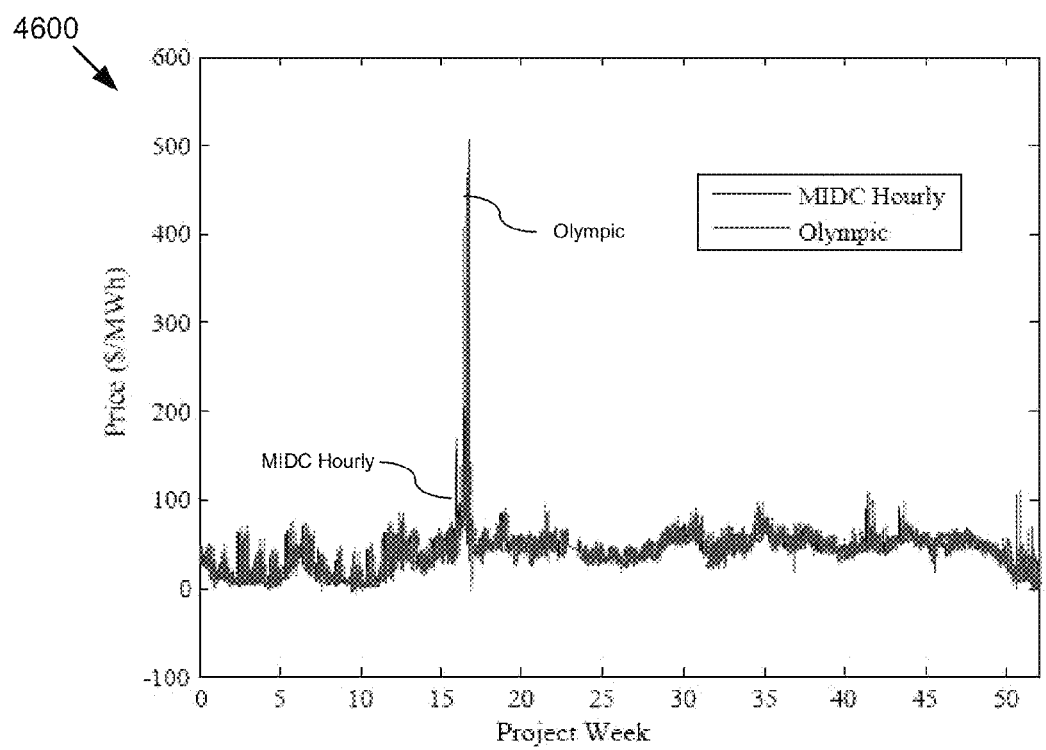
FIGS. 46A through 46D are graphs showing MIDC wholesale electricity price behavior during an experimental use of an embodiment of the disclosed technology.
Figure 46B:
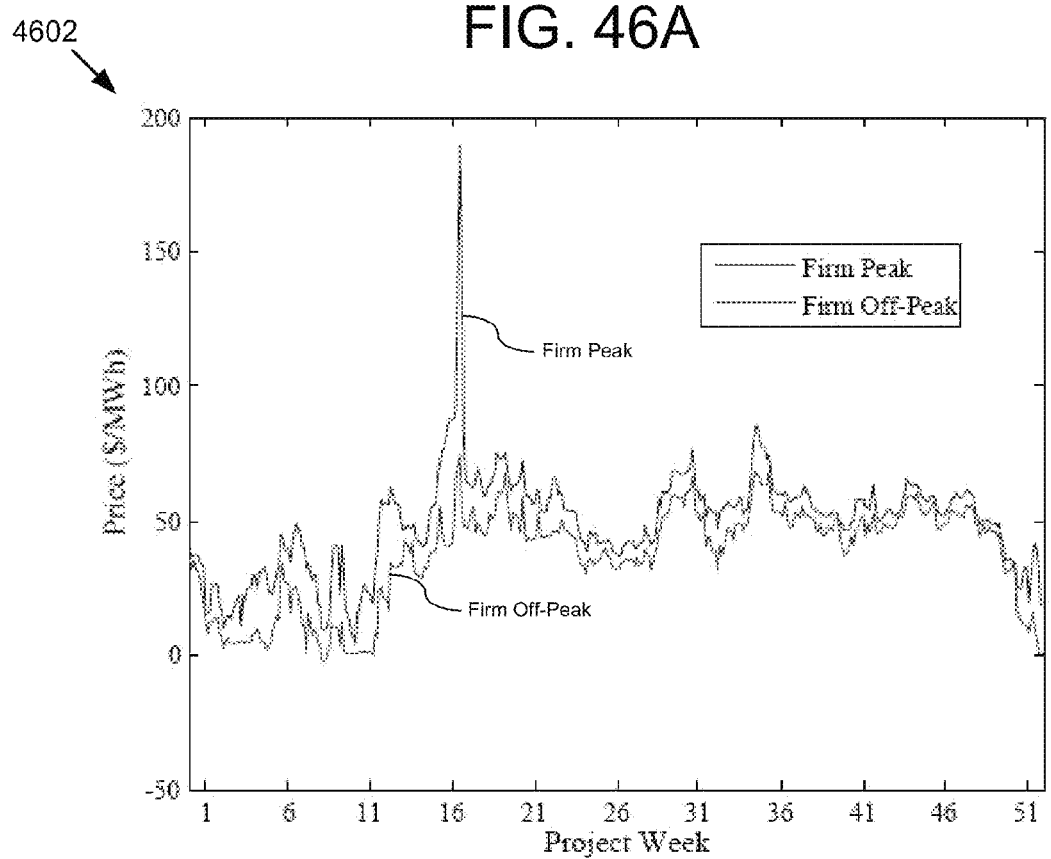
Figure 46C:
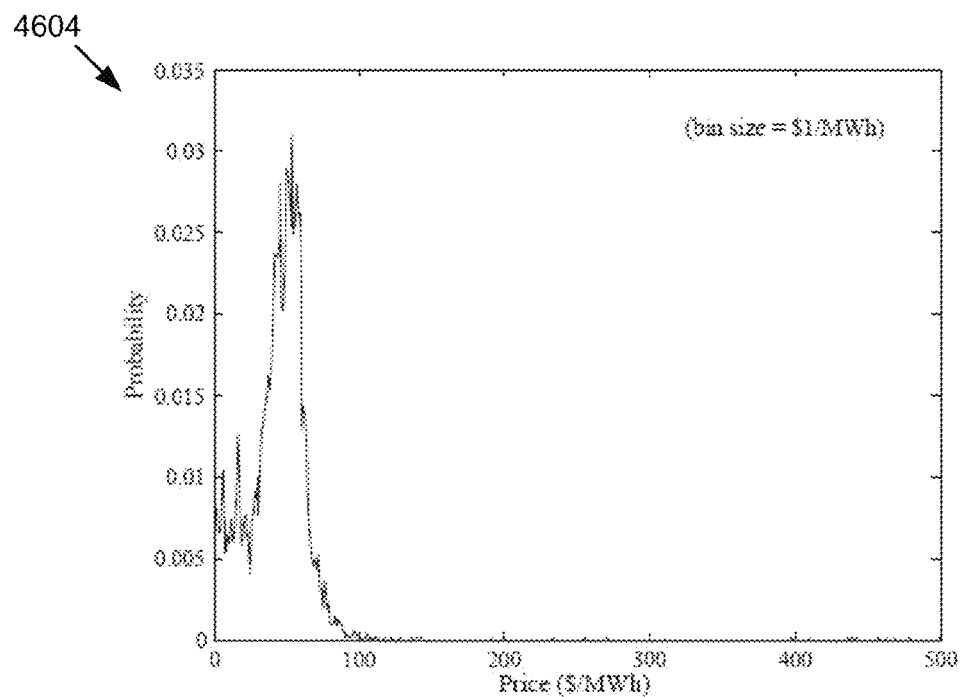
Figure 46D:
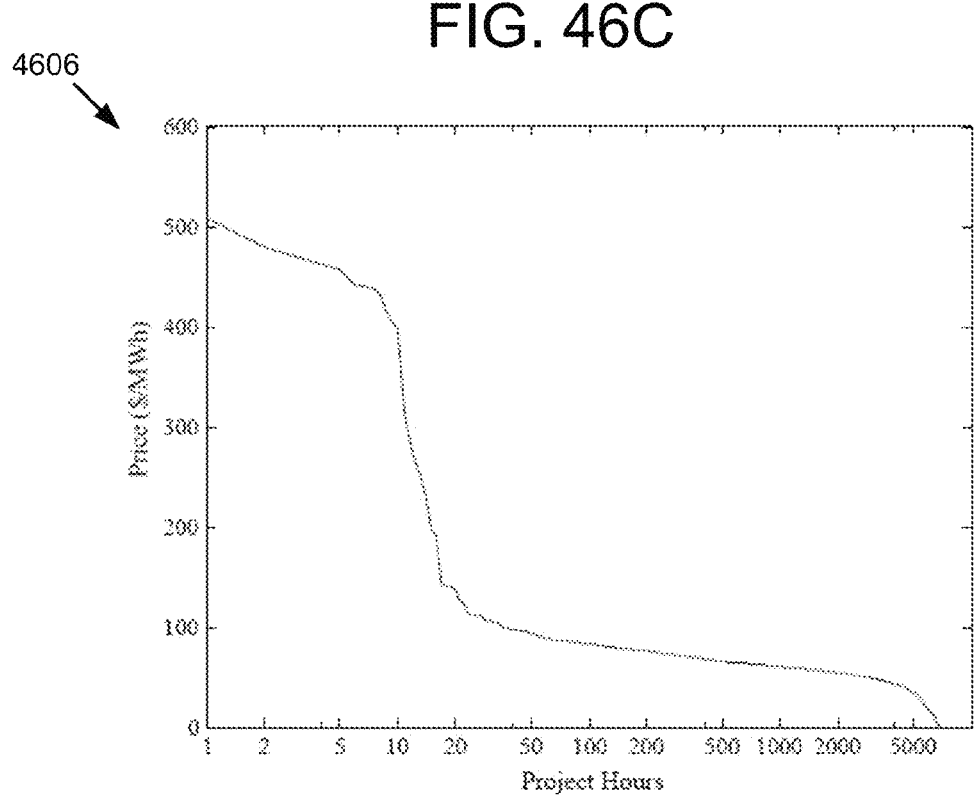

Graphs 4600, 4602, 4604, and 4606 in FIGS. 46A-D summarize the wholesale-price behaviors during the project. The dynamics and some longer-term trends in the wholesale price can be observed, but the MIDC wholesale price was most frequently near $50/MWh. The price is seen to shoot above $400/MWh briefly near the $270^{th}$ day of the experimental period, and, at the other extreme, the price did indeed fall to and remain near zero at times. The price duration curve of graph 4606 in FIG. 46D is very flat just above the price of $50/MWh. The wholesale price was significantly elevated for only about 20 hours of the year. While most project market price control was asserted to manage the local feeder constraint and thereby improve the efficient use of the local infrastructure, it should be observed that the project's market also necessarily responded to these few hours of high wholesale price, which, one would assume, addresses more global grid-wide system efficiencies and constraints. The observed dynamic behavior of the wholesale prices, even without the additional congestion-management values added by the project's market and local marginal price, suggest that utilities and their customers might reap market rewards by tracking even wholesale price signals if they can be communicated to utilities and customers promptly.

6. Residential Load Shapes

Figure 47A:
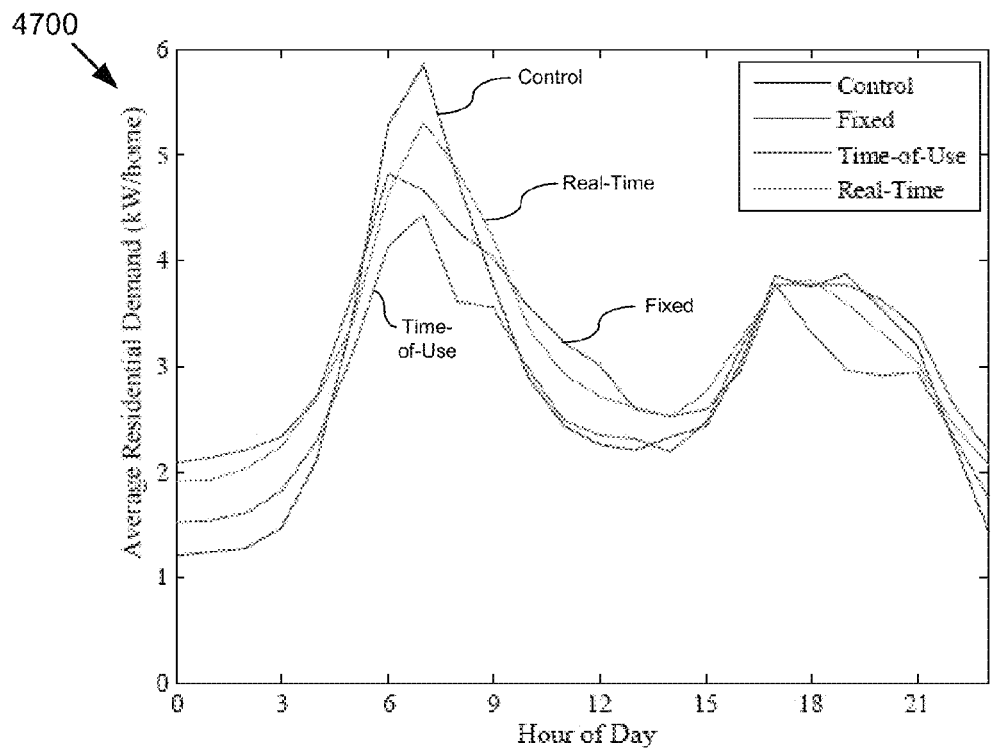
FIG. 47A shows daily firm wholesale power prices.
Figure 47B:
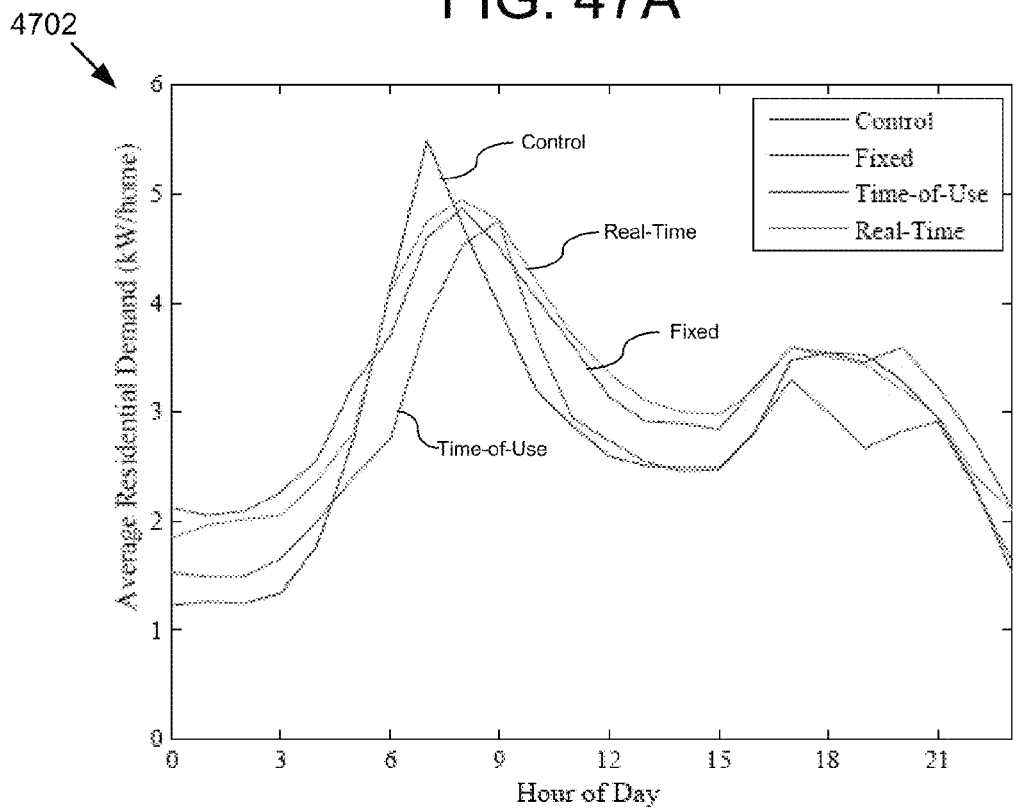
Figure 47C:
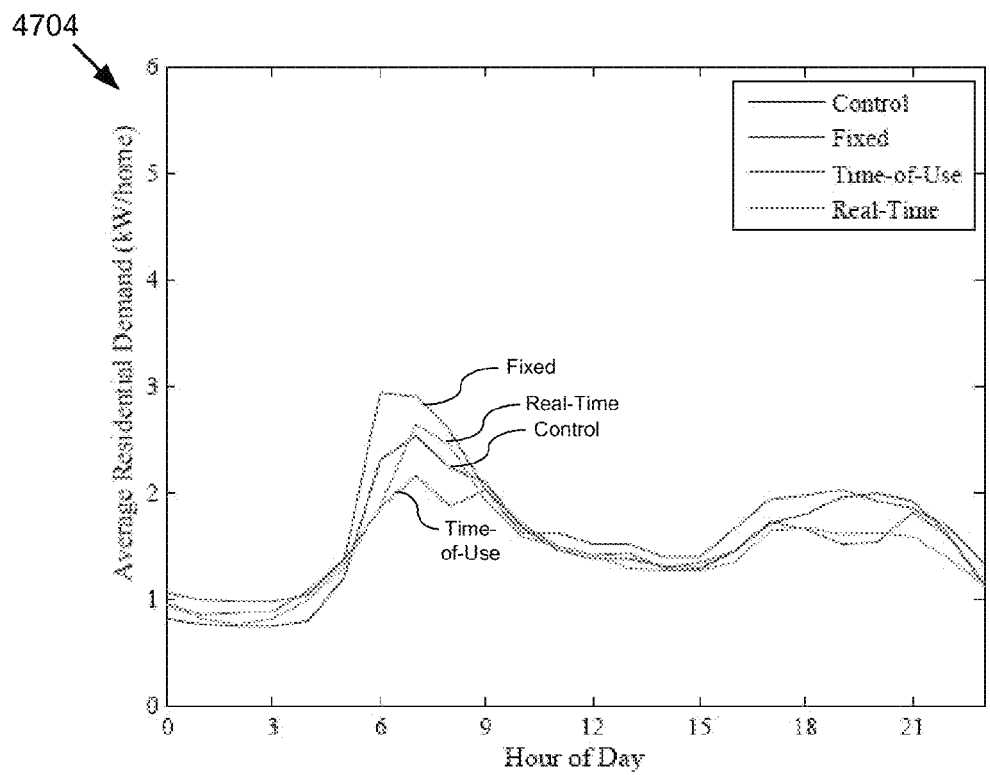
FIG. 47C shows a wholesale price probability distribution.
Figure 47D:
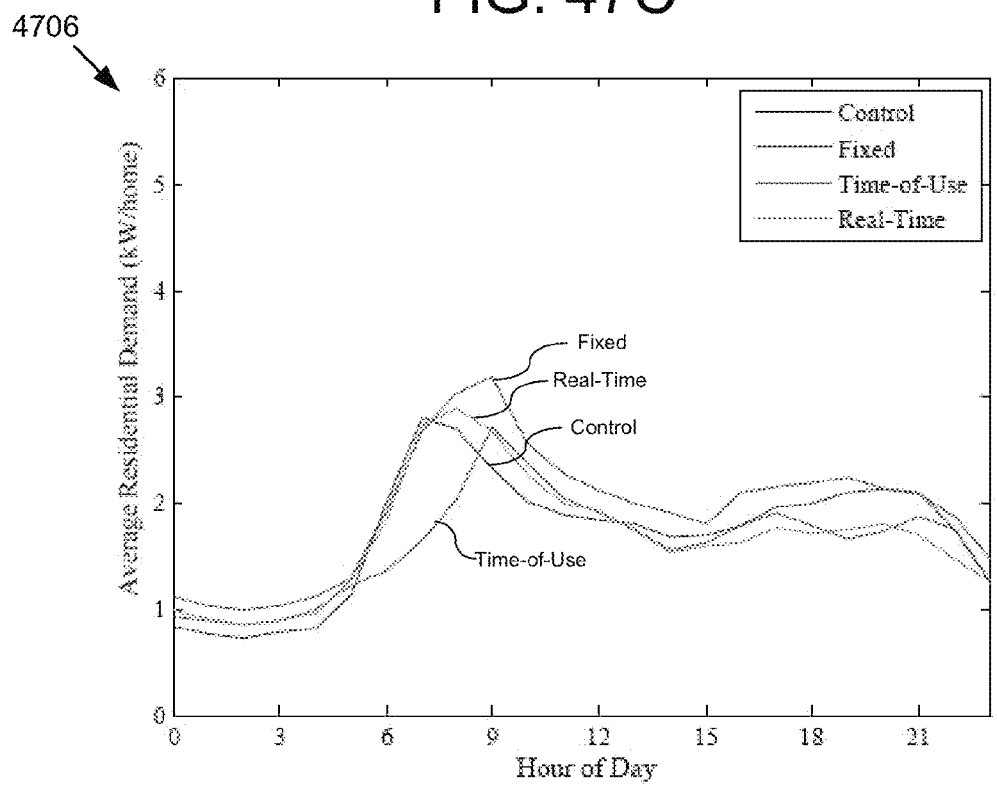
FIG. 47D shows a wholesale price duration distribution.
Figure 47E:
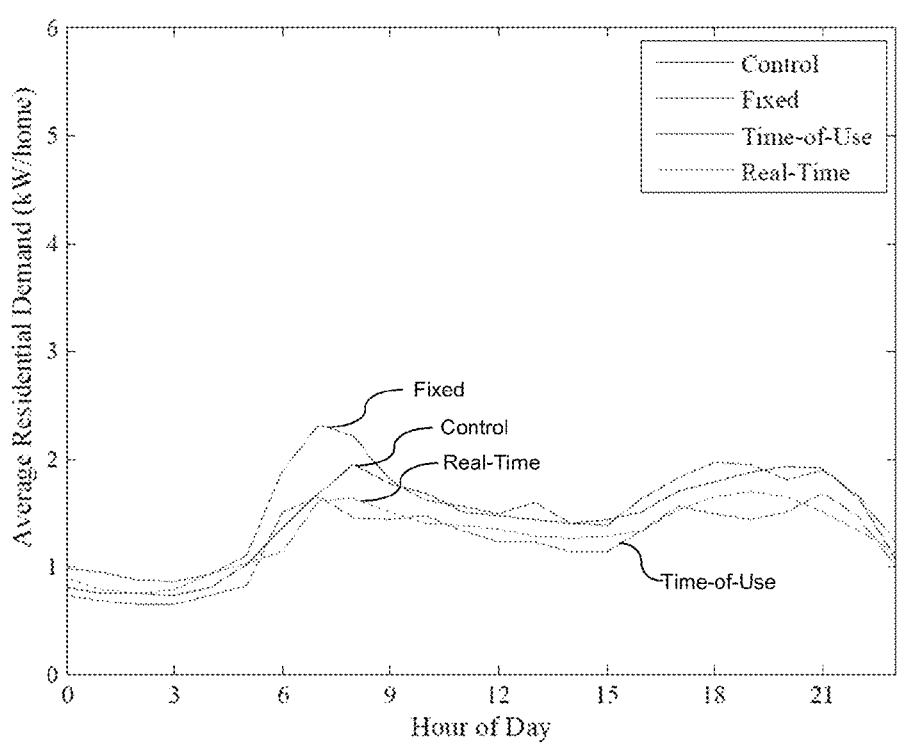
FIG. 47E is for a summer weekend.
Figure 47F:
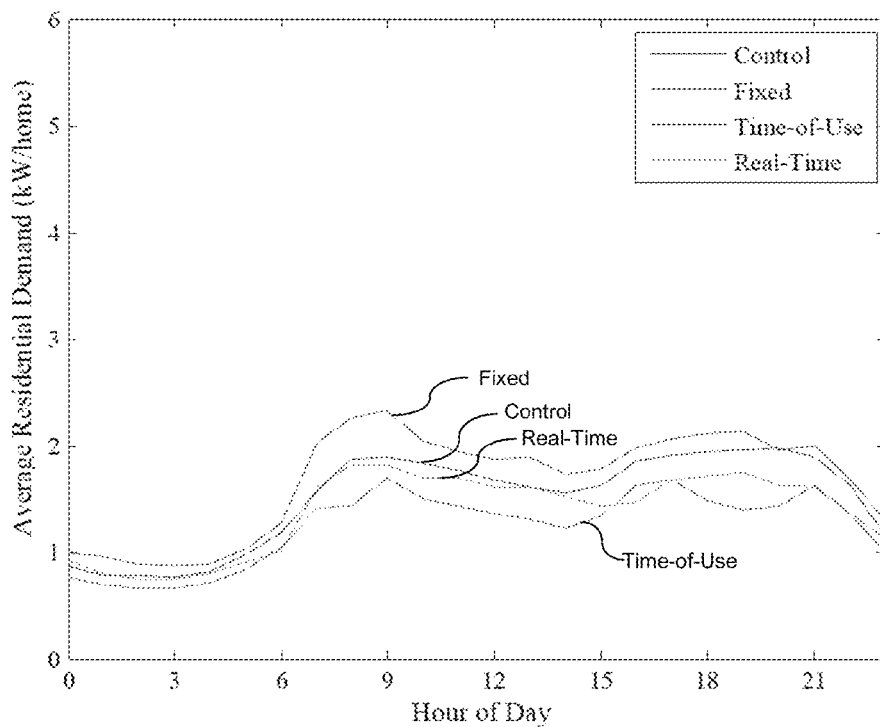
FIG. 47F is for a summer weekend.

Residential participant load behavior was affected by participants' choices of contract. The load shapes for project participants' residences are shown in graphs 4700, 4702, 4704, and 4706 of FIGS. 47A-D, where separate figures are presented for the four seasons. "Winter" refers to January through March, "spring" refers to April through June, and so on. The figures are also separated out to show weekday (Monday through Friday) behaviors and weekend (Saturday and Sunday) behaviors. No special efforts were used to eliminate from these figures or report load behaviors for holidays. Additional load shapes are shown in graphs 4708 and 4710 in FIGS. 47E and 47F.

It is no surprise that these Northwest residential loads demonstrate winter peaking with two distinct daily peaks. The largest peak occurs at about 7:00 AM, and the second, smaller peak, occurs at about 6:00 PM.

Small differences in these load shapes for the entire residential load can be seen for the behaviors of the various contract types. Time-of-use was most effective at reducing peaks for entire residential loads. Indeed, the difference in the time-of-use rate between peak and off-peak rates was a factor greater than 5 and earned a significant response. Time-of-use control, however, resulted in abrupt, not smooth, load changes during the start and end of the peak intervals, which were applied to the population at the same time, the effect of which could be detrimental. Furthermore, the fall weekend day graph shows that the improper assignment of the peak interval (people awaken later on the weekend) can perhaps exacerbate rather than reduce the peak, making it more pronounced, albeit delayed.

The real-time contract load behavior is perhaps smoothest. The fact that the real-time price control is active only when it is most needed implies that, on average, the real-time price control would not and did not result in the lowest average peaks. Evidence will be provided later that the real-time price control strategy was, nonetheless, effective at reducing congestion peaks when it was important to do so.

Figure 48A:
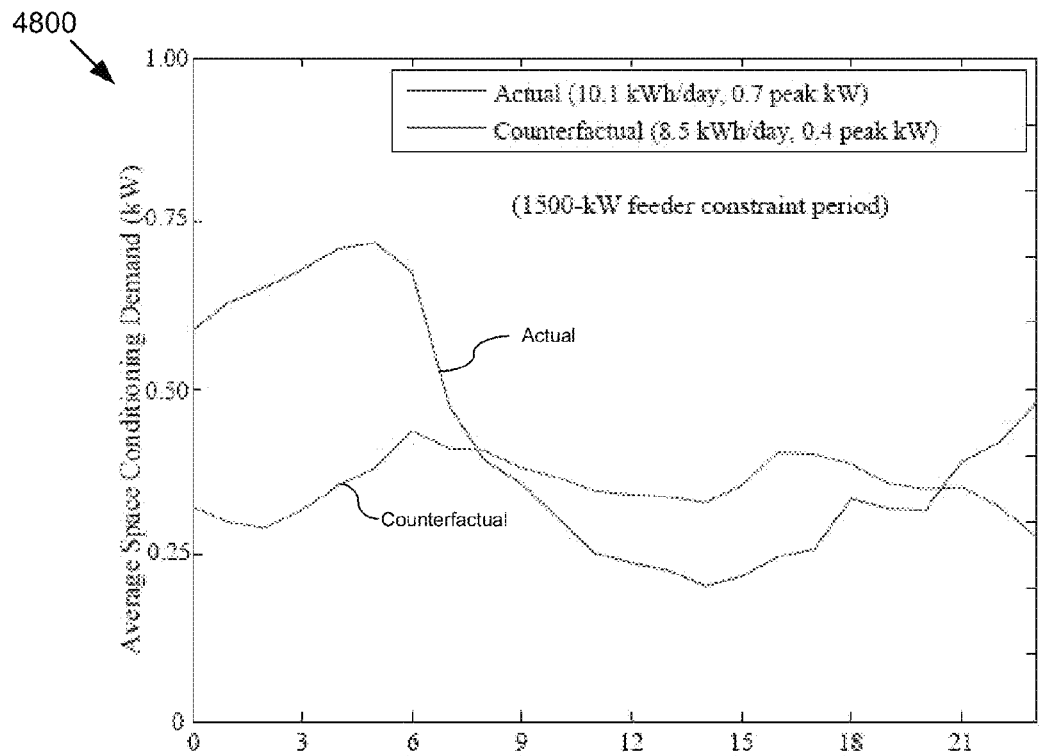
FIGS. 48A through 48B are graphs showing real-time market shifting of a thermostatically controlled residential load as was experienced during an experimental use of an embodiment of the disclosed technology.
Figure 48B:
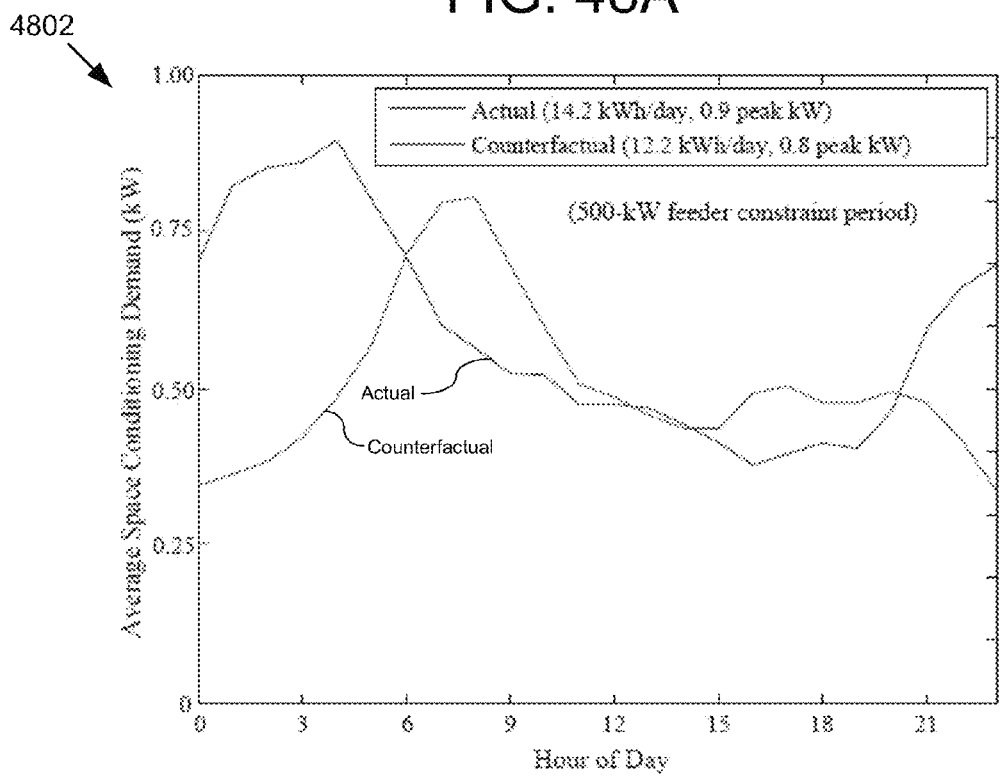

The real-time contract group had a shifted load shape for its thermostatically controlled space conditioning that was directly responsive to market price. Graphs 4800 and 4802 of FIGS. 48A-B show the actual and counterfactual thermostat loads for thermostatically controlled space conditioning of real-time contract homes during the most- and the least-constrained periods of feeder control. Because all participant bids for real-time price contracts were recorded when the market cleared, both the actual and counterfactual energy could be computed for each market period. The actual energy is the power cleared multiplied by the 5-minute duration of the market. The counterfactual energy is the energy that would have been used had the market cleared at the average, not the cleared, price (with a zero price deviation). Therefore, the counterfactual energy is defined as the market interval multiplied by the sum of each power that each customer would have consumed had the price not deviated (had the market cleared at the average price). The counterfactual load curves of FIGS. 48A-B show credible heating load behavior and also the anticipated behavior of space conditioning during the constrained fall period. However, the real-time market price induced an interesting shift of the thermostatically controlled load whether feeder supply was being constrained or not.

When demand was high and the system was constrained, the shift of real-time demand to off-peak hours was significantly larger because of the large local marginal market price differential between off-peak and peak hours. Recall that the real-time price contract tracks a daily average local marginal price and therefore allows, or even encourages, energy consumption in the early morning when daily prices are lowest. Some participants selected comfort settings that further exaggerated this shift by pre-cooling or pre-heating their homes by up to 3° F. when market prices were much below average. This shift occurred on both constrained and unconstrained days. On unconstrained feeder days, price volatility moderated, and the thermostats (responding to numbers of price standard deviations above or below the average price) became increasingly sensitive to smaller diurnal price variations. While the transactive control design did not explicitly predict future price, the diurnal nature of the price itself effectively induced opportunistic pre-heating or pre-cooling more successfully than the project had anticipated. Other strategies do not use off-peak energy as effectively as real-time price-responsive demand does, and therefore, the real-time controllers used more energy during those off-peak hours when electricity happened to be a bargain.

While interesting, the energy consumption shift exhibited by these thermostats was insufficient to visibly shift the load curves for entire RTP contract homes. The heating energy cleared through the bidding process was only a fraction of what might be anticipated for the heating loads of these homes. Thermostats using "no reaction" occupancy modes, for example, did not bid and would therefore have diluted the average energy consumption of the RTP thermostat population.

The only consistently measurable energy-use impact that can be observed is the energy-use reduction of time-of-use participants during peak hours. The real-time price energy reduction only occurs during actual peak conditions and cannot be easily discerned in the aggregate load shape, which includes both peak and non-peak load conditions. In contrast, the peak time-of-use price signal is applied during certain hours of a day, oblivious to whether electricity truly becomes constrained during that period.

7. Commercial Load Shape

Figure 24:
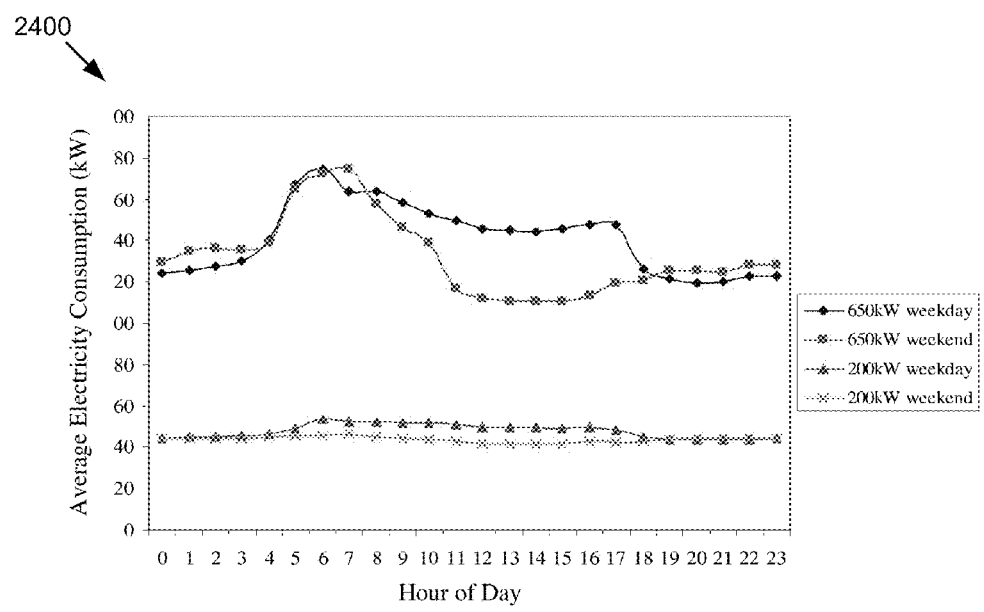
FIG. 24 is a graph showing the average site loads by hour of day for the experiment shown in FIG. 21.

Graph 2400 of FIG. 24 shows the load shapes for the MSL buildings. The MSL buildings are office and laboratory facilities with a relatively constant load through each day. Some variation, caused by facility occupancy, was shown between weekdays and weekends. The shown load shapes were not broken down by season. Some seasonal variation would be expected, of course.

8. Feeder Capacity

Figures 49A, 49B:
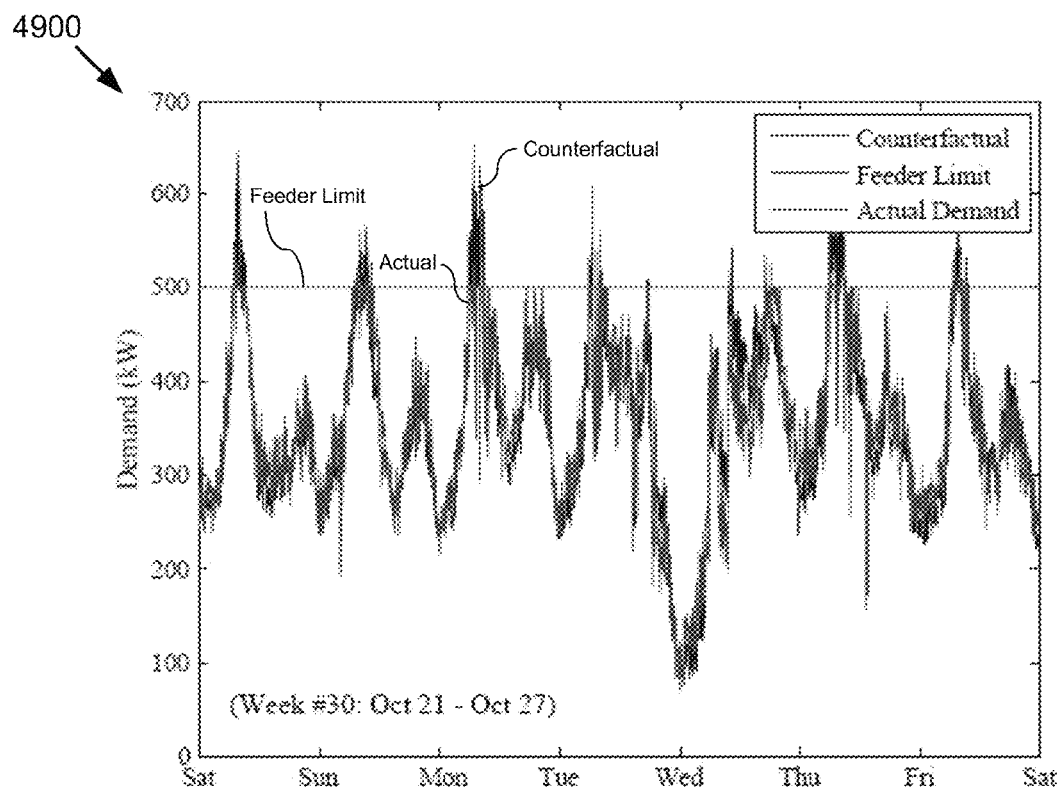
FIGS. 49A and 49B are graphs showing served and managed distribution load during an experimental use of an embodiment of the disclosed technology.

The virtual feeder capacity constraint was varied two times throughout the project to explore the responses of residential and commercial, supply and demand, feeder resources operating under different feeder supply constraints. The feeder constraints are summarized in Table 11. One of the most interesting periods of feeder activity was observed during late October when the feeder capacity was at its lowest value relative to total feeder demand. Graph 4900 and 4902 of FIGS. 49A-B show feeder demand during two such weeks.

The counterfactual demand was deduced by examining the loads' bids. Knowing the bid strategy used to generate bids and knowing the control strategy used to manage the device load, one can deduce what the prevailing conditions were at the time the bid was generated. From this, it can be inferred whether the device would have been running were the real-time price and market feedback unavailable (i.e., if the load were responding to an immutable, average price.)

It can be seen in week 30 (FIG. 49A) that whenever the counterfactual demand exceeded the feeder capacity, the actual demand was held down for a time, either until system demand decreased or until the economic incentive to start the first distributed generating unit overcame the cost of starting it. At this time, the sum of feeder capacity and distributed generation was temporarily allowed to exceed the feeder limit. It can be seen in week 31 (FIG. 49B) that this process can result in flat demand for extended periods, with the demand tracking the available generation, rather than the other way around.

TABLE 11

Summary Application of Distribution Capacity

| Dates | Capacity (kW) |
|---|---|
| 1 Apr-22 Sep | 1500 |
| 22 Sep-8 Dec | 500 |
| 8 Dec-31 Mar | 750 |

Figure 50A:
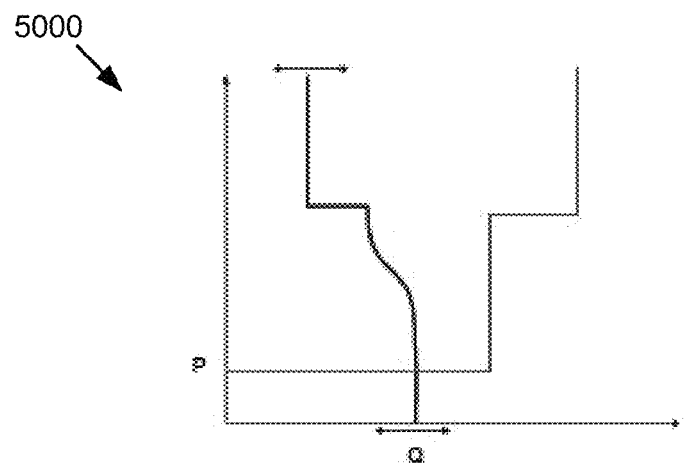
FIGS. 50A through 50C are graphs showing how real-time price can flatten load.
Figure 50B:
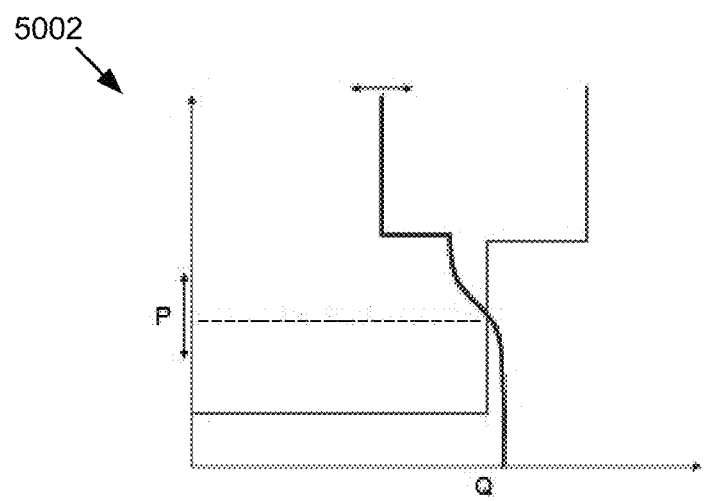
Figure 50C:
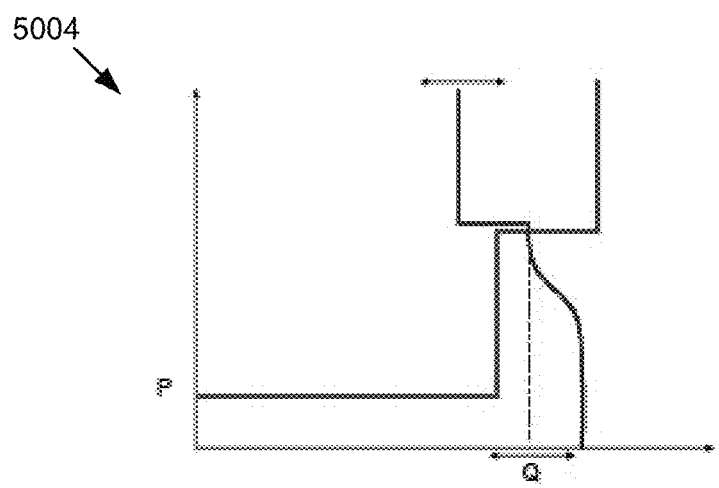

This phenomenon can be easily explained by considering how the actual demand is determined by the real-time market. When the demand is very low, the feeder itself is the marginal energy supplier, and the local marginal price is set at the feeder's bid price-very near the wholesale energy cost. Under these conditions, the load fluctuates while remaining below the feeder capacity, and the price remains constant, as shown in graph 5000 of FIG. 50A. However, as the demand increases, the consumers become the marginal resources, and the feeder is run at capacity, as shown in graph 5002 of FIG. 50B. Under these conditions, the price fluctuates, but the load remains constant. If the demand continues to increase, then at some point, the real-time price raises high enough to start the first distributed generating unit, which then becomes the marginal supplier. This returns us to the previous condition where the price is constant, but the load fluctuates, as shown in graph 5004 of FIG. 50C.

Figure 51:
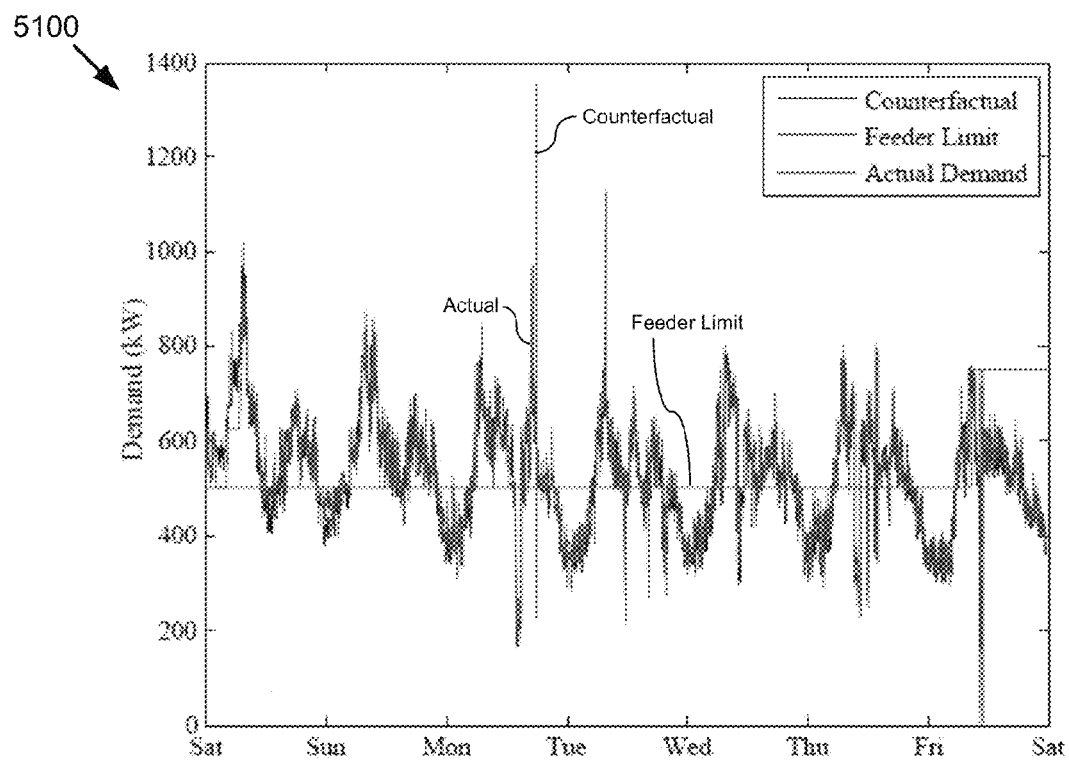
FIG. 51 is a graph showing distribution operations during critically constrained feeder conditions during an experiment use of an embodiment of the disclosed technology.

It is interesting to note the decreased effectiveness of the real-time price control when severe weather conditions made demand less capable of responding to price, as was the case during week 36, shown in graph 5100 of FIG. 51. In this case, there were comparatively fewer satisfied loads bidding on the demand side, and this resulted in much closer tracking of the actual to counterfactual demands.

This illustrates the need to have a substantial amount and diversity of loads that can follow real-time prices under extreme weather conditions. There must remain enough satisfied load that can respond to increasingly high prices under constrained supply conditions. Indeed, the severity of the demand-response shortage can be seen when the feeder capacity was increased on Friday. Immediately after the relaxation of the feeder constraint, the load exceeded the counterfactual demand for nearly half the day until normal operating conditions were restored.

9. Project Peak-Load Reduction

Figure 52A:
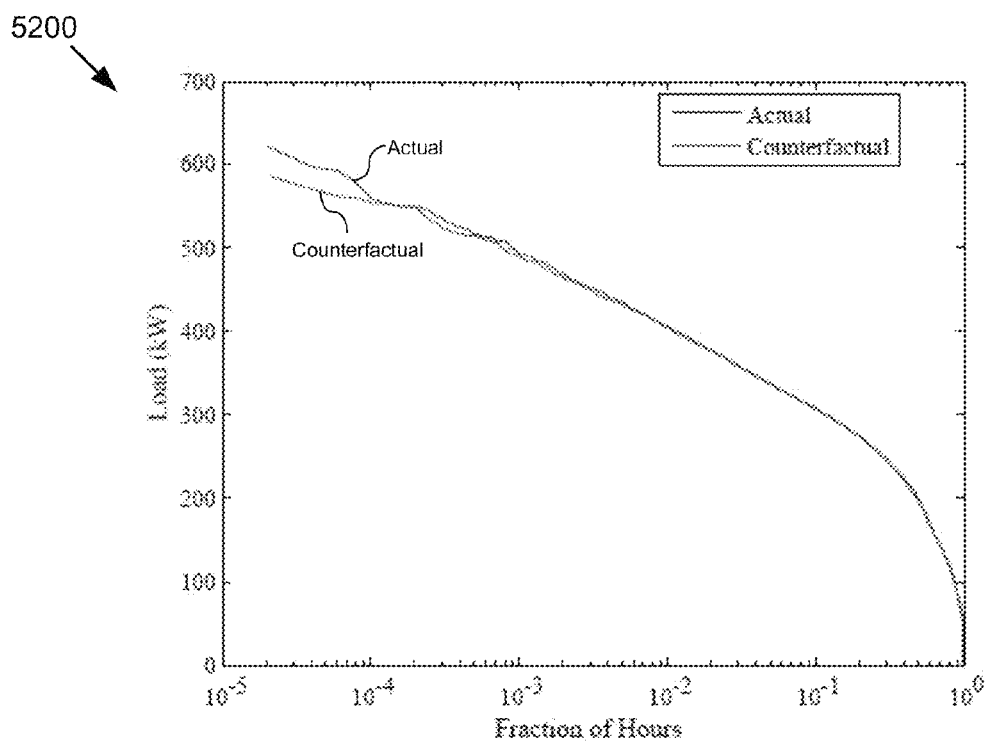
FIGS. 52A through 52C show feeder load duration curves as were experienced during an experimental use of an embodiment of the disclosed technology.
Figure 52B:
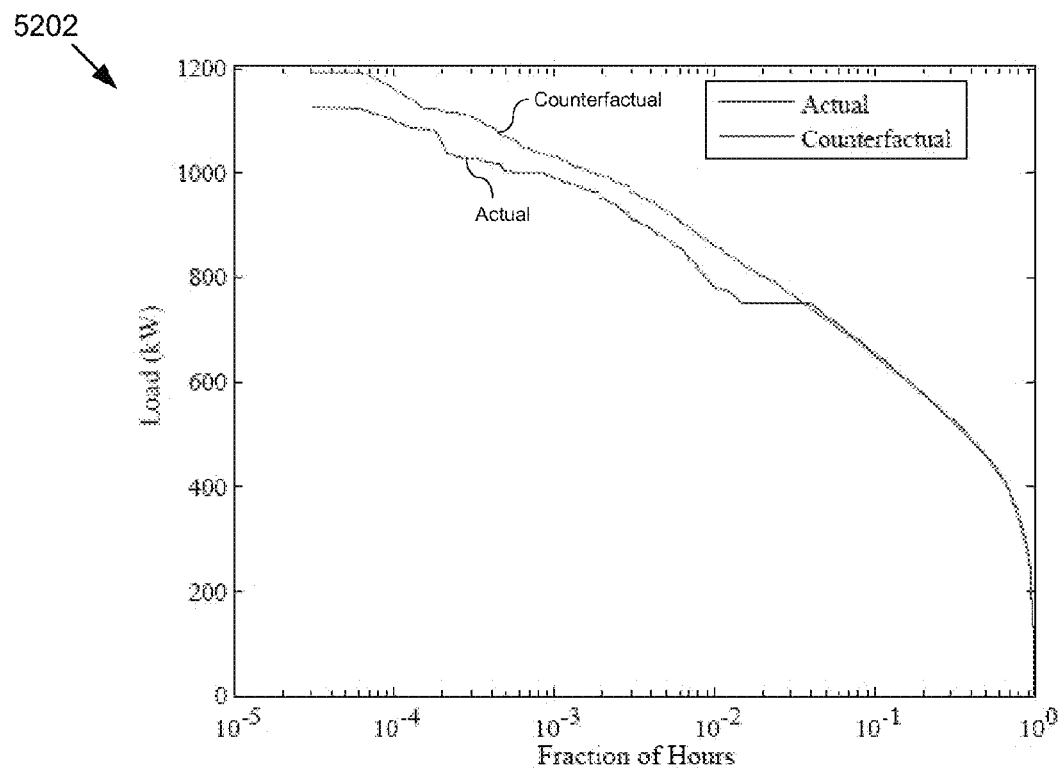
Figure 52C:
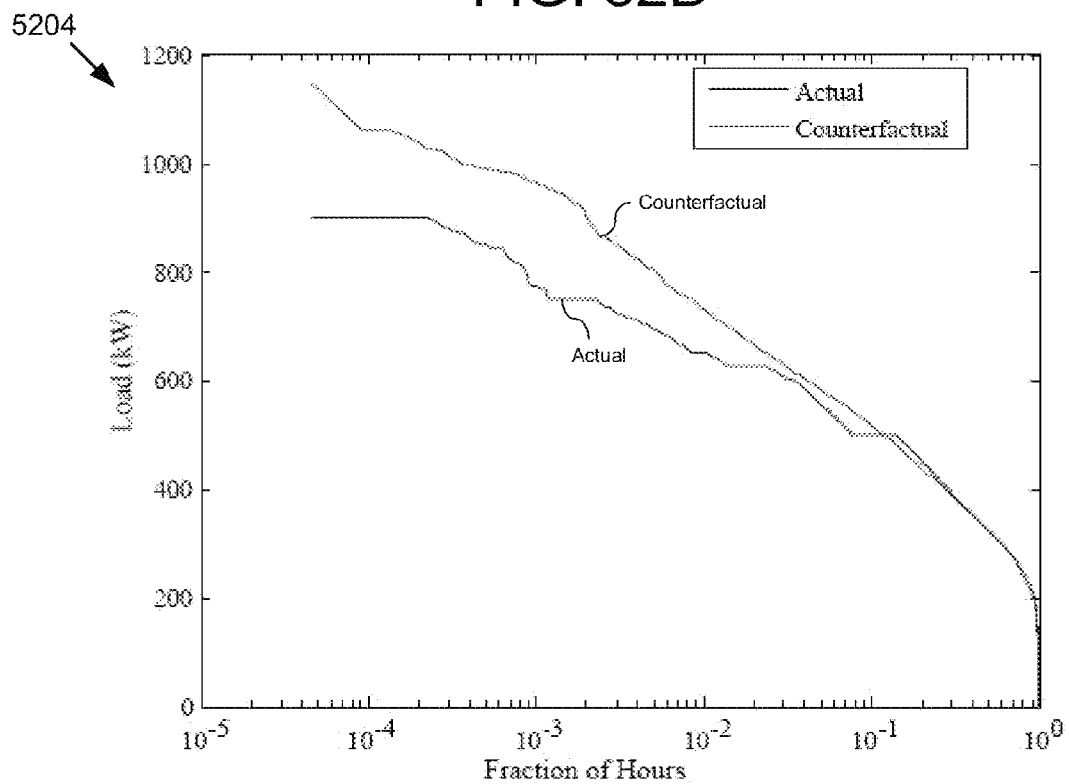

One interesting figure of merit for the project is the actual reduction in peak load observed during the experiment. Graphs 5200, 5202, and 5204 of FIGS. 52A-C provide an interesting estimate of effective peak-load reduction during each of the three imposed feeder constraints. The separations between the actual and counterfactual curves become increasingly greater near the peak load (toward the left of each graph) and for the progressively more constrained feeder operating conditions from 1500 kW (FIG. 52A) to 500 kW (FIG. 52C). A plateau occurs in the actual load curves at each respective constraint magnitude, where load is actively being deferred to manage the feeder constraint. The widths of these plateaus represent the duration for which the loads acted as marginal market resources reducing capacity and holding the local marginal price constant near the wholesale price. Operation to the left of these plateaus eventually required that distributed generators be included into the generation mix. Other plateaus appear where the loads are perhaps managed as marginal resources, again to avoid calling upon second or third distributed generators to run. The reduction of peak load appears to have been about 5 percent for the 750-kW constraint period and up to 20 percent for the 500-kW constraint period. According to these load-duration graphs, there was about a 5 percent increase in "peak" load for the 1500-kW unconstrained period, a result which the project cannot yet explain.

The power flowing through the feeder distribution line divided by how much power would have flowed through the line had the demand response and distributed generators not been operating will be called "peak reduction." The project estimated the peak reduction achieved in the entire feeder by the project's control of a limited number of the residential, commercial, and municipal resources on the feeder. The summary for these peak reduction estimates is found in Table 12. The project achieved impressive 19 percent and almost 30 percent average peak reductions for the 750- and 500-kW constraints, respectively. No peak reduction is estimated for the remaining 1500-kW feeder constraint condition, which never experienced challenging feeder congestion conditions and needed no peak management.

TABLE 12

Average Peak Reduction during Constrained Project Periods

| Period | Constraint | Mean Reduction | Sigma |
|---|---|---|---|
| Fall | 500 kW | 29.7% | 18.7% |
| Winter | 750 kW | 19.0% | 9.7% |

Figure 53:
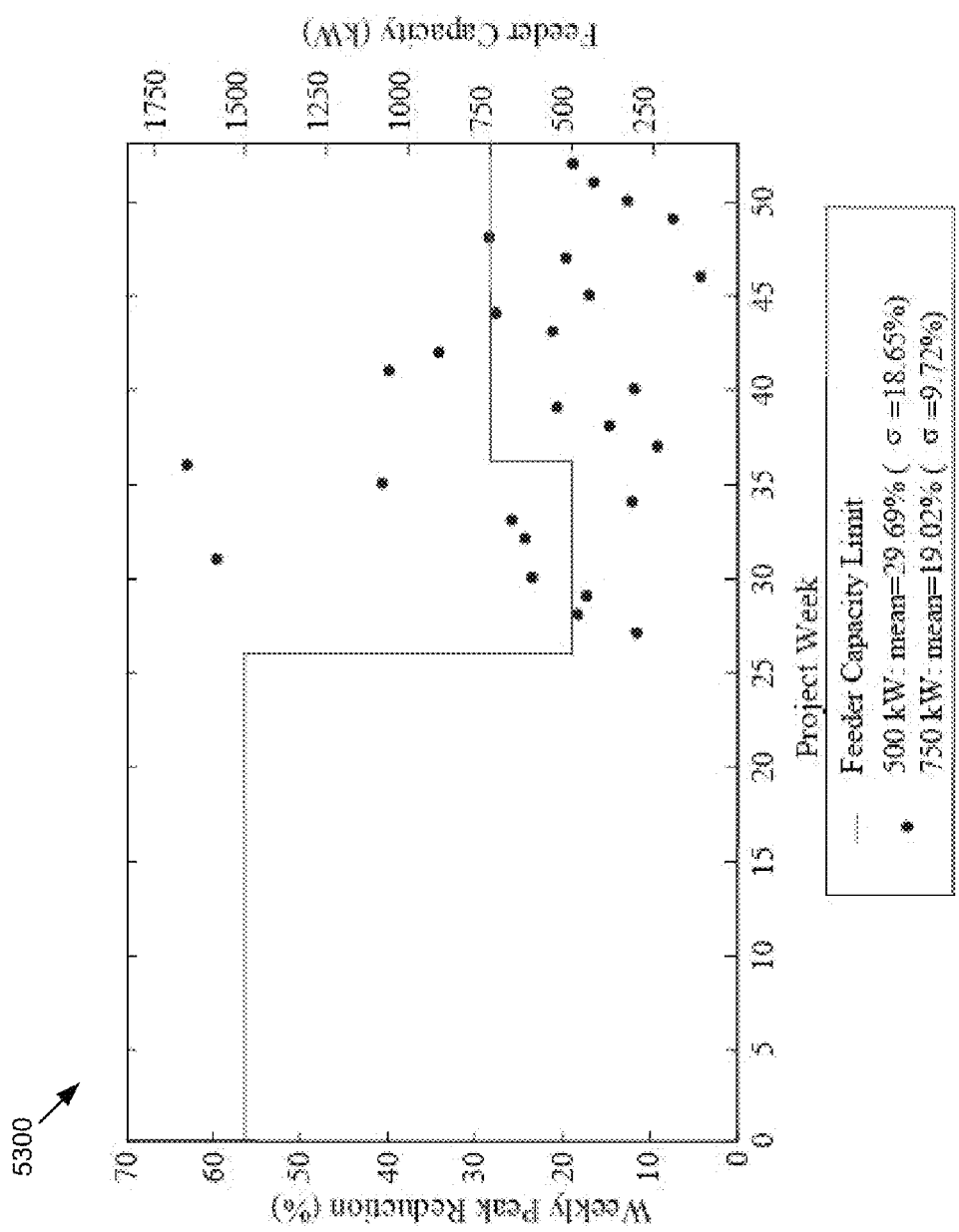
FIG. 53 is a graph showing peak reduction and imposed feeder capacities during an experimental use of an embodiment of the disclosed technology.

Graph 5300 of FIG. 53 shows the weekly peak reductions when the project constrained the feeder. The counterfactual ("would have been") load was calculated by using the buy bids to compute what the loads would have consumed had the market cleared at the average daily price with no variance. Since no distributed generators would have operated for the counterfactual, their operation was always excluded from the counterfactual projection. During the other two more constrained periods, peak reductions for many weeks greatly exceeded the reported averages.

Figure 54A:
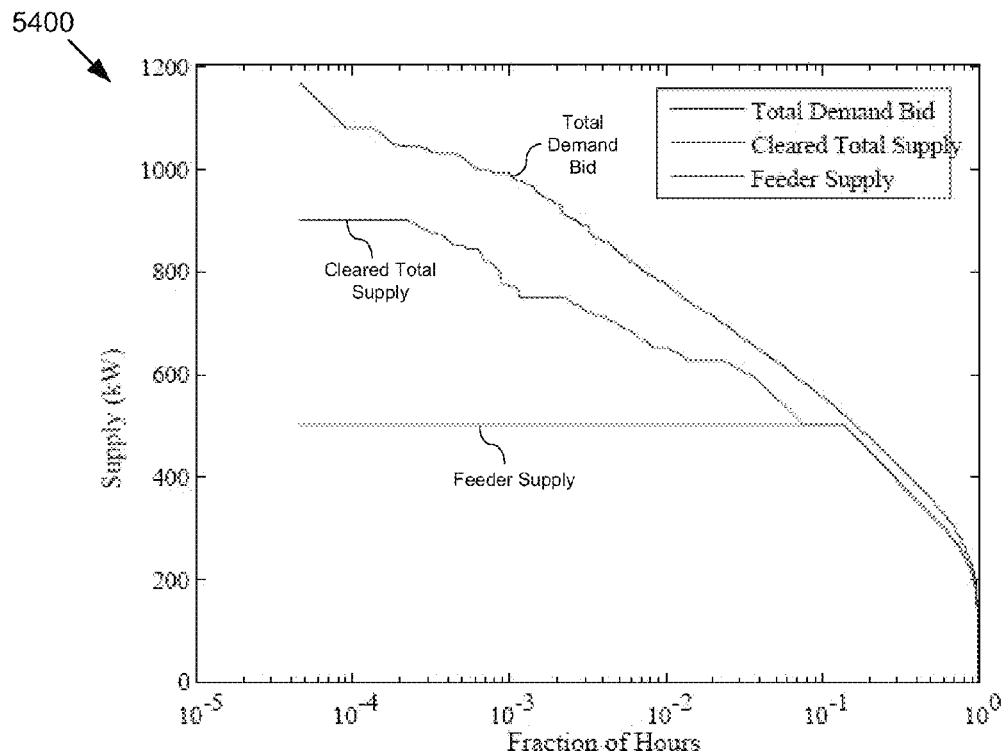
FIGS. 54A through 54C are graphs showing supply duration curves as were experienced during an experimental use of embodiments of the disclosed technology.
Figure 54B:
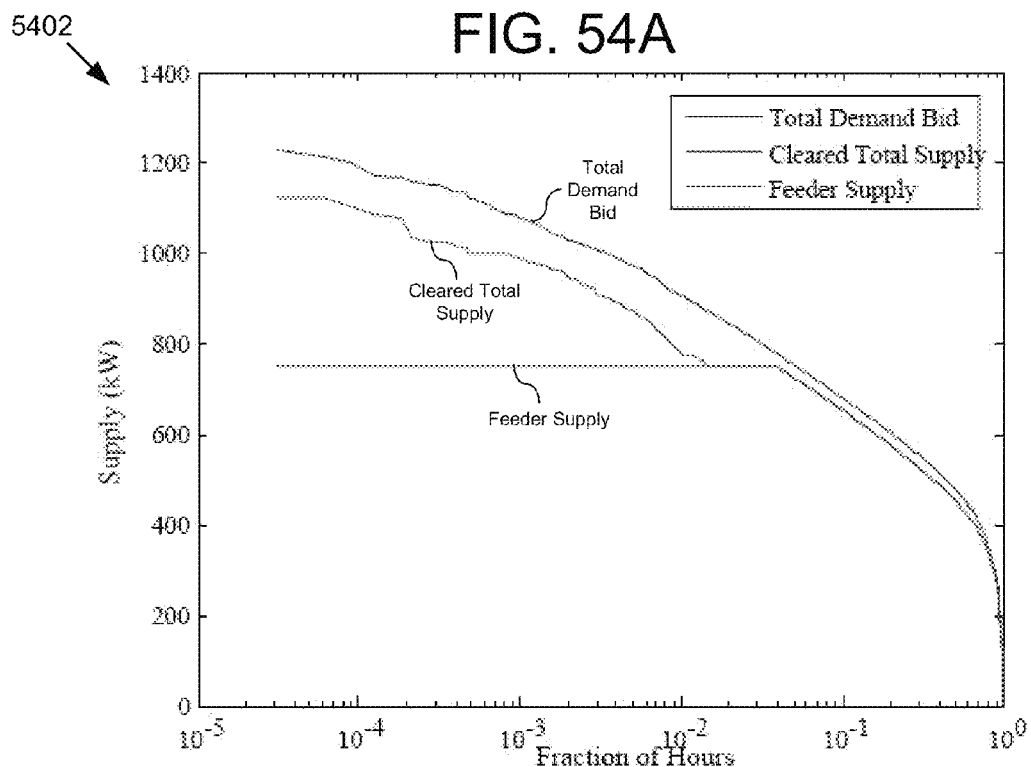
Figure 54C:
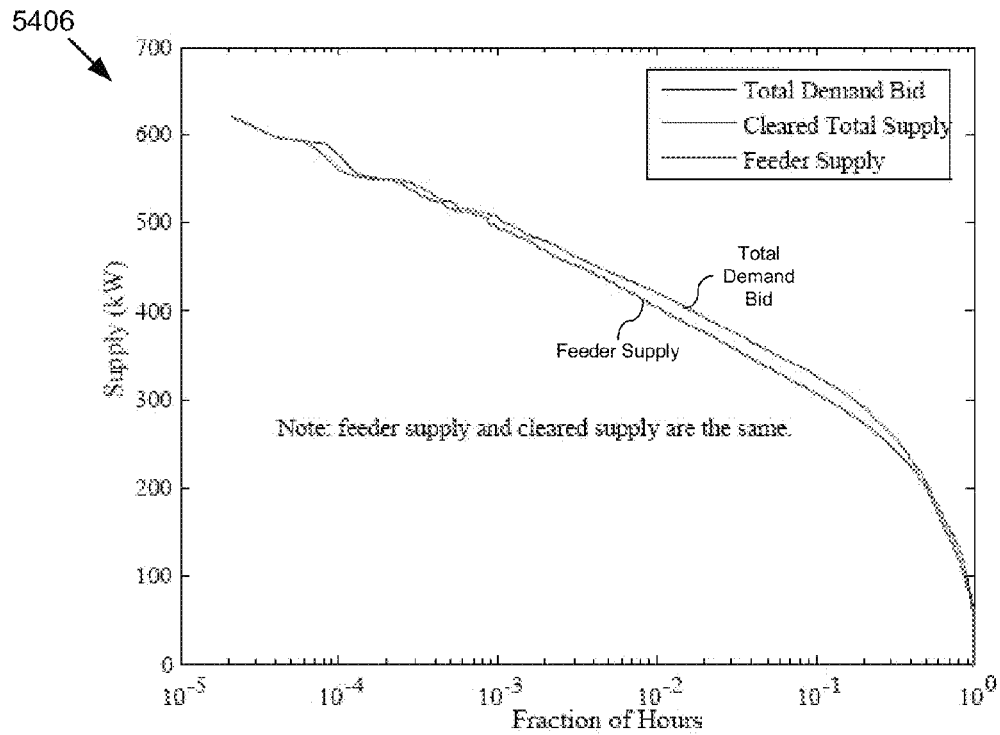

One important result for the project was its successful management of feeder power constraints under peak load conditions, as is shown in graphs 5400, 5402, and 5406 of FIGS. 54A-C. Whenever the feeder became constrained, additional supply was offered to, and in some cases delivered to, the load by distributed generators from within the feeder. The capacity of these distributed generators was seamlessly offered and cleared through the project's market. For the 500-kW feeder, the peak total demand bid capacity was 1,264 kW, and the peak cleared supply was 901 kW. For the 750-kW feeder, the peak total demand bid capacity was 1,280 kW, and the peak cleared supply was 1,138 kW. For the 1500-kW feeder, the peak demand bid and peak cleared supply were both 649 kW. Note that the virtual feeder itself was successfully managed to remain under its imposed distribution capacity limit (i.e., 500, 750, or 1500 kW) for all but one brief interval. In only one instance (under the 500-kW feeder) did the market fail to clear because the total supply offer was less than the portion of the demand bid from unresponsive, uncontrolled loads. During that single 5-minute period, the feeder supplied 520 kW, which was 20 kW (0.2 percent) over its limit.

10. Consumer Surplus

Figure 55:
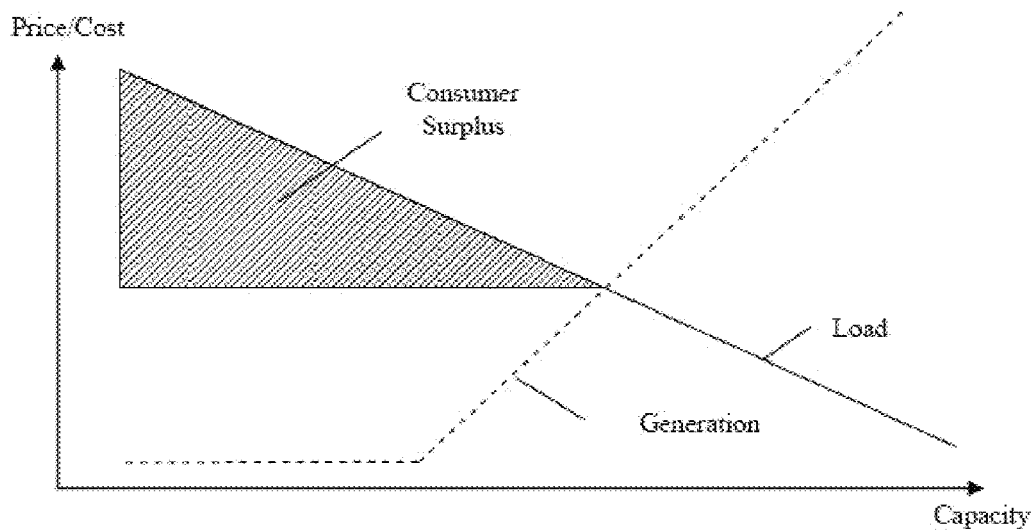
FIG. 55 is a graph illustrating the definition of consumer surplus using a market closing diagram.

"Consumer surplus" is that excess portion of satisfied load bids that exceeds the eventual closing market price in a two-sided market. In this sense, it can be represented by the shaded region in the market closing diagram 5500 of FIG. 55. It represents the bids from experiment participants that were "left on the table" unclaimed by the utility. The consumer surplus is the basis of an argument for price differentiation. The utility can capture more revenue if it can differentiate its service and price accordingly for supplying the highest bidding customers who consistently bid at the top left of the shown load curve.

Figure 56:
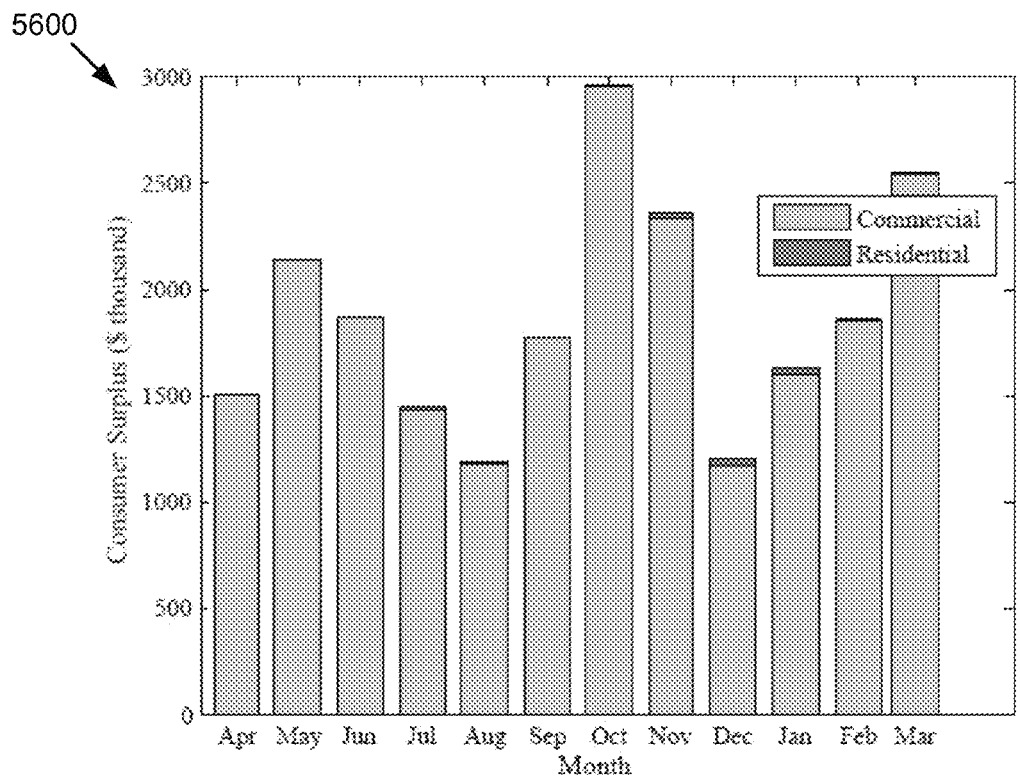
FIG. 56 is a graph showing consumer surplus by month during an experimental use of an embodiment of the disclosed technology.

The project examined the consumer surplus for both residential and commercial real-time participants. The residential consumer surplus was very small compared to the commercial consumer surplus, as is shown in graph 5600 of FIG. 56. This result was unexpected given that commercial loads are often given a discounted differentiated price, the opposite of what is suggested here.

The discrepancy between consumer surpluses of the commercial and residential load populations can be explained as follows: in fact, available resources for demand response at the commercial level were small compared to total demand of commercial buildings. The control system used the real-time price market signal to control the variable air volume dampers of commercial HVAC. From December through March, price also controlled the commercial electric boiler. However, the generating units adjacent to the commercial building could not be run on-grid, forcing those generator units to bid on the demand-side, and only for the displaceable load value of the served building load. The price of those distributed generator load bids was for the generator start-up with a minimum runtime 30 minutes, which was typically very much greater than the clearing price of the market. This suggests that the presence of the non-synchronous generators on the load side of the market artificially inflated the apparent bids of the commercial load entities and thus the magnitude of the commercial consumer surplus.

It should also be stated that commercial entities have more market clout than do residential customers and might have superior opportunities to change from one electricity supplier to another. This additional market force might entice suppliers to hold electricity prices low, even if commercial consumer surplus is shown to be high.

Figure 57:
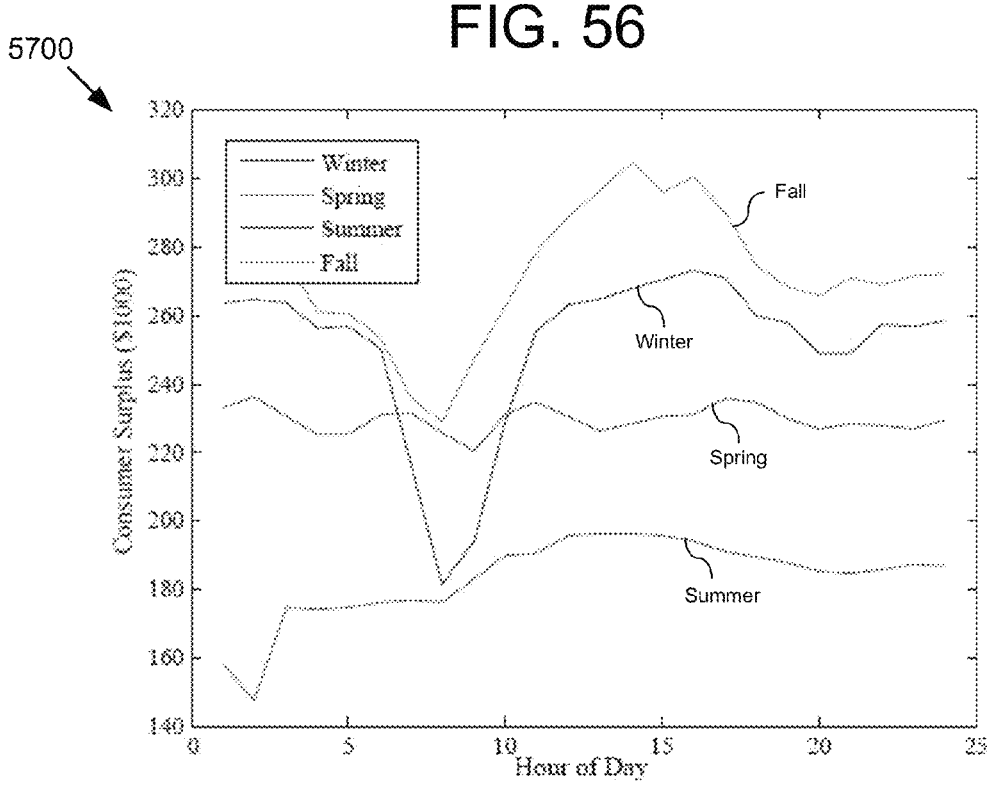
FIG. 57 is a graph showing seasonal consumer surplus by hour of day during an experimental use of an embodiment of the disclosed technology.

The consumer surplus expressed by hour of day and seasonally, as shown in graph 5700 of FIG. 57, reveals the degree to which consumer surplus varies during peak demand periods. Seasonally, the load and resource market lines intersect more steeply during fall and winter, thus increasing the consumer surplus during much of the day. However; during the peak heating hours, the consumer surplus diminishes with higher closing prices. This observation confirms that the real-time price control does indeed capture the economic value of demand for the utility during peak periods.

11. Production Dispatch

Figure 58A:
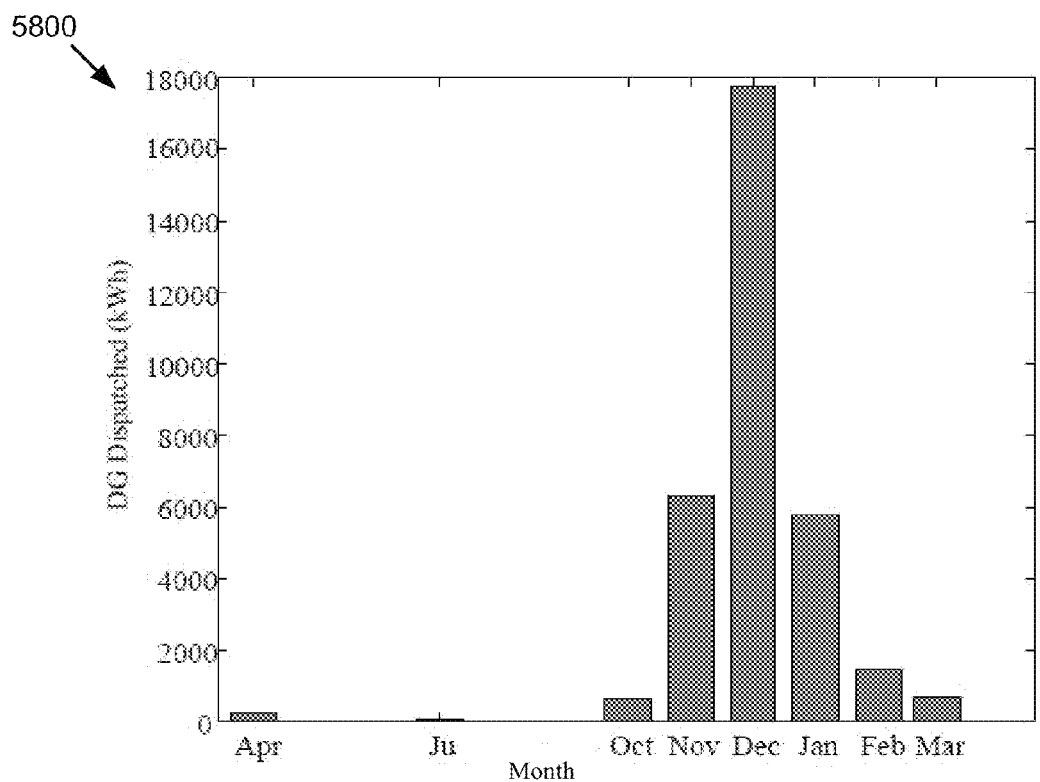
FIGS. 58A and 58B are graphs showing dispatched distributed generation during an experimental use of an embodiment of the disclosed technology.
Figure 58B:
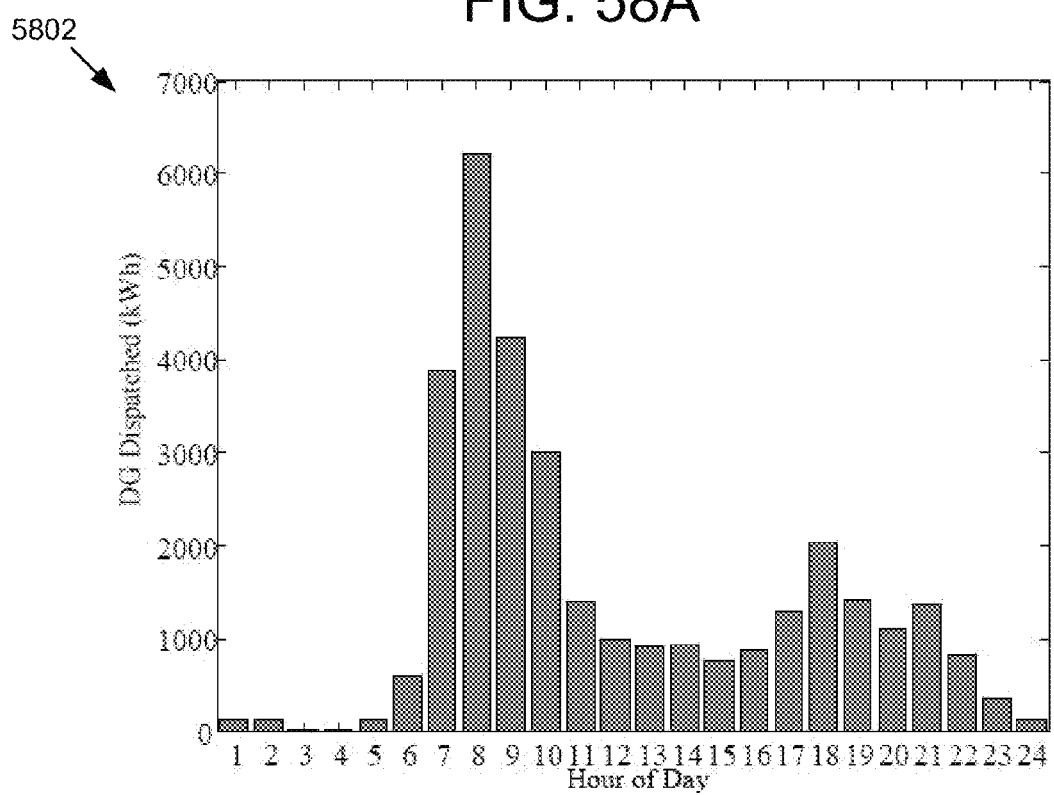

Distributed generating units were dispatched based on whether their bids cleared the market. The peak distributed generation dispatch in December (graph 5800 in FIG. 58A) is most likely due to the extreme shortage of wholesale power imposed on the project's feeder until December 8. After that date, the feeder capacity was increased from 500 to 750 kW, and thus less generation dispatch was required. The peak distributed generation dispatch hour was around 8:00 AM, with a smaller peak around 6:00 PM (graph 5802 in FIG. 58B). This observation coincides well with the demand load shapes presented earlier.

12. Contract Type Mixtures for Achieving Desirable Risk/Benefit Ratios

An innovative analysis approach was developed by and applied to the project market results. In this approach, analysis tools common for the selection of asset portfolios are applied to mixes of price contract types.

a. Efficient Frontiers

The concept of efficient frontiers was introduced in 1952 by Nobel Prize winner Harry Markowitz (1952) as part of the Capital Asset Pricing Model (CAPM) for portfolio theory. The principle is that combining several stocks into a portfolio can decrease the overall risk below that of any individual stock while still attaining a comparable return.

Figure 59:
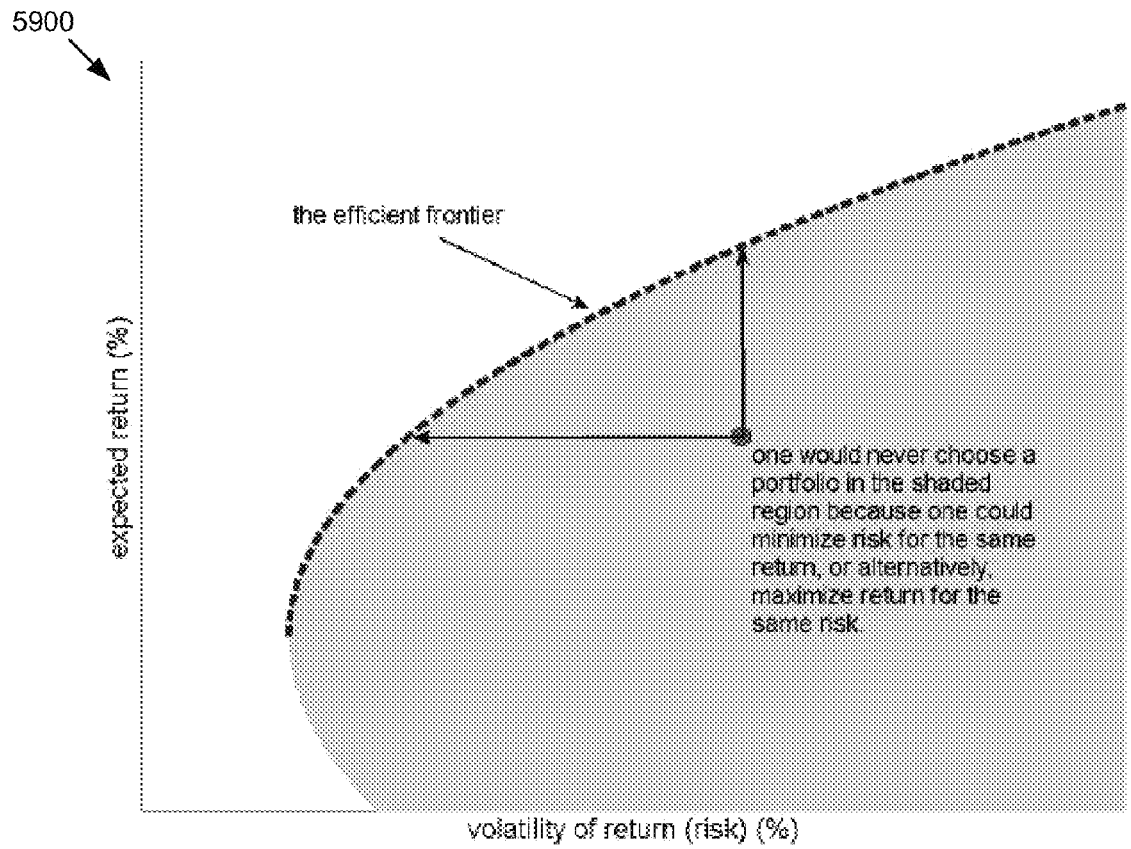
FIG. 59 is a graph illustrating the concept of an efficient frontier and other portfolio weightings.

Diagram 5900 in FIG. 59 depicts this idea. The area in green shows all possible ways (weightings) to combine a group of stocks to make up a portfolio. The top leading edge of this diagram, the efficient frontier, provides the optimal combinations (weightings) of these stocks. This top and left boundary provides the highest return for the lowest risks. No person should wish to invest in a portfolio below the efficient frontier. From below the efficient frontier, the return can always be increased without increasing the risk, or analogously, decrease the risk, for the same return.

For the stock market, risk is defined as the volatility of a stock. In its truest form, diagram 5900 shows that any number of normal random variable distributions combine to form a unique random variable distribution. The optimal way to combine any set of normal random variables can be determined.

The project poses the question, "Given several types of markets that can be offered to customers, what is the optimal combination of these markets to offer?" The Olympic Peninsula Project compared three principle market types: a fixed-price contract, a time-of-use contract, and a real-time price contract. Data obtained over a 1-year period make up the random variables that are needed to perform efficient frontier calculations.

The efficient frontier diagrams for contract types do not necessarily have the same implications as they do in stock analysis. For example, a point on the efficient frontier in stock analysis is by definition considered "good"; however, the efficient frontier for contract type analyses may be good or bad. This analysis does not provide conclusive answers, but rather it provides a rich mechanism to evaluate the consequences of any given contract type mix. Whether a mix is good or bad depends upon the objectives of the utility.

b. Combining Distributions

Figure 60:
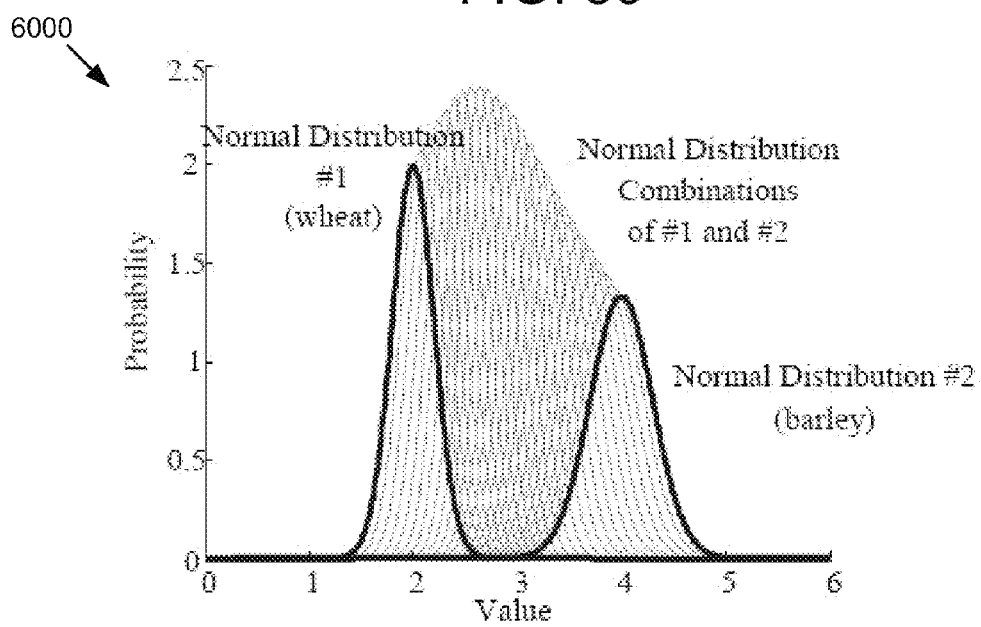
FIG. 60 is a graph illustrating two pure distribution curves and distributions for mixes of the two.

Consider two normal distribution curves, each defined by its mean and standard deviation. Diagram 6000 in FIG. 60 shows these two curves (bold blue). Remember, these two curves represent two different sets of data. For example, the first curve might represent income from selling only wheat, the second, only barley. What income should be expected by selling both wheat and barley? The green normal distribution functions result. There are many of these curves, each representing a different mix of wheat and barley. Together, all these curves represent all possible income levels obtainable by selling different combinations of wheat and barley.

It might be assumed that the mean value of each curve would simply follow a relatively straight line between the two curves, but as can be seen, that does not happen. More is going on. An efficient frontier has been created. Mathematically, this is simply combining the two probability density functions together in different proportions.

Figure 61:
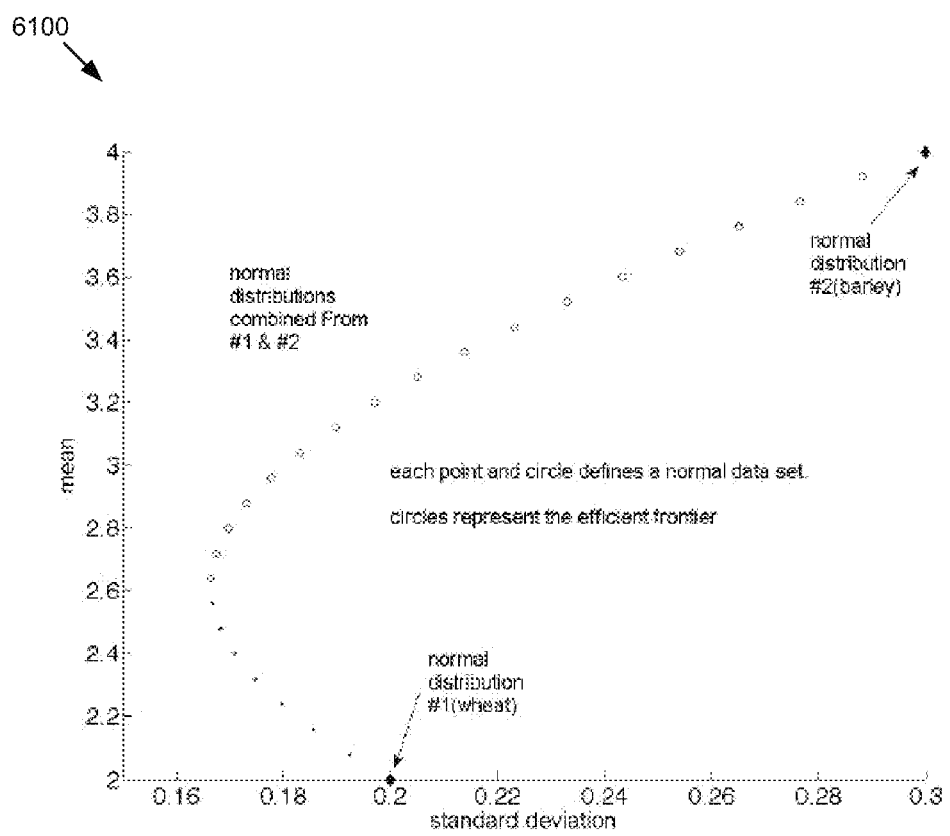
FIG. 61 is a graph showing efficient frontier mixtures of two pure distributions.

Diagram 6100 of FIG. 61 shows another way of viewing this same result. What mixture of wheat and barley should be sold given that the income (mean) and variability in income (standard deviation) of all possible proportions of wheat and barley are known? If the only goal is to increase income, then all of the barley should be sold. But what about the variability of the income? This may also be important if regular proceeds from sales are needed to support operations. If, however, this is not important, then it seems clear that Barley is the way to go.

For argument's sake, let's assume that the income stream is important, so it is desirable to have as consistent an income as possible. A person would be willing to sacrifice a little profit to make this happen. In this case, the optimal mix of wheat and barley occurs at mean 2.6 and standard deviation near 0.165. Anywhere between this point and point #2 (all barley) would be the efficient frontier, which have been denoted as small circles on this graph. It would be necessary to never drop below this optimal point, however, because then a decrease in income would accompany the variability of income.

What if wheat were sold exclusively? Given these observations, by selling a little barley along with the wheat, the income would both increase and become more stable.

c. Electric Power Markets

Now we will leave the examples of wheat and barley and consider the electric power utility industry. In the Olympic Peninsula Project, there were three types of residential contracts offered to consumers of electric power: fixed price, time-of-use, and the real-time price.

Figure 62:
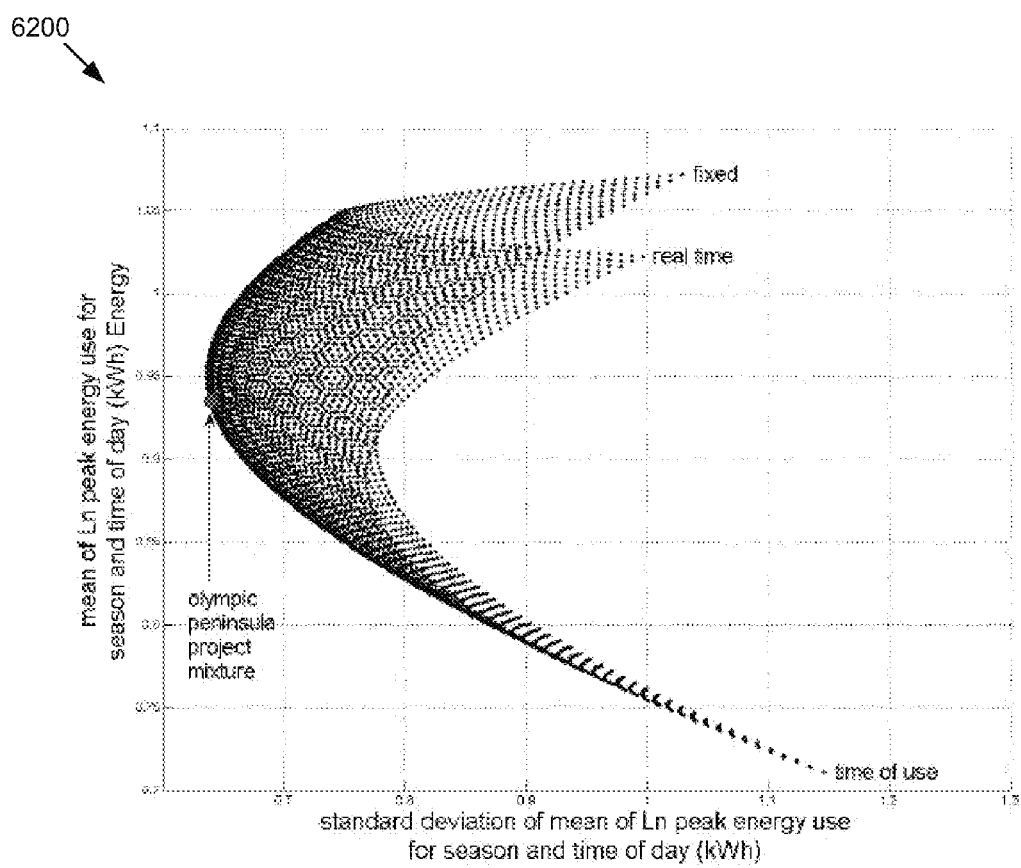
FIG. 62 is a graph showing peak energy use for season and time of day for the duration of an experimental use of an embodiment of the disclosed technology.

Diagram 6200 in FIG. 62 was created from the peak energy data measured over the duration of the project. Only at the times of the year and the day when energy consumption was high were data used for this analysis. Specifically, the time of year from November 1 to December 8 and the hours of the day from 6 to 9 AM and from 6 to 9 PM were used. These data represent the times when the electric power system was at its highest capacity, and therefore they represent the best time to look at how effectively the different project contract types influenced the system capacity.

An efficient frontier analysis was performed. The shaded surface represents all possible proportions of combining the three contract types. The three sharp points at the ends of the shaded regions represent the three pure contract types. For example, the word "fixed" appears near the coordinate (1.04, 1.075). As one moves away from the corner points in the shaded region, three contact types start mixing together. The Olympic Peninsula Project itself had a mixture of roughly ⅓ of each contract type, represented on this figure by a red dot.

If a utility wishes to reduce its peak energy use during its times of high capacity, diagram 6200 in FIG. 62 suggests the utility should select a contract mix as low as possible on the peak energy axis. This point happens to correspond to a 100 percent time-of-use contract assignment for this project data. It might be assumed that the utility would want the variability also to be low. However, once the peak is low enough, the utility might want the customers to further be responsive-to change their energy use as a result of price signals. This implies the utility might actually desire more variability.

By itself, one efficient frontier graph is easily enough interpreted and might result in a clear suggestion of which mix should be sought, as was the case above. However, efficient frontier graphs can be drawn for other parameters, and the optimum mixture of contract types from one efficient frontier graph and a utility's objectives for that variable might not at all optimize the utility's objectives for another variable.

Consider another variable and its efficient frontier graph. Gross margin is defined as the revenue generated by the sale of electricity, minus the cost of that electricity. It does not include costs of infrastructure, labor, taxes, overheads, or other fixed costs. It simply gives an early preview of what profits might look like. Omitting these other fixed charges helps keep this financial metric relevant to a broad range of companies, all of which can add back in their own unique fixed charges. Unlike the previous analysis that looked only at peak periods of electricity use, this gross-margin analysis uses data for the residential homes for the entire project year, 24 hours per day and 7 days per week. Keep in mind that these data are simply different parameters from this same project.

Figure 63:
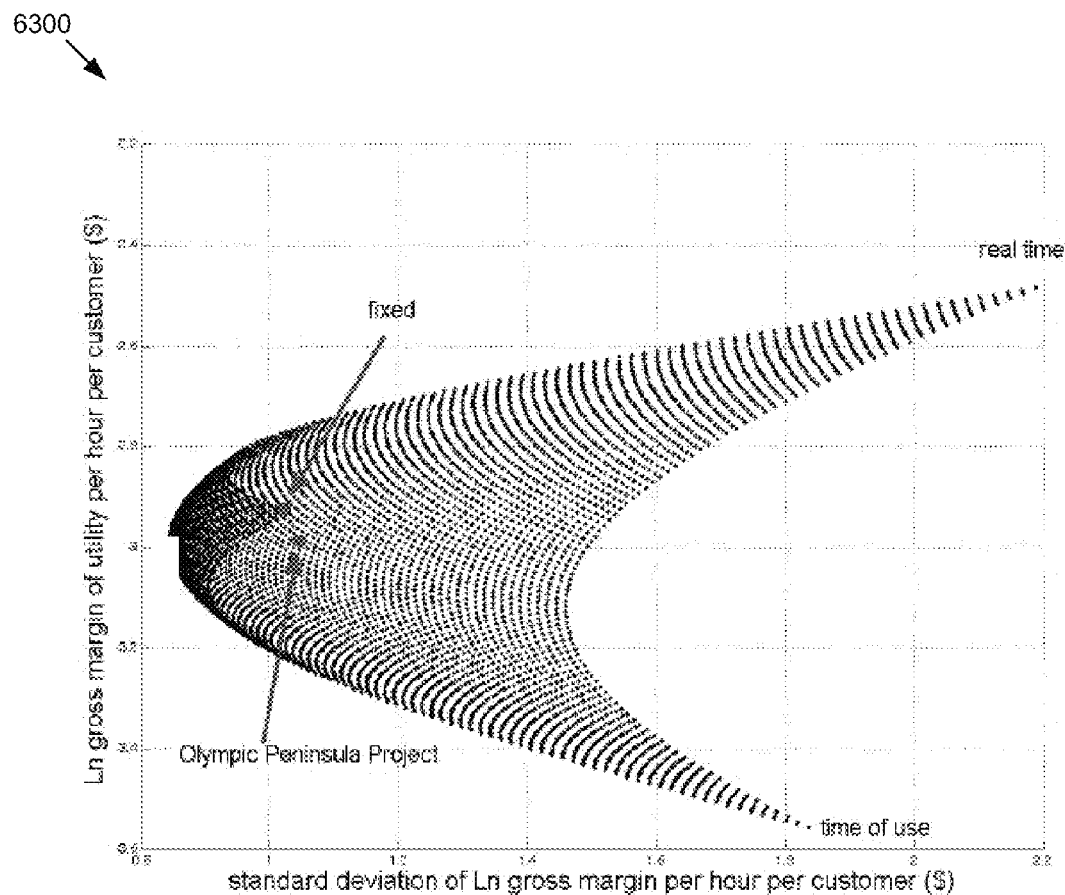
FIG. 63 is a graph showing a gross margin of utility per hour per experiment participant.

Diagram 6300 in FIG. 63 is the efficient frontier graph for gross margin for the duration of the Olympic Peninsula Project. There are still three extreme locations, but the pure fixed contract point is somewhat hidden behind the surface. Both this point and the project's gross margin are emphasized by red dots on the figure. Whereas mixtures heavy in time-of-use contracts minimized energy peaks in the previous analysis and might be preferred, time-of-use contracts also minimize gross margin and would not be preferred in this analysis. This is a clear example of how utility objections might create contradictions during efficient frontier analyses of different parameters.

Regardless, the adoption of this analysis approach shows great promise for utility selection of contract mixes. This approach clarifies the tradeoffs in satisfying utility objectives and acceptable risk, or variability, of tradeoffs.

J. Conclusions

The Olympic Peninsula Project investigated "smart grid" technologies for achieving better grid asset utilization and improved system efficiencies. The project used a futuristic virtual feeder on which it provided a shadow market. Controllers were provided to the various market participants to automate their preferred responses for their loads and supplies in response to the market's signals. The shadow market induced useful energy price responses from residential electricity customers who had been assigned to one of three contract types. One contract type was a two-sided, real-time local marginal price that cleared every 5 minutes. Commercial buildings and municipal water pumps also responded.

Backup distributed generators provided additional supply for the feeder when needed. The project involved a variety of technologies from residential, commercial, and municipal customers and from both the demand and supply sides. The smart grid technologies were used in concert, not as isolated technologies.

The project managed a feeder and its imposed feeder constraint using these technologies. While they did not truly reside on the same Olympic Peninsula feeder, the project was able to control and monitor a realistic set of supply and demand resources as if they resided on the same feeder—a virtual feeder. To conserve project expense and time, the project also defined some virtual generator resources to bolster the supply available from the feeder's real backup generators. A distribution constraint was then imposed on the energy that could be imported into the virtual feeder from existing distribution lines-much like the real transmission constraint that presently limits transmission onto the Olympic Peninsula. Three different constraint magnitudes were imposed from 1500 kW, which never truly constrained the feeder, to 500 kW, which severely constrained the feeder. The project market effectively deferred loads and invited distributed generation supply to run to successfully hold the distribution below its imposed constraint. For only one 5-minute interval did the project allow the constraint to be exceeded when total feeder supply was temporarily unable to supply that part of the feeder load that was uncontrolled by, and therefore unresponsive to, the market.

Market-based control was investigated as a tool for obtaining useful price-based responses from single premises. Zones within PNNL's office and laboratory facilities in Sequim, Wash., were made to compete for the right to receive conditioned air using a local version of market-based control. Thermostatically controlled zones permitted their effective set points to be adjusted relative to changes in market prices. While able to bid directly into the project's market, the zones nonetheless responded to the cleared market price and thereby helped fulfill feeder energy objectives—namely, management of the feeder constraint. Temperatures were automatically set back during constrained feeder conditions.

Market-based control was investigated as a tool for obtaining price-based responses for the entire feeder. Market-based control was also implemented on the entire project feeder for control of load and supply that could respond to the project's two-way, real-time market. Price became the common language by which values of load and supply were bid into the market every 5 minutes. As the loads bid the value of their present need and as supply, including the supply from the distribution feeder line, offered energy at its costs, the cleared electricity price quite naturally rose as the constraint feeder capacity was approached. At the higher price, loads deferred their consumption, and some distributed generators eventually won the right to supply their energy onto the feeder. The market was built upon the region's wholesale electricity market (MIDC) and therefore also was affected by and responded to the more global balance of supply and demand on the larger grid. The deferral of system load at these constraint capacities became apparent on the project's load duration curves, which exhibited stepped plateaus wherever the system load became deferred.

Peak load reduction was also investigated. A mixture of price signals, including real-time and time-of-use, were provided and affected electricity consumption on the project's feeder. A comparison of the resulting average residential load shapes for residential participants revealed some interesting characteristic differences. For example, abrupt changes were observed in the time-of-use load shape at the start and stop of peak intervals. The small population size prevented the project from making more direct comparisons of peaks for the different residential contract types. Indeed, the control objectives of the real-time and time-of-use contract types were noted to be quite different. Because bids were recorded from participating loads and generators, a "counterfactual" baseline could be calculated and used for comparison. The project's load-duration curves for the 750-kW and 500-kW constraint periods suggest that their worst peaks were diminished by about 5 and 20 percent, respectively, in comparison with this baseline. Although average energy consumption during the project was similar across the participants having the various contract types, time-of-use contract members also reduced their total energy consumption more than did members of the other contract groups and thereby achieved conservation benefits in addition to their off-peak savings.

Internet-based communications were investigated for use in controlling distributed resources. Residential participants were required to supply broadband Internet connections on which the home gateway of the project's energy-management system could communicate. While the project experienced poor average Internet connectivity (55 to 80 percent) and experienced particularly poor connectivity after regional storms, the Internet control overcame these obstacles. With very few exceptions, upon losing Internet connectivity, the distributed resources performed appropriately in a default mode until the connections could be reestablished. The project found nothing in this respect that should prevent scaling up this investigation to full implementation.

Residents eagerly accepted and participated in price-responsive contract options. Residential participants were provided educational materials that described their project equipment and how the equipment could be configured to earn incentives from the project. The participants appeared to understand and eagerly requested the price-responsive contract options, including real-time and time-of-use contracts. After participating in the project, 73 percent of the participants said they would select a price-responsive contract type if given the future opportunity. During the closing survey, 95 percent of residential participants said they would be likely or very likely to participate in a similar project in the future. Eighty percent of participants were at least somewhat satisfied with the residential energy-management equipment that had been provided to them by the project.

Automation was particularly helpful for obtaining consistent responses from both supply and demand resources. Participants tended to spend very little time managing, or even considering, the ways they used electricity. Indeed, 55 percent of final survey respondents did not recall to which project contract group they had been assigned. This is a strong endorsement for automated controllers that can be set once and forgotten. Once configured, automated settings will not likely be changed by participants unless their appliances cause them to become inconvenienced (e.g., cold, delayed, annoyed). The project apparently experienced this response when water heater controllers once malfunctioned, and annoyed participants responded by thereafter preventing any control actions by their water heaters. Project monetary incentives were insufficient for these participants to later reconsider their decisions and re-try the more economical water heater comfort settings.

The interaction between automation and human volition was also investigated. Some traditional time-of-use programs have relied only on participants' memory to turn off non-critical loads during peak times. The Olympic Peninsula Project was closer to the other extreme, where most energy responses were carried out automatically. Between these extremes, a sample of project clothes dryers warned their users when prices were high.

Automation was perhaps even more important for the larger commercial and municipal loads and sources. Through automation, even critical resources (like the energy in the top few feet of a municipal water reservoir) could be controlled. Such resources could never be controlled usefully without automation. Exciting opportunities perhaps lie unused for fast automation to provide spinning reserve and regulation and perhaps other valuable ancillary services.

The friendliness with which the project invited and practiced demand response may be useful to attaining needed resource magnitudes. The project provided all participants and resource operators a means by which they could temporarily override the control asserted by the project. In practice, very few participants appeared to have asserted their right to override project control. The project also requested decisions from participants in relative terms that they could easily understand and use. While participants might be comfortable stating an exact zone temperature preference, few are sophisticated enough to state a desired tradeoff between electricity price and thermostat setback. Teaching such formulas to all participants would not be productive. These same participants were, however, intuitively capable of selecting from among relative comfort settings stated as "maximum comfort" or "balanced economy," for examples. The energy information available to all project participants on the Web was well received. Electricity consumers will make better electrical-energy decisions if they are given useful feedback. A monthly energy bill is not sufficient feedback.

Real-time price contracts especially shifted thermostatically-controlled loads to take advantage of off-peak opportunities. An interesting shift in the electricity consumption of real-time price contract thermostats was observed. Because the thermostats tracked average price and standard deviations in that price, electricity consumption was advanced to early morning hours when electricity is a bargain. During unconstrained days, the thermostat took advantage of the diurnal variations in wholesale price. During constrained days, the thermostat "learned" to avoid pricy mid-morning local marginal prices. While pre-heating and pre-cooling were not explicitly designed into the thermostats (they had no explicit predictive ability) their loads were effectively shifted to emulate pre-heating and pre-cooling. The magnitude and pattern of this load shift exceeded the project's predictions. These thermostats overcompensated to correct system peaks. Automatic temperature setbacks over the range prescribed by participants helped flatten system load. These benefits were not easily compared against time-of-use benefits, the response of which is not always so well aligned with true system constraints.

Municipal water pumps were also incorporated into the responsive demand mix. The project achieved price-responsive control of five municipal water pumps. After negotiating with water department representatives who bear the ultimate responsibility to verify that their reservoirs remain full, the project was allowed to affect operation of the pumps, bidding the value of and controlling only the top several feet of two reservoirs' water levels. The water-system operators were provided the necessary automation and the ability to override project control at any time. The limited range of operation that was permitted by system operators perhaps reduced the effectiveness of this project resource, but many such municipal-load resources exist that might become price responsive if the control method can be standardized and eventually trusted by municipalities and their system operators.

While understandably constrained by environmental concerns, the project's real and virtual distributed generators effectively prevented the overloading of a constrained feeder distribution line during peak periods. The project controlled two backup diesel generators (175 and 600-kW) through their automatic transfer switches and one gas microturbine (30-kW) that ran in parallel with the grid. The diesel backup generators bid the capacities of the office building loads they protected; the microturbine bid its nameplate capacity. These generators bid a price for their supply capacity based on their actual fixed and variable expenses. Startup and shutdown expenses were added to the bids to deter the generators from cycling too rapidly with the fast 5-minute market signals. The environmentally licensed runtime hours were constrained by a "premium" bid factor that increased bids proportional to expended licensed hours and remaining license term. To conserve project expense, several additional distributed generators were emulated on the project's virtual feeder, operating like the real generators with similarly imposed constraints. These generation resources—virtual and real alike—were called on multiple times during the project to supply electricity that could not be supplied by the constrained distribution feeder. It was shown that these distributed generators—even groups of emergency backup generators like those found behind many commercial buildings—could be configured to offer their supply, biddable as a real-time resource into a local marginal price market Modem portfolio theory was applied to the mix of residential contract types and should prove useful for utility analysis. Researchers applied modem portfolio theory to the analysis of mixtures of utility contract types. As was shown in this report, portfolio theory provides an analytic structure for better understanding the interplay of utility objectives, some of which conflict or compete with one another. Much as one benefits by owning diversified stocks, a utility benefits by offering a diversified set of energy contract types. Any mixture of contracts reduces the overall operational variability that a utility accepts below that of anyone single contract type. The practice of portfolio theory suggests optimal mixtures of these contracts, described in the theory as efficient frontiers.

Price market participants responded to incentives offered through a shadow market. The project offered real monetary incentives to participants for their desirable responses to the project's price signals. A shadow electricity market was implemented, in which participants' accounts were filled each month and thereafter depleted commensurate with the participants' electricity consumption. Those who responded most to the price signals received the greatest cash remainders from their accounts. After fully implementing the shadow market, the project realized the approach itself might be innovative. This approach permitted the conduct of a field experiment while avoiding delays from regulatory commissions and their processes. Participants fully agreed to the terms of participation. The project did not in any way affect the existing contractual agreements, bills, and payments between participants and their local utilities. The only downfall of the approach was that in providing this shadow market, the project was able to compensate only changes in participants' energy behaviors. Therefore, the effects of weather and other factors that could affect participants' electricity consumption beyond the control of the project were amplified and varied wildly. This variability prevented the project from providing participants with the real-time feedback concerning the status of their shadow market accounts that it had hoped to provide. This observed variability would diminish if the project were to have affected electricity customers' entire bills rather than only the marginal changes in those bills.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims.

What is claimed is:

1. A method for generating a bid value for purchasing electricity in a market-based resource allocation system, comprising:
by computing hardware,
receiving an indication of a current status of a system controlled by an electrical device;
computing an average dispatched value using multiple dispatched values from a previous time period, the multiple dispatched values representing values at which electricity was dispatched by the market-based resource allocation system during the previous time period;
computing a bid value for purchasing electricity sufficient to operate the electrical device, the computing being performed using at least the current status of the system and the average dispatched value;
transmitting the bid value to a central computer in the market-based resource allocation system;
receiving from the central computer an indication of a dispatched value for a current time frame;
comparing the bid value to the dispatched value for the current time frame; and
generating a signal to activate the electrical device if the bid value is equal to or exceeds the dispatched value for the current time frame.

2. The method of claim 1, wherein the method further comprises computing a standard deviation of the multiple dispatched values from the previous time period, and wherein the computing of the bid value is additionally performed using the standard deviation.

3. The method of claim 1, wherein the method further comprises receiving a user comfort setting selected by a user, the user comfort setting being selected from at least a first user comfort setting and a second user comfort setting, the first user comfort setting indicating the user's willingness to pay more to achieve a desired status of the system controlled by the electrical device relative to the second user comfort setting, and wherein the computing of the bid value is additionally performed using the user comfort setting.

4. The method of claim 1, wherein the electrical device is a pump and the current status is a measurement of a water level affected by the pump.

5. The method of claim 1, wherein the electrical device is an electric charger for charging a battery, and wherein the current status of the system is the state of charge of the battery.

6. The method of claim 5, wherein the bid value is computed according to the following equation:

$$P_{bid}=P_{avg}-kP_{std}SOC_{dev}$$

where $P_{bid}$ is the bid value, $P_{avg}$ is an average daily clearing price of energy, $P_{std}$ is a daily standard deviation of price, and $SOC_{dev}$ is the fractional deviation of the SOC from a desired SOC ($SOC_{des}$) with respect to minimum and maximum limits ($SOC_{min}$ and $SOC_{max}$) set by a user.

7. The method of claim 1, further comprising continuously repeating the acts of receiving, computing the average dispatched value, and computing the bid value over fixed periods of time.

8. The method of claim 7, wherein the fixed periods of time are periods of 15 minutes or less.

9. The method of claim 1, wherein the electrical device is an air-conditioning unit; heating unit; heating, ventilation, and air conditioning (HVAC) system; hot water heater; refrigerator; dish washer; washing machine; dryer; oven; microwave oven; pump; home lighting system; electrical charger, electric vehicle charger; or home electrical system.

10. An integrated circuit, pump, or electrical charger comprising computing hardware configured to perform the method of claim 1.

11. A computer-readable storage device storing computer-executable instructions which when executed by a computer cause the computer to perform a method for generating a bid value for purchasing electricity in a market-based resource allocation system, the method comprising:
receiving an indication of a current status of a system controlled by an electrical device;
computing an average dispatched value using multiple dispatched values from a previous time period, the multiple dispatched values representing values at which electricity was dispatched by the market-based resource allocation system during the previous time period;
computing a bid value for purchasing electricity sufficient to operate the electrical device, the computing being performed using at least the current status of the system and the average dispatched value;
transmitting the bid value to a central computer in the market-based resource allocation system;
receiving from the central computer an indication of a dispatched value for a current time frame;
comparing the bid value to the dispatched value for the current time frame; and
generating a signal to activate the electrical device if the bid value is equal to or exceeds the dispatched value for the current time frame.

12. The storage device of claim 11, wherein the method further comprises computing a standard deviation of the multiple dispatched values from the previous time period, and wherein the computing of the bid value is additionally performed using the standard deviation.

13. The storage device of claim 11, wherein the method further comprises receiving a user comfort setting selected by a user, the user comfort setting being selected from at least a first user comfort setting and a second user comfort setting, the first user comfort setting indicating the user's willingness to pay more to achieve a desired status of the system controlled by the electrical device relative to the second user comfort setting, and wherein the computing of the bid value is additionally performed using the user comfort setting.

14. The storage device of claim 11, wherein the electrical device is a pump and the current status is a measurement of a water level affected by the pump.

15. The storage device of claim 11, wherein the electrical device is an electric charger for charging a battery, and wherein the current status of the system is the state of charge of the battery.

16. The storage device of claim 11, wherein the bid value is computed according to the following equation:

$$P_{bid}=P_{avg}-kP_{std}SOC_{dev}$$

where $P_{bid}$ is the bid value, $P_{avg}$ is an average daily clearing price of energy, $P_{std}$ is a daily standard deviation of price, and $SOC_{dev}$ is the fractional deviation of the SOC from a desired SOC ($SOC_{des}$) with respect to minimum and maximum limits ($SOC_{min}$ and $SOC_{max}$) set by a user.

17. The storage device of claim 11, wherein the method further comprises continuously repeating the acts of receiving, computing the average dispatched value, and computing the bid value over fixed periods of time.

18. The storage device of claim 17, wherein the fixed periods of time are periods of 15 minutes or less.

19. The storage device of claim 11, wherein the electrical device is an air-conditioning unit; heating unit; heating, ventilation, and air conditioning (HVAC) system; hot water heater; refrigerator; dish washer; washing machine; dryer; oven; microwave oven; pump; home lighting system; electrical charger, electric vehicle charger; or home electrical system.

20. A system for generating a bid value for purchasing electricity in a market-based resource allocation system, the system comprising:
   computing hardware configured to receive an indication of a current status of a system controlled by an electrical device;
   computing hardware configured to compute an average dispatched value using multiple dispatched values from a previous time period, the multiple dispatched values representing values at which electricity was dispatched by the market-based resource allocation system during the previous time period; and
   computing hardware configured to compute a bid value for purchasing electricity sufficient to operate the electrical device, the computing being performed using at least the current status of the system and the average dispatched value;
   computing hardware configured to transmit the bid value to a central computer in the market-based resource allocation system;
   computing hardware configured to receive from the central computer an indication of a dispatched value for a current time frame;
   computing hardware configured to compare the bid value to the dispatched value for the current time frame; and
   computing hardware configured to generate a signal to activate the electrical device if the bid value is equal to or exceeds the dispatched value for the current time frame.

* * * * *